(12) United States Patent
Nishiyama et al.

(10) Patent No.: US 6,192,327 B1
(45) Date of Patent: Feb. 20, 2001

(54) INJECTION MOLD DESIGN SYSTEM AND INJECTION MOLD DESIGN METHOD

(75) Inventors: Shusaku Nishiyama; Shingo Yamaguchi; Tatsuo Kimura; Masayuki Imakado; Naoki Asano, all of Kawasaki; Fumihiko Makiuchi, Nagano, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/084,965

(22) Filed: May 27, 1998

Related U.S. Application Data

(62) Division of application No. 08/614,055, filed on Mar. 12, 1996, now Pat. No. 5,812,402.

(30) Foreign Application Priority Data

Nov. 2, 1995 (JP) .................................... 7-285944
Jan. 17, 1996 (JP) ......................................... 8-5329

(51) Int. Cl.[7] ................................................ G06F 101/00
(52) U.S. Cl. .................................. 703/2; 703/7; 700/97; 700/100; 700/101; 700/102; 700/103
(58) Field of Search ............................... 364/468; 703/2, 703/7; 700/97, 100, 101, 102, 103; 425/130, 132, 144

(56) References Cited

U.S. PATENT DOCUMENTS

| Re. 25,560 | 4/1964 | Gifford | 29/156.7 |
|---|---|---|---|
| 3,779,680 | 12/1973 | Manceau | 425/145 |
| 4,005,961 | 2/1977 | Manceau | 425/190 |
| 4,014,970 | 3/1977 | Jahnle | 264/161 |
| 4,336,920 | 6/1982 | Murray | 251/357 |
| 4,389,365 | 6/1983 | Kudriavetz | 264/297.08 |
| 4,525,134 | 6/1985 | McHenry et al. | 425/130 |
| 4,556,378 | 12/1985 | Nyfeler et al. | 425/143 |
| 4,562,026 | 12/1985 | Mosher | 264/135 |
| 4,849,062 | 7/1989 | Jennet et al. | 364/156 |

(List continued on next page.)

FOREIGN PATENT DOCUMENTS

| 0 074 320 A1 | 3/1983 | (EP) | B29F/1/06 |
|---|---|---|---|
| 0 090 600 A2 | 5/1983 | (EP) | A61J/3/07 |
| 0 082 757 A1 | 6/1983 | (EP) | B29F/1/12 |
| WO 9213301 | 12/1991 | (WO) | G05B/19/04 |

OTHER PUBLICATIONS

Tseng, et al., "Knowledge–Based Mold Design For Injection Molding Processing" IEEE, 1990, pp. 1199–1204.
Bilge et al, "An Integrated Computer–Aided Process Planning System for Injection Mold Manufacturing," 1996 IEEE Conference on Emerging Technologies and Factory Automation, pp. 123–129, Nov. 1996.*

Primary Examiner—Kevin J. Teska
Assistant Examiner—Samuel Broda
(74) Attorney, Agent, or Firm—Staas & Halsey, LLP

(57) ABSTRACT

An injection mold design method for correcting a profile of a product to be fabricated into a releasable profile from a mold to design an injection mold based on a corrected product shape, utilizing a storage device for storing information of the product shape and mold profile, a display device for displaying the product shape or the mold profile on a screen based on the information read from the storage device, an input device for inputting designation information necessary for correction of the product shape or the mold profile, and a controlling device for unloading information of lines or planes being obstructive to correction of the product shape and the mold profile in the storage device in response to the designation information input by the input device. The method comprises removing lines or planes from the screen, and replotting the lines or the planes on the screen in terms of the information of lines or planes unloaded into the storage device after the correction operation of the product shape or the mold profile is completed.

98 Claims, 96 Drawing Sheets

U.S. PATENT DOCUMENTS

| | | | |
|---|---|---|---|
| 5,258,918 | 11/1993 | Giancola | 364/475.08 |
| 5,296,197 | 3/1994 | Kamiguchi et al. | 422/103 |
| 5,309,369 | 5/1994 | Kamiguchi et al. | 364/475.05 |
| 5,350,546 | 9/1994 | Takeuchi et al. | 264/40.1 |
| 5,539,650 | 7/1996 | Hehl | 364/475.05 |
| 5,812,402 * | 9/1998 | Nishiyama et al. | 364/468.03 |

* cited by examiner

| | (6) BOTTOM | |
|---|---|---|
| (10) LEFT REAR | (3) REAR | (9) RIGHT REAR |
| (5) LEFT SIDE | (1) TOP | (4) RIGHT SIDE |
| (8) LEFT FRONT | (2) FRONT | (7) RIGHT FRONT |

; INDICATES PARTING LINE

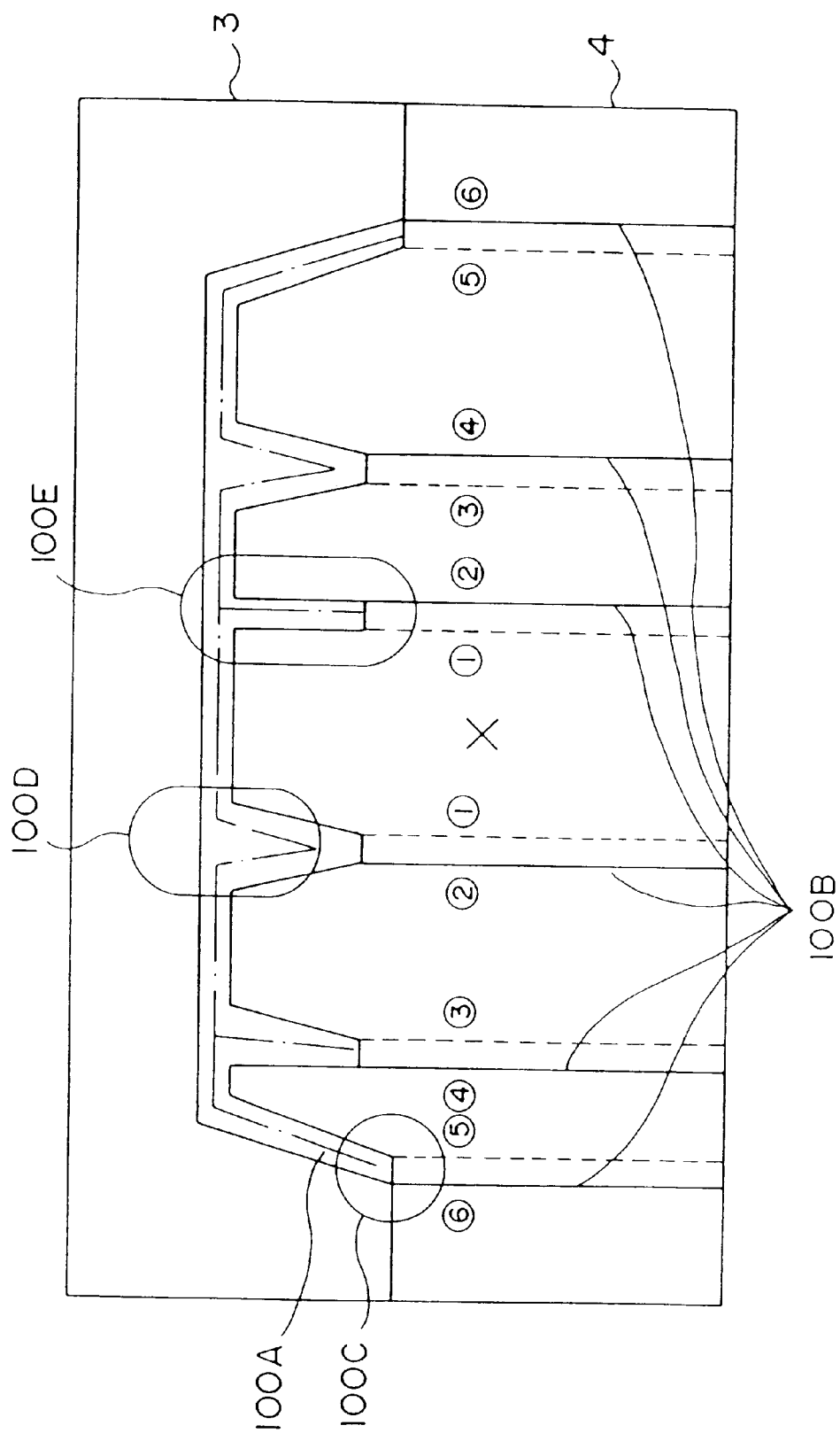

$\phi D + 0.01\sim 0.03$

— : PARTING LINE

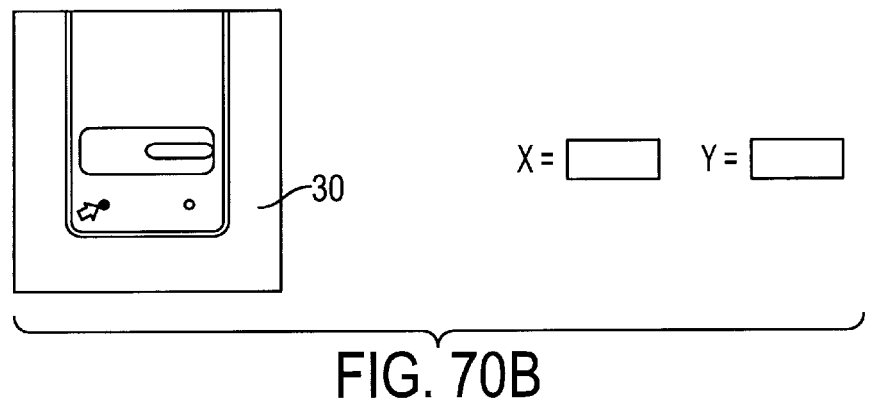
FIG. 70B
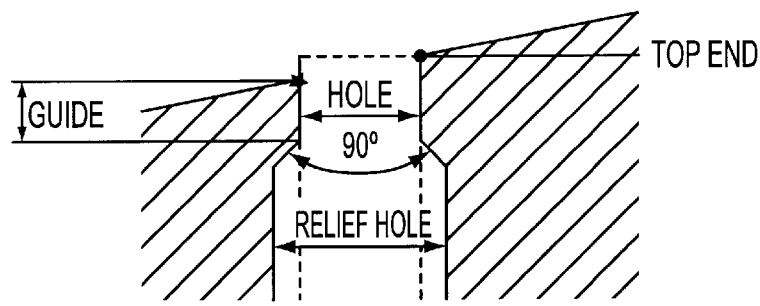
• : MAXIMUM HEIGHT
✱ : MINIMUM HEIGHT
FIG. 70C
| (X, Y) | 45,20 | 55,20 | ~ |
|---|---|---|---|
| HOLE DIAMETER | 4.0 | 4.0 | ~ |
| RELIEF HOLE DIAMETER | 5.0 | 5.0 | ~ |
| GUIDE LENGTH | 3.0 | 3.0 | ~ |
| EJECTOR PIN LENGTH | 135.1 | 135.1 | ~ |
FIG. 70D

| | | |
|---|---|---|
| COLOR OF PRODUCT DATA | CYAN | COLOR DESIGNATION |
| DISPLAY COLOR OF UNDERCUT | PINK | |
| COLOR OF PARTING LINE | YELLOW | |
| COLOR OF CAVITIY/CORE BLOCK | MAGENTA | |
| COLOR OF MOLD BASE | WHITE | |
| COLOR OF EJECTOR PIN | BLUE | |
| UNDERCUT PORTION | GRAPHICS | OUTPUT METHOD |
| EJECTOR PIN INFORMATION | PAPER | |
| MANUFACTURING DATA INFORMATION | PAPER | |
| CHECK DISTANCE | 3 mm | DESIGN DATA |
| EJECTOR PIN LENGTH + | 0.1 mm | |
| EXTRUSION AMOUNT | 10 mm | |
| BASE OFFSET AMOUNT | 10 mm | |
| EJECTOR PIN DESIGN | CORE-BLOCK<br>CORE-PLATE<br>ERP, EP | PARTS DATA |
| MOLD TEMPERATURE ADJUSTING WATER PATH | CAVITY-PLATE<br>CAVITY-BLOCK<br>CORE-BLOCK<br>CORE-PLATE | |
| NEST DESIGN | CAVITY-PLATE<br>CAVITIY-BLOCK<br>CORE-BLOCK<br>CORE-PLATE | |

FIG. 75

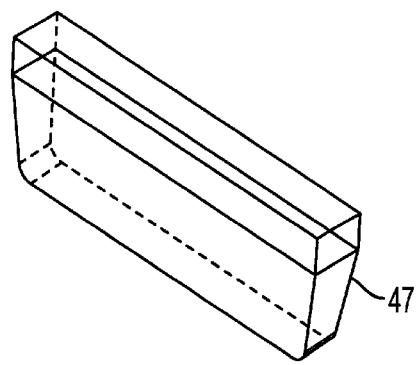
FIG. 81D
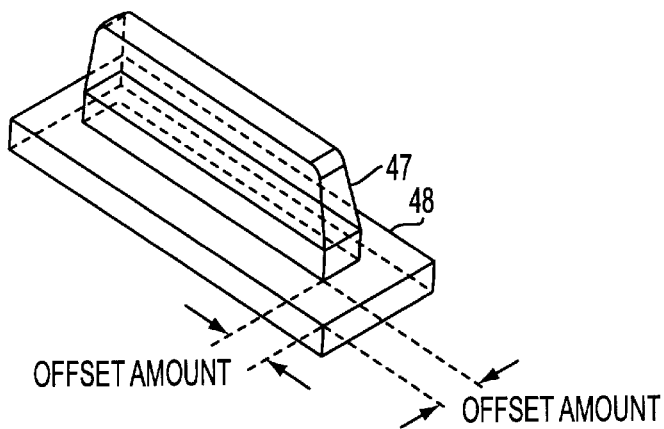
FIG. 81E
| PARTS NAME | CAVITY-PLATE |
|---|---|
| LOCATION | (-200, 350) |
| MATERIAL | X=80, Y=90, Z=40 |
FIG. 81F

INJECTION MOLD DESIGN SYSTEM AND INJECTION MOLD DESIGN METHOD

This is a Divisional of application Ser. No. 08/614,055 filed on Mar. 12, 1996, which has been allowed and issued as U.S. Pat. No. 5,812,402.

BACKGROUND OF THE INVENTION

1. Field of the Invention

The present invention relates to an injection mold design system and an injection mold design method and, more particularly, a design support system for a mold used for fabricating resin (plastics) injecting moldings and a design method for designing the mold.

2. Description of the Related Art

In recent years, according to demands for more variety of product design, users' various usages etc., plastics have been widely used as material of enclosures for electrical products since they may present an attractive appearance and may be molded arbitrarily. In addition, it entails such advantages that reduction in the number of parts and simplification of assembly may be attained. This is because seats, bosses (projections), etc., these being used for mounting printed circuit boards and other parts, and reinforcing members such as ribs may be formed integrally with the enclosures if the enclosures are fabricated by resin injection molding.

FIG. 1A shows an example of moldings (molded products) formed by resin injection molding. In FIG. 1A, a reference 1 denotes a molding used as an enclosure of a portable electronic device, and a reference 2 denotes a bore portion provided in the molding 1. After preparing the mold in which a cavity having the same profile as that of the product is in advance formed, melted resin is filled into the cavity and then cured, so that the molding 1 with a shape shown in FIG. 1A may be formed. At this time, the bore portion 2 may be formed by nests arranged in the mold.

FIG. 1B shows a configuration of the mold. In FIG. 1B, a reference 3 denotes a cavity (female mold) for defining an outer shape of the molding 1, and a reference 4 denotes a core (male mold) for defining an inner shape of the molding 1. When the cavity 3 is put on the core 4, the cavity corresponding to the products profile to be formed may be formed between them.

FIG. 1C shows a configuration of an injection molding machine on which the mold is mounted. With being arranged so as to oppose to each other in the vertical direction, the cavity 3 and the core 4 are clamped on a cavity plate 3A and a core plate 4A respectively. The cavity plate 3A may be driven by a driving apparatus (not shown) to move in the vertical direction. A reference 5 denotes a runner stripper plate in which a runner (not shown) is formed to introduce the resin 7 into the space in the mold. The runner stripper plate 5 may be placed on the cavity plate 3A. When the molds are opened, the runner stripper plate 5 may then be separated from the cavity plate 3A to enable the resin cured in the runner to be removed from the runner. A reference 6 denotes a gate (pouring gate) formed in the mold. Resin 7 is filled into the cavity in the mold via the gate 6.

A reference 8 denotes a gas vent (breathing hole) which is provided in the mold to exhaust the air from the space in the mold to the exterior when the resin is poured into the space in the mold. A reference 9 denotes a cooling water path provided in the mold. Since the resin to be filled into the mold is heated at a temperature of a few hundreds ° C., a temperature of the mold is raised when the resin is filled into the mold. As a result, drawbacks such as not only reduction in molding efficiency but also warpage, twist, etc. of the product are caused. In order to prevent the drawbacks, the mold is cooled by flowing water through the cooling water path 9. Usually, the cooling water path 9 is provided on the core 4 side.

A reference 10 denotes an extruder portion for extruding the moldings 1 from the core 4. The extruder portion 10 has a rod-like member referred to as an ejector pin. The moldings 1 can be extruded from the core 4 by inserting the ejector pin into a through hole provided in the core 4.

In any event, since the injection mold is composed of the cavity 3 and the core 4, as mentioned above, the mold must be split into the cavity 3 side and the core 4 side when designing the mold. The split plane is called a parting plane. In case there is caused an undercut portion in the products to be fabricated, the moldings cannot be stripped off from the mold if the parting plane is set incorrectly. Here the undercut portion may be defined as a portion serving as an engagement formed in the mold opening direction when the product is taken out from the molds. If the undercut portion exists, consideration for providing a slide structure to the mold or the like should be taken inevitably.

In order to strip the product off from the mold readily, slight slopes (draft slopes) are provided on the surface of the mold so as to prevent inner surfaces of the mold from being formed perpendicularly to the parting plane. In the prior art, in the case of the mold having a relatively simple profile, mold designers be able to design the mold according to drawings prepared for the product while considering parting plane, draft slope, etc. Conversely, as for the product which must be designed by use of a plenty of free-form surfaces to achieve the high design property, it would become difficult to illustrate the profile of the product in the drawings. As a countermeasure to this drawback, first the product model (model) is formed, then profile lines of the product model are illustrated with many dots, and then the profile of the product is converted into numeric data by correlating these dots with each other in terms of digitizing process. Then NC (Numeric Control) data used for cutting process and electric discharge machining electrodes are then prepared for based on the numeric data. According to these data, the mold may be then fabricated by the electric discharge machining electrodes.

In the meanwhile, there are some cases where the mold may be designed by means of the three dimensional CAD (Computer-Aided Design) system. In such cases, data of the product shape are first input into the CAD system, then the product shape or the mold block (i.e., virtual block displayed on the screen for illustrating an outer shape of the mold) in which a cavity corresponding to the product shape is formed is depicted on the display. While monitoring the screen of the display, the designer may draw the parting line on the screen to form the parting plane or select the planes to which a draft slope is provided. The CAD system may thus output numeric data to form the mold in compliance with these setting conditions.

However, in the method where the designer has to design the mold on the basis of the design drawings, the designer must design the mold while considering undercut, draft slope, etc. as mentioned above. Therefore, it can be seen that, in the case of the product with complicate profile, it would become difficult for the designer to determine a solid product shape from the drawings. For this reason, according to this method, problems have been arisen that man-hour in design is increased and design error is prone to generate.

Alternatively, in the method where data used for fabricating the mold are generated from the product model, there are some problems that, since the product model must be formed to have a precise profile, the designer must be well practiced in forming the product model and much time must also be consumed to form the product model.

Moreover, in the method where the three dimensional CAD system is used, the troublesome procedures would be required and further a great deal of skill would be required for the designer since the mold designer must design parting plane, draft slopes, etc. on the basis of image displayed on the screen of the display. Because of the causes such as missing of the undercut portion, the mold designer is apt to generate errors in design.

SUMMARY OF THE INVENTION

It is an object of the present invention to provide a design system capable of designing an injection mold readily and in short time and a design method employed in the same.

According to the injection mold design system of the present invention, in case the product shape or the mold profile should be corrected, since lines or planes being obstructive to profile correction can be unloaded to a storing device temporarily, the designer may correct the product shape or the mold profile while monitoring the display screen on which only lines or planes indispensable to the certain profile correction are depicted. Therefore, with displaying a stereoscopic drawing and a projection drawing of the product on the display device, the designer may execute correction of shrinkage rate, extraction of parting line, provision of draft slope, etc. in an interactive manner.

According to the injection mold design method of the present invention, design items can be reduced by preparing parameters of the mold parts and fixing parts as patternized information, and in addition correction, change, etc. of the product shape and the mold profile can be effected automatically. Consequently, man-hour of design in typical design operations can be significantly reduced.

According to the injection mold design method of the present invention, features of the mold which being indispensable to formation of the mold can be grasped by extracting candidates of split borderlines of the mold. In addition, lack of knowledge and experience as to the mold design can be made up for by utilizing a loop check function for the split borderlines and a nest split function. Thus, the design method of the present invention enables the designer having little experience to execute the mold design.

With the above, the present invention may extremely contribute to the mold design support system capable of executing correction of the product shape, design of the mold, and design of manufacturing jigs in an interactive manner.

BRIEF DESCRIPTION OF THE DRAWINGS

FIG. 34 is a side view showing the cavity and the core when assigning the priority level according to the eleventh embodiment of the present invention;

FIGS. 70A to 70D are views showing screen images on the display device when designing the ejector pin according to the twenty-fourth embodiment of the present invention;

FIG. 75 is a view illustrating the contents of the configuration file according to the twenty-sixth embodiment of the present invention;

FIGS. 81A to 81F are views illustrating screen images on the display device when designing the manufacturing jigs according to the twenty-ninth embodiment of the present invention.

DETAILED DESCRIPTION OF THE PREFERRED EMBODIMENTS

Figure 1A:
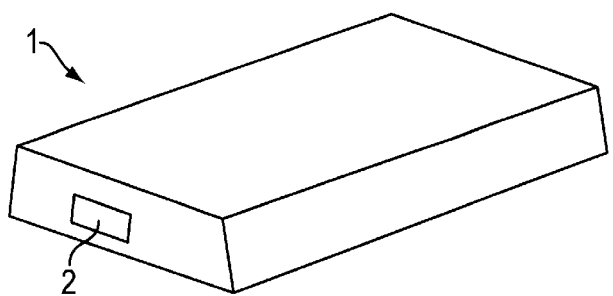
FIG. 1A is a perspective view illustrating an example of a moldings according to the conventional injection mold design method.
Figure 1B:
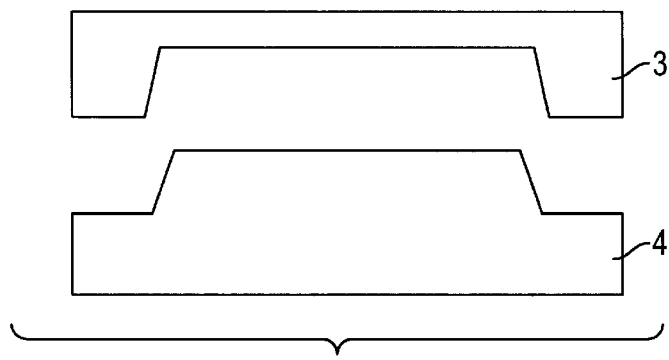
FIG. 1B is a side view showing molds used for forming the example of the moldings in FIG. 1A.
Figure 1C:
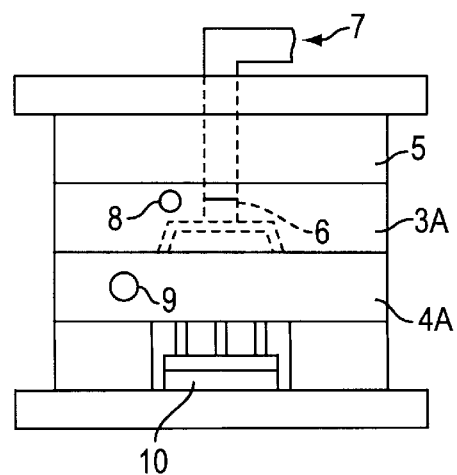
FIG. 1C is a side view showing an injection molding machine on which the molds shown in FIG. 1B are mounted.

There will now be explained in detail preferred embodiments of the present invention with reference to accompanying drawings hereinafter.

An injection mold design system for correcting a profile of a product to be fabricated into a releasable profile from a mold to design an injection mold based on a corrected product shape, comprising a storing device for storing information of product shape and mold a displaying device for displaying the product shape or the mold profile on a screen based on the information read from the storing device, inputting mechanism for inputting designation information necessary for correction of the product shape or the mold profile, and a controlling device for unloading information of lines or planes being obstructive to correction of the product shape and the mold profile into the storing device in response to the designation information input by the inputting mechanism, removing the lines or the planes from the screen, and replotting the line or the planes on the screen in terms of the information of lines or planes unloaded into the storing device after the correction operation of the product shape or the mold profile is completed.

In the injection mold design system, the lines or the planes being obstructive to the correction operation are removed from the screen by the controlling device when the product shape is corrected into a releasable profile. With this process, upon correcting the profile, missing of undercut portions and generation of the line or plane such as fillet being obstructive to correction operation can be prevented, so that operability may be improved and design error may be prevented. In this event, according to the design system of the present invention, since information of the lines or planes removed from the screen are stored in the storing device, the lines or the planes may be replotted on the screen after correction operation of the profile is completed.

In the design system of the present invention, the storing device may be provided wherein first design items used for correcting the product shape into the releasable profile from the mold, second design items used for designing the mold, and third design items used for forming manufacturing jigs of the mold are stored.

Since the design items being roughly classified into three groups are stored in the storing device, the product designer or the mold designer may correct the product shape in compliance with the first design items so as to enable the product to be readily released from the mold. The mold designer may design the mold in compliance with the second design items. In addition, both the mold designer and the mold manufucturer may design the manufacturing jigs in compliance with the third design items. Consequently, since software resources stored in the storing device may be commonly used by the product designer, the mold designer, and the mold manufacturer, design operation of the mold may be conducted easily and quickly.

In the design system of the present invention, a unit is provided which may form dot lines on a constituting plane of the product being perpendicular to the mold opening direction, and then detect whether or not the dot lines can be projected onto other constituting plane in the mold opening direction.

In case it has been detected that the dot lines formed on the constituting plane of the product can be projected onto other constituting plane in the mold opening direction, the constituting plane would become obstructive in the mold opening direction. Therefore, the constituting plane may be detected as the undercut portion.

In the design system of the present invention, a unit for connecting an outermost peripheral profile of the product viewed from the mold opening direction and line segments of the product designated by the designer so as to extract a split line of the product occupying a certain space may be provided.

If the outermost peripheral profile of the product viewed from the mold opening direction and the line segments of the product designated by the designer are connected, the designer may extract the split line of the product occupying a certain space in a manner interacting with the design system.

In the design system of the present invention, device is provided which may detect a flat plane constituted with the split line occupying a certain space, then connect the detected flat plane and one of a circular cylinder surface, a circular cone surface, and a free-form surface all being designated by the designer, and then form the split plane to split the product into the cavity and the core.

By connecting the detected flat plane constituted with the split line and one of the circular cylinder surface, the circular cone surface, and the free-form surface all being designated by the designer, the designer may form the split plane for splitting the product shape into the cavity and the core in a manner interacting with the design system.

In the design system of the present invention, a device is provided which, when the designer has instructed a concerned location against the profile of the core viewed in the mold opening direction, may detect the designated location and a height of the ejector pin for ejecting the product from the core and then form a hole profile with dimensions input by the designer on the designated location.

By detecting the designated location against the core profile viewed in the mold opening direction and the height of the ejector pin, the designer may easily design the hole profile, for example, used for the ejector pin for ejecting the product from the core, in a manner interacting with the design system.

In the design system of the present invention, a device for displaying on one screen a profile of a mold base constituting the mold and an instruction window having boxes for inputting respective dimensions of individual constituting parts of the mold base therein, and a device for forming data of the mold base in compliance with the input dimensions when the designer has input respective dimensions in the boxes of the instruction windows of the displaying device may be provided.

According to the design system of the present invention, when the designer inputs respective dimensions of individual constituting parts of the mold in the instruction windows of the displaying device, data of the mold base may be formed in compliance with the input dimensions. Thus, while monitoring the profile of the mold base, the designer may design the mold base easily in a manner interacting with the design system.

In the design system of the present invention a, storing device is provided which may store at least information concerning display color of characters, lines, symbols and regions, information concerning output method of design information of the mold, and information concerning reference values required for each design of the mold. For purposes of example, the storing device may be composed of an erasable and writable read-only memory.

According to the design system of the present invention, the storing device in which information relating to display color, output method of design information, and reference values are stored may be composed of the erasable and writable read-only memory. Therefore, although a plenty of automatic process have been employed, display colors of characters, lines, symbols and regions, output method of information required for designing the mold, reference values required for each design of the mold, and display method of respective parts data may be modified arbitrarily. As a result, the mold design system being mostly suitable for each designer can be built up a.

In the design system of the present invention, designing device is provided which may design the mold by using data in the group with selected name when the designer selects the group name of data necessary for design of the mold in compliance with the design items of the mold after the designer allots respective names to groups of data relating to the design items of the mold.

According to the design system of the present invention, when the designer selects a group name of data necessary for design of the mold, the design system may design automatically the mold in accordance with data included in the group with selected name. Therefore, since the designer be able to reduce design items to be input into the design system, design operations may be simplified.

In the design system of the present invention, a device is provided which may detect a separating distance between a particular hole and other hole of the mold parts, and then compares the separating distance between the particular hole and other hole with a preliminary set separating reference value.

When the separating distance between the particular hole and other hole of the mold parts are compared with the preliminary set separating reference value, and if the separating distance between the holes is less than the separating reference value, an abnormal approach between the holes may be detected in the course of design operation. As a result, design error such as overlapping between the holes may be prevented.

In the design system of the present invention, a device is provided which, when the designer designates a range of the manufacturing jigs to be used for manufacturing the mold parts against the displayed mold parts, may form an ejected profile having a range of the manufacturing jigs of the mold parts as a sectional shape and transfer a profile of the mold parts to the ejected profile.

According to the design system of the present invention, when the designer designates the range of the manufacturing jigs on the displayed mold parts, the ejected profile having the range of the manufacturing jigs as the sectional shape may be formed, and the profile of the mold parts may be transferred onto the ejected profile. As a result, the designer be able to design the manufacturing jigs of the mold parts in-a manner interacting with the design system.

As for the first design method according to the present invention, in the injection mold design method for designing the core and the cavity by correcting the profile of the product to be fabricated into a releasable profile from the mold, then arranging the corrected product shape in the mold block being displayed on the screen to provide a cavity corresponding to the product shape in the mold block, and then splitting the mold block, part of lines or planes constituting the product shape or the mold profile may be removed temporarily from the screen, and the lines or planes may be replotted on the screen after the correction operation of the product shape or the mold profile being displayed on the screen is completed.

According to the injection mold design method of the present invention, part of the lines or planes constituting the product shape or the mold profile may be removed temporarily from the screen, and the lines or planes may be replotted on the screen after completion of profile correction when the product shape or the mold profile being displayed on the screen is corrected. Therefore, the designer may remove lines or planes being obstructive to required operation from the screen on the display to display only indispensable information on the screen. As a result, design error due to missing of the undercut, etc. can be prevented.

In this event, for instance, candidates of the split borderline would be selected by forming a flat surface perpendicular to the mold opening direction, then projecting the product shape onto the flat surface so as to detect its outermost peripheral line, and then drawing a straight line from the outermost peripheral line in the mold opening direction so as to detect entire borderlines of the product shape being intersecting with this straight line. In general, the split line (parting line) would often be obtained as an outermost peripheral contour of the product shape viewed in the mold opening direction. With the above method, the split line may be determined readily by detecting the candidates of the split borderline.

As for the second design method of the present invention, in the injection mold design method for designing the core and the cavity by correcting the profile of the product to be fabricated into a releasable profile from the mold, then arranging the corrected product shape in the mold block being displayed on the screen to provide a cavity corresponding to the product shape in the mold block, and then splitting the mold block, the undercut portion may be detected by calculating a normal vector on the plane of the product shape and a reference vector in the mold opening direction, and then detecting a normal vector having the opposite direction to that of the reference vector.

According to the second design method of the present invention, the undercut portion may be detected by comparing the normal vector on the plane of the product shape and the reference vector in the mold opening direction, and then detecting the normal vector with the opposite direction to that of the reference vector. In other words, the plane with the normal vector having the opposite direction to that of the reference vector always exists in the undercut portion. In the present invention, the undercut portion can be automatically detected based on such a characteristic. As for the third design method of the present invention, in the injection mold design method for designing the core and the cavity by correcting the profile of the product to be fabricated into a releasable profile from the mold, then arranging the corrected product shape in the mold block being displayed on the screen to provide a cavity corresponding to the product shape in the mold block, and then splitting the mold block, the split plane may be formed by extending the designated split borderline in parallel to the designated direction when the mold block is split into the core and the cavity.

As for the fourth design method of the present invention, in the injection mold design method for designing the core and the cavity by correcting the profile of the product to be fabricated into a releasable profile from the mold, then arranging the corrected product shape in the mold block being displayed on the screen to provide a cavity corresponding to the product shape in the mold block, and then splitting the mold block, candidates of the split line for splitting the core of the mold block into the nest structure may be selected by detecting a bottom of the cavity in the core side, and then extending a peripheral portion of the bottom along the mold opening direction.

According to the fourth design method of the present invention, when forming the nest structure, the candidates of the split line for splitting the core of the mold block into the nest structure may be selected by detecting the bottom of the cavity in the core side, and then extending the peripheral portion of the bottom in the mold opening direction. Subsequently, by way of example, the candidates of the split line are numbered in the order from near side of an arbitrary point, then the core may be split by employing odd numbered or even numbered (either one being selected by the designer) candidates of the split line as the split line, and then the split portion may be determined finally as the nest structure. In this manner, the nest structure may be automatically designed.

Figure 2:
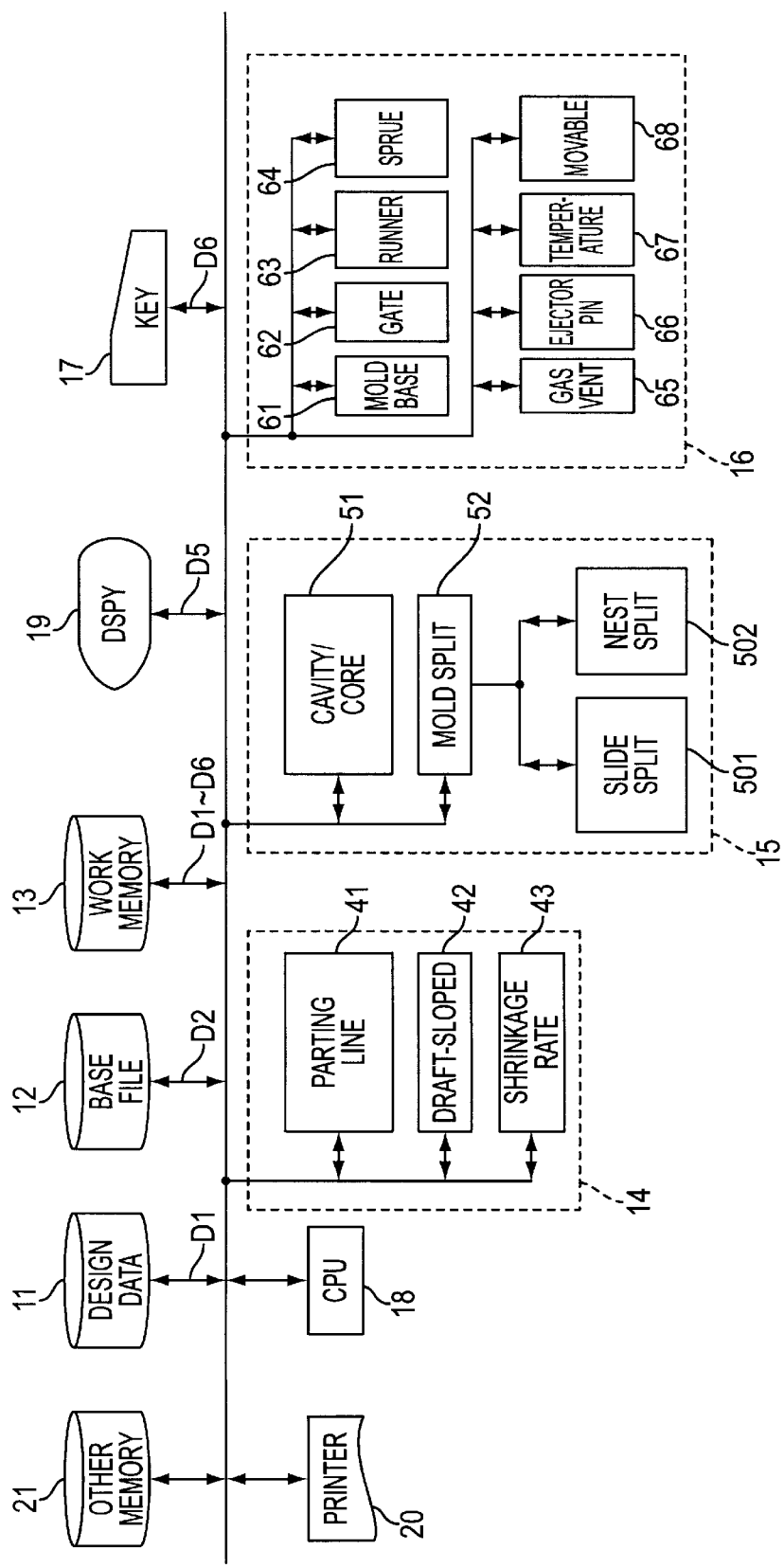
FIG. 2 is a view showing a configuration of an injection mold design system according to embodiments of the present invention.

Next, preferred embodiments of the present invention will be explained with reference to accompanying drawings. FIGS. 2 to 81F illustrates an injection mold design system and an injection mold design method according to embodiments of the present invention.

FIG. 2 shows a configuration of a plastics injection mold design system according to an embodiment of the present invention. In FIG. 2, a reference 11 denotes a design data memory (a storing device) for storing product shape data (image information) D1 to display a stereoscopic drawing and a projection drawing of a product to be fabricated. Data D1 are binary data.

A reference 12 denotes a base file for storing mold base data D2 as a database which may store profiles of cavity and core parts, plates to which cavity and core parts are clamped, regular parts (screw, ejector pin, water cooling path, etc.).

A reference 13 denotes a work memory for storing image information (data D1 to D6, etc.) of a mold model and a product model generated in the course of design operation. D3 are element data such as line elements of the product (i.e., data such as length, curvature, angle of lines constituting the product shape) and plane elements of the product (i.e., data such as size, curvature, angle of planes constituting the product shape). D4 are cavity/core data for defining shapes of the cavity and the core. D5 are image data required for display on a display 19. D6 are input data such as control statement, etc.

A reference 14 denotes a product shape correction editor for executing correction operation of the product shape so as to enable the product to be stripped off readily from the mold. The product shape correction editor 14 comprises, as respective softwares, a parting line forming section 41, a draft-sloped plane providing section 42, a shrinkage rate correction section 43. The parting line forming section 41 may serve to extract candidates of the parting line from product shape data D1, form the parting line, detect the undercut portion residing in the product shape, edit the parting line (i.e., rearrange the parting lines having continuous location coordinates into same groups), and check loops of the parting lines. The draft-sloped plane providing section 42 may serve to detect respective planes which are to be sloped for easy drafting of the product from the mold and respective planes which are preferably to be sloped (these planes being referred to as "sloped planes" hereinafter), provide the draft slope to the detected sloped planes, and check whether or not the product may be released readily from the mold. The shrinkage rate correction section 43 may serve to examine changes of respective dimensions of the product according to the shrinkage rate caused when the resin cures in the mold, and detect the portions of the product, for example, which cannot be drafted from the core because convex portions of the core are put into the product. If such portions have been detected, required treatments are effected such that the profile of the mold must be modified partially, the draft slope must be provided to concerned planes by the draft-sloped plane providing section 42.

A reference 15 denotes a cavity design editor for designing the cavity in the mold. The cavity design editor 15 comprises, as respective softwares, a cavity/core arranging section 51, a mold splitting section 52 including a slide split section 501 and a nest split section 502,. The cavity/core arranging section 51 may generate a mold block such as rectangular parallelepiped or circular cylinder each having larger profile than that of the product shape on the screen, and then form a cavity with a profile identical to the product shape in the mold block. The mold splitting section 52 may form a main parting plane according to the parting line candidates which are extracted by the foregoing parting line forming section 41, and generate the cavity and the core on the screen by splitting the mold block by the main parting plane. The slide split section 501 may function to form a slide plane being used to split the cavity or the core to form the undercut portion as a slide structure, and check interference between the cavity and the core. Furthermore, the nest split section 502 may generate the parting line for forming nests on the core side depending upon a depth of the mold, provide priority levels to respective parting lines for splitting the core, and form nests by splitting the core.

A reference 16 denotes a plate design editor for designing constituent parts necessary for the mold. The plate design editor 16 comprises, as respective softwares, a mold base arranging section 61, a gate design section 62, a runner design section 63, a sprue design section 64, a gas vent design section 65, an ejector pin design section 66, a temperature adjusting structure design section 67, a movable structure design section 68, and so on. The mold base arranging section 61 may design portions for fixing the mold such as the mold base. The gate design section 62 may also design location, shape, size, etc. of the gates. The runner design section 63 may further design shape, location, etc. of the runners to introduce the resin to the mold in the lateral direction thereof. In addition, the sprue design section 64 may design shape, location, etc. of the sprue (sprue runner) to introduce the resin to the runner in the vertical direction of the injection molding machine. The gas vent design section 65 may design shape, location, size, etc. of the gas vent to exhaust the air from the mold when the resin being injected into the mold. The ejector pin design section 66 may design shape, location, etc. of the ejector pin to eject the moldings from the mold. The temperature adjusting structure design section 67 may design the cooling path to cool the mold. Finally, the movable structure design section 68 may design driving systems (link mechanism) such as runner stripper plate, cavity plate, and core plate.

A reference 17 denotes a keyboard (an input mechanism) for inputting control statement etc. to the concerned design system as input data (designation information) D6 by the designer, and instructing switching of the screen. Auxiliary input tool such as a mouse may be connected to the keyboard 17. The product or the mold on the screen may be rotated by operating the mouse or the ten key.

A reference 18 denotes a CPU (Central Processing Unit) for controlling input/output of design data memory 11, base file 12, work memory 13, product shape correction editor 14, cavity design editor 15, plate design editor 16, keyboard 17, display 19, printer 20, and other memory 21. Depending upon designation information input through the keyboard 17, the CPU 18 may execute various functions for temporarily unloading data of lines or planes, which being obstructive to the correction operation of the product shape or the mold operation currently displayed on the screen, to the work memory 13, then removing the lines or planes from the screen, and then replotting the lines or planes on the screen after the correction operation of the product shape or the mold profile being completed.

The CPU 18 further causes the work memory 13 to store historical file generated in respective design operations. For instance, the CPU 18 stores in time sequence five historical files of data generated in the respective function editors into the work memory 13 in the order from No. 1 to No. 5. In this event, on the assumptions that forming data of the fillet (i.e., reinforce member provided on the intersecting portion between more than two planes) data are stored into the historical file No. 3, that data for providing the draft slope are stored into the historical file No. 5, and that in addition it is hard to provide the draft slope because the fillet serves as the obstruction, the CPU 18 returns to the historical file No. 3 prior to forming the fillet and then provides the draft slope using data stored in the historical file No. 5 to the concerned plane. Subsequently, the CPU 18 returns automatically to the historical file No. 5 by using data stored in the historical files No. 3 and No. 4.

A reference 19 denotes a display (displaying means) for displaying the product model or the mold two or three-dimensionally reading image information from design data memory 11, database memory 12, or work memory 13. The display 19 comprises CRT (Cathode Ray Tube), liquid crystal display, plasma display.

Figures 3A, 3B:
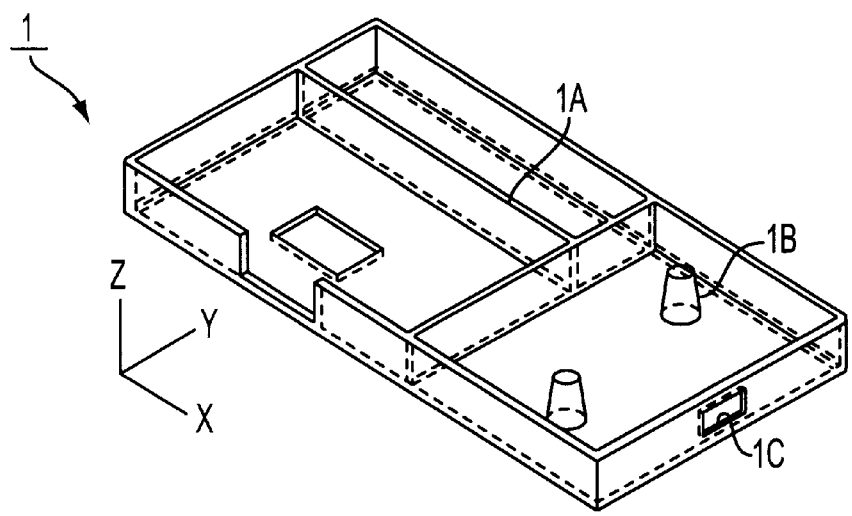
FIGS. 3A to 3G are views illustrating various display functions of a display device according to embodiments of the present invention.

In order to make easy for the designer to recognize the stereoscopic profile of the product, the design system of the present invention lets the display 19 display a stereoscopic drawing (isometric drawing, etc.) as shown in FIG. 3A, for example. Referring to FIG. 3A, a reference 1 denotes an example of the product to be molded. In this product 1, reinforcing rib 1A, bosses 1B to which parts such as printed circuit board are fixed, holes 1C into which external terminals, etc. are inserted are provided.

Figure 3C:
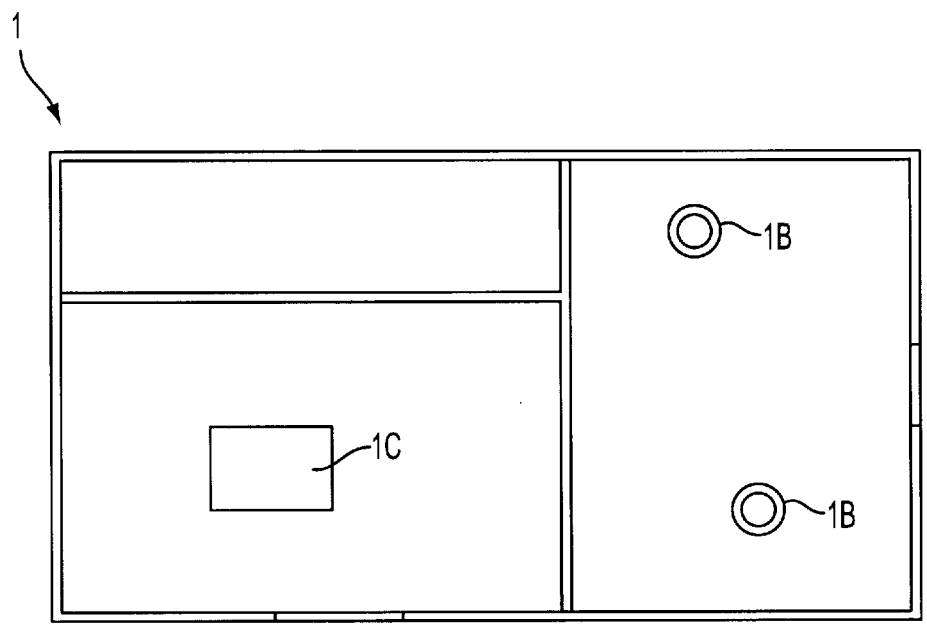
Figure 3D:
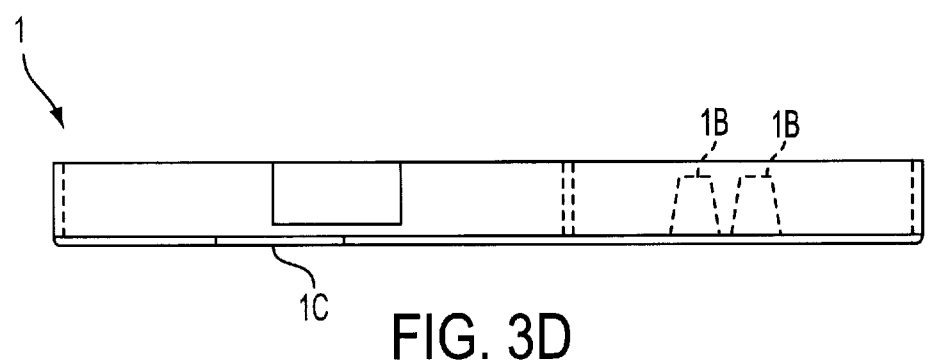
Figure 3E:
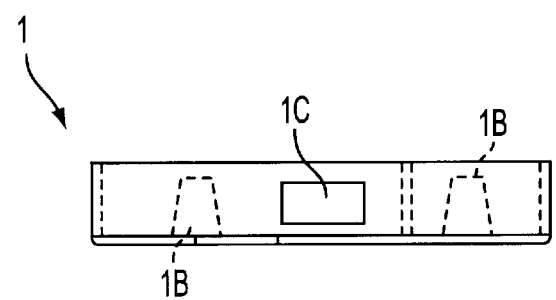

FIG. 3B illustrates kinds of design drawings which are able to be displayed by the display 19. Where (1) is a top view of the product 1 and FIG. 3C is a top view of the product 1, for example, (2) is a front view of the product 1 and FIG. 3D is a front view of the product 1, for example, (3) is a rear view of the product 1, (4) is a right side view of the product 1, (5) is a left side view and FIG. 3E is a left side view of the product 1, for example, (6) is a bottom view of the product 1, (7) is a right front isometric view showing the product 1 three-dimensionally, (8) is a left front isometric view of the same, (9) is a right rear isometric view of the same, and (10) is a left rear isometric view of the same.

With combining these ten kinds design drawings with each other, three-dimensional display screen (window screen) may be depicted together in the two-dimensional display screen (main screen) on the display 19. More particularly, when draft slope, nest split, parting plane, gate, runner, ejector pin, and gas vent will be designed, any one of isometric drawings (7) to (10) of the product 1 may be displayed simultaneously with plan views of above (1) to (6) on the display 19. Besides, when cavity/core split, cooling path, and link will be designed, any one of isometric drawings (7) to (10) of the product 1 may also be displayed simultaneously with plan views of above (2). to (5) on the display 19. In the present design system, these design drawings are displayed using three-dimensional CAD tool, CG (Computer Graphics) tool, etc.

Figure 3F:
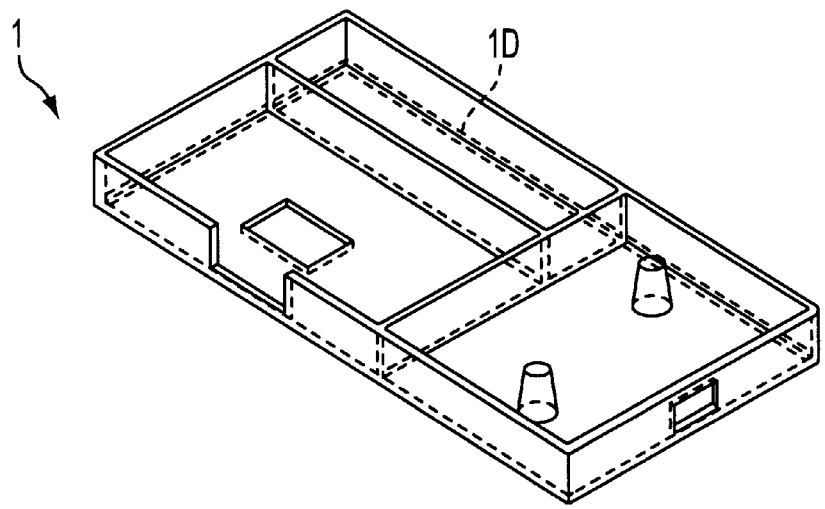
Figure 3G:
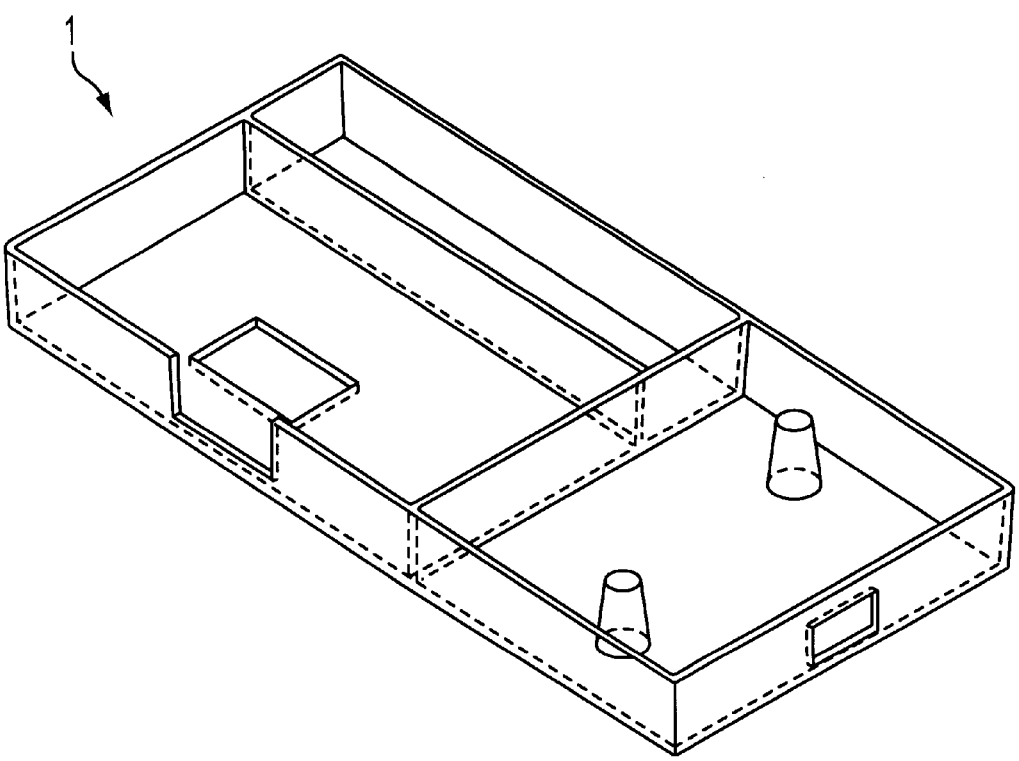

Furthermore, the present design system may be equipped with a function for removing temporarily from the screen lines or planes being obstructive to the correction process upon correcting the product shape. For instance, when-the profile of the product 1 will be corrected, a fillet portion 1D of the product 1 in FIG. 3F may be removed from the screen, and alternatively an isometric drawing as shown in FIG. 3G may be displayed. When the correction operation has been completed, the fillet portion may be replotted on the screen.

A reference 20 denotes a printer for outputting profiles and dimensions of the mold parts on the paper.

A reference 21 denotes other memory. Various design items for simplifying operations of the mold design system, configuration files for supporting the mold design system, and various default values required for design of the mold parts may be stored in this memory. A read-only memory in which data are rewritable and erasable may be used as the memory 21. EPROM and EEPROM are suitable for the memory 21. The design items will be explained later in the twentieth embodiment. Operation of the configuration files will be explained later in the twenty-sixth embodiment.

Next, an operation of the injection mold design system according to the embodiment of the present invention will be explained. First the designer has to read image information of the product 1 from the design data memory 11 via the keyboard 17 to display the stereoscopic drawing or the projection drawing of either the product 1 or the mold on the display 19. At this time, the designer may temporarily unload data of lines or planes being obstructive to the profile correction operation of the product 1 or the mold into the work memory 13 through the keyboard etc. to thus remove these lines or planes from the screen, and may therefore display only necessary information obviously.

With the above process, while watching or monitoring the screen on which lines or planes indispensable to the profile correction operation are displayed, the designer may correct the profile of either the product 1 or the mold.

In the event that the profile of the product 1 should be corrected, for example, the designer may first generate temporarily on the screen a flat plane on which the profile of the product 1 is projected, then set new straight lines or new curves on the flat plane, and then project the straight lines or new curves onto the product 1. The new straight lines or new curves projected onto the product 1 can be extracted as the candidates of the parting lines to split the mold block into the cavity and the core.

Furthermore, in the case that the profile of the product 1 should be corrected, the designer may first generates temporarily on the screen a flat plane on which the profile lines, edges or borderlines between planes of the product 1 are projected, then set new profile lines, edges or borderlines between plane elements of the product 1 on this flat plane, and then project onto the product 1 the profile lines, edges or borderlines between plane elements-of the product 1 these being newly set. The new profile lines, edges or borderlines between plane elements projected onto the product 1 are extracted as the candidates of the parting lines to split the mold block into the cavity and the core.

As stated earlier, if the candidates of the parting lines have been extracted preliminarily, the parting lines required for splitting the mold block into the cavity and the core may be prepared based on the profile lines, edges or borderlines between plane elements of the product 1 even when the profile of the product 1 must be modified in the course of design operation because of correction of shrinkage rate, provision of draft slope.

Under the condition where the stereoscopic drawing and the projection drawing of the product 1 are being displayed on the display 19, the designer may therefore execute correction of the profile, extraction of the parting line, provision of draft slope, etc. of the product 1 in an interactive fashion.

After the profile correction operation of the product 1 or the mold model has been completed, the CPU 18 may plot lines or planes in response to the instruction from the designer, using data which have been unloaded into the work memory 13.

Figure 4A:
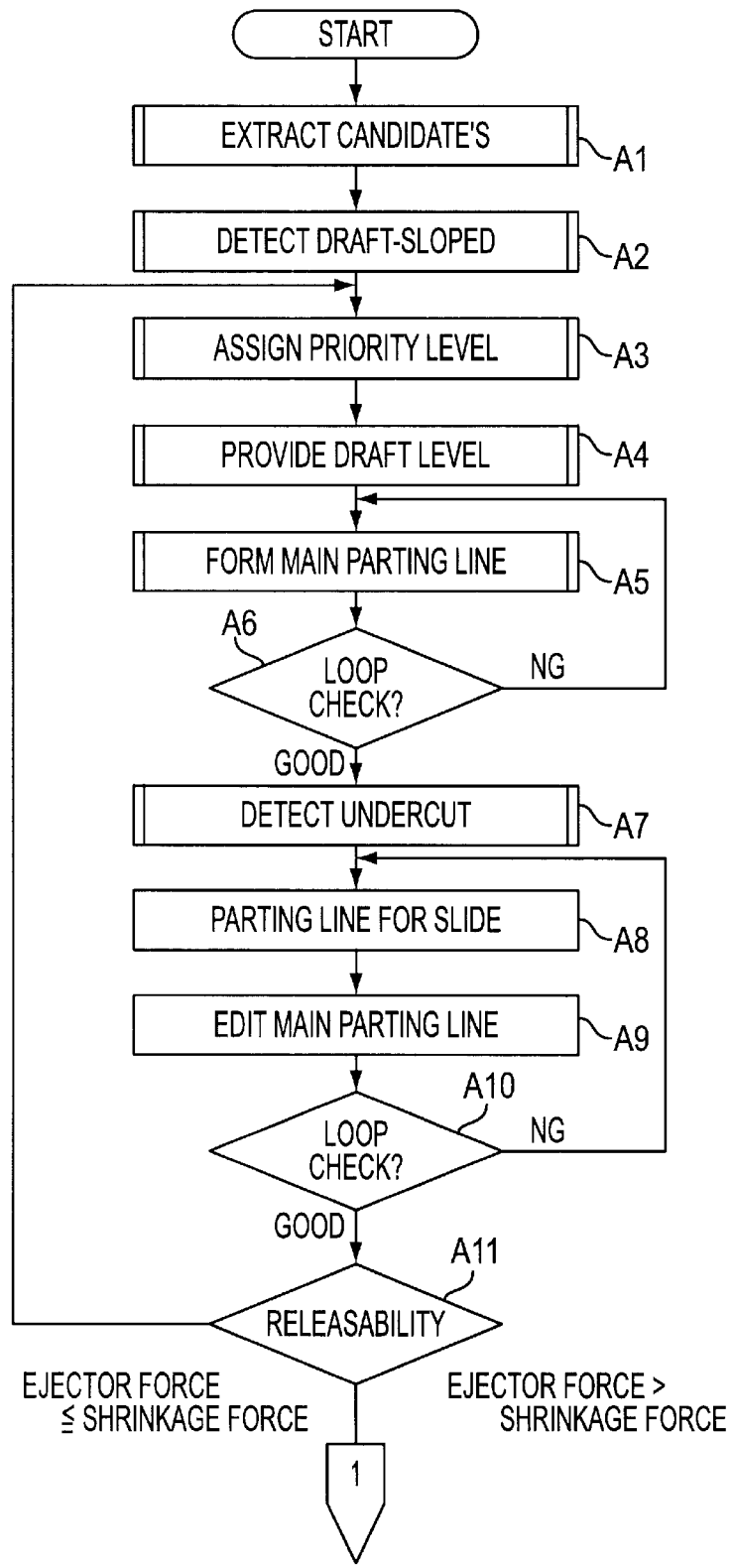
FIGS. 4A to 4C are flowcharts, when taken together, illustrating injection mold design according to embodiments of the present invention.
Figure 4B:
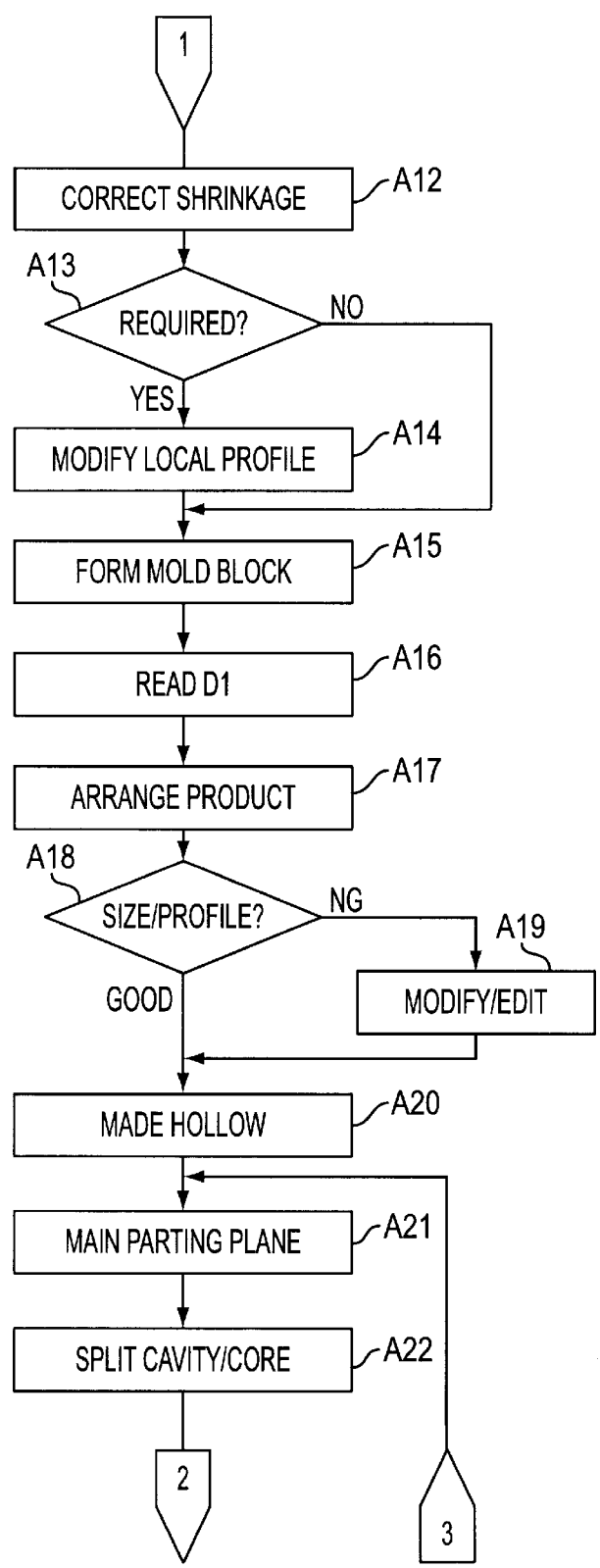
Figure 4C:
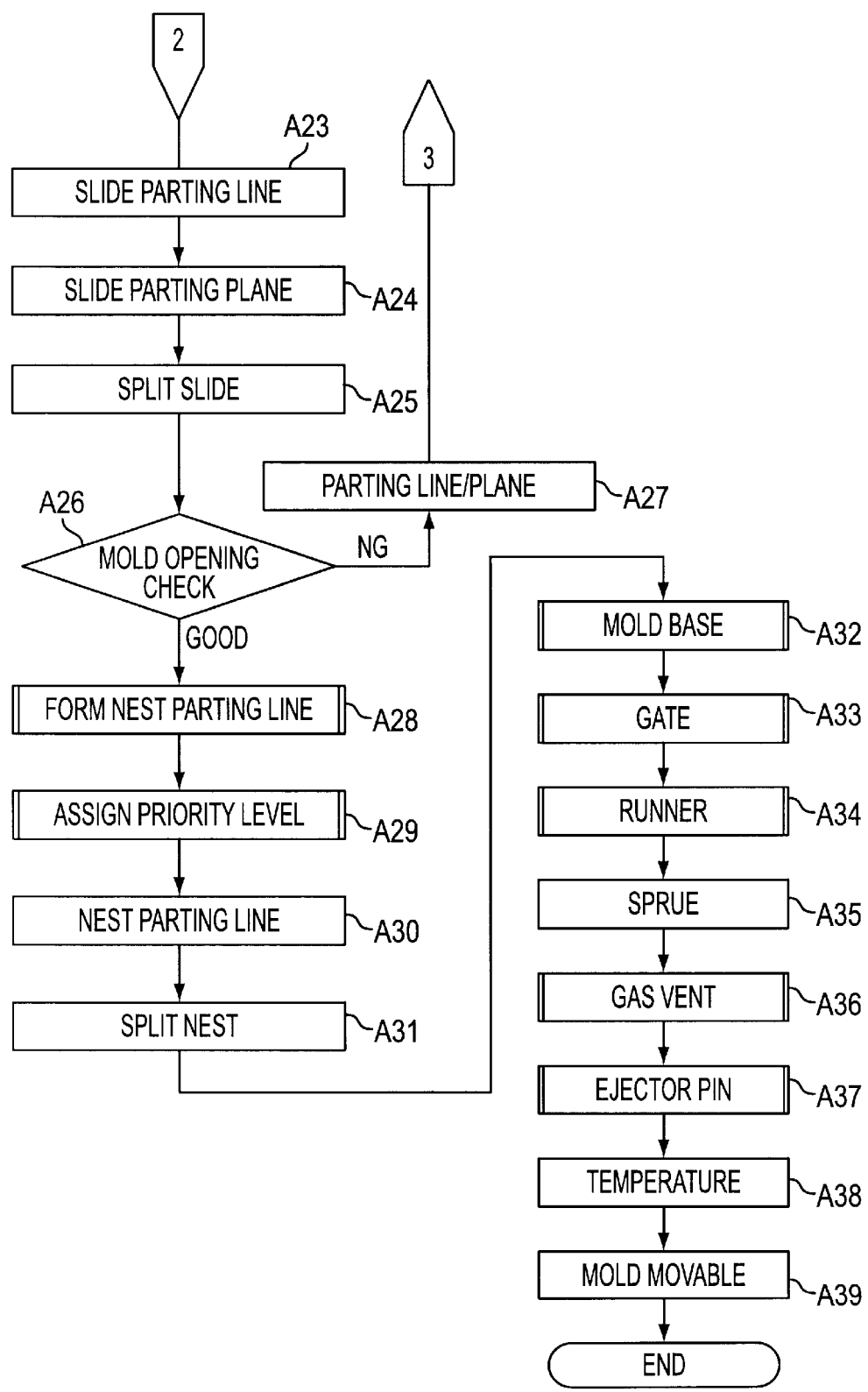

Subsequently, an injection mold design method of the present invention together with operations of the design system will be explained with reference to FIGS. 2 to 81F. FIGS. 4A to 4C are flowcharts (main routine) illustrating design operations of the injection mold. More detailed operations in respective steps will be explained in embodiments described later.

In FIG. 4A, in step A1, candidates of a main parting line for splitting the mold block into the core and the cavity may be first extracted from the product shape in the parting line forming section 41 in the product shape correction editor 14 (see a first embodiment).

In step A2, planes to be sloped are in turn detected from the product shape in the draft-sloped plane providing section 42 (see a second embodiment).

In step A3, priority levels are then assigned to respective draft-sloped planes in the draft-sloped plane providing section 42 (see a third embodiment). Then, in step A4, draft slopes are provided to the product shape in the draft-sloped plane providing section 42 (see a fourth embodiment).

In step A5, the main parting line is in turn formed based on the candidates of the main parting line already extracted in step A1 in the parting line forming section 41 (see a fifth embodiment).

In step A6, loop check of the main parting line is then effected in the parting line forming section 41 (see a sixth embodiment). At this time, if the main parting line has not formed a closed loop (NO GOOD/NG), then the process returns to step A5 so as to repeat formation of the main parting line.

If the main parting line has not been formed as the closed loop in step A6 (GOOD), then the process advances to step A7 where the undercut portions are extracted from the product shape in the parting line forming section 41 (see a seventh embodiment).

Thereafter, the process proceeds to step A8 where the parting line for a slide structure is formed in the parting line forming section 41. The parting line for the slide structure is required when the parting plane for splitting the undercut portions into nest parts would be formed. Subsequently, in step A9, edit operation of the main parting line is executed. This edit operation of the main parting line is effected when the main parting line would be changed accompanying with formation of parting lines for a slide core. Substantially, the same process as in step A5 is executed in step A9.

In step A10, loop check of the main parting line is again effected in the parting line forming section 41. If the main parting line has not formed a closed loop at this time (NG), then the process returns to step AB to form the parting line for the slide structure again. If GOOD in step A10, the process advances to step A11.

In step A11, releasability of the product shape is checked in the draft-sloped plane providing section 42 (see a eighth embodiment). More particularly, ejector force of the ejector pin and shrinkage force of the product shape are compared with each other. If ejector force of the ejector pin has been less than shrinkage force of the product shape (NG), the process returns to step A4 to repeat provision operation of the draft slope. If ejector force of the ejector pin has been in excess of shrinkage force of the product shape (YES), the process advances to step A12.

In FIG. 4B, in step A12, shrinkage rate of the product shape may be corrected in the shrinkage rate correction section 43. In other words, since individual resins have different shrinkage rates when being solidified, sometimes the draft slope must be set again according to the resins. In step A12, a deformation amount of the product shape may be calculated in compliance with shrinkage rate of the resin.

In step A13, the designer would then determines whether or not local modification of the product shape is required. If the product shape has been determined to be locally modified in step A13 (YES), the process proceeds step A14 so as to modify the profile of the product 1 locally (new draft slope setting, etc.). On the contrary, if it has been determined that local modification of the product shape should not be effected in step A13 (NO), the process proceeds step A15.

In step A15, the cavity/core arranging section 51 in the cavity design editor 15 commences formation of the mold block. In step A16, the cavity/core arranging section 51 then reads out product shape data D1 from the work memory 13. In step A17, the product shape and the mold block are then overlapped and displayed on the display 19.

Next, in step A18, size and profile of the mold block are checked. If it has been judged by the designer that size and profile of the mold block is not appropriate (NO), the process advances step A19. In step A19, the cavity/core arranging section 51 modifies dimension of the mold block and displays modified dimension. Conversely, it has been determined in step A18 that size and profile of the mold block is appropriate (GOOD), the process advances step A20.

Figure 5:
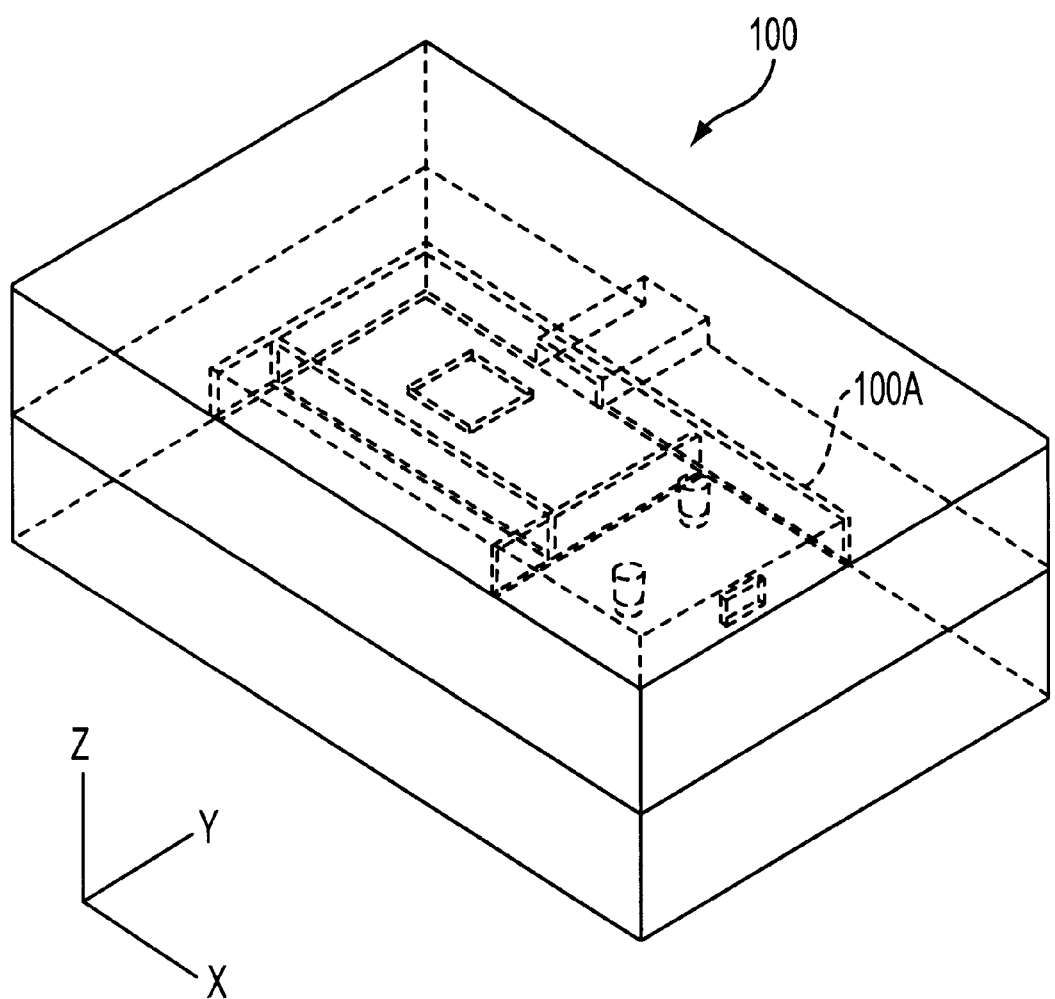
FIG. 5 is a perspective view showing a cavity and a core in a coupled state according to embodiments of the present invention.

In step A20, a portion in the mold block corresponding to the product shape may be made hollow in the cavity/core arranging section 51. The hollow portion of the product shape may be formed by inverting the product shape portion and the hollow portion mutually (solid/hollow inverting function) in terms of Boolean operation which are executed in the cavity/core arranging section 51. Cavity/ core data D4 obtained by Boolean operation which are executed in the cavity/core arranging section 51 are stored in the work memory 13. An isometric drawing as shown in FIG. 5 would be displayed on the display 19. In FIG. 5, a reference 100 denotes the mold block, whereas a reference 100A denotes the mold cavity portion.

In turn, in step A21 in FIG. 4C, the main parting plane for splitting the mold block 100 may be formed in the mold splitting section 52 (see a ninth embodiment).

Thereafter, in step A22, process for splitting the mold block 100 into the cavity and the core may be started in the mold splitting section 52, and then in step A23 the slide parting line may be formed. Then in step A24, a slide parting plane may be formed based on the slide parting line in the mold splitting section 52.

Figure 6:
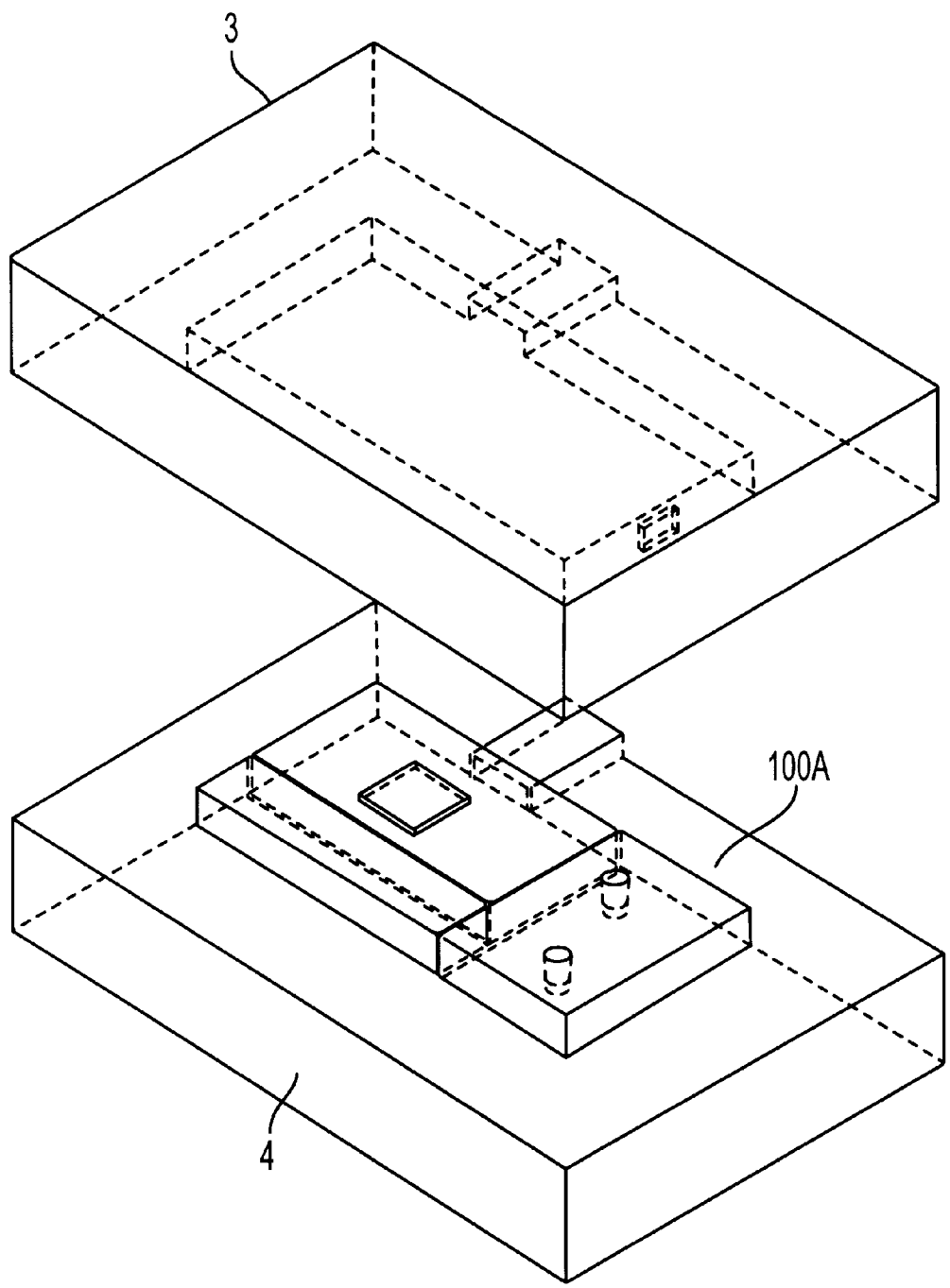
FIG. 6 is a perspective view showing the cavity and the core in a separated state according to embodiments of the present invention.

In step A25, the mold block 100 is divided into the cavity and the core by providing the slide parting plane to the mold block 100 in the slide split section 501. As shown in FIG. 6, an isometric drawing in which the cavity 3 and the core 4 are split is displayed on the display 19.

Next, in step A26, it would be detected in the mold splitting section 52 whether there is caused interference between the cavity 3 and the core 4 or not (mold opening interference check). If it has been determined that mold opening is impossible due to interference between the cavity 3 and the core 4 (NG), the process advances to step A27 where edit of parting lines and parting planes is repeated in the mold splitting section 52. If it has been determined that mold opening is feasible because of no interference between the cavity 3 and the core 4 (GOOD), the process advances to step A28. The mold opening interference check is determined depending upon whether or not a coordinate value of a certain line element is overlapped with other line element.

Next, in step A28, the parting line for splitting the cavity 3 or the core 4 (usually, core) is formed on the basis of depth of the mold in the nest split section 502. This is the case where the mold is constituted with nests by splitting the cavity 3 or the core 4, therefore the nest structure would not be always required if the product shape is relatively simple.

In step A29, priority levels would be given to the parting line for splitting into the nest in the nest split section 502. Then, in step A30, the nest split section 502 may form the parting plane of the nest.

Figure 7A:
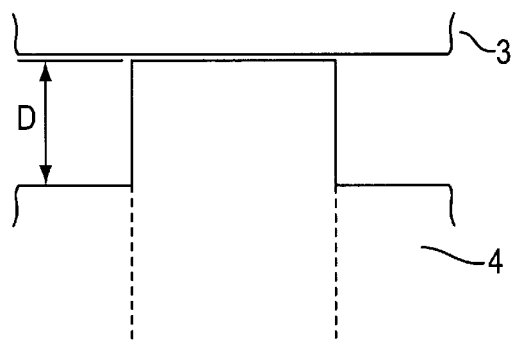
FIGS. 7A to 7C are enlarged partial sectional views showing the molds when designing a parting plane according to embodiments of the present invention.
Figure 7B:
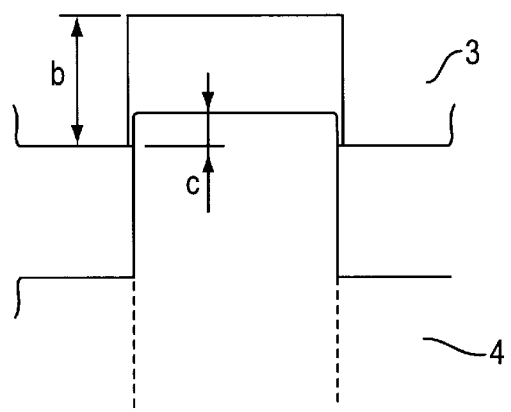
Figure 7C:
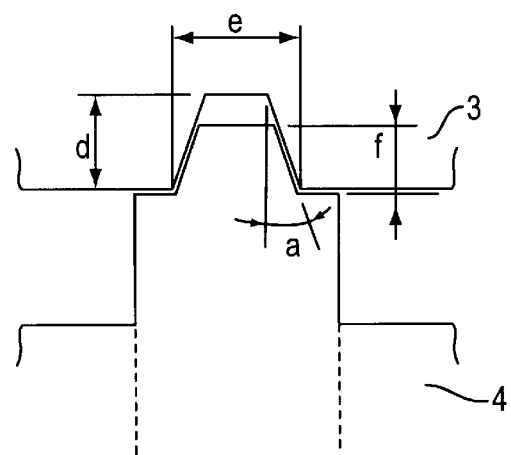

In the present embodiment, three kinds of structures such as flat plane locking structure shown in FIG. 7A, and socket and spigot structure and positioning locking structure shown in FIG. 7B have been prepared in advance as the parting plane of the nest. The designer may thus select one of these structures. Hence it would not be necessary for the designer to input various data into the system, so that the nest parts for forming the undercut portion of the product 1 may be readily designed, and therefore a burden of the designer may be extremely reduced.

Figure 8A:
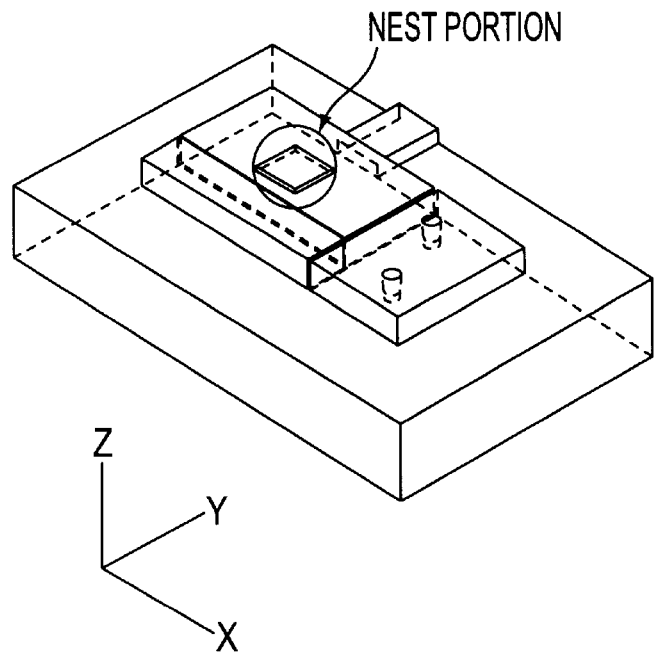
FIGS. 8A and 8B are perspective views respectively showing split of a nest portion according to embodiments of the present invention.
Figure 8B:
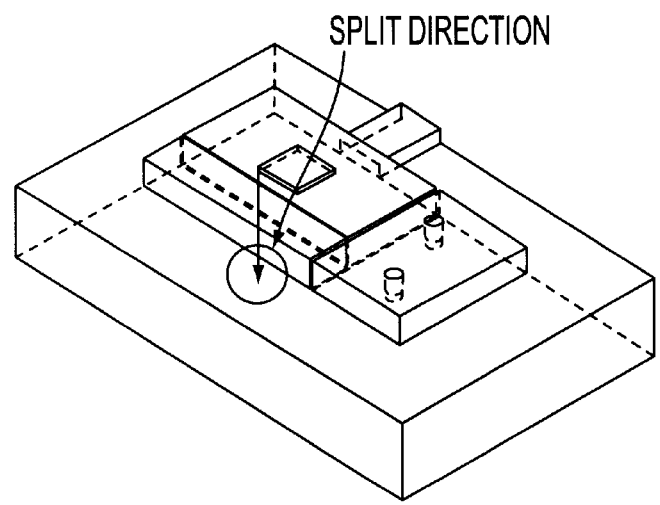
Figure 9A:
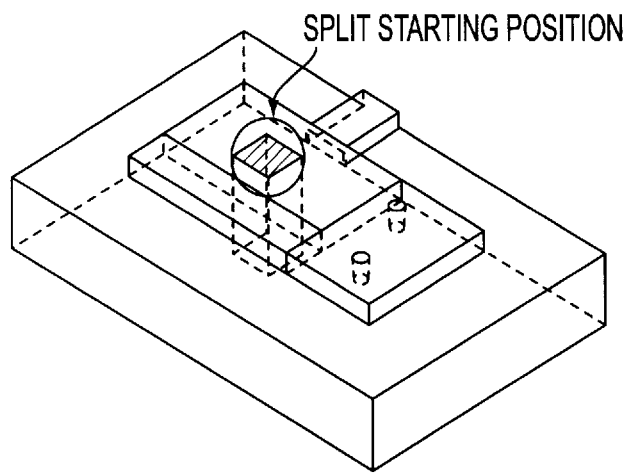
FIG. 9A is a perspective view showing split of the nest portion according to embodiments of the present invention.
Figure 9B:
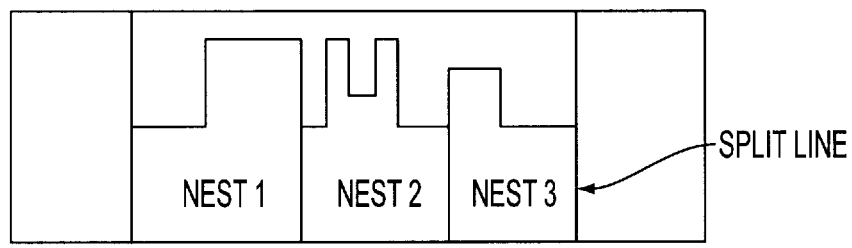
FIG. 9B is a side view showing the nest portion in FIG. 9A.
Figure 9C:
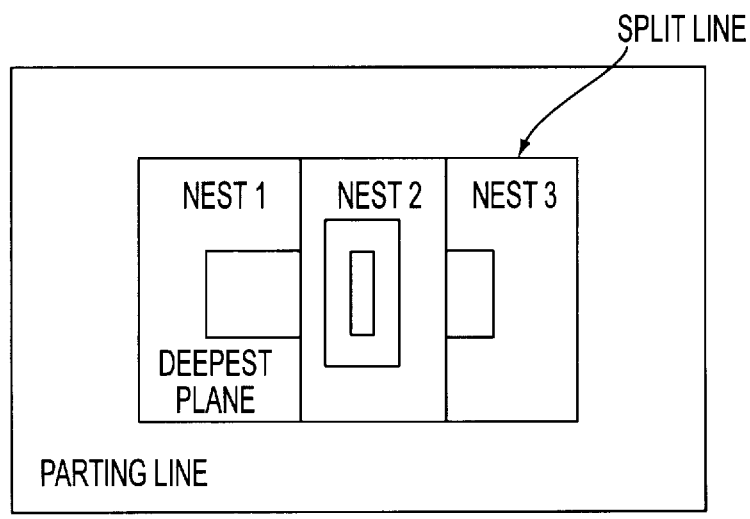
FIG. 9C is a plan view showing the nest portion in FIG. 9A.

In step A31, responding to instruction of the designer, part of the cavity 3 or the core 4 may be split into one or plural nests in the nest split section 502 (see tenth and eleventh embodiments). For purposes of example, with confirming the nests of the mold on the isometric drawing by the display 19, as shown in FIG. 8A, the designer may designate the sectional view of the nest. The designer then instructs a split direction of the nest structure, as shown in FIG. 8B. Thereafter, before and after the nest structure is split as-shown in FIG. 9A, the isometric drawing may be displayed on the display 19. For this reason, as shown in FIGS. 9B and 9C, three nest structures 1 to 3 for splitting the core 4 by the parting plane are displayed on the display 19. The top view of three nest structures 1 to 3 projected onto the parting plane as well as the sectional view (FIG. 9B) of the nest may be displayed on the display 19. In FIG. 9C, a hatched portion is a deepest plane of the mold. Likewise, the portion for forming bore portions, etc. of the product 1 may be constituted as the nest structure.

In step A32, the mold base for supporting the mold may be arranged in the mold base arranging section 61 of the plate design editor 16 (see a twelfth embodiment).

Next, in step A33, a gate may be designed in the gate design section 62 (see a thirteenth embodiment). In this event, since several kinds of gate profiles have been stored in the database 12 as patternized data in the present embodiment, the designer may then design the gate by either selecting the kind of the gate or inputting numeric values in compliance with procedures displayed on the screen.

In step A34, the runner may be designed in the runner design section 63 (see a fourteenth embodiment). In this case, since several kinds of runner profiles have also been stored in the database 12 as patternized data in the present embodiment, the designer may design the runner by either selecting the kind of the runner or inputting numeric values according to procedures displayed on the screen.

Subsequently, in step A35, the sprue may be designed in the sprue design section 64. In this event, since several kinds of sprue profiles have been stored in the database 12 as patternized data in the present embodiment, the designer may design the sprue by either selecting the kind of the sprue or inputting numeric values in compliance with procedures displayed on the screen.

In step A36, the gas vent may be designed in the gas vent design section 65 (see a fifteenth embodiment). In this case, since several kinds of gas vent profiles have also been stored in the database 12 as patternized data in the present embodiment, the designer may design the gas vent by either selecting the kind of the gas vent or inputting numeric values according to procedures displayed on the screen.

Furthermore, in step A37, profile, size, location of the ejector pin and diameter of hole for the ejector pin provided in the core may be designed in the ejector pin design section 66 (see a sixteenth embodiment). In this event, since several kinds of ejector pin profiles, etc. have been stored in the database 12 as patternized data in the present embodiment, the designer may design the ejector pin by either selecting the kind of the ejector pin or inputting numeric values in compliance with procedures displayed on the screen.

In step A38, size, location, etc. of the cooling path may be designed in the temperature adjusting structure design section 67 (see a seventeenth embodiment). In the present embodiment, since several kinds of profiles, etc. of the cooling path are stored in the database 12 as patternized data, the designer may design the cooling path by selecting kinds of the cooling path and inputting numerical values according to procedures displayed on the screen.

In step A39, a "link structure" for coupling the runner stripper plate, cavity plate, and core plate may be designed in the movable structure design section 68 (see an eighteenth embodiment). In the present embodiment, since several kinds of the link structures are stored in the database 12 as patternized data, the designer may design the cooling path by selecting kinds of the link structure and inputting numerical values according to procedures displayed on the screen.

Consequently, it would be understood that the plastics injection mold may be designed via respective steps of the main routine of the design system.

Next, respective function portions of the product shape correction editor 14, the cavity design editor 15 and the plate design editor 16 in the design system according to the present invention will be explained at every embodiment below.

(1) First Embodiment

Figure 10:
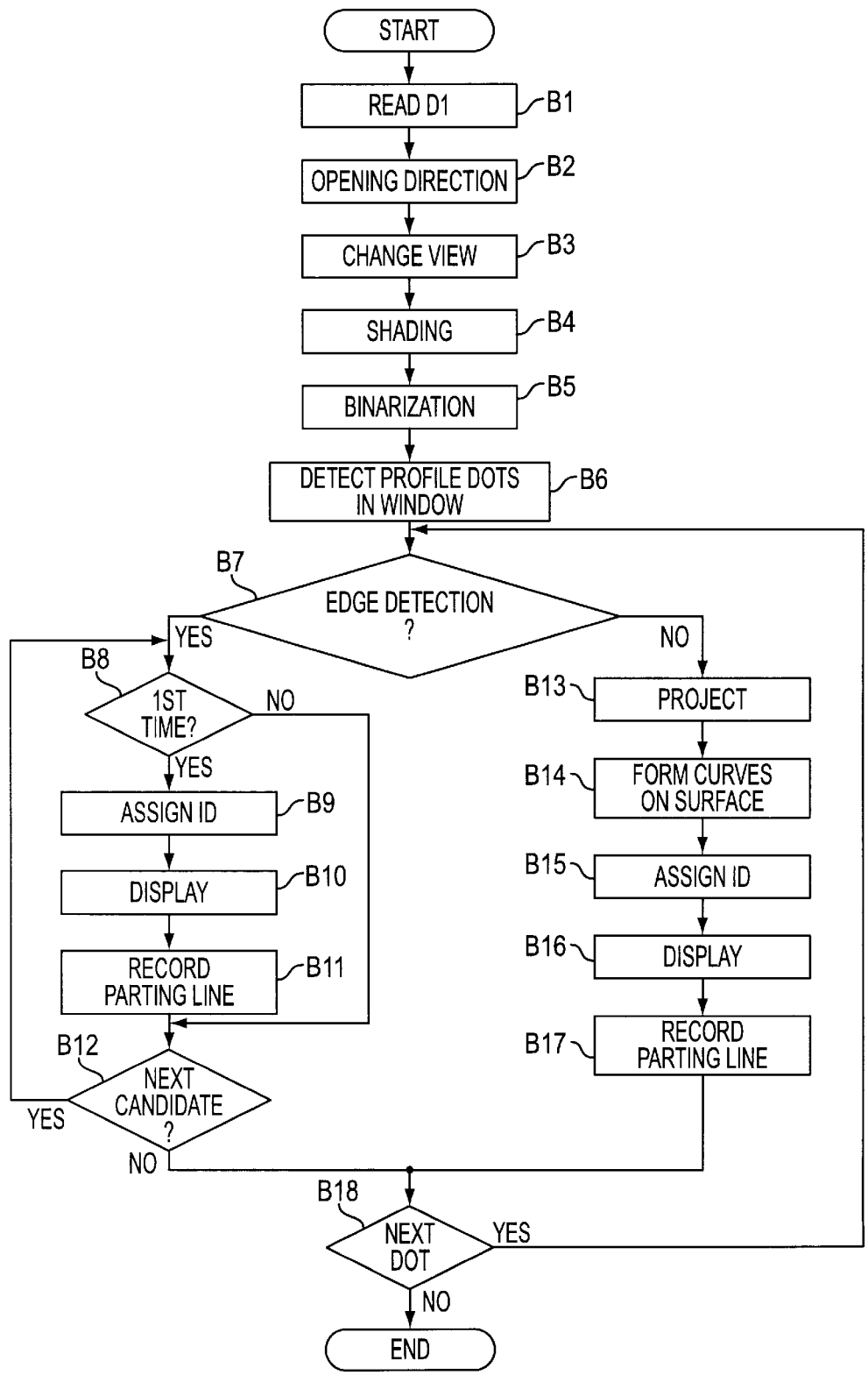
FIG. 10 is a flowchart illustrating profile detection of an outermost periphery and through holes of a product shape according to a first embodiment of the present invention.

FIG. 10 is a flowchart illustrating detection operation of profile lines of outermost periphery and though holes of the product according to the first embodiment of the present invention. In this process, candidates of the parting line may be extracted from the profile of the product 1 in the parting line forming section 41.

Figure 11:
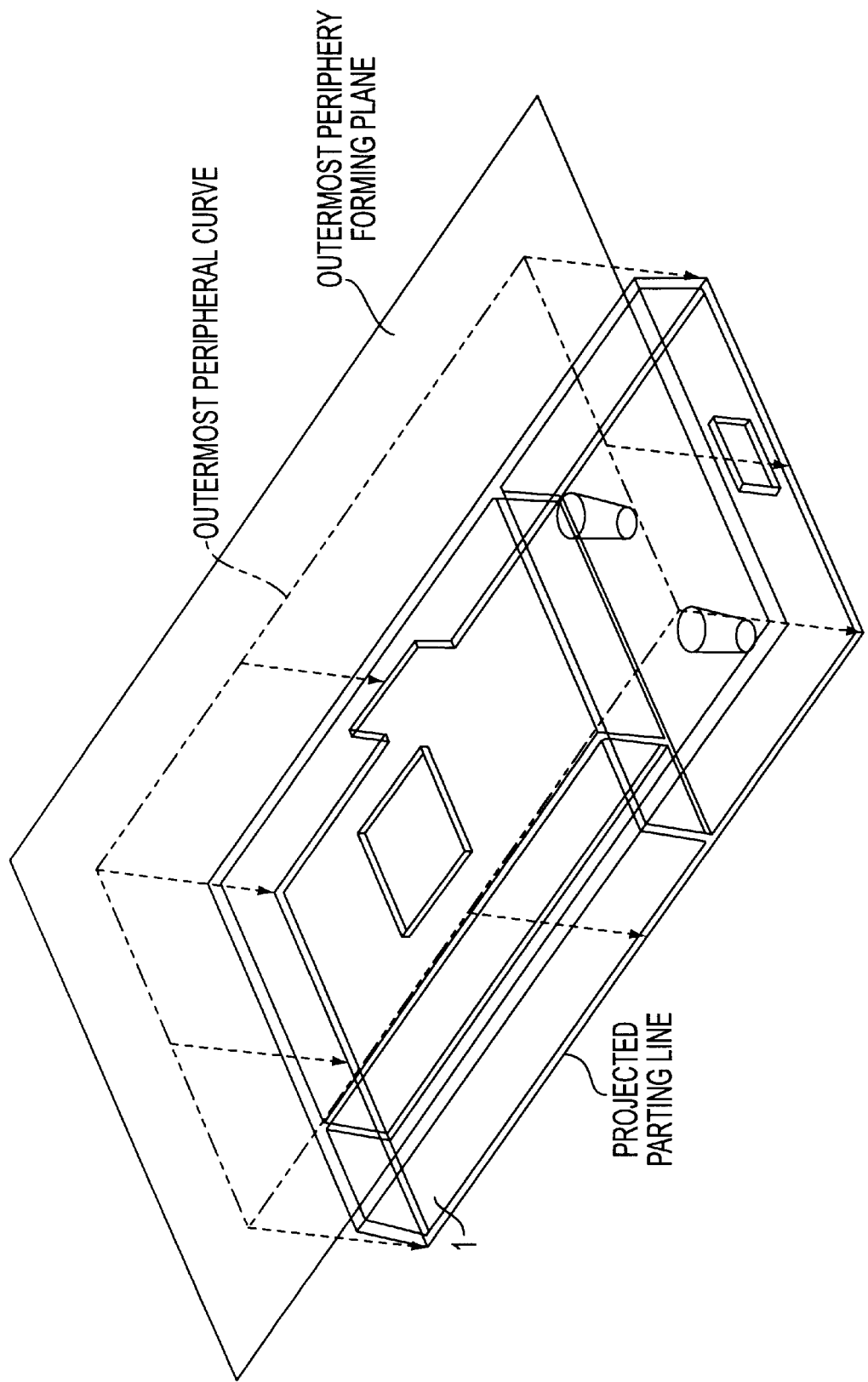
FIG. 11 is a perspective view showing the product shape when detecting the outermost periphery according to the first embodiment of the present invention.

In step B1, the design system may first read the product shape data D1 from the design data memory 11 and then display the product shape on the display 19 like as a stereoscopic display shown in FIG. 11. In step B2, the designer may input a mold opening direction of the product shape via the keyboard. The process then advances to step B3. The design system may then switch the display screen on the display 19 to the top view, in which the product shape is viewed from the mold opening direction. The reason why the display should be switched to the top view is that the parting line may often appear as the outermost periphery of the product shape viewed from the mold opening direction. If the parting line detected in the top view is three-dimensionally displayed once again, it would become easy for the designer to monitor the parting line. In the event that the mold opening direction cannot be determined as a certain direction, then the side view and the bottom view of the product 1 are displayed on the display 19.

In step B4, the top view being displayed on the display 19 may be depicted as a shading display to clarify borderlines of the product shape. Where the shading display signifies color tone of the screen on the display 19. For instance, insides of the profile line of the product 1 are darkened and outside thereof are lightened on the display 19.

In step B5, data of the product shape may be binarized (i.e., a dark portion on the screen is "0" whereas a light portion on the screen is "1"). Then, in step B6, dots constituting the profile line (referred to as "profile dots" hereinafter) may be detected. The borderlines as above may be extracted by image processing using Laplacian filter discussed hereinafter.

In image processing using the Laplacian filter, values of four pixels, i.e., upper, lower, right and left pixels B to E into which a target pixel A displayed as the value "0" or "1" is fetched may be first examined. In the case of F<0 in the expression satisfying $F=(B+C+D+E)-4A$, portions expressed by the value "1" show the borderlines of the object side. In the case of F>0, portions expressed by the value "0" show the borderlines of the space side. In the case of F=0, there is no borderline. Consequently, according to this image processing, the profile lines of the outermost periphery and through holes of the product 1 may be detected.

Then, in step B7, it is determined whether or not borderlines (edges) being placed directly beneath the profile lines previously detected may be detected. This edge detection may be effected by a screen position function. The screen position function signifies that, for example, edges of side portions of the product shape are detected by drawing lines from the plane (outermost periphery forming plane) on the product 1 downward in the vertical direction, as shown in FIG. 11. If the edges have been detected (YES), then the process proceeds to step B8 where it is checked whether the edges are detected for the first time. If the edges have been detected for the first time (YES), then the process advances to step B9. In step B9, individual identifiers (ID) indicating candidates of the parting lines are attached to edge constituting lines of the product shape data D1. Conversely, if the edges have been detected for the second time in step B8 (NO), the process then advances to step B12.

In step B10, display on the display 19 may be changed, and then in step B11 line elements of candidates of the parting lines are recorded in the work memory 13. In step B12, it is checked whether or not succeeding candidates of the parting lines are therebelow. If the succeeding candidates has existed (YES), then the process returns to step B8. On the contrary, if there has been no succeeding candidate (NO), then the process advances to step B18.

While there has been no edge in step B7 (NO), the process advances to step B13 where profile dots previously detected may be projected onto the product shape.

In step B14, curves are formed on the surface of the product shape by the projected profile dots. Then in step B15, individual identifiers (ID) are attached to the product shape data D1 as the candidates of the parting lines.

Then in step B16, display on the display 19 may be changed. In step B17, the candidates of the parting lines are stored in the work memory 17, and the process then advances to step B18.

In step B18, it is checked whether or not succeeding profile dots are present. If the profile dots have not been present (NO), the process is then terminated. While the profile dots have been present (YES), the process then returns to step B7 to repeat either steps B8 to B12 or steps B8 to B17. As described above, as to all profile dots detected from the top view, the candidates of the parting lines may be detected. Thus profile lines of the outermost periphery and the through holes of the product shape are extracted as edges or the borderlines of plane pixels.

In this manner, in the injection mold design method according to the first embodiment of the present invention, the candidates of several parting lines may be preliminarily detected. Therefore, even if the product shape is modified in the middle of design operation because of shrinkage rate correction or draft slope provision of the product 1, the parting lines being required for splitting the mold block into the core and the cavity at desired location can be automatically obtained.

According to the first embodiment of the present invention, it would be understood that, since the product shape being three-dimensionally displayed has been changed temporarily to that viewed from the mold opening direction, the parting lines can be readily extracted by detecting the outermost peripheral edge on the top view. Moreover, it would be apparent that, since the outer edge of the product shape may be displayed with different color from other portions on the display 19 or since the product shape may be classified on the display 19 by different color with defining the outer edge as the boundary, the designer may discriminate easily portions to which design process is requested from portions to which design process is not requested.

(2) Second Embodiment

Figure 12:
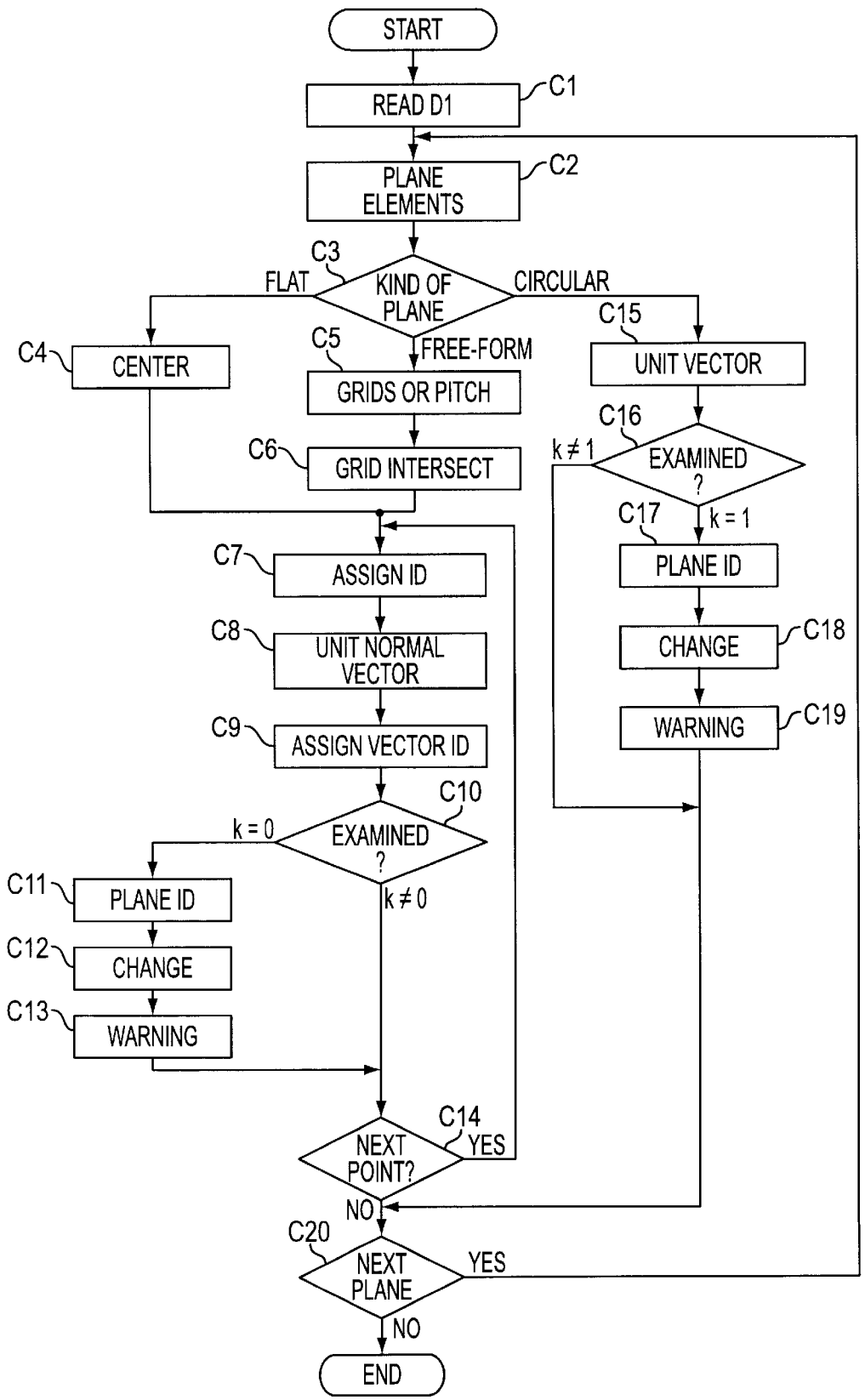
FIG. 12 is a flowchart illustrating draft-sloped plane detection according to a second embodiment of the present invention.

FIG. 12 is a flowchart illustrating detection process of draft-sloped planes according to the second embodiment of the present invention. In this process, planes to which draft slope should be provided may be extracted from the product shape in the draft-sloped plane providing section 42.

First, in step C1, the product shape data D1 may be read from the design data memory 11. In step C2, plane elements of the product shape are read out. The plane elements may correspond to bottom plane, side plane, plane of rising portion of the product 1.

Then, in step C3, the designer may discriminate kinds of the plane elements. If a plane to be inspected has been a flat surface, the process proceeds to step C4 where center of gravity of the plane is calculated. The process then advances to step C7.

If the plane to be inspected has been a free-form surface, then the process moves to step C5 where the designer may input the number of grid or the pitch of grid for splitting the free-form surface via the keyboard 17. It should be noted that the number of grid or the pitch of grid may be set preliminarily in the design system.

After this, the CPU 18 may calculate coordinates of a grid intersecting point in step C6, and then the process moves to step C7.

In step C7, an inspection point identifier (ID) indicating an inspection point would be assigned to the center of gravity calculated in step C4 or the grid intersecting point calculated in step C6. In step C8, a unit normal vector is calculated on the inspection point. The unit normal vector k derived here can be used as an inspection vector. In step C9, the draft-sloped plane providing section 42 may assign the inspection point ID=k to the inspection point.

Thereafter, in step C10, components of the inspection vector k in the mold opening direction may be examined. In case the inspection vector k has been 0 (i.e., it is a parallel plane in the mold opening direction), then the process proceeds to step C11. In step C11, using this plane as the sloped plane, a sloped plane identifier (ID) for indicating sloped plane would be assigned to the product shape data D1. In step C12, such sloped plane can be displayed with different color from other planes on the display 19.

In step C13, a warning such as sound, display, etc. may be issued to inform that the sloped plane has been detected. If in step C10 the inspection vector k has not been 0 (k≠0, i.e., it is a slant plane with respect to the mold opening direction), it may be determined that the plane should not be sloped and then the process proceeds to step C14.

In step C14, it may be determined whether or not an inspection point to be succeedingly tested is present. If the succeeding inspection point has been present (YES), the process returns to step C7 where it may be checked whether or not draft slope is needed. But if there has been no succeeding inspection point in step C14 (NO), then the process advances to step C20.

In the meanwhile, if the plane to be inspected is a circular cylinder surface in step C3, a unit vector k may be calculated for the central axis of the circular cylinder surface. The unit vector can be set as the inspection vector k.

In step C16, components of the inspection vector k in the mold opening direction may be examined. In case the inspection vector k has been 1 (i.e., the central axis of the circular cylinder is parallel to the mold opening direction), then the process proceeds to step C17. In step C17, the sloped plane identifier (ID) for indicating the sloped plane may be assigned to data of the circular cylinder surface in the product shape data D1. In step C18, such sloped plane may be displayed with different color from other planes on the display 19.

In step C19, it may be informed by sound, display, etc. that the sloped plane has been detected. If in step C14 the inspection vector k has not been 1 (k≠1, i.e., the central axis of the circular cylinder surface is perpendicular to the mold opening direction), it may be determined that the plane should not be sloped and then the process proceeds to step C20.

In step C20, it may be determined whether a plane to be succeedingly inspected is present or not. If the succeeding inspection plane has been present (YES), then the process returns to step C2 where steps C2 to C14 are repeated. But if there has been no succeeding inspection plane (NO), then the process is terminated.

With the above processes, it would be obvious that, even if the rising portion of the product shape has been formed by a flat surface, a free-form surface, or a circular cylinder surface, the sloped plane may be detected. Such detected sloped plane would been stored in the work memory 13 as element data D3.

(3) Third Embodiment

Figure 13:
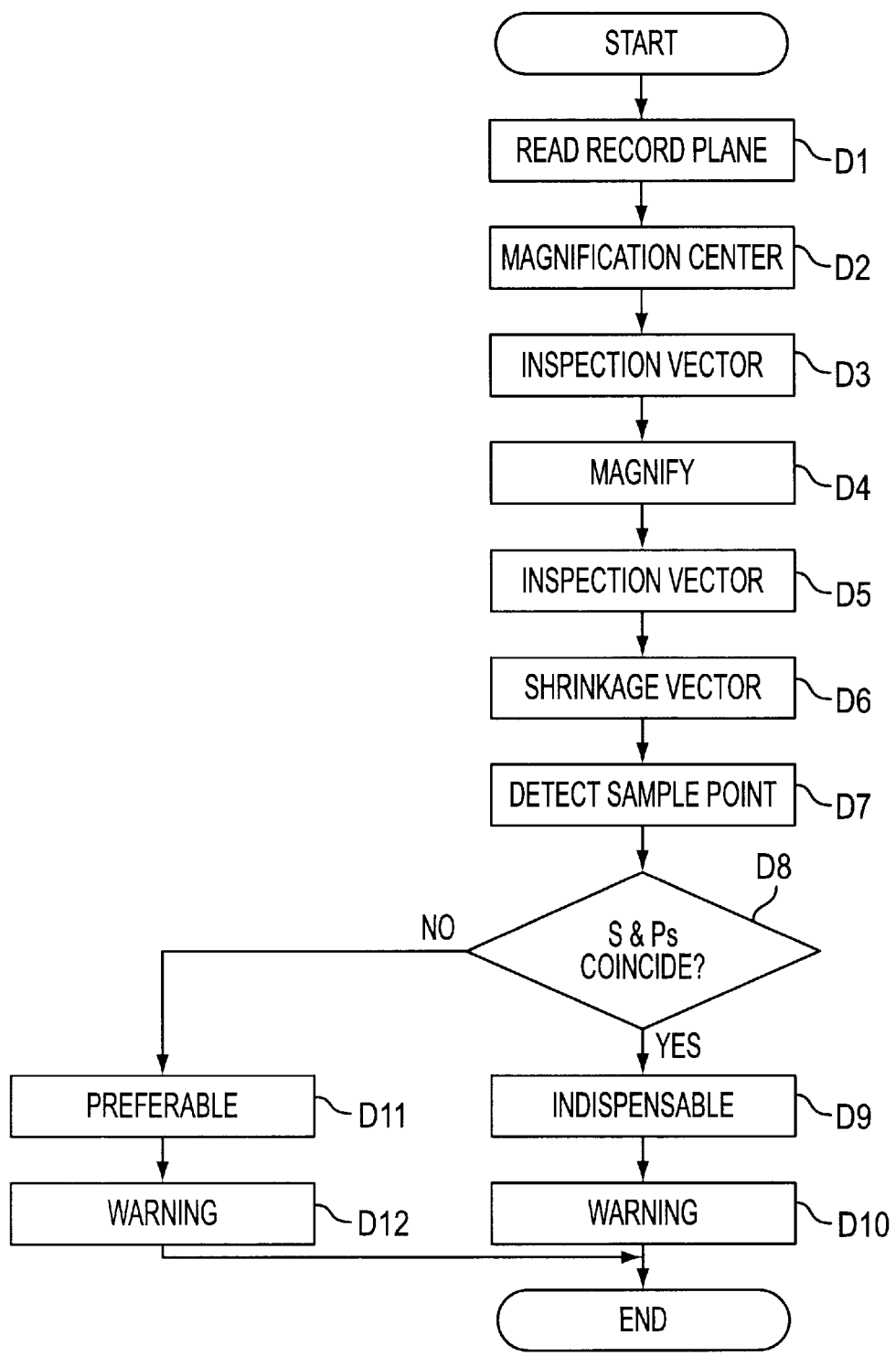
FIG. 13 is a flowchart illustrating assignment of priority level to the draft-sloped plane according to a third embodiment of the present invention.

FIG. 13 is a flowchart illustrating assign process of priority levels to draft slopes according to the third embodiment of the present invention. In this process, priority levels may be assigned to respective sloped planes detected in the second embodiment in the draft-sloped plane providing section 42.

In FIG. 13, in step D1, information of sloped plane previously registered may be first read from the work memory 13. In step D2, a magnification center of the draft slope plane may then be calculated. The magnification center is a center of gravity of the product when the product shape is projected onto the flat plane being parallel to the mold opening direction.

Figure 14A:
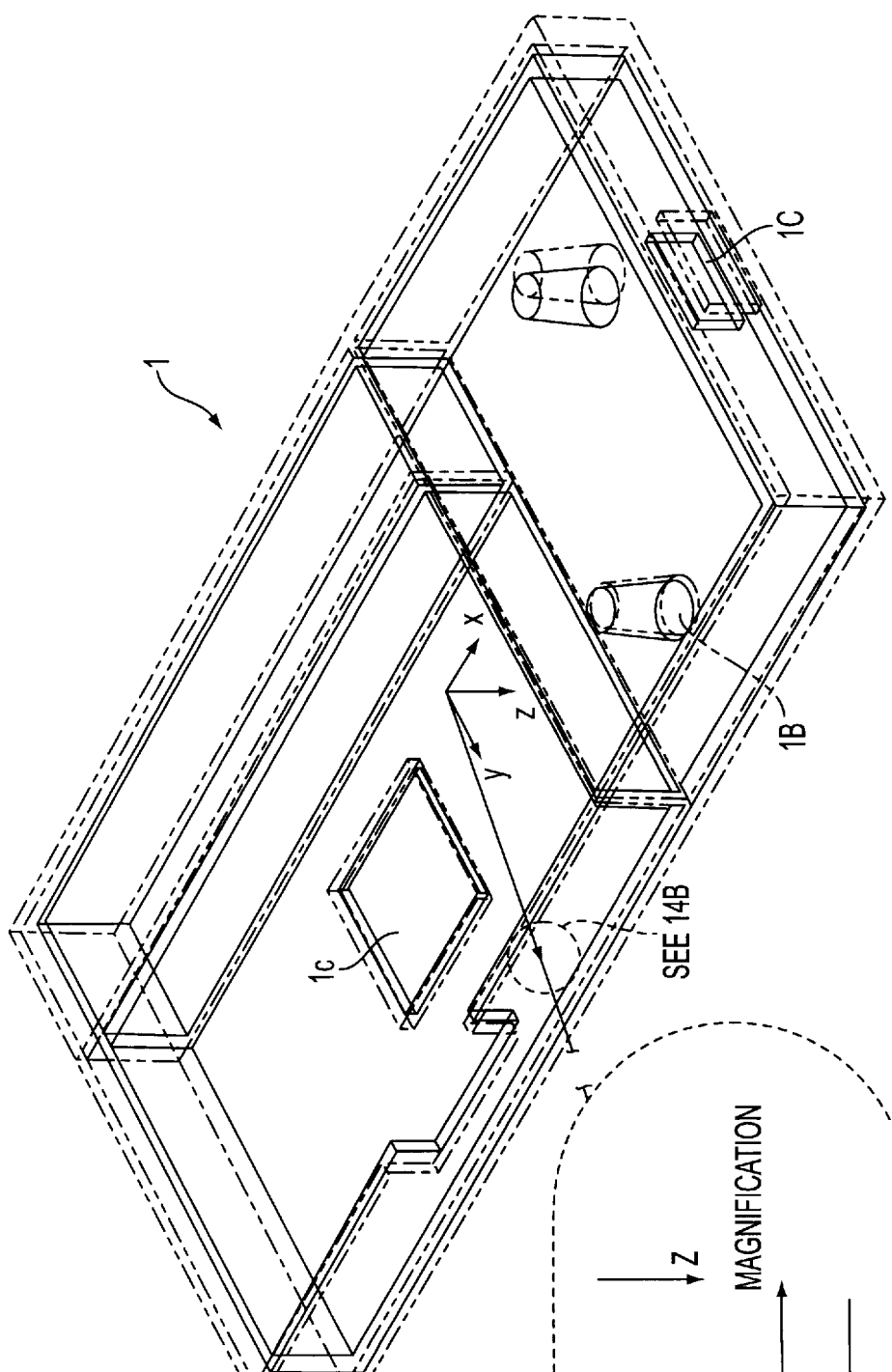
FIGS. 14A and 14B are is a perspective view showing the product shape before and after magnification when assigning the priority level according to the third embodiment of the present invention.
Figure 14B:
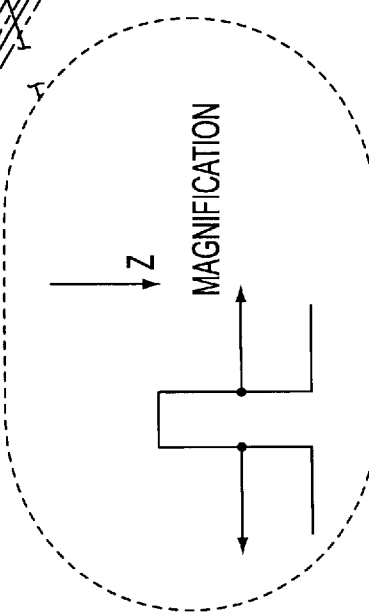

Subsequently, in step D3, the inspection vector k may be calculated before the magnification being effected. In step D4, the product shape may be magnified in the direction perpendicular to the mold opening direction Z on the display 19. FIGS. 14A and 14B are isometric drawing showing the product shape before and after the magnification being conducted. Next, in step D5, the inspection vector is calculated after the magnification being effected.

Figure 15A:
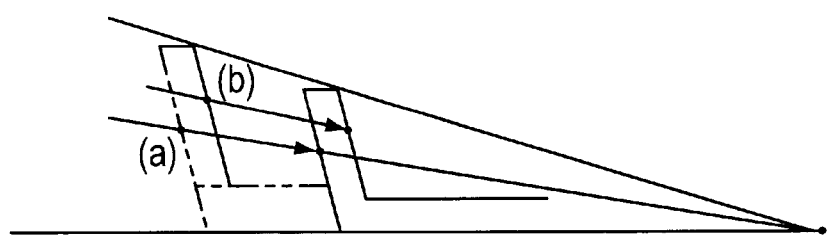
FIGS. 15A to 15C are views respectively explaining shrinkage of the product shape when assigning the priority level according to the third embodiment of the present invention.
Figure 15B:
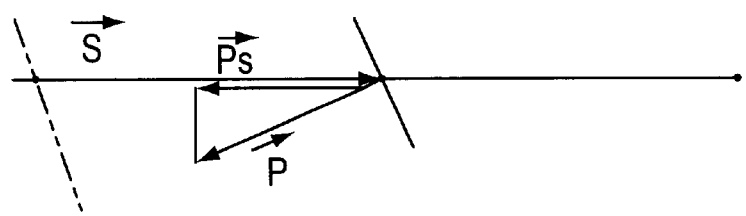

In step D6, shrinkage vector as for the sloped plane may be calculated. FIG. 15A is a sectional view showing a certain edge of the product 1 before and after the magnification being executed. In FIG. 15A, points (a) and (b) denote respectively a sample point of the edge of the product 1 before and after the magnification being effected. FIG. 15B shows a vector analysis chart of the point (a). S (where a vector symbol being omitted) means the shrinkage vector, and a vector component such that the core may be clamped by the product. P (where a vector symbol also being omitted) means the normal vector of the edge plane. Ps (where a vector symbol also being omitted) means the normal vector of the edge plane of the product 1 in the shrinkage direction (referred to as "normal vector in the shrinkage direction" hereinafter). In case the shrinkage vector S and the normal vector Ps in the shrinkage direction are opposite to each other (i.e., if it is an outer plane), the moldings be able to be easily released from the mold. Therefore this indicates that the edge plane need not be draft-sloped (but it would be preferable to provide the draft slope).

Figure 15C:
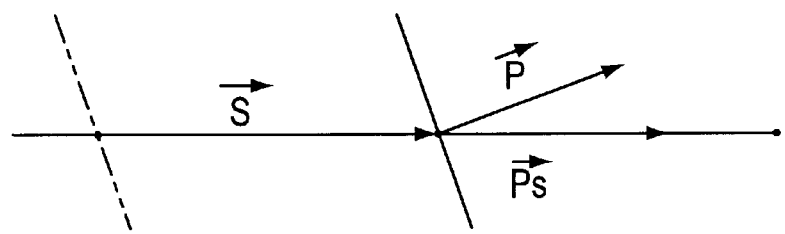

FIG. 15C shows a vector analysis chart of the point (b). In case the shrinkage vector S and the normal vector Ps in the shrinkage direction are in the same direction (i.e., if it is an inner plane), the moldings cannot be readily released from the mold. Therefore this indicates that the draft slope must always be given to the edge plane.

In other words, in step D7, components of the sample points (a) and (b) in the magnification center direction may be detected from the enlarged view of draft-sloped plane as shown in FIG. 15A. In step D8, vector analysis may be effected on the sample points (a) and (b). On the other hand, if the shrinkage vector S and the normal vector Ps in the shrinkage direction have been in the opposite direction (NO), the process advances to step D11 where necessity of the draft slope may be recorded. Then in step D12, a warning to the effect that provision of the draft slope is not indispensable but preferable may be displayed on the display 19.

In step D8, in case both directions of the shrinkage vector S and the normal vector Ps in the shrinkage direction have coincided with each other (YES), the process advances to step D9 where indispensable necessity of the draft slope may be recorded. Then in step D12, a warning to the effect that provision of the draft slope is indispensable may be displayed on the display 19.

Consequently, depending on the shrinkage vector S and the normal vector Ps in the shrinkage direction, constituent planes of the product 1 may be classified into the planes to which the draft slope is indispensable and the planes to which the draft slope is preferable.

As discussed earlier, according to the injection mold design method of the third embodiment of the present invention, it may be confirmed whether or not the draft slope is appropriately provided to portions, to which the draft slope is indispensable, by comparing both directions of the shrinkage vector S and the normal vector Ps of the sloped plane of the product shape. This is because priority levels have been assigned to "the plane to which the slope plane of the mold is indispensable" in step D9 and "the plane which is preferable to be formed as the slope plane" in step D11.

(4) Fourth Embodiment

Figure 16:
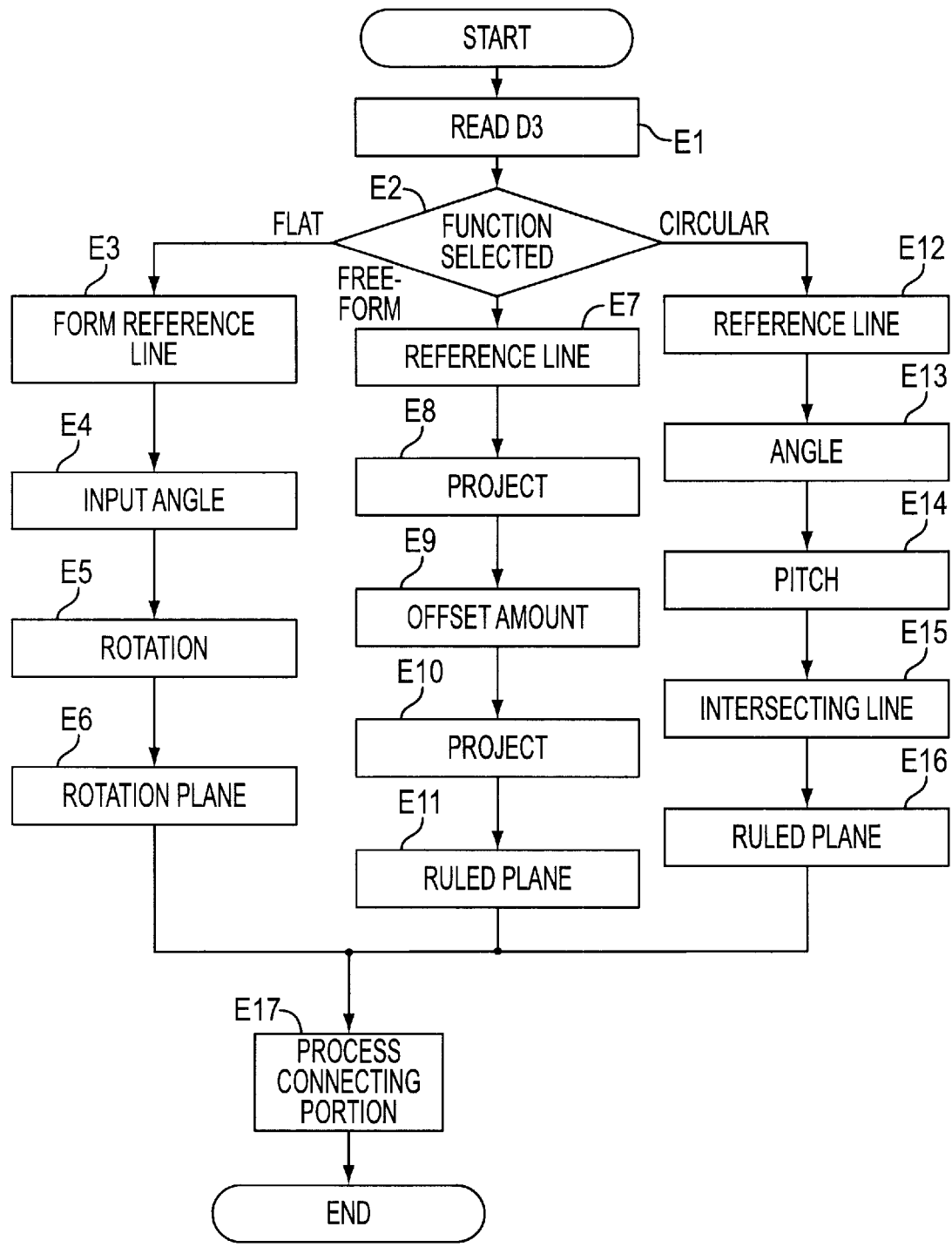
FIG. 16 is a flowchart illustrating provision of draft slope according to a fourth embodiment of the present invention.

FIG. 16 is a flowchart illustrating provision process of draft slope according to the fourth embodiment of the present invention. In this process, slant may be given to the draft-sloped plane by the draft-sloped plane providing section 42. As the method for providing the slant, a method for simply inclining the sloped plane, a method for utilizing a slant plane of circular cone, and a method for forming a ruled plane which being formed by connecting a shifted base side edge of the rising plane and a leading edge of the same by shifting the base side edge at a distance in the horizontal direction may be listed.

In FIG. 16, in step E1, element data D3 of edge in the product shape previously recorded are first read out from the work memory 13.

Figure 17:
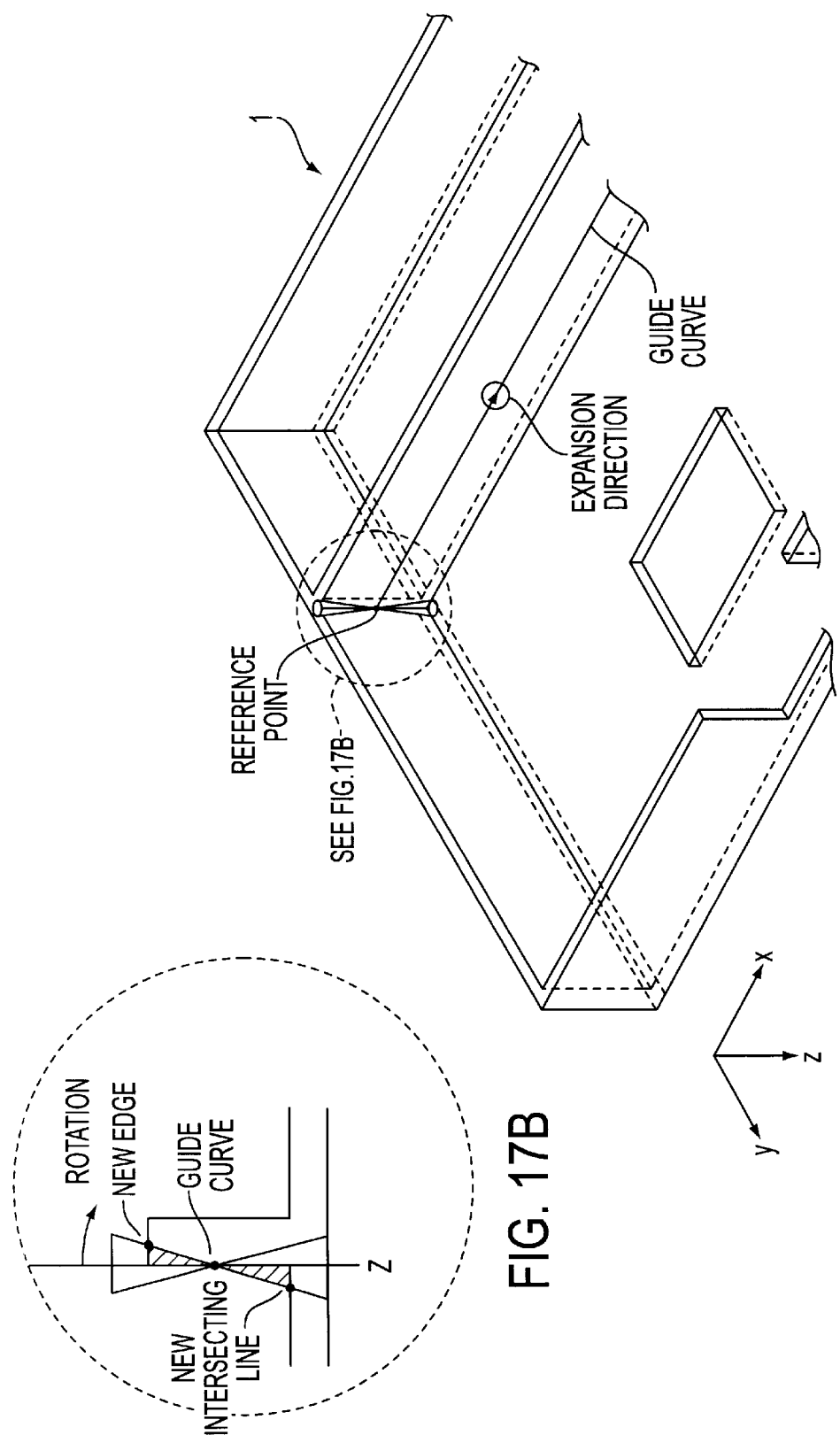
FIG. 17 is a perspective view showing circular cone when providing the draft slope according to the fourth embodiment of the present invention.

Then in step E2, the designer may select a sloped plane. If the selected plane is a flat plane, the process advances to step E3 where, as shown in a broken line circle in FIG. 17B, the sectional view of the edge of the product 1 may be temporarily displayed on the display 19. In the broken line circle in FIGS. 17A and 17B, a guide curve (reference line) is displayed along the edge of the product shape on the display 19. In FIG. 17, the designer may set a reference point at an arbitrary location on the edge line of the product shape, and extend the reference point from the reference point in the X or Y direction of the product shape.

In steps E4 and E5, the designer may input angle and rotation direction through the keyboard. The process may move to step E6 where, as shown in FIGS. 17A and 17B, the designer may rotate the edge plane of the product shape by input angle in the input rotation direction with the guide curve as the center to thus form a new plane. Thus a sloped plane can be derived.

Figure 18:
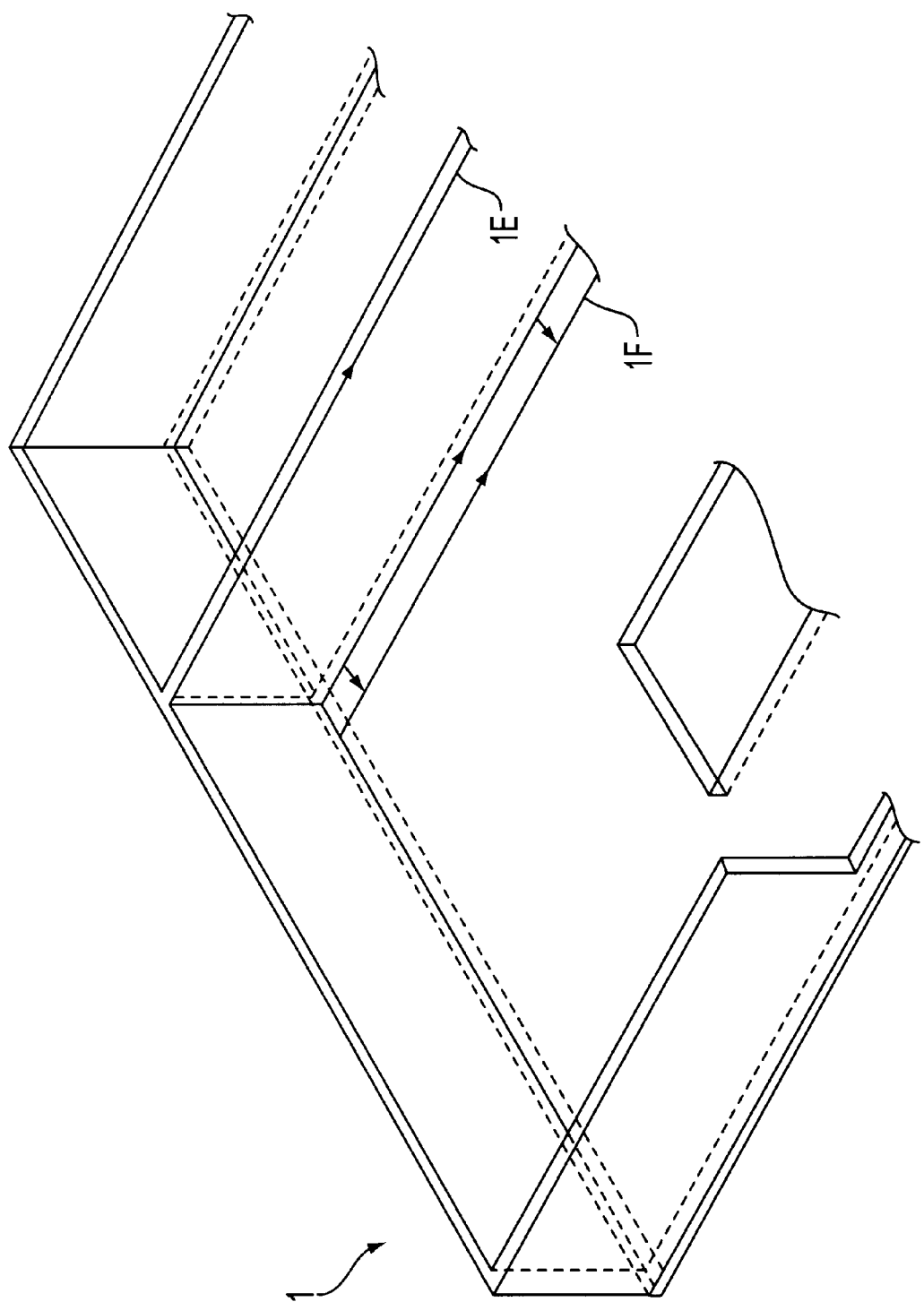
FIG. 18 is an enlarged perspective view showing projection of a parting line when providing the draft slope according to the fourth embodiment of the present invention.
Figure 19:
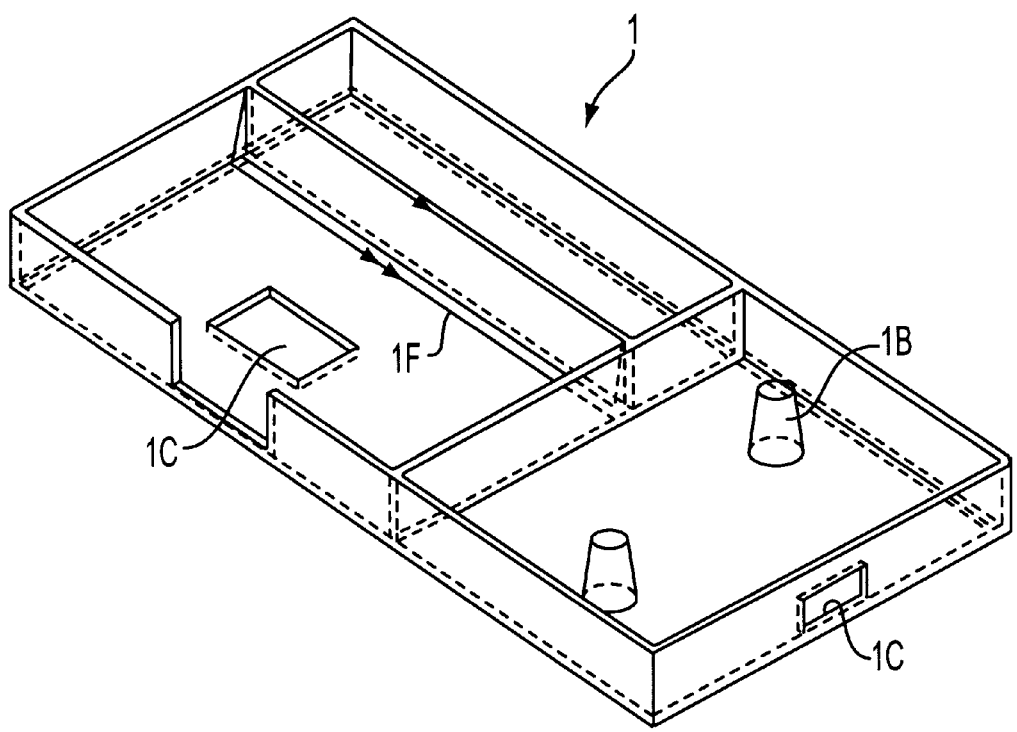
FIG. 19 is a perspective view showing the product shape having draft-sloped plane according to the fourth embodiment of the present invention.

As shown in FIG. 18, a new edge may be selected and projected onto the product shape. In FIG. 18, a reference IE denotes an original edge portion, and a reference 1F denotes a edge portion after offset is effected by projecting onto the product 1. The isometric drawing of the product shape to which the draft slope as shown in FIG. 19 being provided may be displayed on the display 19. Then the process advances to step E17.

Instead, in step E2, if the rising portion of the product shape has been formed by the free-form surface, the process proceeds to step E7 where the guide curve (reference line) may be formed to generate the ruled plane. At this time, a cross section of the edge may be displayed temporarily as the plan view on the display 19. The cross section of the edge is the rising portion of the product 1. The plan view intersects perpendicularly with the guide curve.

In the next, in step E8, the edge may be projected to the plan view on the display 19. In step E9, the designer inputs an offset amount of the base side edge of the rising plane. In step E10, the design system may then project the offset edge to the product shape.

In step E11, a triangle can be created with setting offset edge, not-offset edge, and top edge of the rising plane as its three apexes. Then locus of oblique sides of the triangle may be created by moving the triangle along the guide curve to obtain a ruled plane. The process proceeds to step E17.

Alternatively, in the event that in step E2 formation of a ruled plane by using a circular cone surface has been selected, the process moves to step E12 where a reference line (guide curve) may be created to form the ruled plane. In step E13 and E14, the designer may input angle of the circular cone and intersecting line calculating pitch. In response to this input, in step E15, the design system may shift the circular cone along the reference line. Then, for respective intersecting line calculating pitches, it may calculate intersecting lines between locus of the oblique side of the circular cone or a prolonged line of the oblique side and the bottom.

Then in step E16, the design system may form the ruled plane for connecting the calculated intersecting lines to the top edge of the rising plane. Then the process advances to step E17. This method for forming the ruled plane by using the circular cone may be applicable even if the bottom is not the flat plane. The intersecting lines may be utilized when the profile would be further corrected in post-process.

In step E17, connecting portion of the ruled plane is processed. In other words, intersecting lines of the ruled plane in the portion to which a plurality of planes being connected may be calculated, and overlapped portions of the ruled plane may then be trimmed. As above, in case the rising portion of the product shape is either the flat surface or the free-form surface or unless the bottom is the flat plane, slant (draft slope) may be provided to the product shape. Information as to the draft slope of the product shape are stored into the work memory 13.

In the mold design method according to the fourth embodiment of the present invention, the reference point being newly designated on the flat surface temporarily formed in step E2 may be projected onto the rising portion of the product shape, then the guide curve may be created by extending the new reference point, and then the sloped plane may be formed by inclining the plane or moving the circular cone along the guide curve. The draft slope may therefore be provided to the rising plane of the product shape.

Hence, it would be understood that, if the sloped plane is modified according to shrinkage rate correction of the product shape, the slope may be freely modified by assigning angle of the oblique side of the circular cone again, etc. For this reason, the sloped plane being suitable for the product shape may be provided. The best sloped plane enables the product 1 to be released readily from the mold.

In the conventional three-dimensional CAD system, only the function for giving a slope to flat surface or circular cylinder surface may be effected, but in the fourth embodiment of the present invention the best sloped plane may be provided to the product 1, as illustrated in steps E7 to E11 or steps E12 to E14, even if the sloped plane is formed of the curve line. As a result, in the fourth embodiment of the present invention, in case the sloped plane of the free-form surface should be modified because of the shrinkage rate correction of the product 1, the sloped plane may be modified arbitrarily by setting a new edge on the temporarily formed flat plane. Thus the best sloped plane may be provided when the profile of the product 1 has been changed.

(5) Fifth Embodiment

Figure 20:
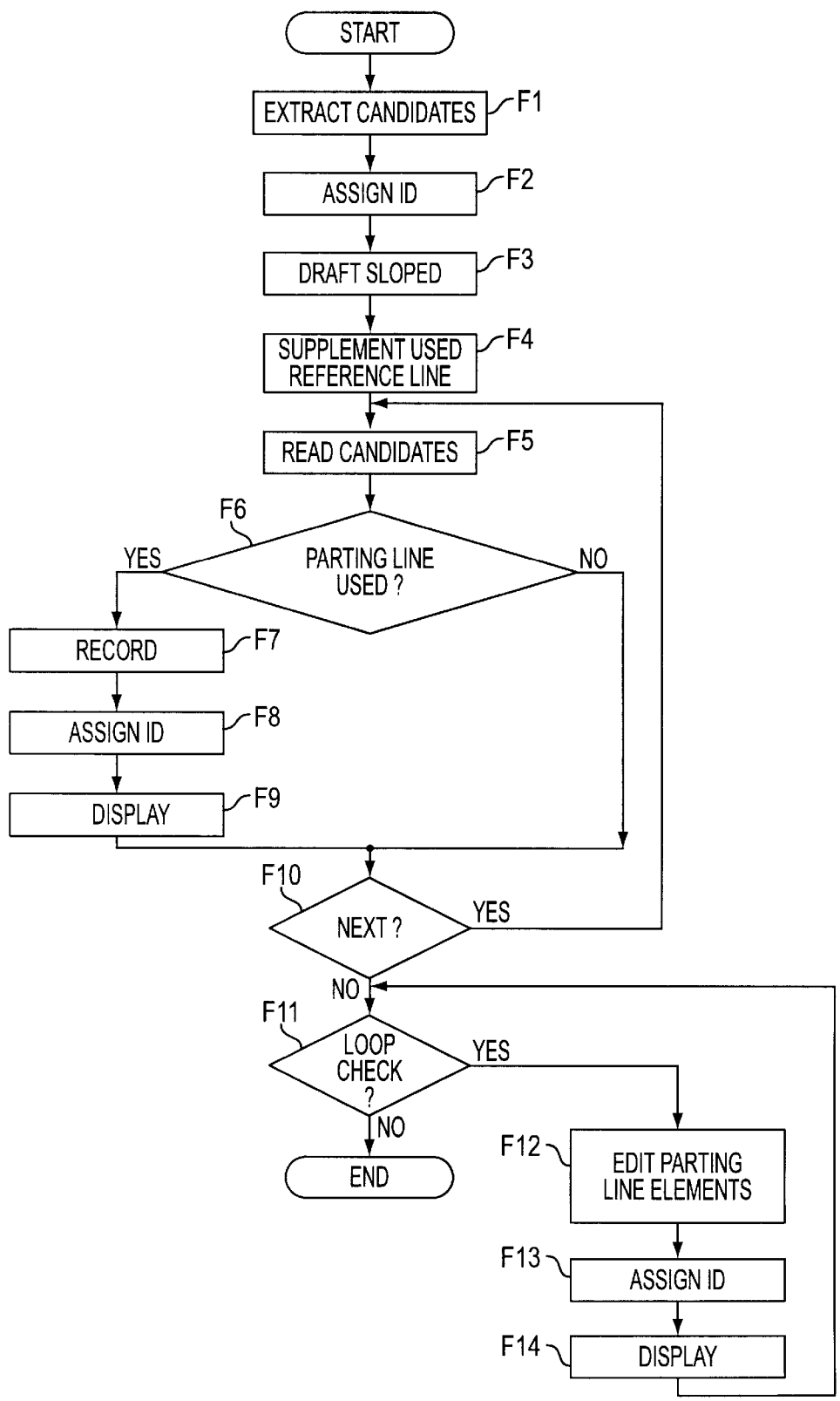
FIG. 20 is a flowchart illustrating formation of the parting line according to a fifth embodiment of the present invention.

FIG. 20 is a flowchart for forming the parting line according to the fifth embodiment of the present invention. In this process, the main parting line for splitting the mold into the cavity and the core may be formed in the parting line forming section 41. In the fifth embodiment of the present invention, steps F1 to F3 and steps F11 to F14 overlap with other embodiments.

In FIG. 20, in step F1, candidates of the parting line may first be extracted as shown previously in FIG. 10 and, in step F2, parting line candidate IDs are assigned to respective candidates of the parting line. The process then proceeds to step F3 where the draft slope may be provided in the manner as shown previously in FIG. 17.

Next, in step F4, the guide curve (reference line) used to provide the draft slope may also be supplemented as the candidates of the parting line. This is because the guide curve would be required for profile correction, etc. of the product 1.

In step F5, the candidates of the parting line may be read from the work memory 13. In step F6, it may be determined by the designer whether or not the candidates of the parting line should be used as the main parting line. If the candidates of the parting line have been used as the main parting line (YES), the process then advances to step F7. Where the line element may be registered as the main parting line in the work memory 13.

Figure 21A:
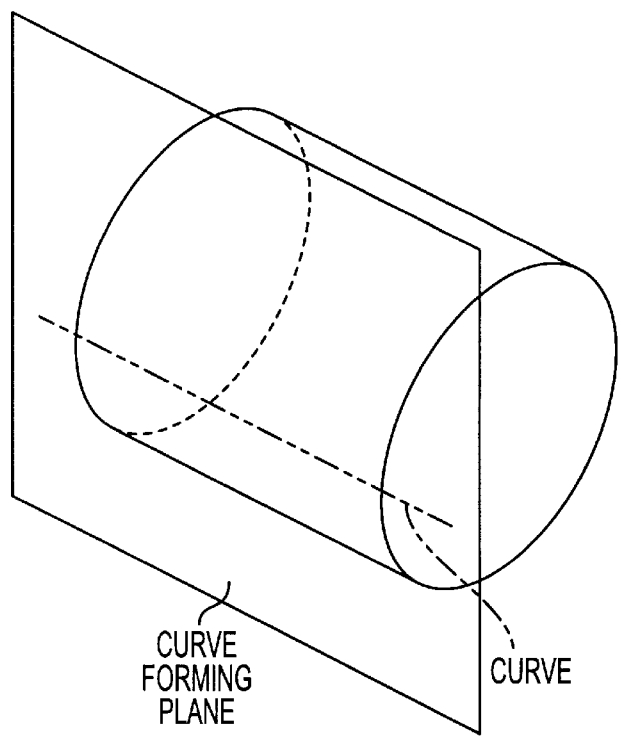
FIGS. 21A and 21B are perspective views showing a circular cylinder when forming the parting line according to a fifth embodiment of the present invention.
Figure 21B:
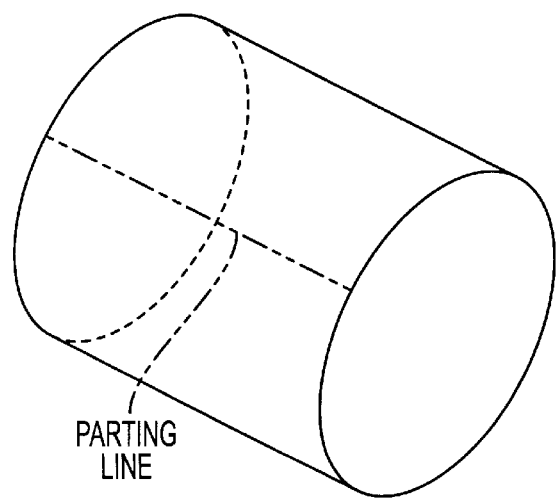

At this time, if the edge cannot be designated because the product shape is formed of the circular cylinder as shown in FIG. 21A or if the parting line should be provided on the portion other than the edge, the designer may first define a flat plane perpendicular to a normal line on the parting line forming plane (curve forming plane). A curve (or straight line) may be formed on this plane. The design system then projects the curve (or straight line) onto the circular cylinder shape product shape. Consequently, as shown in FIG. 21B, the parting line may be formed on the product shape 1 with a circular cylinder shape.

Figure 22:
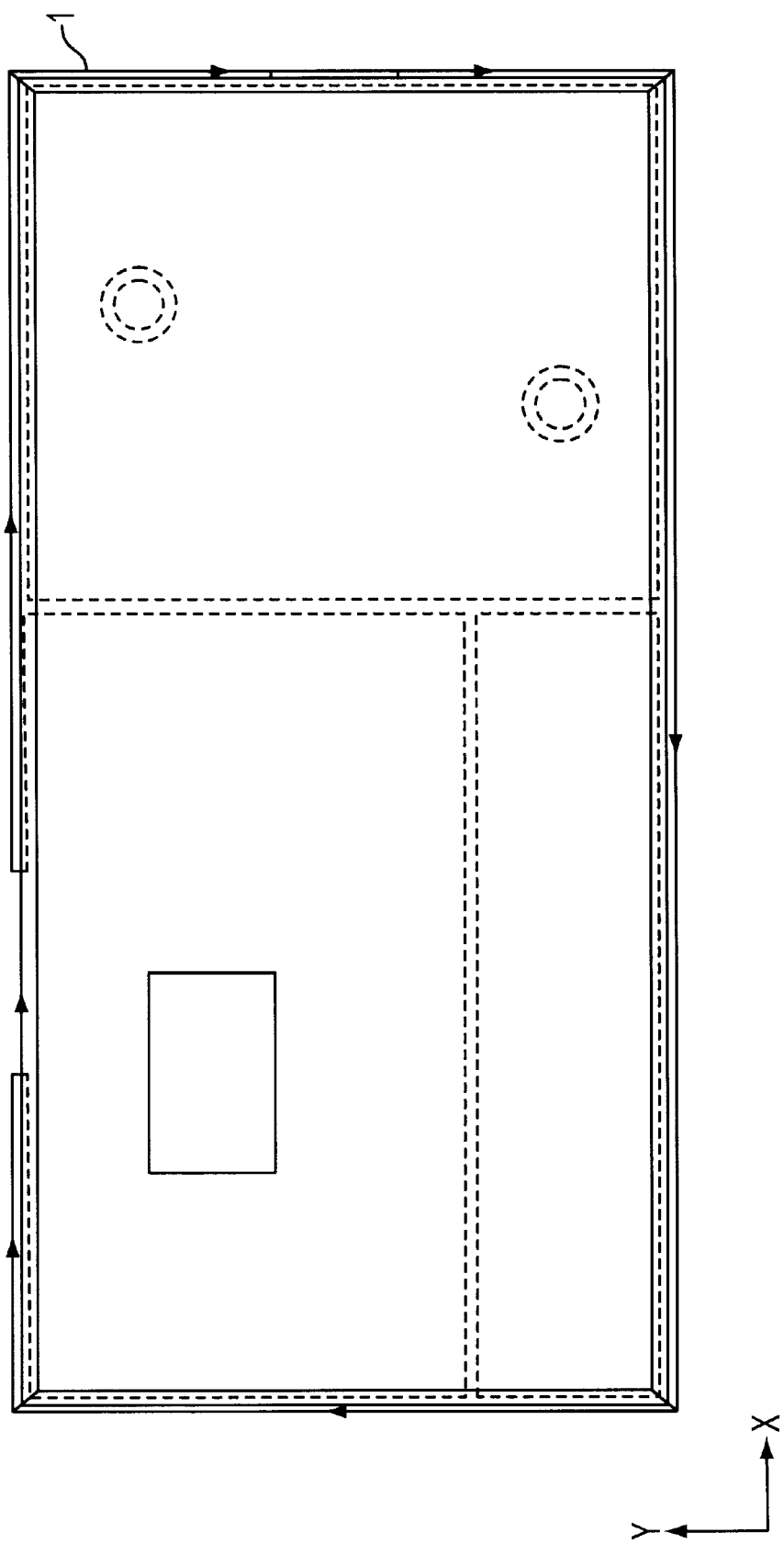
FIG. 22 is a plan view showing the product shape when forming the parting line according to the fifth embodiment of the present invention.

After the main parting line being set and the line elements being recorded, as above, the designer may cause the display 19 to display the product shape (bottom view) viewed in the mold opening direction, as shown in FIG. 22, to designate an outer edge. Thus the display 19 may display such that color tone of the designated outer edge portion has to be changed, inside and outside with the outer edge as the boundary have to be displayed by different kind of line, or silhouette has to be changed in inside/outside of the parting line (marking process).

In step F8, parting line IDs for indicating that the line elements being used as the main parting line are assigned to the line elements. In step F9, display on the display 19 may then be changed (marking process) so as to discriminate the concerned line elements from other lines, and the process advances to step F10.

On the other hand, if the designer has determined that the candidates are not used as the main parting line in step F6 (NO), then in step F10 it is retrieved whether or not succeeding candidates are present. If there has been succeeding candidates (YES), then the process returns to step F5 to repeat steps F5 to F10. If there has been no succeeding candidate (NO), then the process advances to step F11 where loop check may be effected to check whether the main parting line can be formed as a closed loop.

Unless the main parting line could be formed as the closed loop (YES), then in step F12 it may be corrected. With monitoring the display 19, the designer may correct the main parting line by indicating edge curve, borderline, etc.

Thereafter, the process then proceeds to step F13 where the parting line IDs are assigned to edited parting line. In step F14, the display 19 may change the display on the screen. Then the process returns to step F11.

In the event that there has been no open element (NO), setting of the main parting line may be ended. Element data D3 of the main parting line being set are stored in the work memory 13. Consequently, the main parting line for splitting the mold into the cavity and core has been formed.

Like the above, according to the mold design method according to the fifth embodiment of the present invention, it would be evident that, as shown in step F7, the projection plane may be defined on the perpendicular plane to the normal direction of the curved surface of the circular cylinder shape, and the straight line may be formed on this plane, and then the straight line may be projected onto the curved surface of the product. Therefore, the mold design method would be convenient when the edge cannot be designated to the curved surface or when the parting line has to be formed on the portion other than the edge.

Furthermore, if the main parting line must be raised intentionally from the plane of the product in the mold opening direction, the parting line may be designed arbitrarily by forming the parting line on the top view of the product and then projecting it onto the side view of the product.

(6) Sixth Embodiment

Figure 23:
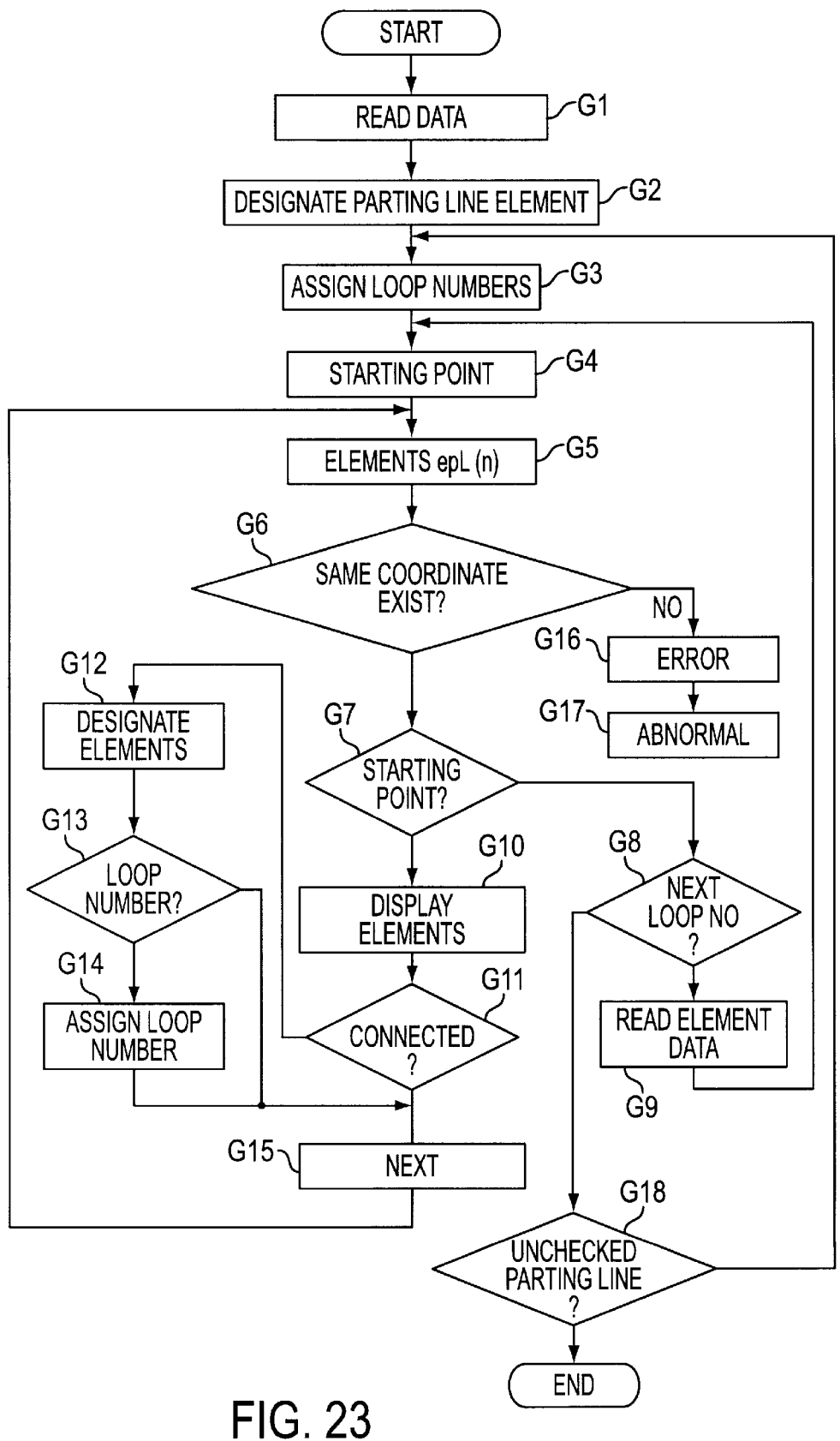
FIG. 23 is a flowchart illustrating loop check of the parting line according to a sixth embodiment of the present invention.

FIG. 23 is a flowchart illustrating check process of the parting line according to the sixth embodiment of the present invention. In this process, it may be checked automatically whether or not the main parting line is formed as the closed loop in the parting line forming section 41. If OK, it would be set as the parting line.

Figures 24A, 24B:
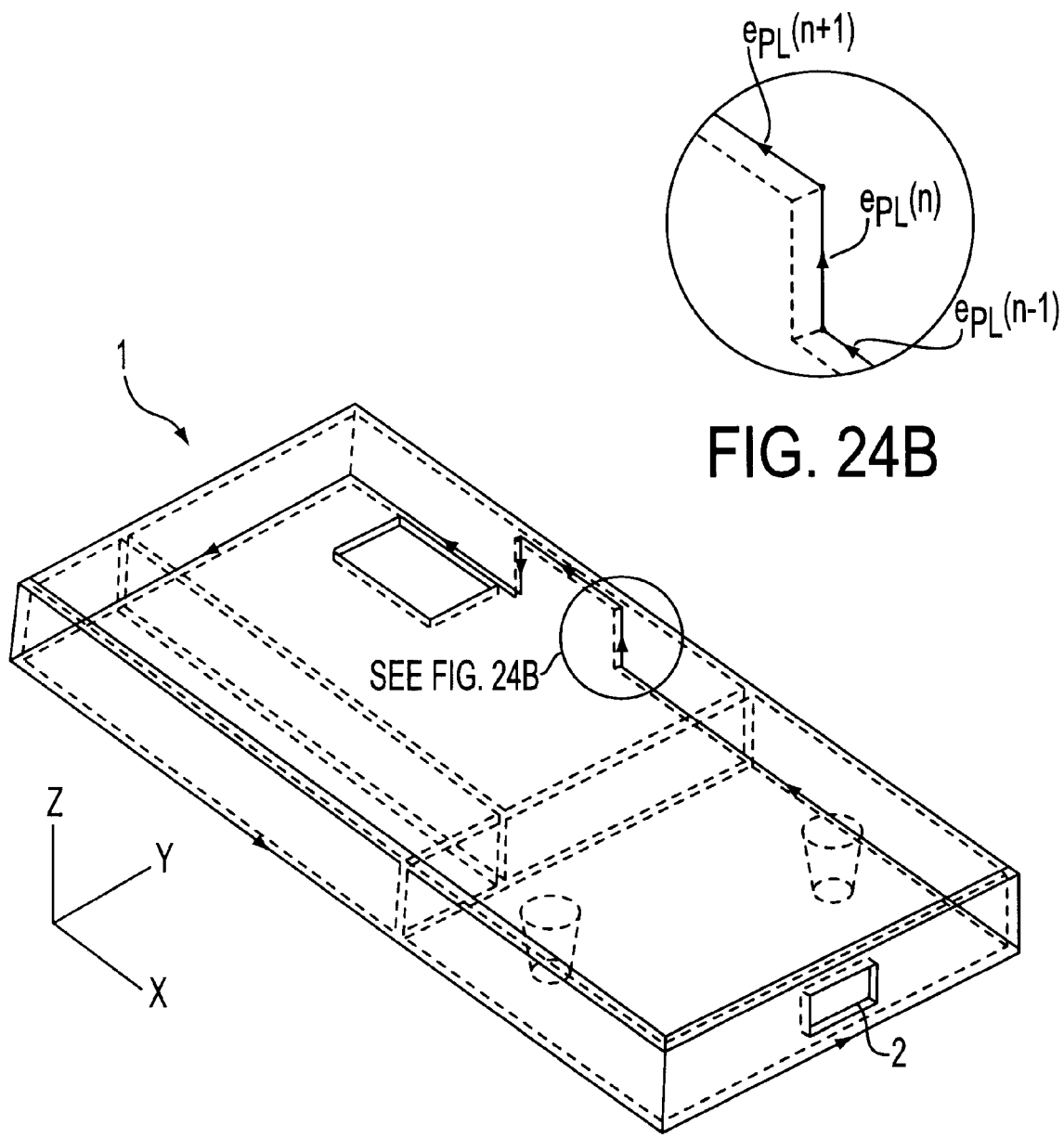
FIGS. 24A and 24B are views, is a perspective view showing line elements when checking the parting line according to the sixth embodiment of the present invention.

In FIG. 23, in step G1, element data of the parting lines may first be read from the work memory 13. In step G2, loop check of the parting lines may be commenced. The designer may designate the element of the parting lines to start loop check. As shown in FIGS. 24A and 24B, the elements of the parting lines are labelled by ePL(n).

Then, in step G3, as for the elements of the parting lines designated by the designer, the loop numbers are assigned to the parting lines, and in step G4 coordinates of a starting point knot may be calculated. The parting lines assigned by the loop number are collected into a group as an element. Coordinates of starting point of the parting lines are given by $(xn^S, yn^S, zn^S)$ and coordinates of end point of the parting lines are given by $(xn^E, yn^E, zn^E)$ In step G5, elements ePL(n) of other parting lines connected to object parting line may be retrieved. Then, in step G6, it may be decided whether or not there are elements of the parting lines having knots on the same coordinates. That is, it may be detected whether starting points of the elements ePL(n) coincide with end points of the elements ePL(n−1), or whether end points of the elements ePL(n) coincide with starting points of the elements ePL(n+1).

In case it has been determined that there are elements of the parting lines having knots on the same coordinates (YES), then the process advances to step G7. In step G7, it may be determined whether or not they are starting point knots of the parting lines. If they have been determined to be the starting point knots (YES), then in step G8 it would be decided whether the succeeding loop number exists or not. If the succeeding loop number has existed (YES), then in step G9 element data D3 of the parting lines having the succeeding loop number may be read out.

Then, returning to step G4, coordinates of the starting point knots may be calculated. While, if it has been decided that there is no parting line having knots on the same coordinates in step G6 (NO), then in step G10 elements of the parting lines being connected to other parting lines are displayed.

In step G11, it may be decided whether or not plural elements being connected to other parting lines are present. In case the number of element has been decided as a plural (YES), then in step G12 where other parting lines are checked. The designer may designate elements of the parting lines to be checked at this time. For the parting lines designated by the designer, it may be judged in step G13 whether or not loop number of the designated parting lines is existing one. If the loop number of the designated parting lines has been decided to be existing one (YES), then the process moves to step G15. Conversely, if it has been decided that the loop number of the designated parting lines is not existing one (NO), then in step G14 loop numbers are assigned to non-selected parting lines. Then in step G15, coordinate values of succeeding knots may be calculated.

Thereafter, returning to step G5, elements of the parting lines being connected to other parting lines are retrieved. In step G6, it may be decided whether or not there are elements of the parting lines having knots on the same coordinates. In case it has been determined that there is no element of the parting lines having knots on the same coordinates, i.e., that the parting line does not constitute a closed loop (NO), then the process advances to step G16. An error message is displayed on the display 19, then the process goes to step G17 where abnormal termination is effected.

In step G8, if it has been determined that there is no succeeding loop number (NO), then in step G18 it may be examined whether elements of unchecked parting lines exist or not. If there have been elements of unchecked parting lines (YES), the process returns to step G3 to repeat steps G3 to G15 etc. If there has been no unchecked parting lines (NO), the process may be terminated since all grouped parting lines have been formed respectively as closed loops. Thus check of the parting lines has been completed.

As has been stated above, in the mold design method according to the sixth embodiment of the present invention, by checking in step G6 according to the coordinate retrieval result of line elements of the parting lines whether there are elements of the parting lines having knots on the same coordinates, it may be checked automatically whether or not the parting lines may constitute the closed loop. Therefore, if the parting lines have been formed as the closed loop, it can be grasped in the initial stage of design that "the mold block 100 can be split into the cavity and the core", whereas if the parting lines have not been formed as the closed loop, it can be found in the initial stage of design that "the mold block 100 cannot be split into the cavity and the core". Overlapping of line elements of the parting lines may be checked by the check function.

According to the sixth embodiment of the present invention, it would be evident that line elements of the parting lines may be grouped by allotting loop number to the line elements of the parting lines in step G3. Hence, batch data processing may be effected when the split plane for splitting the mold block 100 into the cavity and the core is formed, or when individual identifiers (IDs) such as priority level are assigned.

(7) Seventh Embodiment

Figure 25:
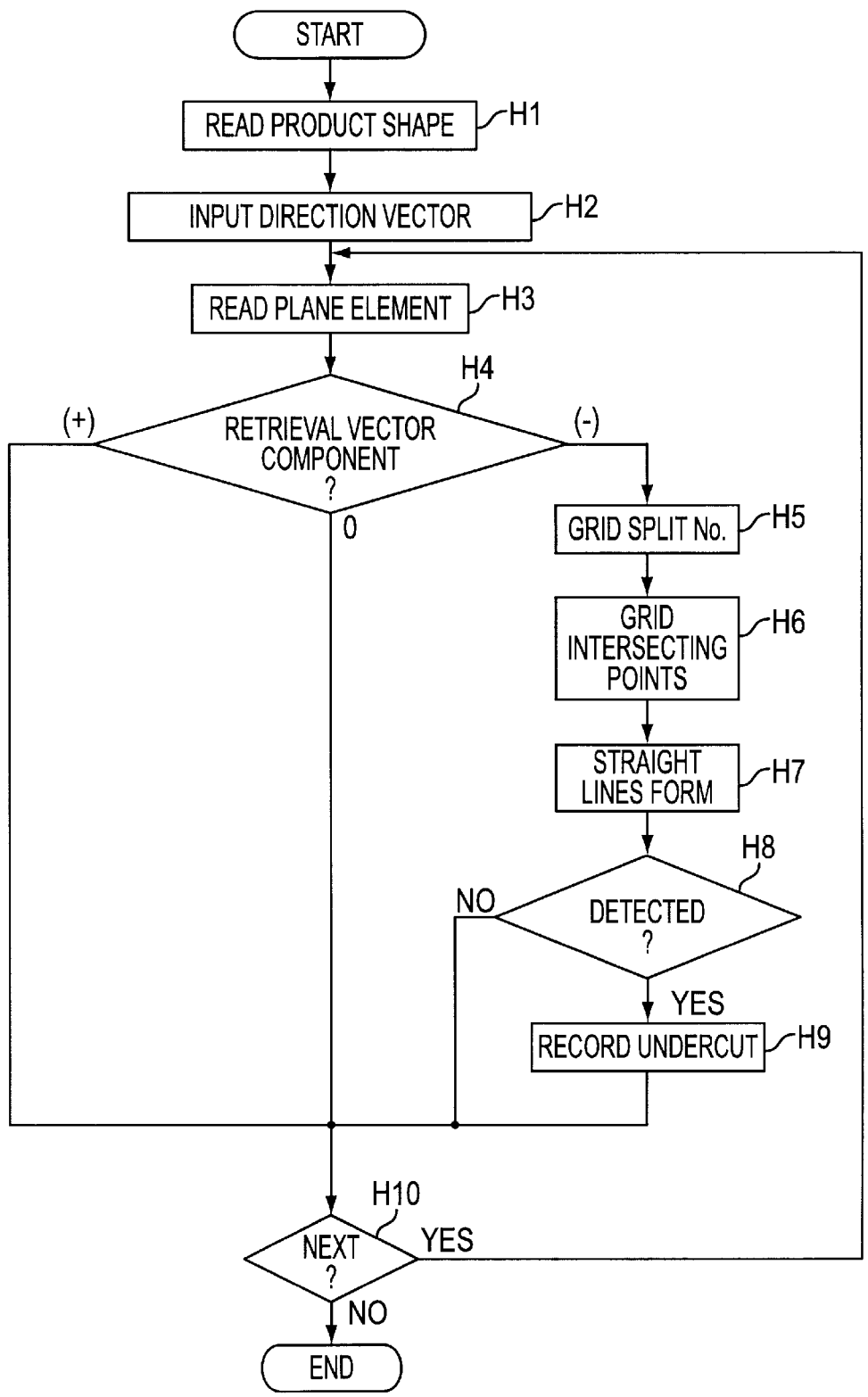
FIG. 25 is a flowchart illustrating detection of undercut according to a seventh embodiment of the present invention.

FIG. 25 is a flowchart for detecting undercut portions in the product shape according to the seventh embodiment of the present invention. In this process, the parting lines constituting the opening portion (hole) of the product 1 in the parting line forming section 41. In the mold, the undercut portion may be formed as a nest structure. In the nest structure, the moldings must be released from the mold by sliding the split portions.

In FIG. 25, in step H1, product shape data D1 to which the main parting line has been determined may first be read from the work memory 13. In step H2, the direction of retrieval vector for retrieving the undercut may be set.

Figure 26:
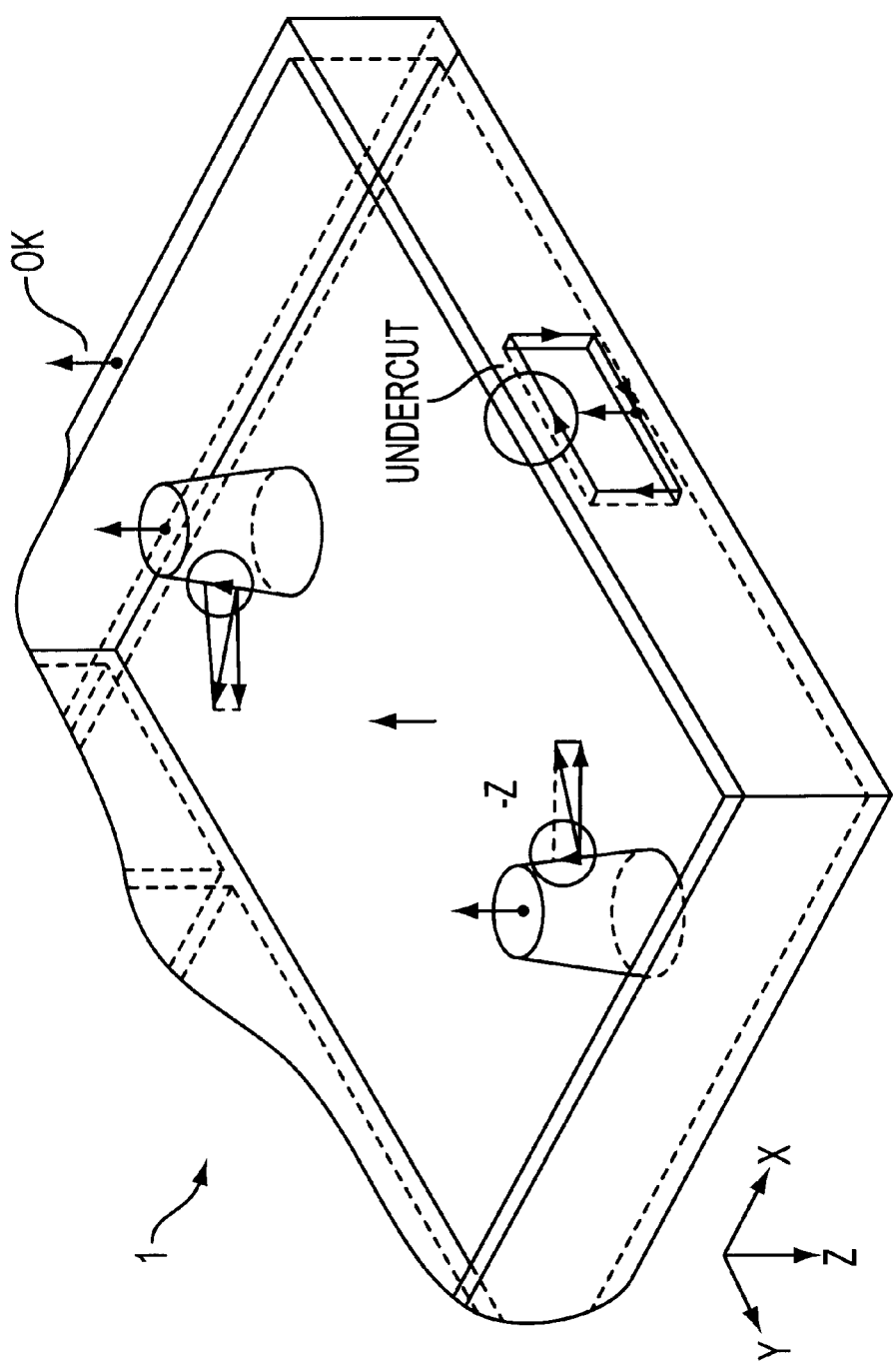
FIG. 26 is a perspective view showing an opening portion when detecting the undercut according to the seventh embodiment of the present invention.

As shown in FIG. 26, the retrieval vector is −Z component, which is opposite direction to the vector in the mold opening direction. The mold opening direction may be defined as the direction for splitting the mold block 100 into the cavity and the core (see FIG. 5). Accordingly, the plane elements having their normal vectors in the same direction as the retrieval vector become obstructive when the mold block 100 is split into the cavity and the core.

Figure 27:
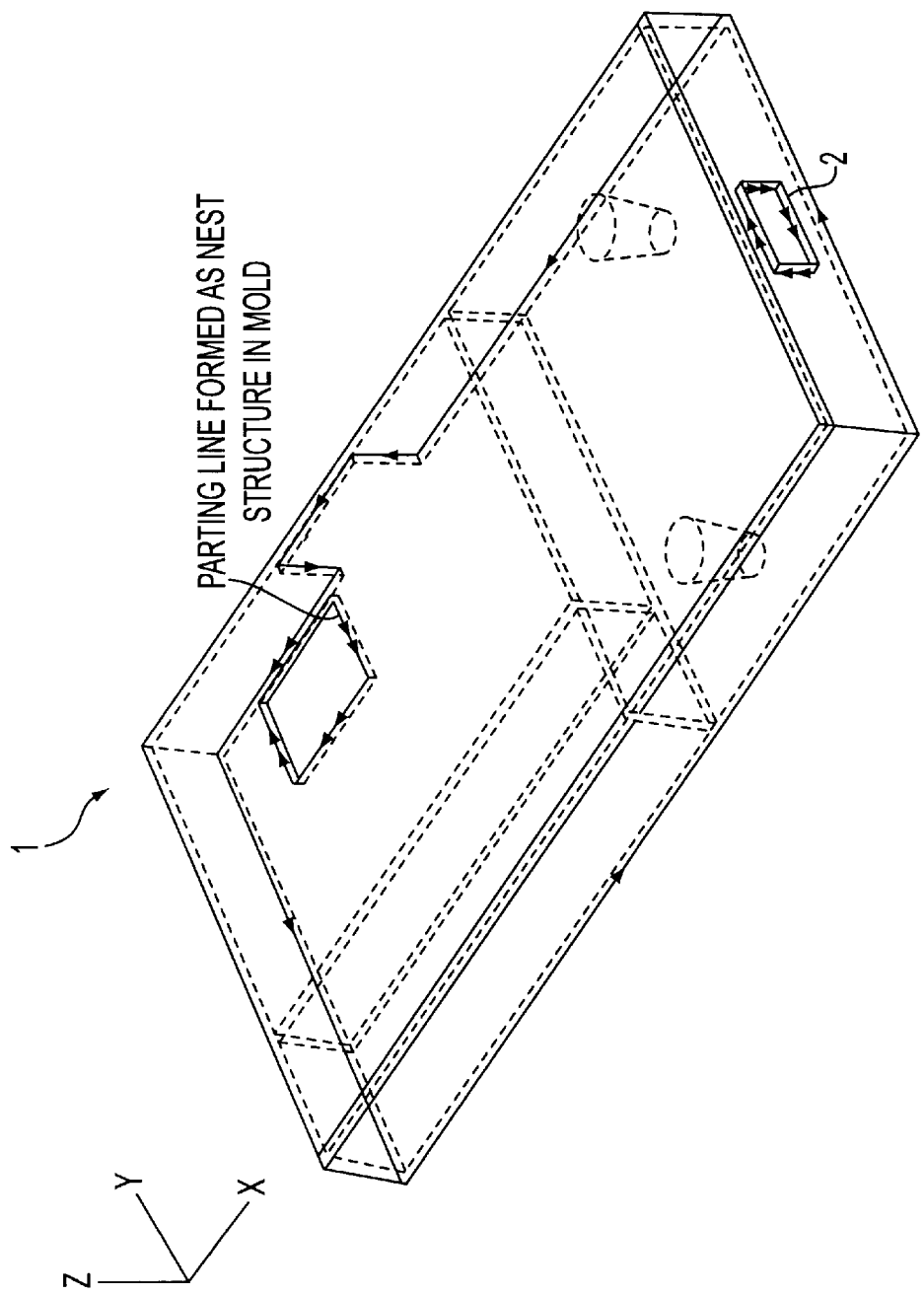
FIG. 27 is a perspective view showing detection of opening portions other than the undercut according to the seventh embodiment of the present invention.

In step H3, plane elements constituting the product shape may be read out, and in step H4, components of the normal vector on the product plane with respect to the retrieval vector may be examined. As shown in FIG. 26, if the normal vector is opposite to the direction component of the retrieval vector, i.e., positive (+) or if it is 0, the progress goes to step H10 where succeeding plane elements are retrieved since it is not obstructive to the mold opening. As shown in FIG. 27, the opening hole on the upper surface of the product 1 with the direction of its retrieval vector of 0 is not the undercut portion. In order to discriminate such opening portion from the undercut portion, the opening portion may be displayed with different color tone on the display 19.

If the normal vector is identical to the direction component of the retrieval vector, i.e., negative (−), the process advances to step H5. For instance, the designer may input the number of grid to split the plane since as shown in FIG. 26 the undercut portion being obstructive to the mold opening is present. In step H6, the CPU 18 may calculate grid intersecting points including parting lines of the plane serving as the undercut portion.

In step H7, straight lines (semi-infinite straight lines) which extend in the (−) direction of the retrieval vector using the grid intersecting points as the starting points are formed. In step H8, it may be detected whether product planes intersecting with these semi-infinite straight lines exist or not. If there have been product planes intersecting with the semi-infinite straight lines (YES), the process proceeds to step H9 where they can be registered as the undercut portions. Undercut IDs are assigned to the product shape data D1.

Unless product plane intersecting with the semi-infinite straight lines has been detected in step H8 (NO), no undercut portion can be registered. The process then goes to step H10 where it is checked whether or not plane elements to be succeedingly inspected are present. If there have been plane elements to be succeedingly inspected (YES), the process returns to step H3. Plane elements constituting the product shape may then be read out. Steps H3 to H9 may then be repeated. In step H10, if there has been no plane element to be succeedingly inspected (NO), the process may be ended. As a result, the undercut portions of the product 1 may be detected.

In this manner, in the mold design method according to the seventh embodiment of the present invention, the undercut portions being obstructive to release of the cavity 3 from the core 4 of the mold may be detected by retrieving the normal vector of the product shape in the same direction as the retrieval vector. Thus, the rising portions of the product shape, the undercut hidden behind the boss, etc. cannot be missed. By detecting the undercut, the core of the mold may be designed as the nest structure.

In addition, according to the seventh embodiment of the present invention, it would be obvious that, if the closed loop of other parting line is on the inside of the closed loop of a certain parting line, the closed loop candidate of this inner parting line then shows the hole provided in the product 1 other than the undercut portion. Therefore, the mold can be designed without escaping the rising portions of the product shape, the undercut hidden behind the boss, etc.

(8) Eighth Embodiment

Figure 28A:
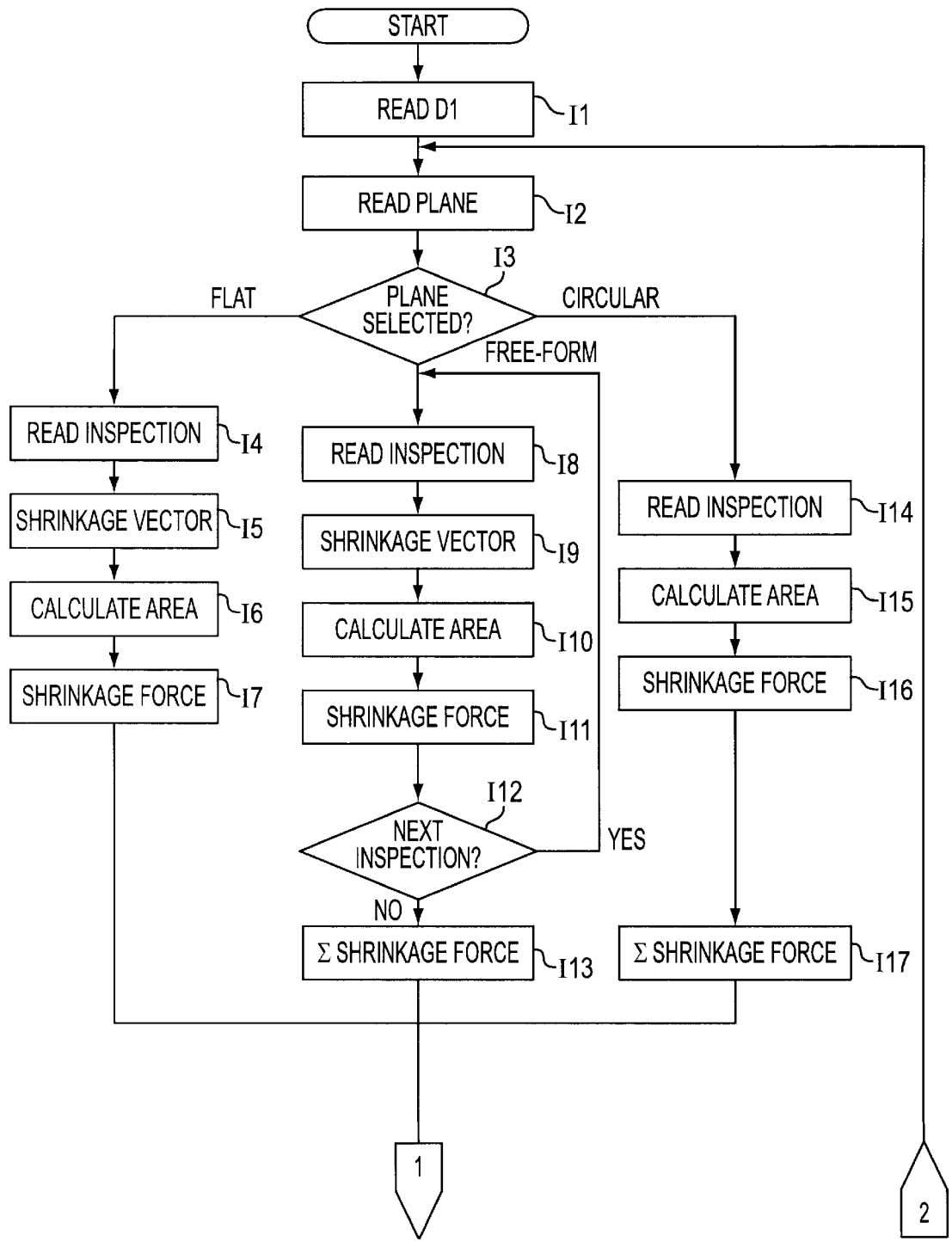
FIGS. 28A and 28B are flowcharts, when taken together, illustrating check process of releasability of the product shape according to an eighth embodiment of the present invention.
Figure 28B:
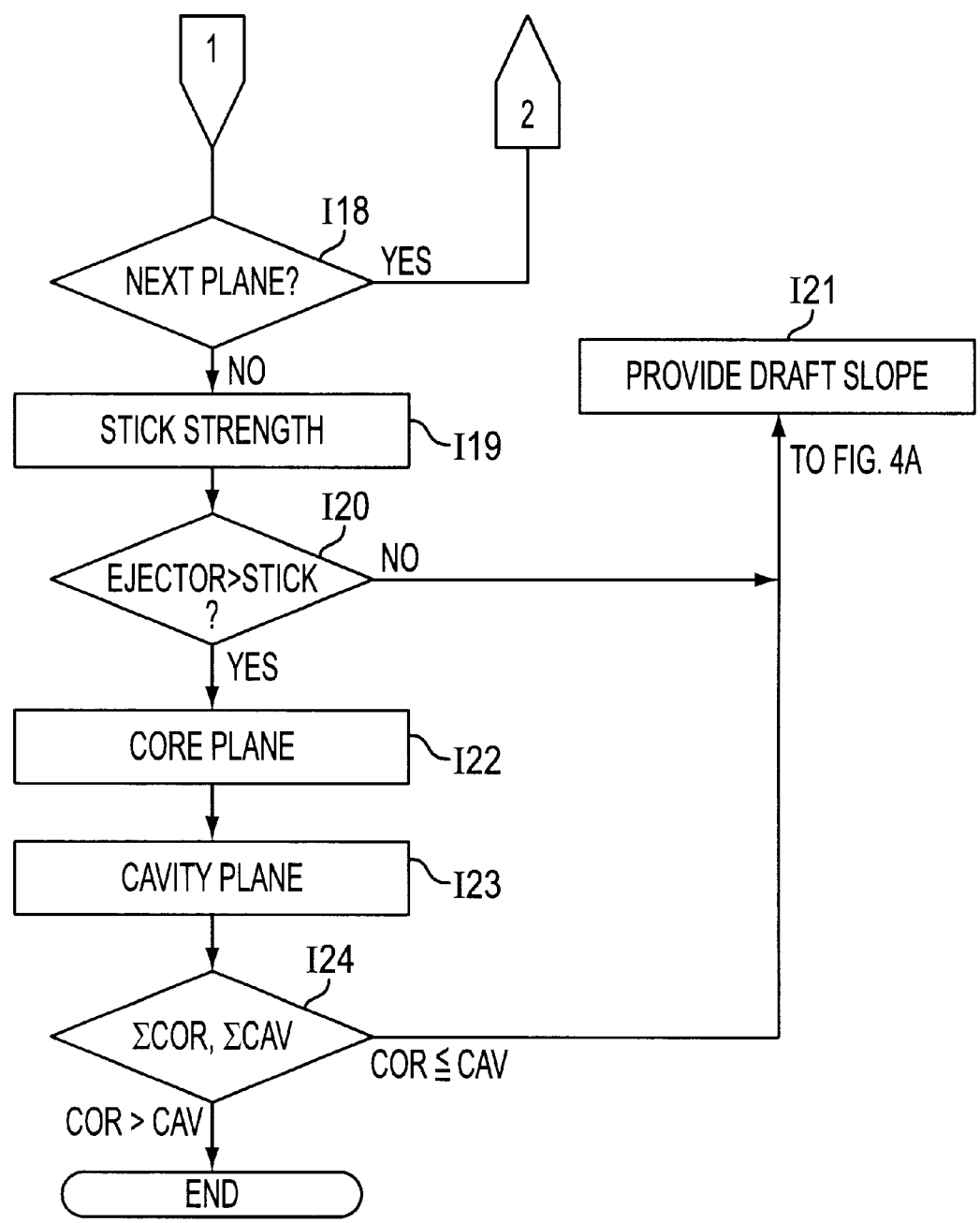

FIGS. 28A and 28B are flowcharts illustrating check process of releasability of the draft-sloped plane according to the eighth embodiment of the present invention. In this process, it may be checked in the draft-sloped plane providing section 42 whether or not the moldings can be easily released from the mold.

In FIG. 28A, in step I1 the product shape data D1 are read from the design data memory 11. In step I2 the plane elements of the product shape are read from the work memory 13. The designer may designate the plane element of the parting lines. The plane element can be selected from flat surface, free-form surface, and circular cone surface.

In step I3, the plane element derived previously in FIGS. 3C to 3E may be classified. If the plane element is the flat surface, then in step I4 where inspection points may be read.

In step I5, the shrinkage vector may be read, and then in step I6 an area may be calculated. In step I7, shrinkage force caused upon drafting the moldings may be calculated by multiplying dimension and area of the shrinkage vector together.

On the contrary, if the plane element is the free-form surface in step I3, then in step I8 the inspection point may be read, followed by reading of the shrinkage vector in step I9. Subsequently, in step I11, like the case where the plane element is the flat plane, the shrinkage force may be calculated by multiplying dimension and area of the shrinkage vector together.

In step I12, it would be checked whether or not a succeeding inspection point is present. If it has been judged that the succeeding inspection point is present (YES), then the process returns to step I8 so as to read the inspection point. If it has been judged that the succeeding inspection point is not present (NO), then the process goes to step I13 where the shrinkage forces of the product 1 are summed entirely. The process proceeds to step I18.

Furthermore, if the plane element is the circular cone surface in step I3, then in step I14 the shrinkage vector may be read, thereafter in step I15 the area may be calculated. Next, in step I16, the shrinkage force may be calculated by multiplying dimension and area of the shrinkage vector together. In step I17, whole shrinkage forces are summed and the process goes to step I18.

In step I18, it may be decided whether succeeding plane element is present or not. If the succeeding plane element has been present (YES), then the process returns to step I2 so as to repeat steps I3 to I18. Unless there has been the succeeding element in step I18 (NO), then in step I19 stick strength of the moldings to the mold may be calculated by multiplying the total shrinkage force by a certain coefficient.

After this, in step I20, ejector force of the ejector pin and stick strength of the moldings are compared with each other. In the event that ejector force of the ejector pin has been less than stick strength of the moldings (NO), the process then returns to draft slope step of the main routine in FIG. 4A.

In the event that in step I20 ejector force of the ejector-pin has been more than stick strength of the moldings (YES), the process then goes to step I22 where total shrinkage force of the core plane may be calculated. Then in step I23, total shrinkage force of the cavity plane may be calculated.

In step I24, the total shrinkage force of the core plane and the total shrinkage force of the cavity plane may be compared with each other. In case the total shrinkage force of the core plane has been larger than the total shrinkage force of the cavity plane (YES), the process may be terminated. On the contrary, in case the total shrinkage force of the core plane has been smaller than the total shrinkage force of the cavity plane (NO), the process then returns to draft slop provision step I4 in the main routine in FIG. 4A so as to form the draft slope once more.

With the above processes, it would be apparent that it may be checked whether or not the moldings can be easily released from the mold (i.e., releasability of the draft-sloped plane may be checked).

(9) Ninth Embodiment

Figure 29A:
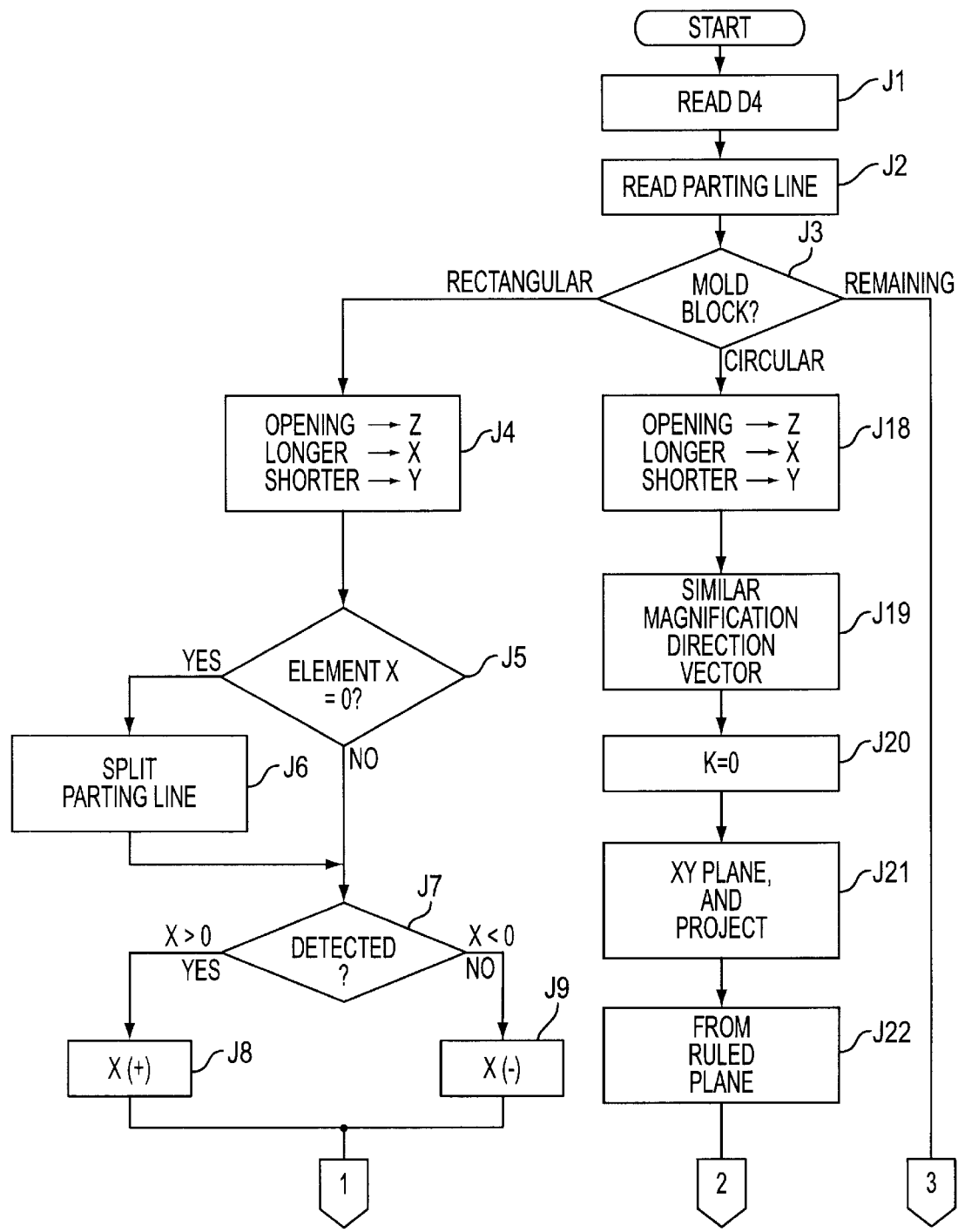
FIGS. 29A to 29C are flowcharts, when taken together, illustrating formation process of the parting plane according to a ninth embodiment of the present invention.
Figure 29B:
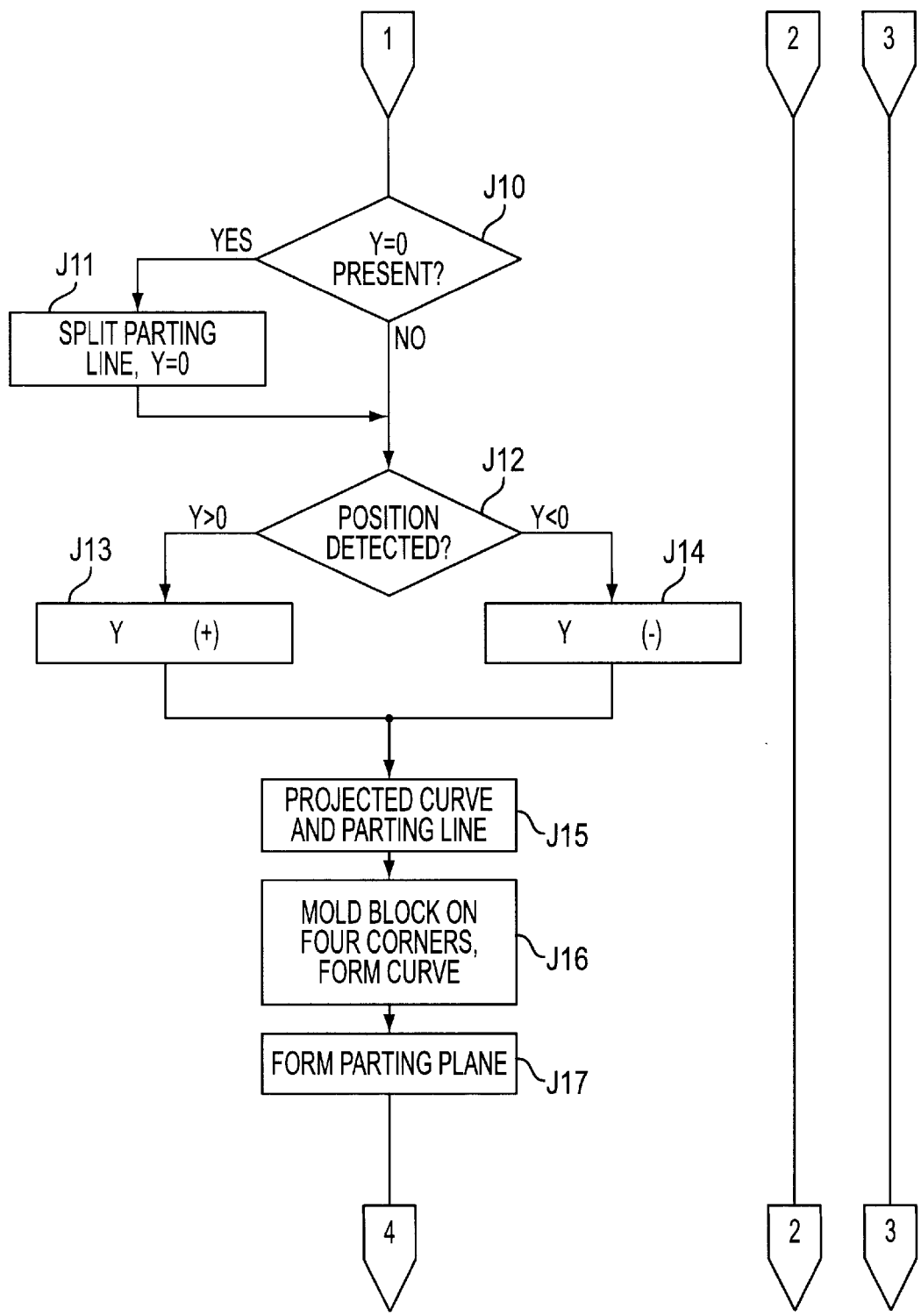
Figure 29C:
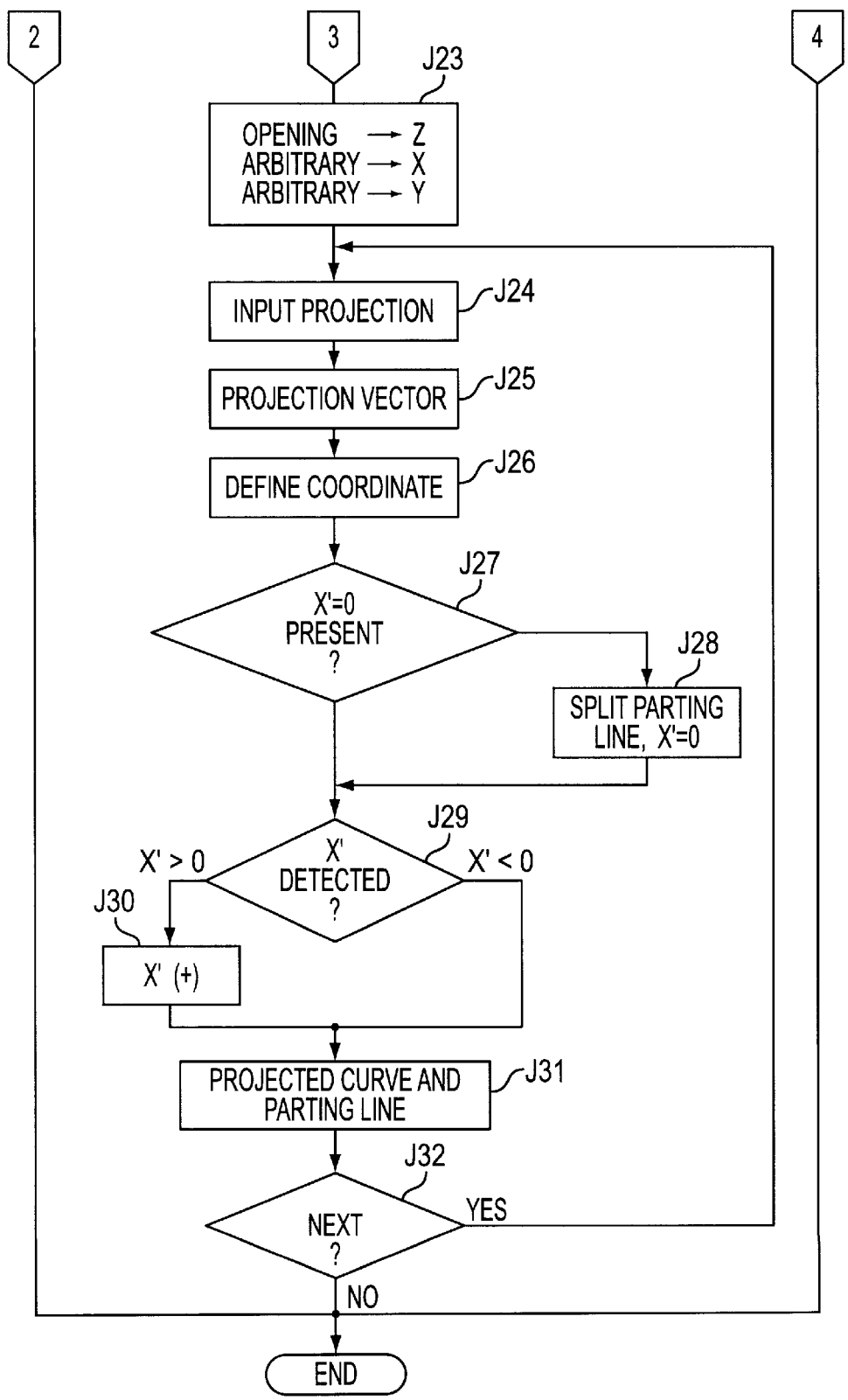

FIGS. 29A to 29C are flowcharts illustrating formation process of the parting plane according to the ninth embodiment of the present invention. In this process, in the mold splitting section 52, the mold block 100 may be formed to surround the product shape three-dimensionally and then the cavity corresponding to the product shape may be formed in the mold block 100. A parting line plane 200 may be formed based on the candidates of the parting lines, and then the mold block 100 may be split based on the parting line plane 200 to form the cavity and the core.

In FIG. 29A, in step J1, the cavity/core data D4 in which the actual product shape and the space profile to enclose the actual product shape are inverted may be read from the work memory 13. In step J2, the element data D3 of the parting lines may be read from the work memory 13.

Figure 30A:
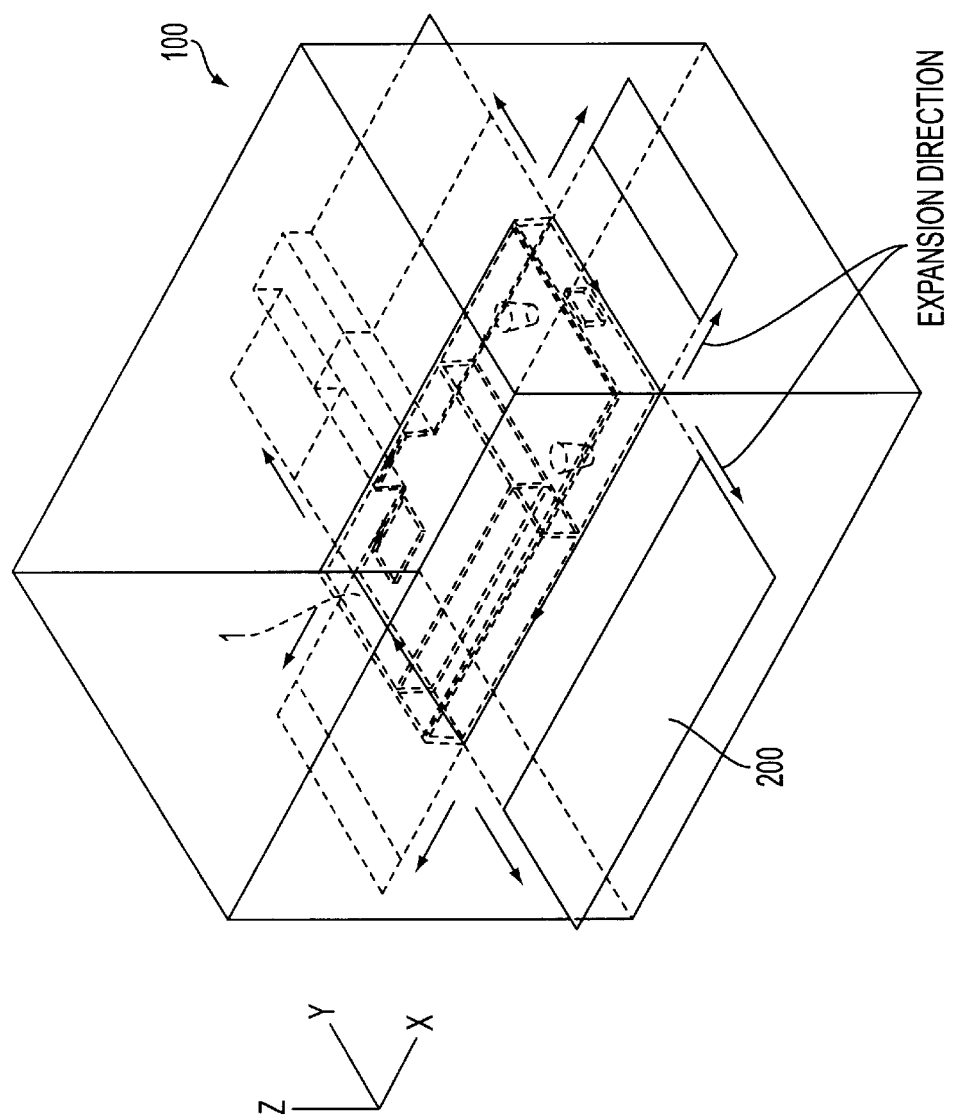
FIGS. 30A to 30C are perspective views respectively showing split of the mold into the cavity and the core according to the ninth embodiment of the present invention.

In step J3, the designer may classify the mold block 100. For purposes of example, if the mold block 100 is the rectangular parallelepiped as shown in FIG. 30A, then in step J4, according to the instruction from the designer, a coordinate system may be defined wherein a Z axis is the mold opening direction, an X axis is a longer side and a Y axis is a shorter side.

In step J5, it may be detected whether or not the parting line which intersects with the plane having the element X=0 of the mold block 100 is present. Where the plane having the element X=0 signifies the plane of the mold block 100 placed in Z·Y directions. If the parting line which intersects with the plane having the element X=0 has been detected in step J5 (YES), then in step J6 the parting line is split at an intersecting point with the plane having the element X=0, and then the process goes to step J7. Unless the parting line intersecting with the plane having the element X=0 has been detected in step J5 (NO), then in step J7 the mold split section 52 may detect position of the element ePL(n) of the parting line.

If the element X>0 of the mold block 100 has been detected in step J7 (YES), then in step J8 the parting line may be projected onto the surface of the mold block 100 in the +X direction. Conversely, if the element X<0 has been detected in step J7 (NO), then in step J9 the mold split section 52 may project the parting line onto the surface of the mold block 100 in the −X direction.

In addition, in step J10, it may be detected whether or not the parting line which intersects with the plane having the element Y=0 of the mold block 100 is present. Where the plane having the element Y=0 signifies the plane of the mold block 100 placed in the Z·X directions. If the parting line which intersects with the plane having the element Y=0 has been detected in step J10 (YES), then in step J11 the parting line is split at an intersecting point with the plane having the element Y=0, and then the process goes to step J12.

Unless the parting line intersecting with the plane having the element Y=0 has been detected in step J10 (NO), then in step J12 the mold split section 52 may detect position of the element ePL(n) of the parting line. If the element Y>0 of the mold block 100 has been detected in step J12 (YES), then in step J13 the parting line may be projected onto the surface of the mold block 100 in the +Y direction. On the contrary, if the element Y<0 has been detected in step J12 (NO), then in step J14 the mold split section 52 may project the parting line onto the surface of the mold block 100 in the −Y direction.

In step J15, a ruled plane may be formed between the curve projected onto the mold block 100 and the parting line provided on the product shape. In step J16, the curve projected onto the mold block 100 and the parting line provided on the product shape are connected to each other. As a result, four parting planes 200 have been formed in the X·Y directions.

Figure 30B:
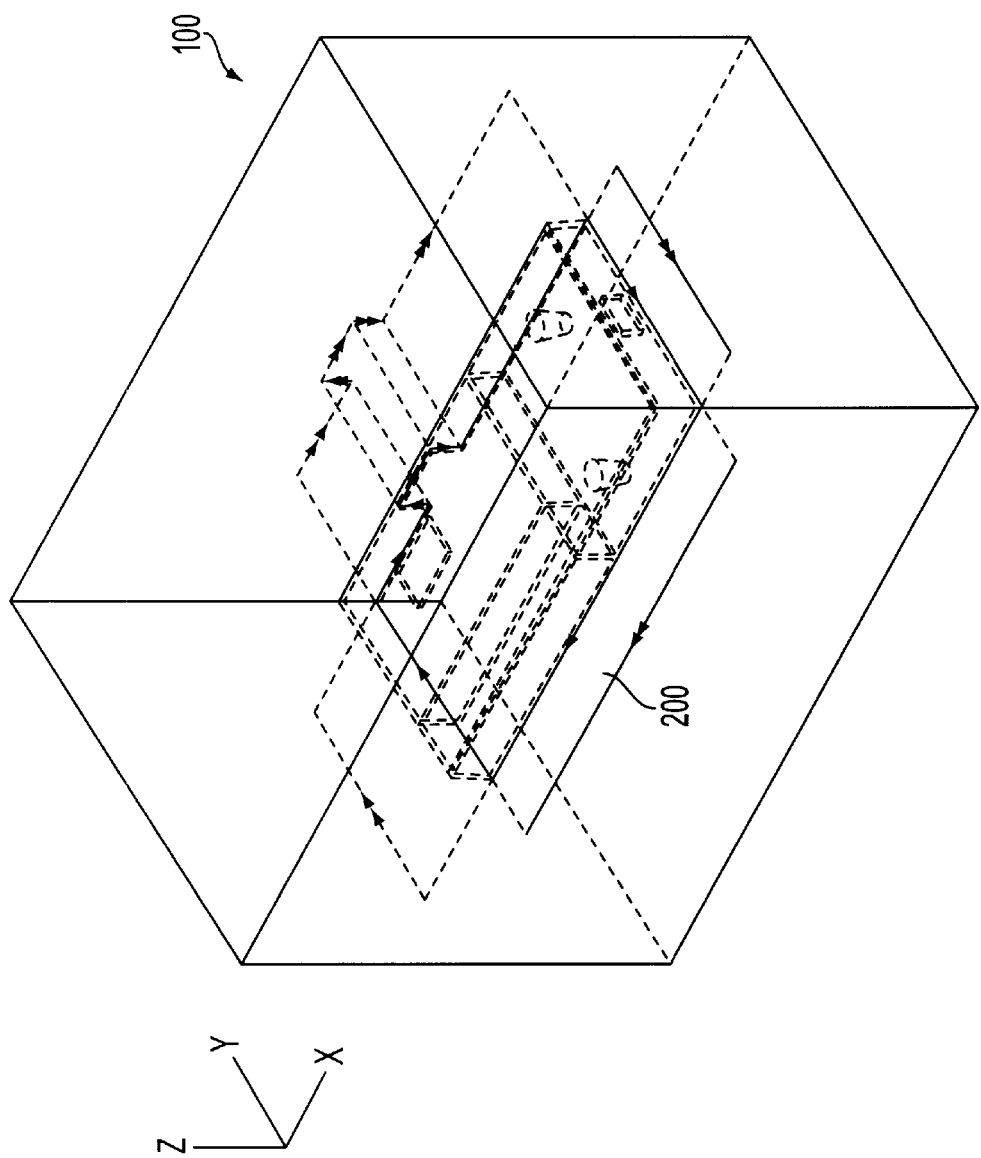
Figure 30C:
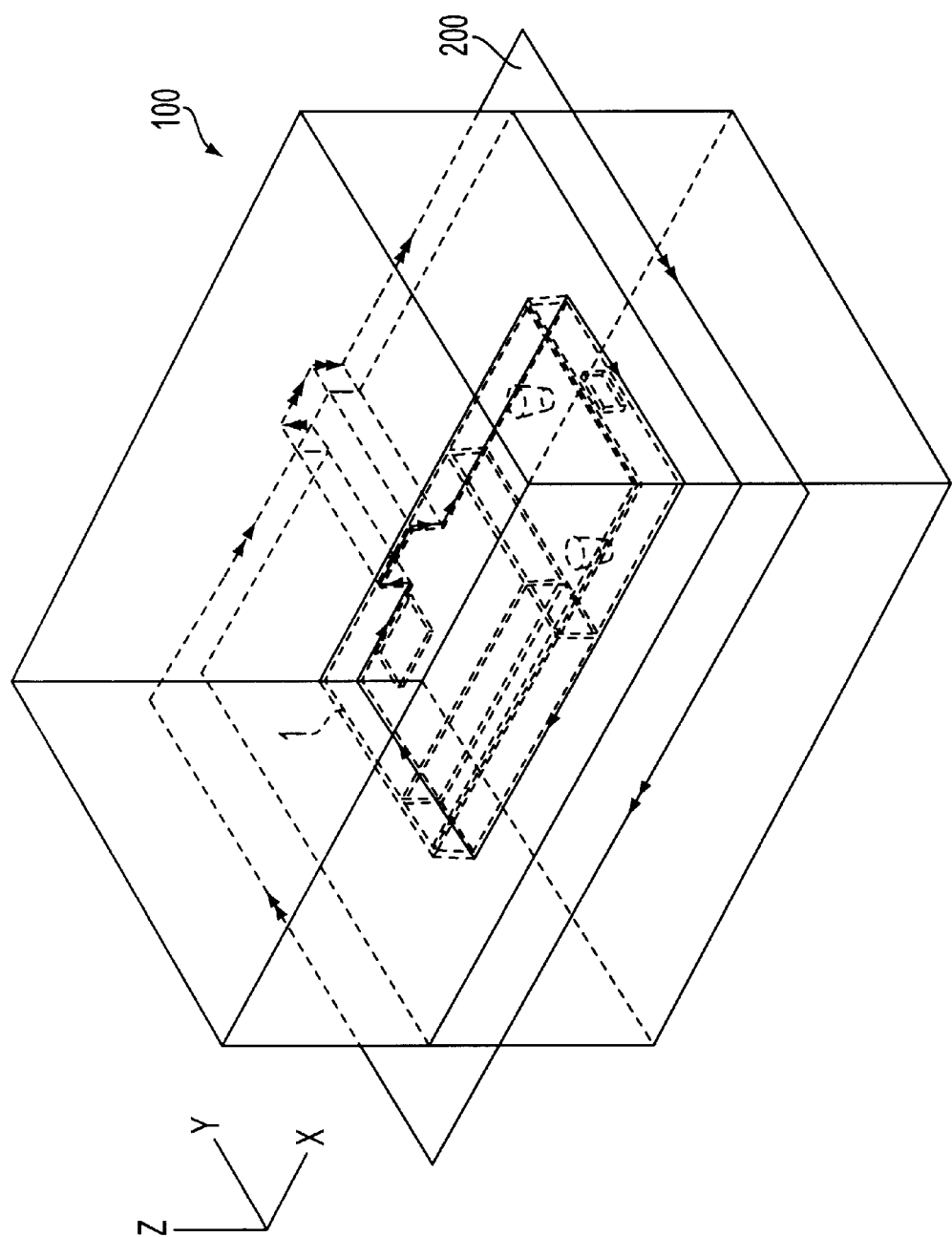

In step J17, as shown in FIG. 30B, the parting plane 200 may be depicted on the display 19. In FIG. 30B, the parting line provided on the product shape may be projected onto four side surfaces of the mold block 100. FIG. 30C illustrates offset parting line projected onto four side surfaces of the mold block 100 in an enlarged manner. In other words, coordinates of the edges of the projected parting line are extended to the corners of the mold block. Otherwise, the parting line may be formed on the edge portions of the mold block by magnifying edge portions of the product shape with a particular point on the flat surface including two parting lines as the magnification center and then projecting them onto the mold block. In this manner, the parting plane 200 for splitting the mold block into the cavity 3 and the core 4 has been formed. In FIG. 30C, a single arrow line signifies the parting line provided on the product shape, and a double arrow line signifies the parting line obtained by magnifying the curve projected onto the mold block 100.

If the designer has designated the circular cylinder as the profile of the mold block 100 in step J3, then in step J18 the coordinate system may be defined wherein the mold opening direction is set as a Z axis and X and Y axes are not particularly specified.

In step J19, a directional vector for similar magnification of the elements of the parting line may be calculated. Where the directional vector for similar magnification signifies a line segment which may lie from an origin of the parting line, being to be magnified arbitrarily, to a definition point of the parting line.

The process then advances to step J20 where a Z axis component of the foregoing directional vector for similar magnification may be set to k=0. In step J21, the elements of the parting line may be magnified in parallel to the X·Y plane, and then the parting line may be projected onto the surface of the mold block 100. Here previously modified vector may be used. In step J22, the mold split section 52 may form a ruled plane between the curve projected onto the surface of the mold block 100 and the parting line provided on the product shape 1.

While, if it has been decided in step J3 that the mold block 100 is not the rectangular parallelepiped nor the circular cylinder, then in step J23, as another case, the coordinate system may be defined wherein the mold opening direction is set as a Z axis and X and Y axes are not particularly specified. In step J24, the designer may input the plane to be projected, i.e., the objective projection plane, into the mold split section 52.

Then, in step J25, a projection directional vector may be input. In step J26, the direction of the projection directional vector may be set to the X' axis. Subsequently, in step J27, it may be detected whether the parting line which intersects with the plane having the element X'=0 of the mold block 100 is present or not.

If the parting line intersecting with the plane having the element X'=0 is present in step J27 (YES), then in step J28 the parting line may be split at the point intersecting with the plane having the element X'=0. Then, the process proceeds step J29. If there has been no parting line which intersects with the plane having the element X'=0 in step J27 (NO), then in step J29 position of the line elements of the parting line may be detected. In case X'>0 in step J29 (YES), then in step J30 the parting line may be projected onto the surface of the mold block 100 in the +X' direction. Conversely, in case X'<0 in step J29 (NO), then the process goes to step J30.

Then, in step J31, the ruled plane may be formed between the curve projected onto the mold block 100 and the parting line provided on the product shape.

In step J32, it may be detected whether or not a succeeding projection direction remains. If the succeeding projection direction has been detected in step J32 (YES), then the process returns to step J24 so as to execute steps J24 to J32 repeatedly. Instead, unless the succeeding projection direction has been detected in step J32 (NO), then the process may be ended.

With the foregoing processes, the parting plane 200 for splitting the mold block 100 into the cavity 3 and the core 4 may be formed. Cavity/core split information are stored as cavity/core data D4 into the work memory 13. The cavity may constitute the fixed side of the mold and the core may constitute the movable side of the mold. The cavity and the core can be registered as individual parts.

In this fashion, according to the mold design method of the ninth embodiment of the present invention, it would be apparent that the parting plane 200 may be formed in the mold split section 52 by extending the parting line for splitting the mold block 100 in parallel to the designated direction. Therefore, position coordinates of the parting line may be utilized as the starting point coordinates of the parting plane 200. Accordingly, since the parting plane 200 may be formed by merely designating the position coordinates of the parting line, a burden of the designer can be significantly reduced in contrast to the case where all new coordinates have to be input as the parting plane 200. Besides, man-hour for design can be extremely cut down.

According to the ninth embodiment of the present invention, it should be noted that the parting plane 200 may be formed by providing an arbitrary offset amount to the parting line for splitting the mold block 100 and then magnifying the parting line in the designated direction. Therefore, only by designating the magnified position of the parting plane 200, the designer can clearly grasp, for example, which plane may split the mold block 100 being displayed in three-dimensional fashion into the core and the cavity.

According to the ninth embodiment of the present invention, it would be evident that, since the parting plane 200 for splitting the mold block 100 into the core and the cavity may be displayed three-dimensionally in the perspective view, the convex portion of the mold block 100 serving as the core of the mold can be confirmed from the concave portion side of the mold block 100 serving as the cavity of the mold. In this manner, the parting plane 200 passing through the parting line can be formed effectively.

(10) Tenth Embodiment

Figure 31A:
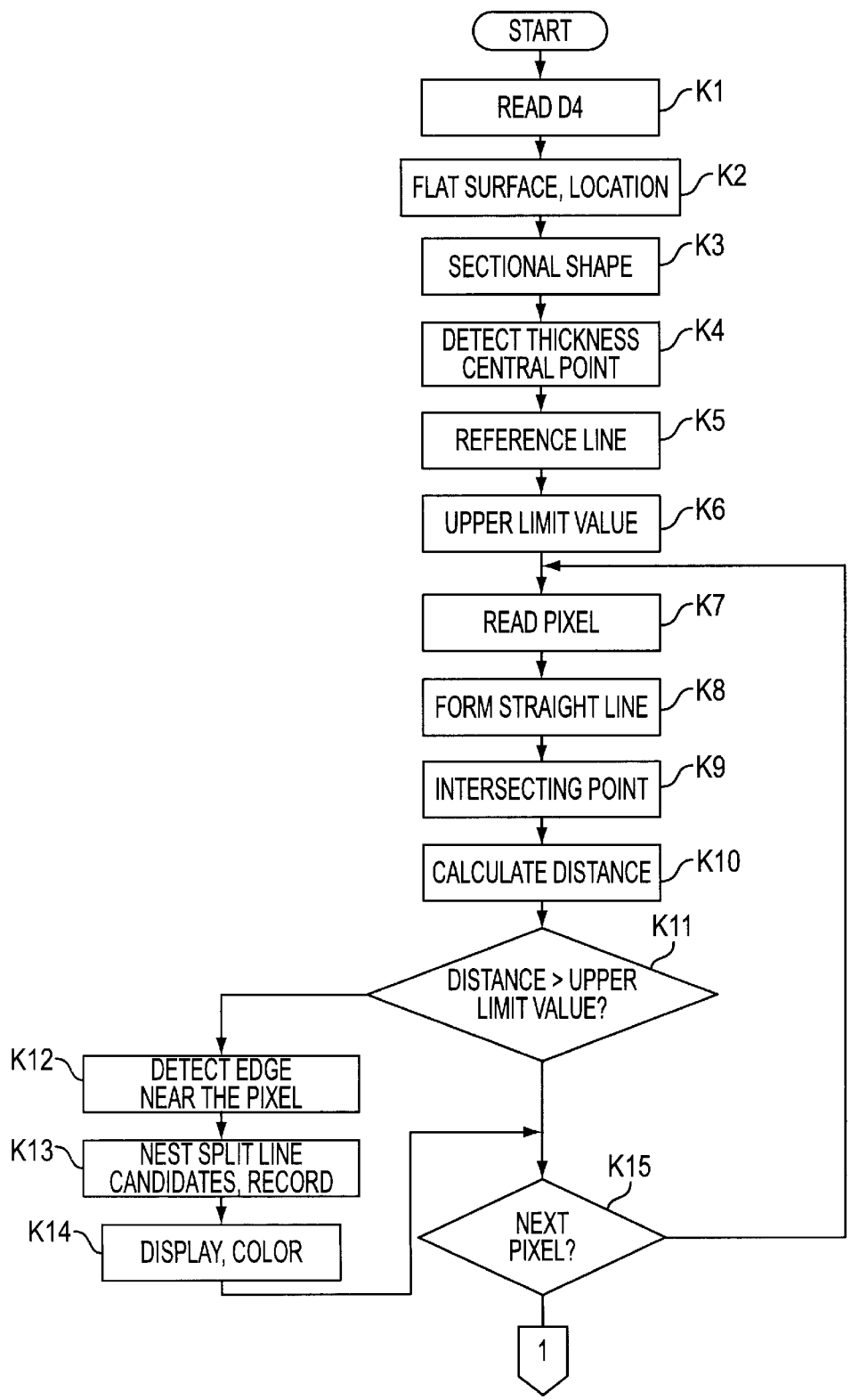
FIGS. 31A to 31C are flowcharts, when taken together, illustrating detection process of a depth of the core and split candidate location of the core according to a tenth embodiment of the present invention.
Figure 31B:
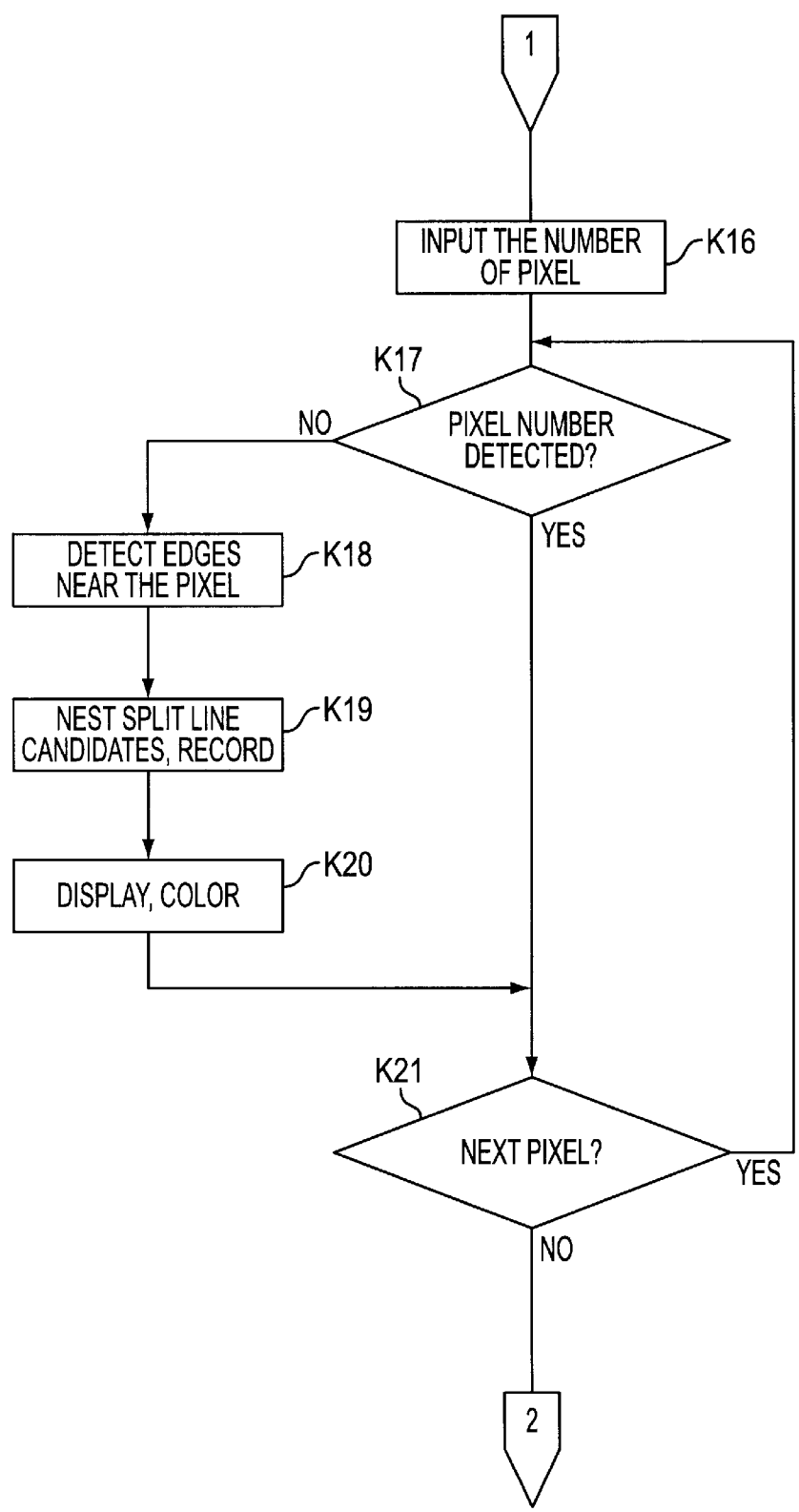
Figure 31C:
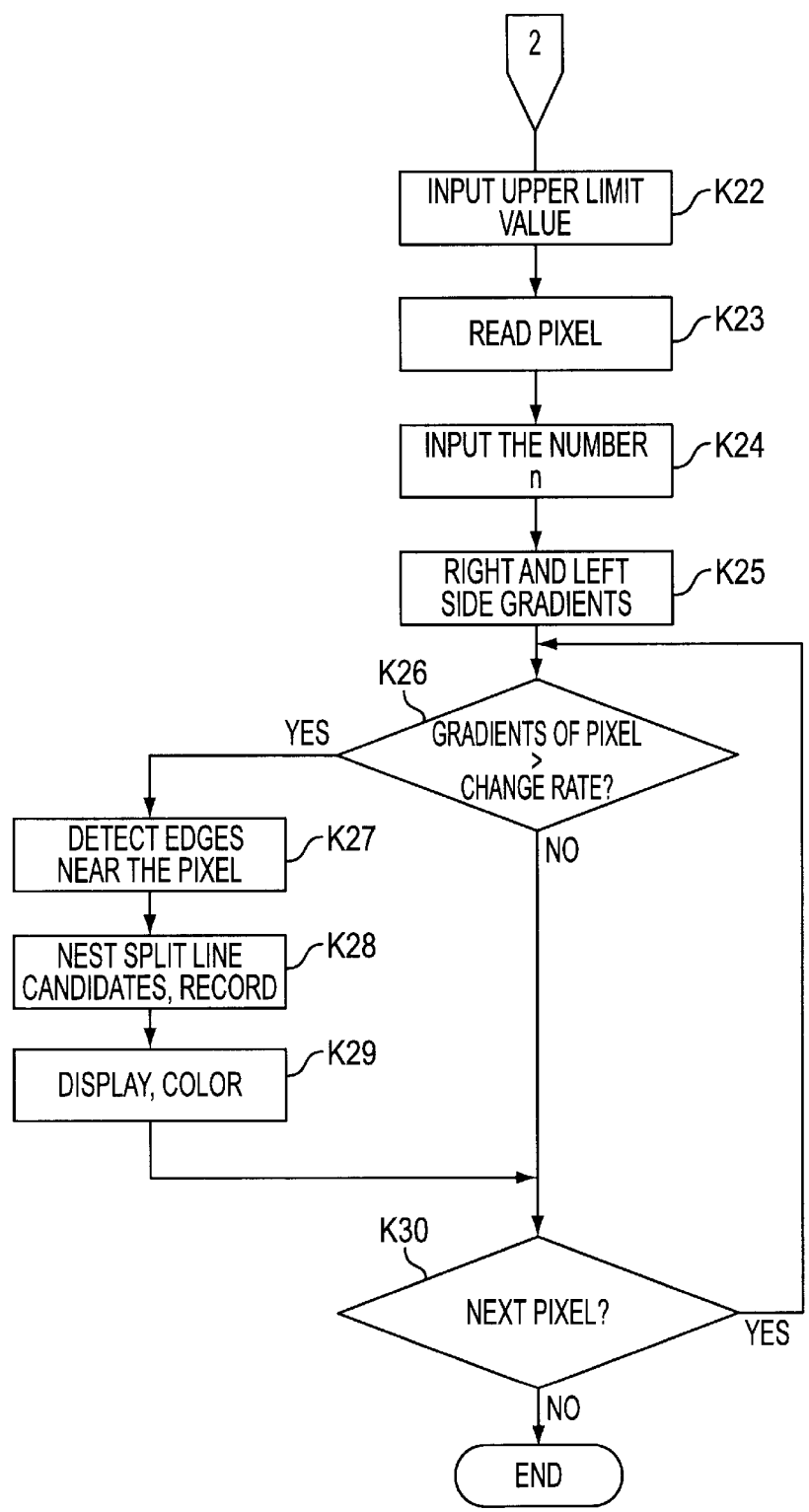

FIGS. 31A to 31C are flowcharts illustrating detection process of a depth of the mold and split candidate position according to the tenth embodiment of the present invention. In this process, in order to facilitate fabrication of the cavity 3 and the core 4, the cavity 3 and the core 4 may be formed as the nest structure depending upon the depth of the mold in the nest split section 502. In order to form the nest structure, nest split candidates must be detected based on the depth of the mold.

Figure 32:
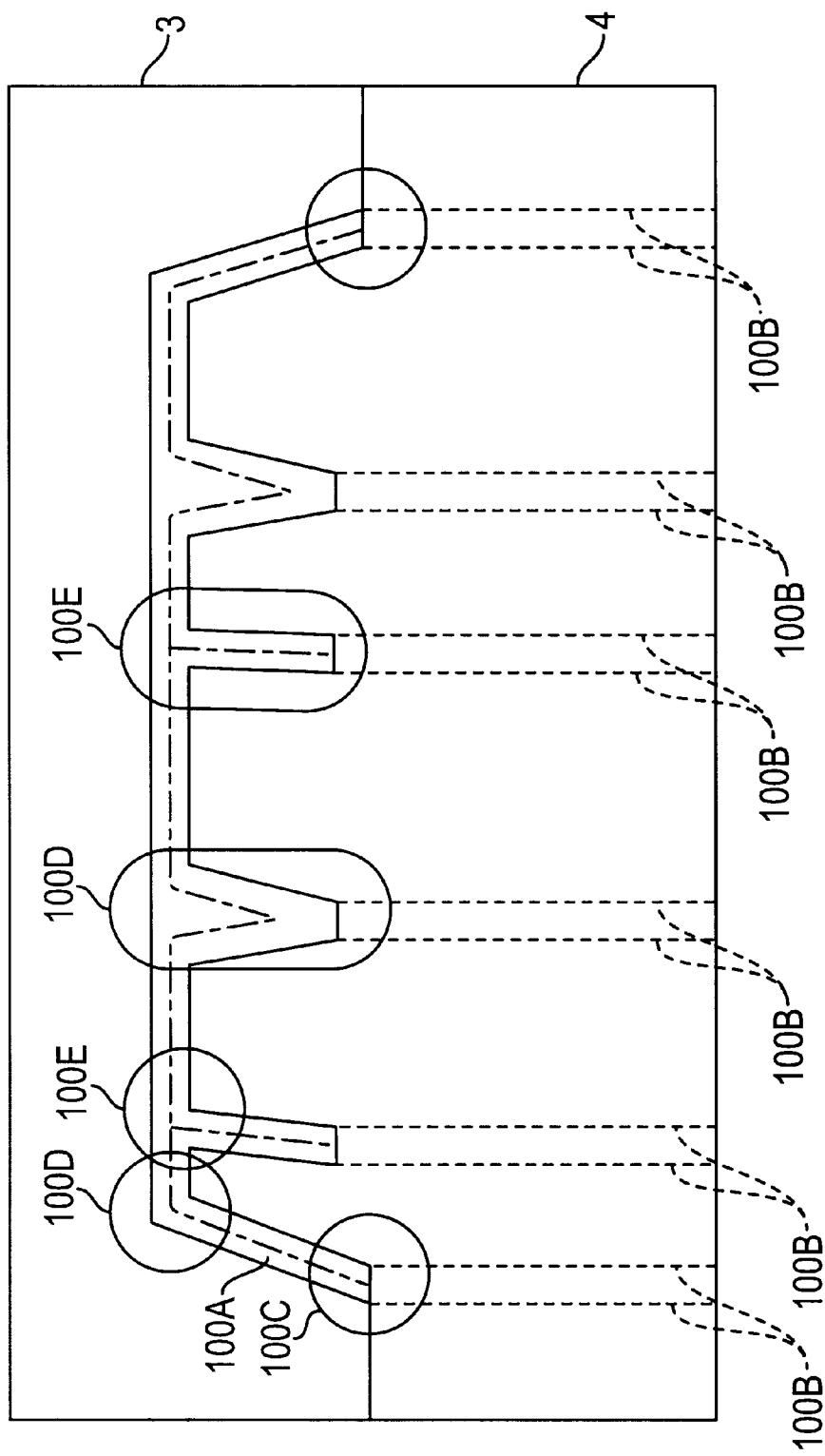
FIG. 32 is a side view showing the cavity and the core when designing split nest of the mold according to the tenth embodiment of the present invention.

In FIG. 31A, in step K1, cavity/core data D4 may first be read from the work memory 13. In step K2, the flat surface may be positioned on a location at which the depth of the mold must be inspected. In step K3, a sectional shape of the mold may be displayed on the display 19 to inspect the depth. Here, as shown in FIG. 32, a neutral plane of the mold may be displayed on the display 19. Where the neutral plane signifies a plane formed by collecting thickness central points of the moldings, and it further includes the plane separated from the wall surface at a constant distance in the concave portion, as shown by a dot-dash line in FIG. 32. In FIG. 32, a reference 100A denotes a cavity portion constituting the moldings; 100B, split line candidate portions; 100C, deepest portion of the mold; 100D, portion wherein its Z component being suddenly changed on the neutral plane (abruptly changing concave/convex portion); and 100E, portion corresponding to the rib of the moldings, etc. on which the neutral plane must be branched.

In step K4, the thickness central line may be detected by retrieving (decaying) the cavity 3 (cavity portion). The thickness central line signifies a line which may pass the center in the edge thickness direction of resin of the moldings.

In step K5, a reference line used for measuring the depth of the moldings may be defined. In step K6, an upper limit value for providing a depth detection range may be input according to the instruction issued from the designer.

In steep P7, pixels on the thickness central line may be read. Then in step K8, the straight line passing the pixels on the thickness central line and being in parallel to the mold opening direction may be formed. In step K9, an intersecting point of the previous straight line and the reference line may be calculated.

In step K10, a distance between pixels on the thickness central line and the intersecting point may be calculated. Then the distance per one pixel may be calculated in units of mm.

Then in step K11, the distance previously calculated and an upper limit value of the depth may be compared with each other. In other words, it may be determined whether or not the calculated distance is longer than the upper limit value of the depth. If the distance previously calculated has been longer than the upper limit value of the depth (YES), then the process proceeds to step K12. On the other hand, if the distance previously calculated has been less than the upper limit value of the depth (NO), then the process advances to step K15.

In step K12, edges near the pixel on the thickness central line may be detected. The edge detection may be done by the screen position function which has already been explained. Edges of the deepest portion of the mold can thus be detected. Line elements extending from these edges are decided as candidates of the nest split line.

In step K13, lines extending from the edges of the deepest portion may be registered as candidates of the nest split line. This registration may be done by assigning the nest split line candidate ID and algorithm to the cavity/core data D4. The algorithm would determine draft order of respective nest structures.

In step K14, for easy monitoring of the designer, the isometric drawing of the mold as shown in FIG. 6 may be displayed with different color tone on the display 19. In step K15, it may be checked whether or not succeeding pixels is present. If there have been succeeding pixels (YES), then the process returns to step K7 where pixels on the thickness central line may be read. Then, succeeding steps P8 to P14 would be effected repeatedly. With the above processes, candidates of the nest split line of the mold can be detected.

In step K16, the number of pixel near the depth to be detected may be input. As the number of pixel, (odd number)2 −1 may be input depending on neighboring pixels the depth of which is to be detected. For example, the number of pixel is $3^2-1=8$, $5^2-1=24$, or the like. Designation of input pixel may be input by the designer.

In step K17, adjacent pixels may be detected in the pixel matrix having the neighboring pixel number designated by the designer. If the adjacent pixels has been detected (YES), the process goes to step K21. Unless the adjacent pixels has been detected (NO), then in step K18 edges near the pixel may be detected. Such edge detection may be effected by screen position function. In step K19, the edges may be registered as candidates of the nest split line. Upon registering the edges, nest split line candidate ID and algorithm are assigned to the cavity/core data D4. The algorithm may determine draft order of respective nest structures.

In step K20, for easy monitoring of the designer, the isometric drawing of the mold may be displayed with different color tone on the display 19. In step K21, it may be checked whether or not succeeding pixel is present. If the succeeding pixel has been present (YES), then the process returns to step K17 where pixels on the thickness central line may be read out. Thereafter, succeeding steps K18 to K20 would be repeated. Thus circumstances around the adjacent pixels can be found at the candidate positions for splitting the mold in the depth direction.

In step K22, an upper limit value (absolute value) of gradient rate (rate of change) of the depth may be input. In step K23, pixels at candidate locations for splitting the depth may be read. In step K24, the number n of pixel may be input to approximately calculate the gradient of the depth. Then in step K25, right and left side gradients as for the pixel being read out from the work memory 13 may be calculated.

In step K26, difference between the right and left side gradients may be compared with the upper limit value of change rate of the gradient. If the difference between the right and left side gradients has been greater than the upper limit value of rate of change of the gradient (YES), then in step K27 edges near the pixel may be detected. The edge detection may be executed by screen position function. In step K28, the edges may be registered as candidates of the nest split line. Upon registering the edges, nest split line candidate ID and algorithm are assigned to the cavity/core data D4. The algorithm may determine draft order of the nest structures.

In step K29, for clear monitoring of the designer, the isometric drawing of the mold may be displayed with different color tone on the display 19. Then the process goes to step K30. On the contrary, if the difference between the right and left side gradients has been less than the upper limit value of change rate of the gradient in step K26 (NO), then in step K30 it may be checked whether or not succeeding pixel is present. If the succeeding pixel has been present (YES), then the process returns to step K26 where the difference between the right and left side gradients of the pixel and the upper limit value of change rate of the gradient may be compared with each other. Steps K27 to K29 may be performed one more time. While, if there has been no succeeding pixel in step K30 (NO), then the process would be terminated. With the above processes, the nest split candidates for forming the nest corresponding to the depth of the mold may be detected.

As described above, according to the mold design method according to the tenth embodiment, it should be noted that, by extending the edge point near the deepest position from the split plane of the mold block 100 in the split direction of the mold block 100, candidates of the split borderline for splitting the core of the mold block 100 into the nest parts may be extracted.

Therefore, even if the sectional shape of the product 1 viewed from the direction being parallel to the split direction of the mold block 100 is complicate like a comb shape, the optional item can be offered to the designer which enable the nest profile to be most readily formed as the mold parts. As a result, even if the mold cavity should be formed as a deep pocket shape which would be of course difficult to be formed, the core 4 may be split into the most suitable nest profile.

(11) Eleventh Embodiment

Figure 33:
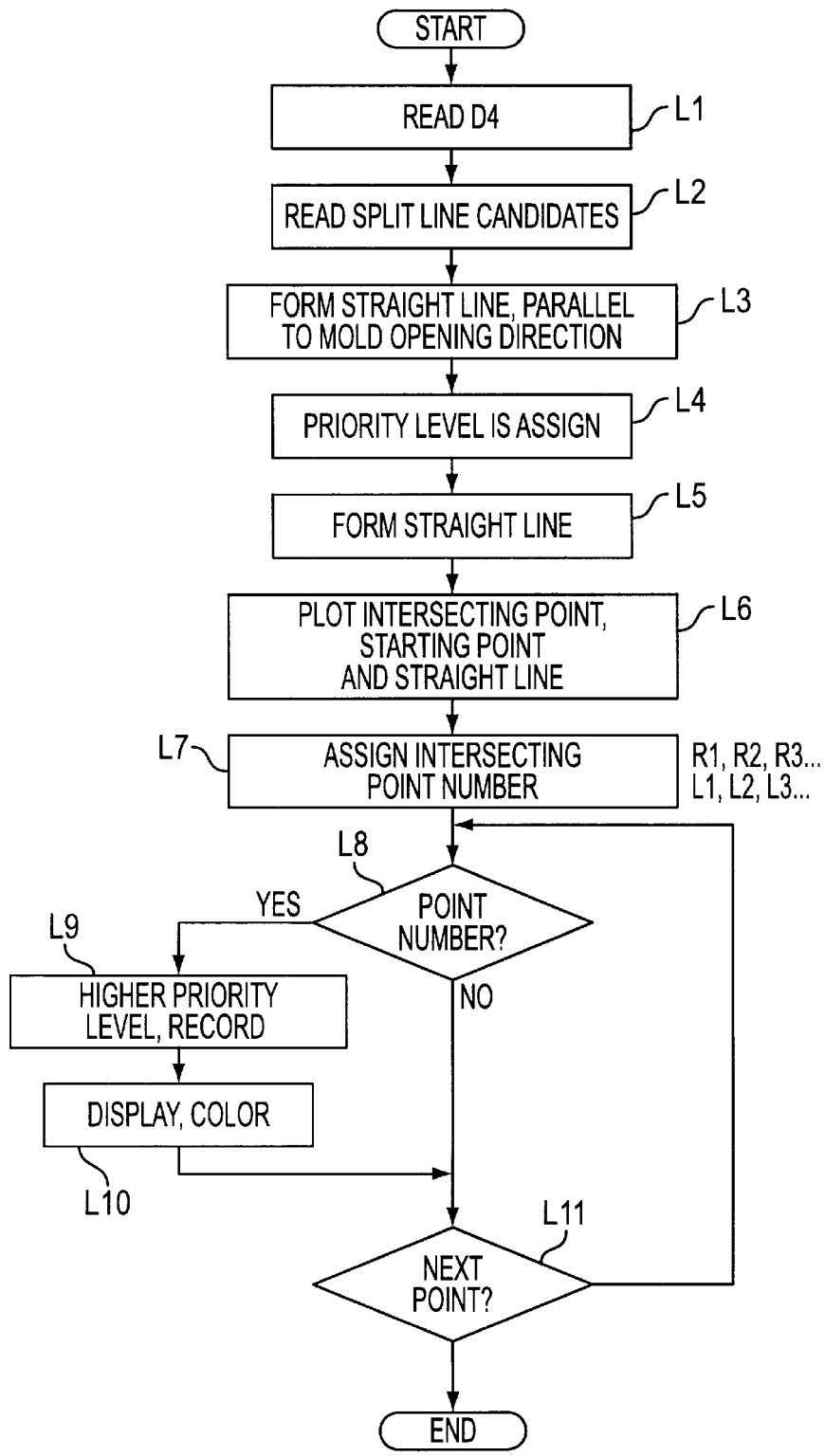
FIG. 33 is a flowchart illustrating assignment of priority level to split line candidates of the core according to an eleventh embodiment of the present invention.

FIG. 33 is a flowchart illustrating assignment process of priority levels to nest split line candidates according to the eleventh embodiment of the present invention. In this process, the priority levels may be assigned to the parting lines for splitting the cavity 3 and the core 4 in the nest split section 502.

Referring to FIG. 33, in step L1, the cavity/core data D4 in which the nest split line candidates has been detected may be read from the work memory 13. As shown in FIG. 33, the neutral plane may be displayed on the display 19.

In step L2, with respect to both the portions to which large surface unevenness of the mold has to be required and the portions in which the cavity portion of the mold has to be formed as a deadend portion, the split line candidates may be read. The split line candidates may be recognized by IDs of the cavity/core data D4 read out from the work memory 13.

In step L3, the split candidate lines may be displayed on the neutral plane on the display 19 according to the split line candidates derived from IDs of the cavity/core data D4. The split candidate lines are illustrated by the broken line, as shown in FIG. 34. Then lines being in parallel to the mold opening direction (Z) and passing the split candidate lines are drawn. The parallel lines are illustrated by the solid lines, as shown in FIG. 34.

After this, in step L4. the designer may instruct the starting points to assign priority levels. Then in step L5, lines being perpendicular to the mold opening direction and passing the starting points are drawn. In step L6, such points may be formed that pass the above lines being perpendicular to the mold opening direction and passing the starting points, and pass the split candidate lines (shown by dots in the sectional view), and also intersect with the parallel lines in the mold opening direction.

In step L7, intersecting point numbers may be assigned in sequence from the starting point side in respective right and left directions. In other words, R1=①, R2=②, R3=③. . . are labeled in sequence to the right side, and L1=①, L2=②, L3=③. . . are labeled in sequence to the left side.

In step L8, it may be determined whether or not the intersecting point numbers are either odd number or even number. If the intersecting point numbers have been even number (YES), then in step L9 where the candidate lines may be registered as the candidate with higher priority level. IDs may be assigned split line candidates of the cavity/core data D4.

In the next, in step L10, with changing color of the portions to be selected as the split line candidates, the display may be switched from the neutral plane of the mold to the isometric drawing on the display 19. The process then proceeds to step L11. Alternatively, if the intersecting point numbers have been even number in step L8 (YES), then in step L11 it may be checked whether or not succeeding intersecting point is present. If there is the succeeding intersecting point in step L11 (YES), the process returns to step L8 where it may be determined whether the intersecting point numbers are either odd number or even number. Then following steps L9 and L10 would be repeated.

If there is no succeeding intersecting point in step L11 (YES), then the process may be ended. With the above, priority levels may be assigned to the parting lines for splitting the cavity 3 and core 4.

In this manner, in the mold design method according to the eleventh embodiment, according to rules caused by the restriction on process for the mold parts, priority levels have been assigned to the candidates of the split borderlines for the nest parts in step L9. Therefore, the designer may design the nest profile to be most readily formed as the mold parts by selecting the candidates of the split borderlines of the nest parts in compliance with the priority levels even if the sectional shape of the mold cavity is complicate like the comb shape. As a result, the designer having no experience can design easily the nest structure.

(12) Twelfth Embodiment

Figure 35A:
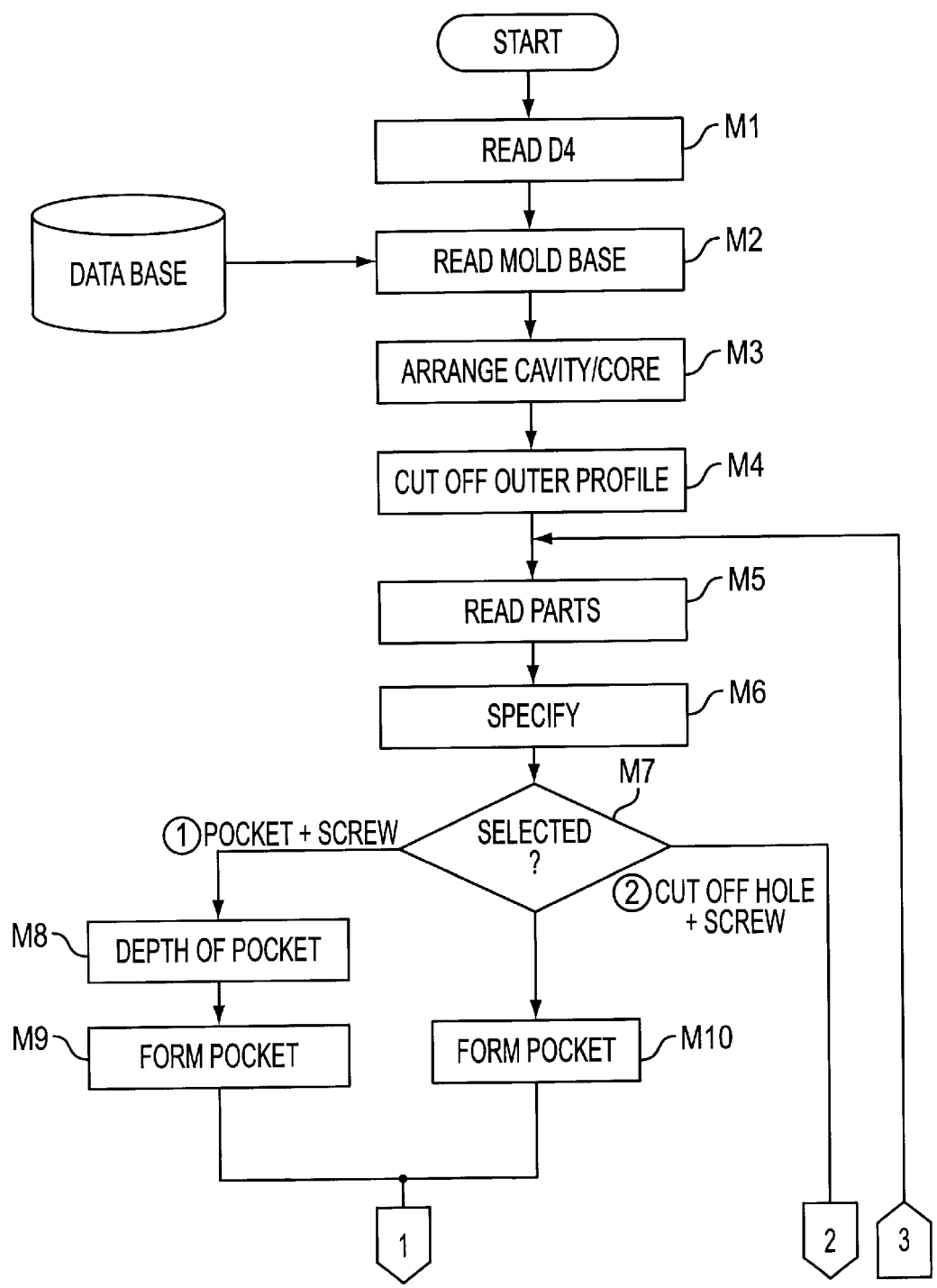
FIGS. 35A and 35B are flowcharts, when taken together, illustrating arrangement of mold base according to a twelfth embodiment of the present invention.
Figure 35B:
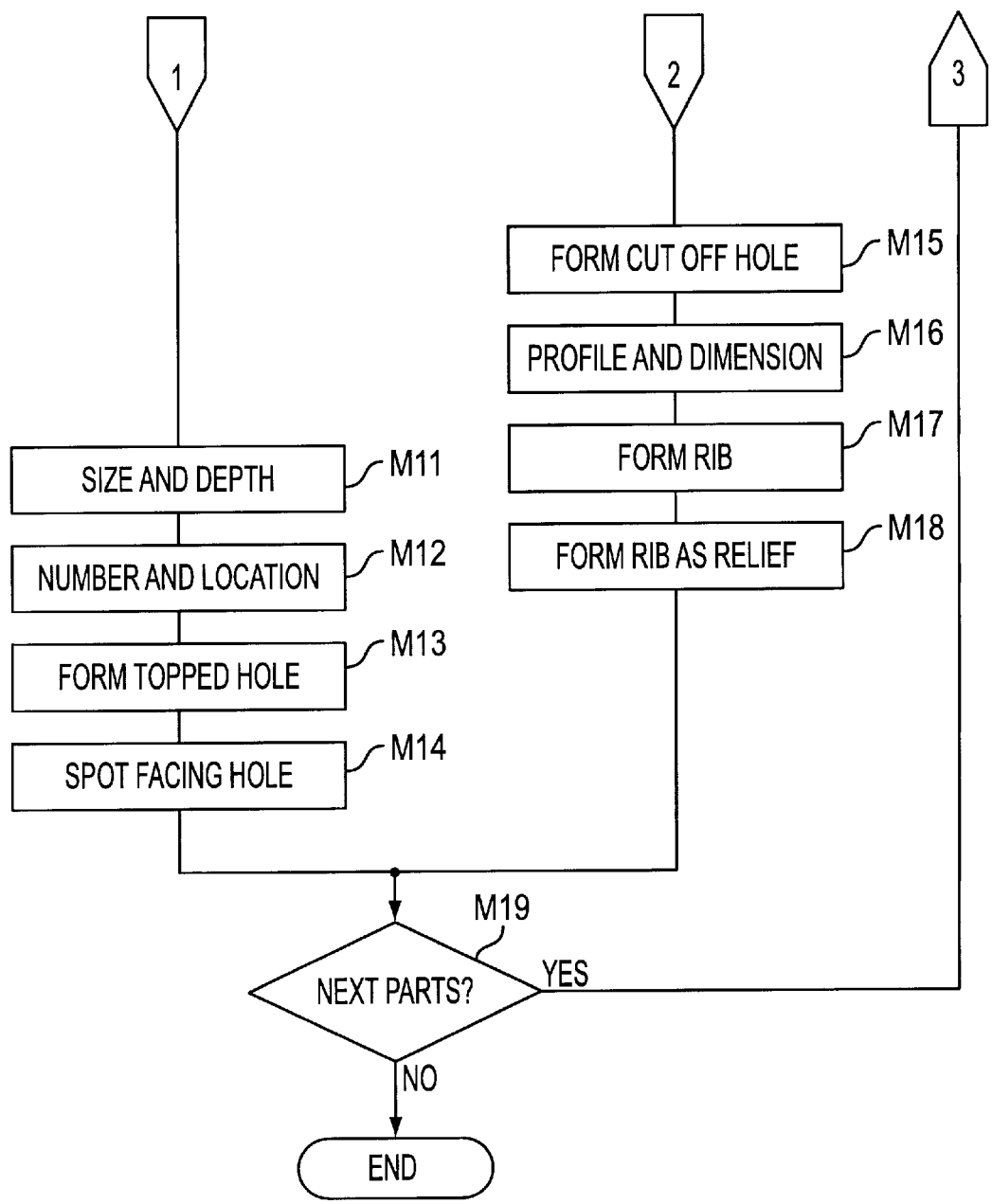

FIGS. 35A and 35B are flowcharts illustrating arrangement process of the mold base according to the twelfth embodiment of the present invention. In this process, the mold base may be arranged for fixing the mold, and the mold may be fixed by the plates in the mold base arranging section 61.

Referring to FIG. 35A, in step M1, the cavity/core data D4 may first be read out from the work memory 13. In step M2, the mold base having a suitable size in which the cavity and the core can be housed may be read out. The mold base constitutes the plate for fixing the mold. In the twelfth embodiment of the present invention, as for the method for fixing the cavity and the core to the plate, clamping screw or rib, fixing position, nominal designation of thread or rib dimension etc. may be patternized. Mold base data D2 obtained by patternizing the fixing parts have been stored in the base file 12.

In step M3, the mold base arranging section 61 may arrange the cavity and the core in the mold base. In step M4, the profile (mold block) of the cavity and the core may cut off from the plate of the mold base. In the mold split section 52, cutting-off of the profiles of the cavity and the core may be effected by the solid/hollow inversion function in terms of Boolean operation.

In step M5, parts of the cavity and the core may be read out. In step M6, the designer may specify the parts serving as the base.

Figure 36:
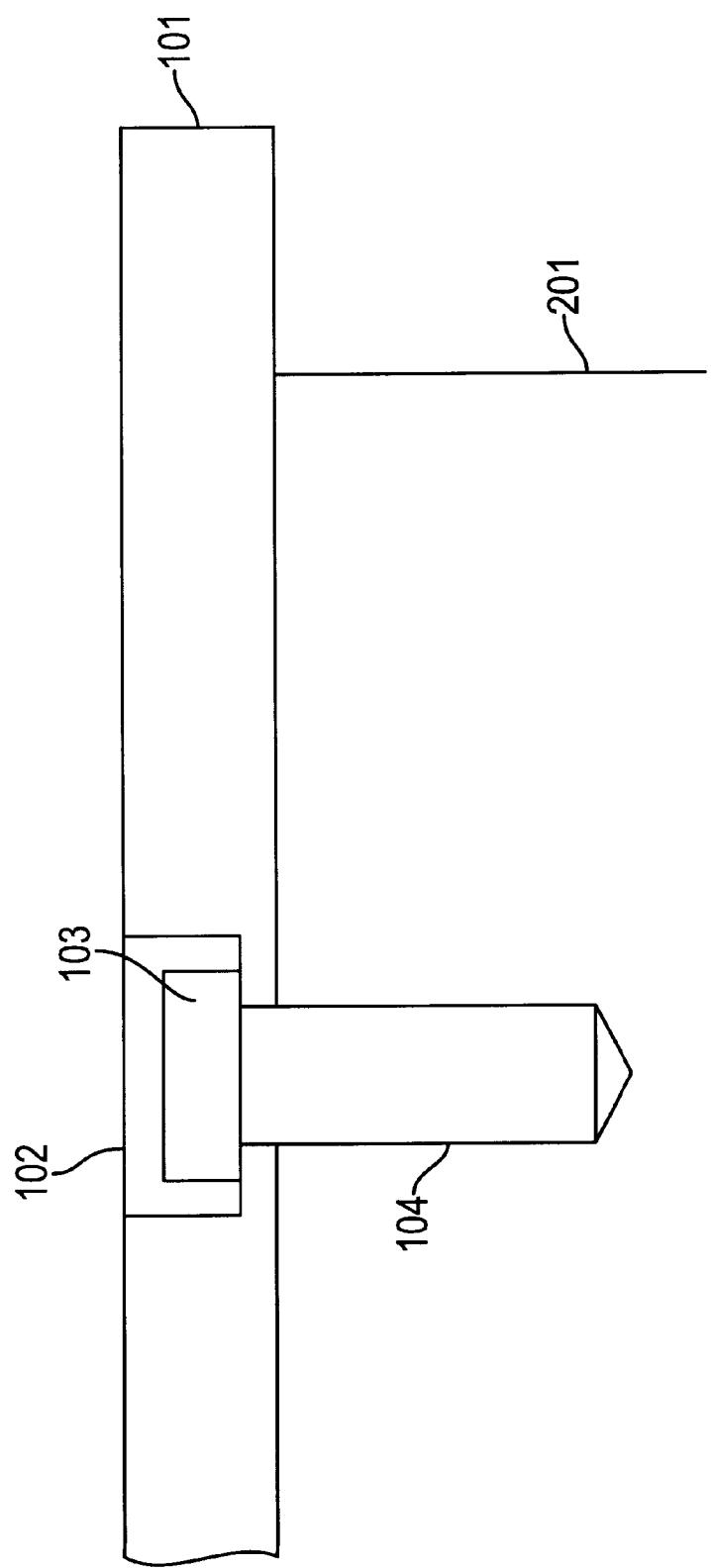
FIG. 36 is a fragmental sectional view showing a fixing structure of the mold parts according to the twelfth embodiment of the present invention.

In step M7, the designer may select the fixing structure of the mold. In the event that the mold should be fixed by the pocket holes and screws, then in step M8 the depth of the pocket hole may be input. The connection diagram between the plate and the block, as shown in FIG. 36, may be displayed on the display 19. In FIG. 36, a reference 101 denotes a plate in which a pocket hole (spot facing hole) 102 is formed, and a reference 201 denotes a block in which a tapped hole 104 is formed. The plate 101 may support the block 201 which holds the nest therein. FIG. 36 illustrates the case wherein the plate 101 and the block 201 are fixed by the screw 103.

In step M9, the pocket hole 102 may be formed in the plate 101. The pocket hole 102 is formed by cutting off the plate 101 serving as the base to the middle of its thickness. Then the process advances to step M11 in FIG. 35B.

In the event that the designer has selected the case the mold should be fixed by the cut-off holes and screws in step M7, then in step M10 the cut-off holes may be formed. The cut-off holes may be formed by cutting the base parts off so as to pass through it. Thereafter, in step M11 in FIG. 35B, clearance (designation) and depth of the fixing screws are input. In step M12, the number and location of the fixing screws are input.

In step M13, tapped holes may be formed in the screw parts to be fixed to the plate, and in step M14 spot facing holes for the fixing screws may be formed. The spot facing holes may be formed in the plate located beneath the mold. The process then advances to step M19.

Figure 37A:
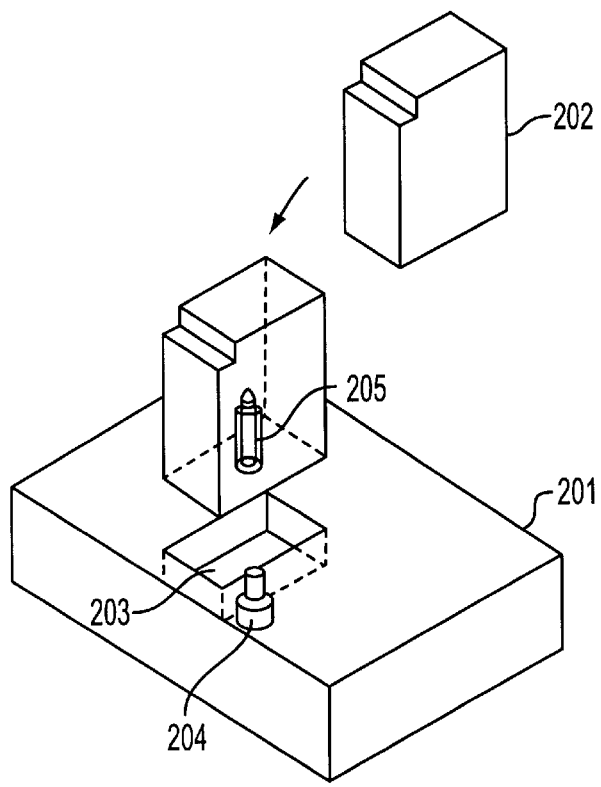
FIGS. 37A and 37B are perspective view showing a fixing structure of the mold parts according to the twelfth embodiment of the present invention.

If the designer has not selected the screw clamping by way of the pocket holes or the cut off holes in step M7, then the process goes to step M15. For example, there is a case where the designer intends to fix the nest shown in FIG. 37A in the block. In FIG. 37A, a reference 201 denotes a block having the pocket holes (spot facing holes) 203 and the tapped holes therein, and a reference 202 denotes a nest having a tapped hole 205 therein. Now FIG. 37A illustrates the case wherein the nest 202 may be put into the spot facing hole in the block 201 and fixed by thescrew from the bottom surface.

Figure 37B:
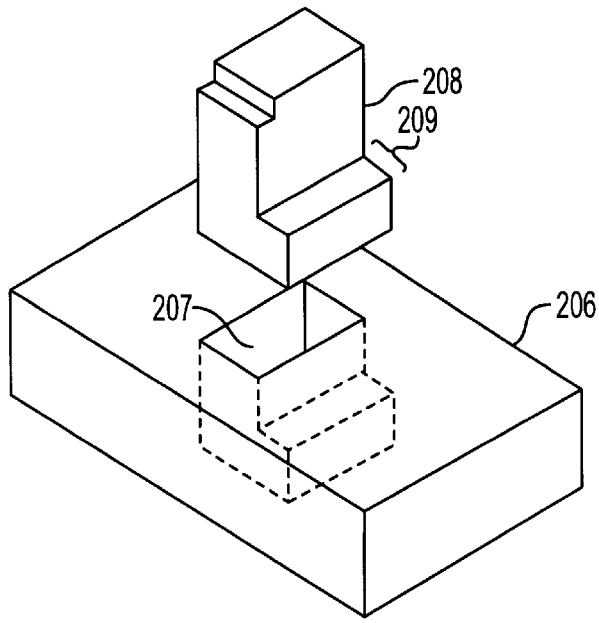

In FIG. 37B, a reference 206 signifies a block having a stepped opening portion 207, and a reference 208 signifies a nest having a rib 209. FIG. 37B illustrates the case where the nest 208 may be inserted from the bottom surface of the block 206 and then fixed by other plate. The rib 209 of the nest 208 cannot be drafted because of its engagement with the stepped opening portion 207.

The cut-off holes for the parts being fixed to the plate 101 serving as the base may be formed. In step M16, shape and dimension of the rib of the nest may be input.

In step M17, ribs may be provided to the nest, etc. In step M18, clearance (relief) for the rib may be formed in the parts serving as the base. After this, in step M19, it may be checked whether or not succeeding parts is present. If the succeeding parts has been present (YES), then the process returns to step M5. There the mold base data may be read out from the base file 12, and steps M6 to M18 may be repeated. Unless the succeeding parts has been present (NO), then the process may be completed. With the above processes, the mold may be arranged in the mold base.

As stated earlier, according to the mold design method according to the twelfth embodiment, it would be evident that the designer may design the fixing parts by selecting in step M7 any of the fixing parts structures such as clamping screw, rib, etc. those being patternized in advance, then displaying the fixing parts in the perspective view of the mold model, and then inputting fixing location, nominal designation of thread, rib dimension etc. via the keyboard. Therefore, the designer may get the fixing parts structures instead of designing them at the beginning. As a result, a burden of the designer can be extremely reduced.

As discussed in the twelfth embodiment, clamping screw, rib, etc. are prepared preliminarily as patternized information of the fixing parts. Thus, it would be evident that, since input items can be decreased significantly, the fixing structures of the mold parts may be designed in a short time and that, even if the designer has little knowledge concerning the injection molding, he or she may design the fixing structures of the mold parts. As a result, such design operation may be conducted effectively.

(13) Thirteenth Embodiment

Figure 38:
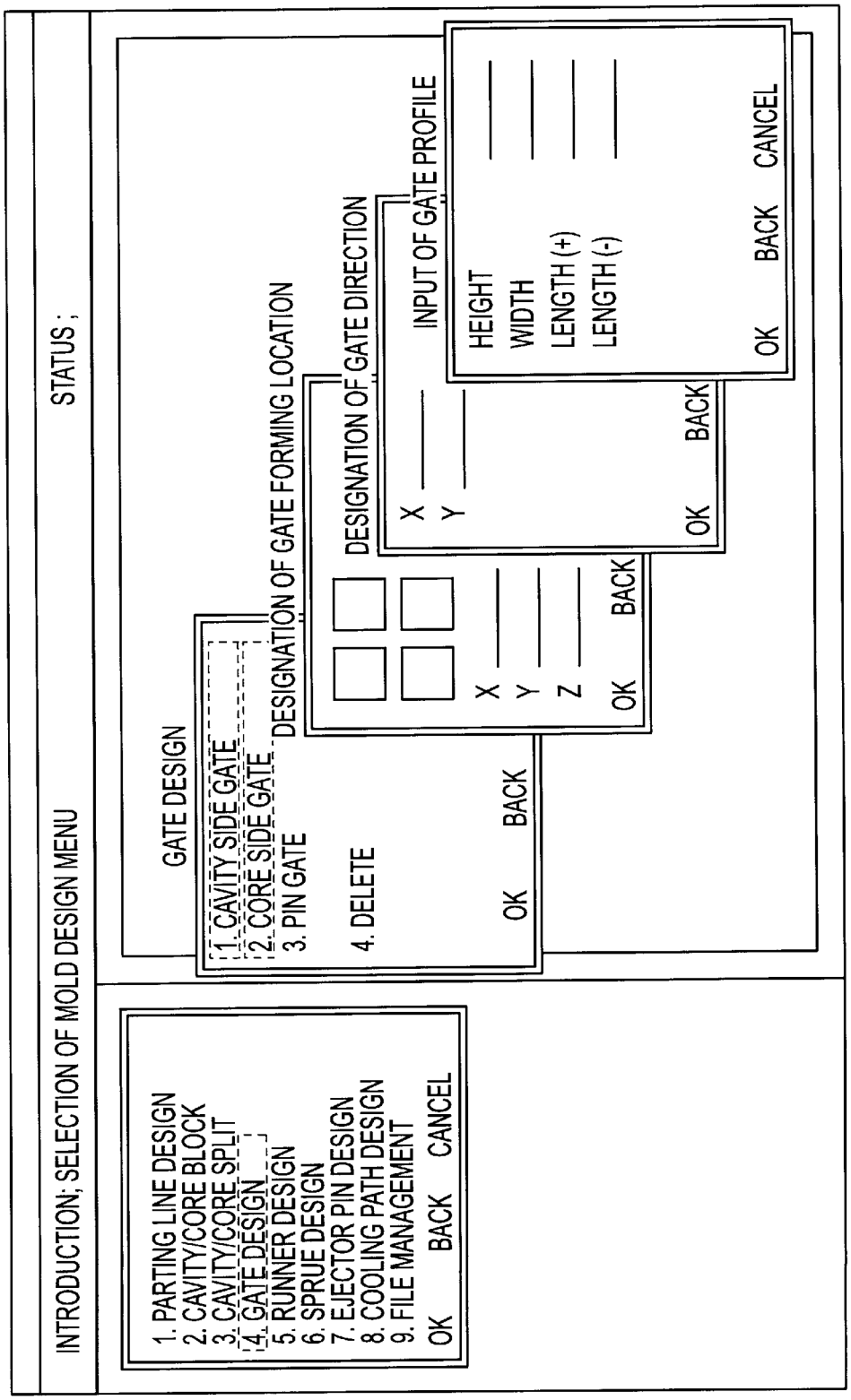
FIG. 38 is a view showing an image on the display device when designing a gate structure according to a thirteenth embodiment of the present invention.
Figure 39:
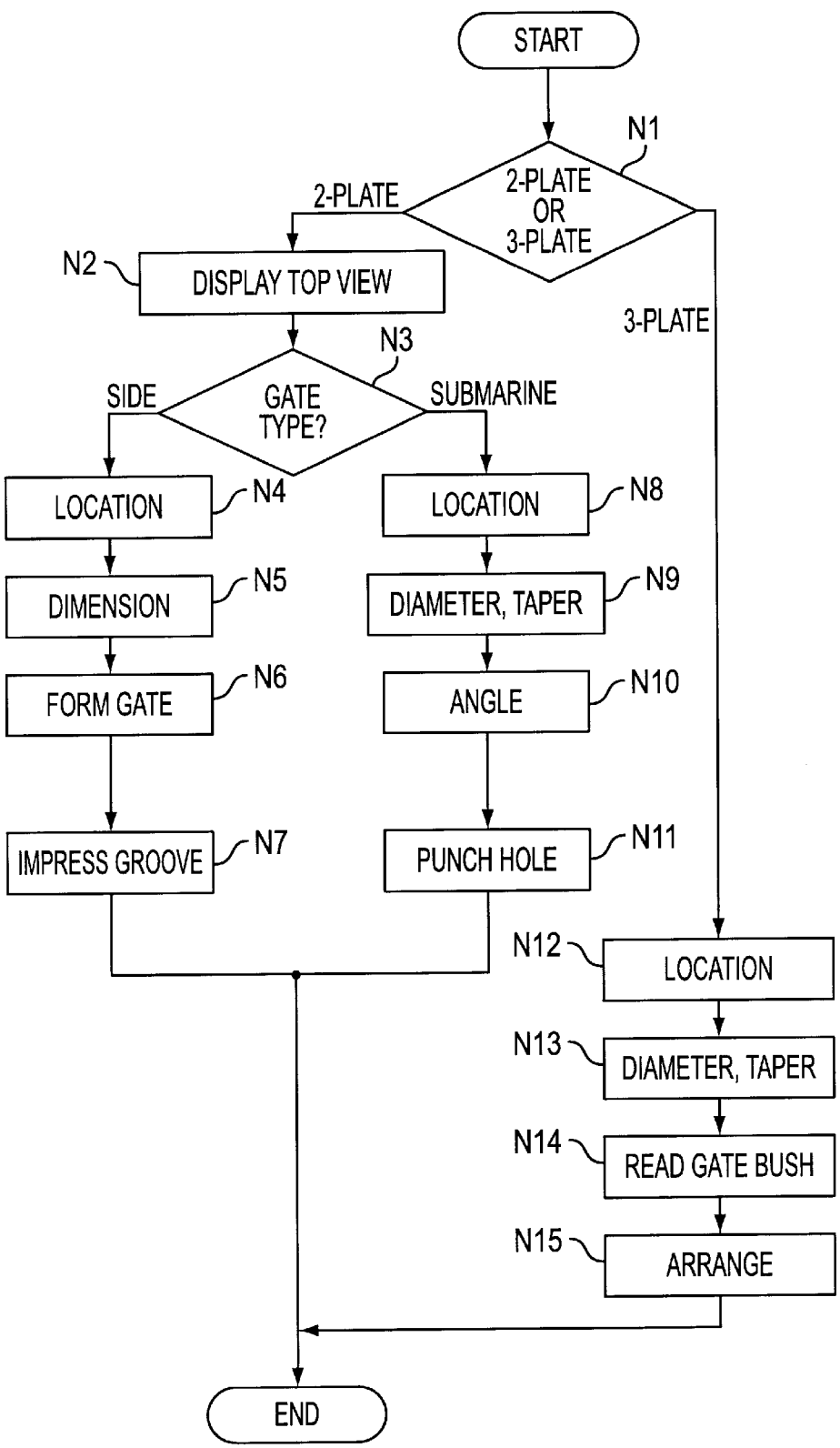
FIG. 39 is a flowchart illustrating gate design according to the thirteenth embodiment of the present invention.

FIG. 38 is a view showing an image on the display upon designing the gate according to the thirteenth embodiment of the present invention. FIG. 39 is a flowchart illustrating design process of the gate structure according to the thirteenth embodiment of the present invention. In this process, the gate used for injecting the resin into the mold may be designed in the gate design section 62.

Referring to FIG. 38, the designer may display a mold design menu screen on the display 19 to then select "gate design". In FIG. 39, in step N1, the designer may first select either the mold design of two-plate structure or the mold design of three-plate structure. In the mold of two-plate structure, the runner stripper plate for introducing the resin into the cavity has been omitted. The mold of three-plate structure comprises the runner stripper plate, the cavity plate, and the core plate.

Figure 40:
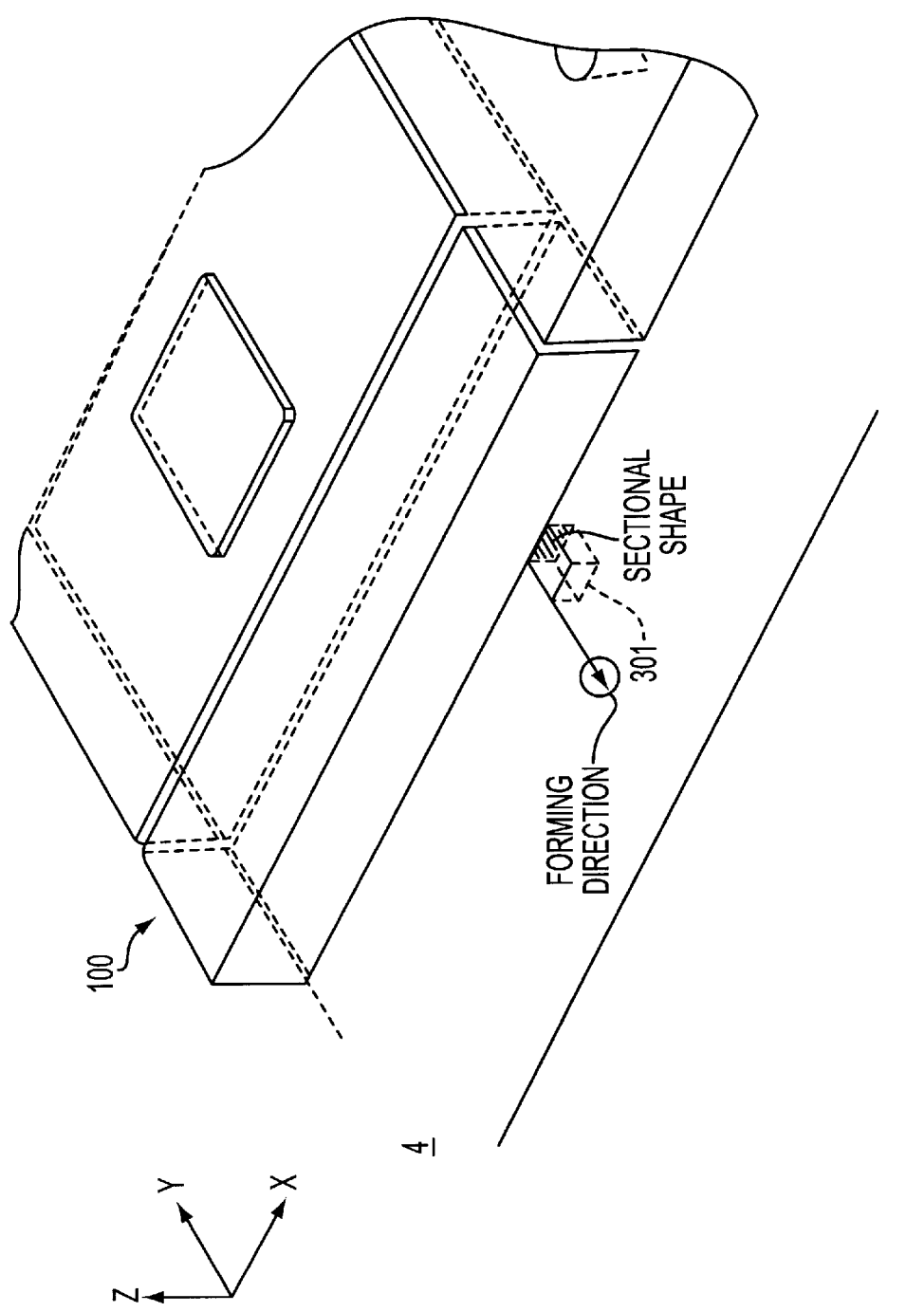
FIG. 40 is a perspective view showing the gate structure according to the thirteenth embodiment of the present invention.

If the mold of two-plate structure may be selected (YES), then in step N2 the top view of the parting plane for splitting the mold may be displayed on the display 19. Then the process goes to step N3 where the designer may select kinds (type, dimension) of the gate. If the designer has selected the side gate in step N3 (YES), then in step N4 the designer may instruct the gate location. Now, as shown in FIG. 40, the isometric drawing of the core 4 and the moldings 100 may be depicted on the display 19. In FIG. 40, a reference 301 is a gate which is provided in the core 4. In step N5, a sectional shape and dimension of the gate are input, and in step N6 a geometric locus of the gate may be formed. The gate forming direction is Y direction, as shown in FIG. 40.

Figure 41A:
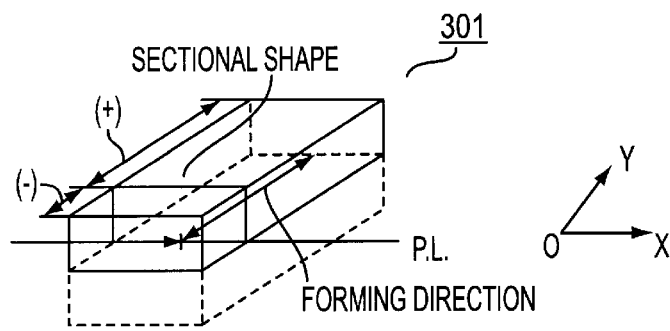
FIG. 41A is a perspective view showing the gate structure according to the thirteenth embodiment of the present invention.

In the case of designing the side gate, as shown in FIG. 41A, the gate forming direction may be defined by the composite vector in the X and Y directions. Default (not arranging direction) is +X direction. A length in the (+) direction and a length in the (−) direction are input based on the parting line. It may be selected by the foregoing menu screen in FIG. 38 whether or not the side gate is provided in either the cavity 3 or the core 4.

In step N7, the designer may instruct a groove which is to be impressed on the contacted surface of the cavity and the core. Then a groove may be formed by sweeping the gate profile along the parting plane.

If the designer has selected a submarine gate in step N3 (No), then in step N8 the designer may designate a gate location. Then in step N9, a diameter of the gate and a taper thereof may be input. In step N10, a slant angle of the gate may be input. In step N11, the designer may instruct a groove which is to be impressed on the contacted surface between the cavity and the core. In the gate design section 62, a groove for the gate of the circular cone provided on the deepest plane may be formed.

Figure 42:
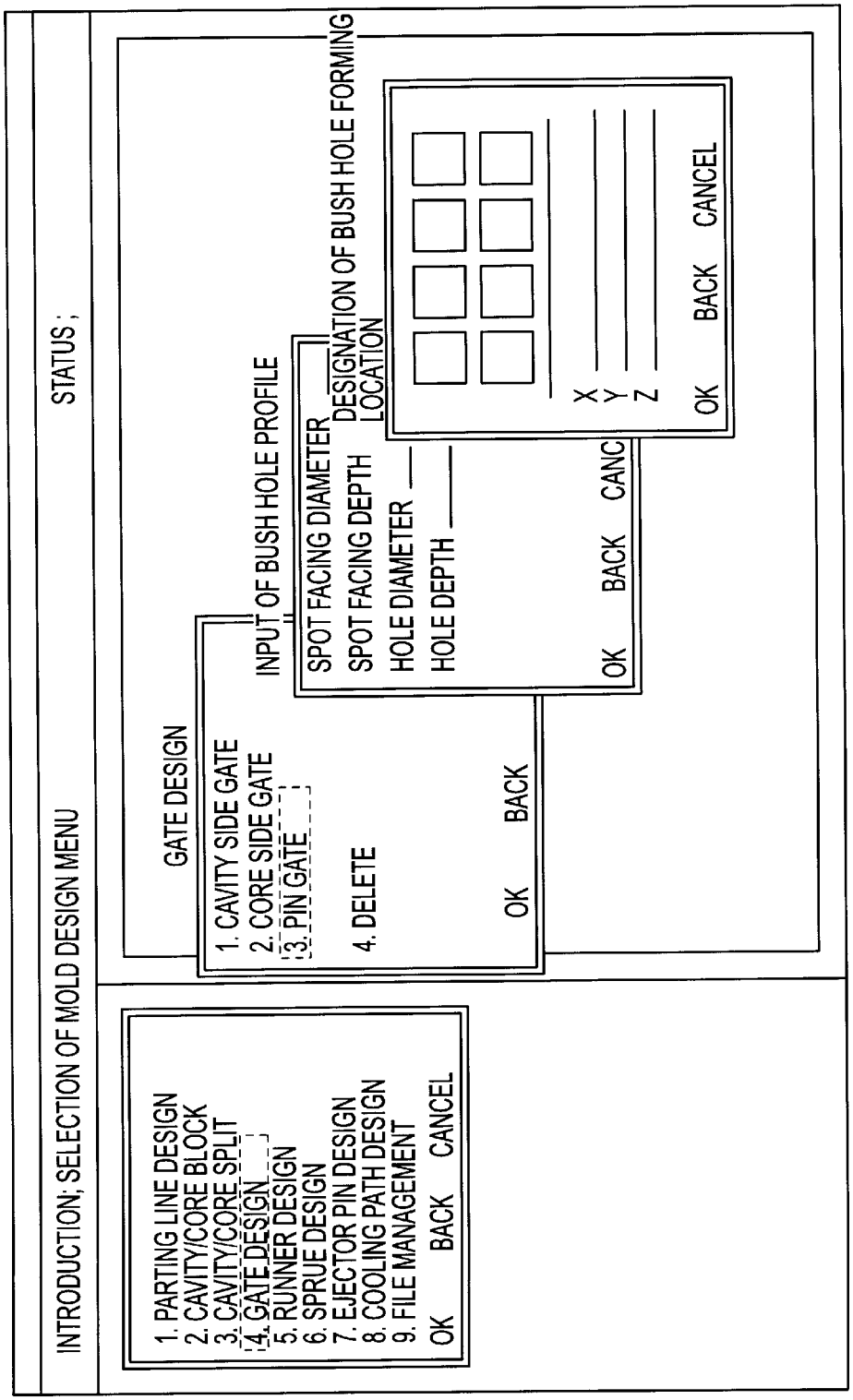
FIG. 42 is a view showing an image on the display device when designing the gate structure according to a thirteenth embodiment of the present invention.

Conversely, if the designer has designed the mold of three-plate structure in step N1 (YES), then in step N12 the designer may designate a gate location. Instruction of the gate location may be input by selecting the foregoing menu screen in FIG. 42. Then in step N13, a diameter of the gate and a taper thereof are input.

Figure 41B:
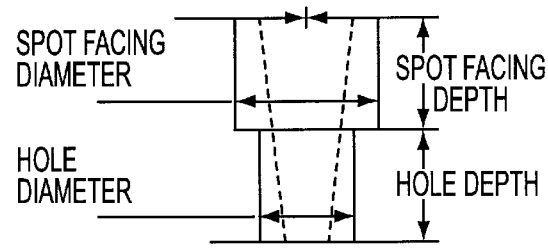
FIGS. 41B to 41D are sectional views showing an ejector pin according to a sixteenth embodiment of the present invention.

In step N14, the designer may read a pin gate (gate bush) having a profile being closet to the gate profile, for example, from the base file 12. The gate bush is a mold standard parts, wherein bush hole forming location, spot facing diameter, spot facing depth, hole diameter, and hole depth are normalized, as shown in FIG. 41B.

In step N15, the gate bush may be placed on the isometric drawing, etc of the mold. With the above process, side gate, pin gate, etc. for injecting the resin into the mold may be designed.

In the mold design method according to the thirteenth embodiment, the designer may display the selected gate on the perspective view of the mold model by selecting in steps N1 or N3 one of the side gate, submarine gate, pin gate, etc. all being patternized previously, so that he or she may design the gate structure such as gate location, type and dimension of the gate, treatment of the connection portion, etc. via the keyboard 17. Therefore, the designer may get the gate structures without designing them at the beginning. As a result, the thirteenth embodiment entails such an advantage that a burden of the designer can be extremely reduced.

Furthermore, in the thirteenth embodiment, since various parameters required for providing the gates are patternized, design operations may be simplified. In other words, since input items can be significantly decreased because of patternization of the parameters, the designer may design the gates in a short time.

(14) Fourteenth Embodiment

Figure 43:
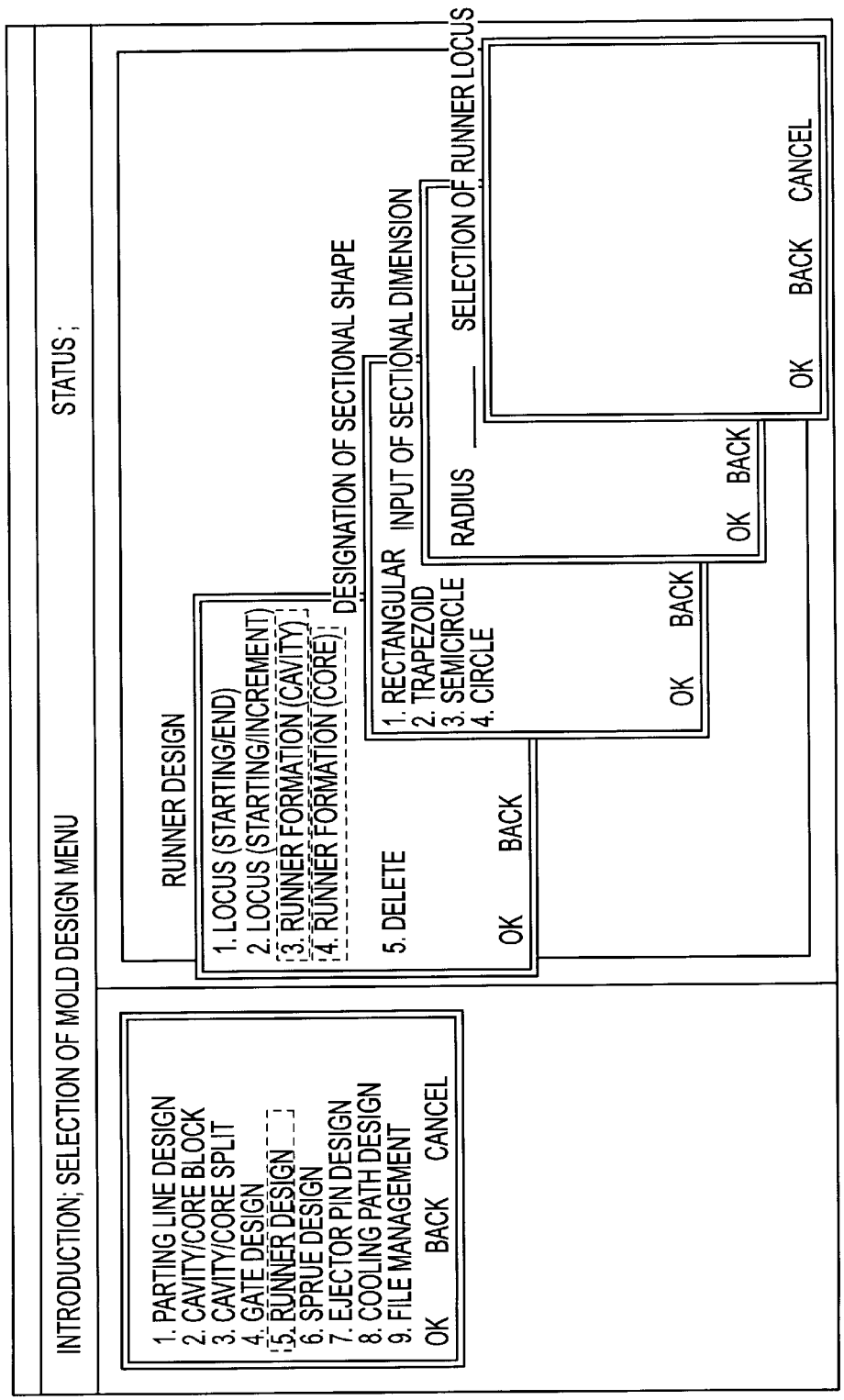
FIG. 43 is a view showing an image on the display device when designing a runner structure according to a fourteenth embodiment of the present invention.
Figure 44:
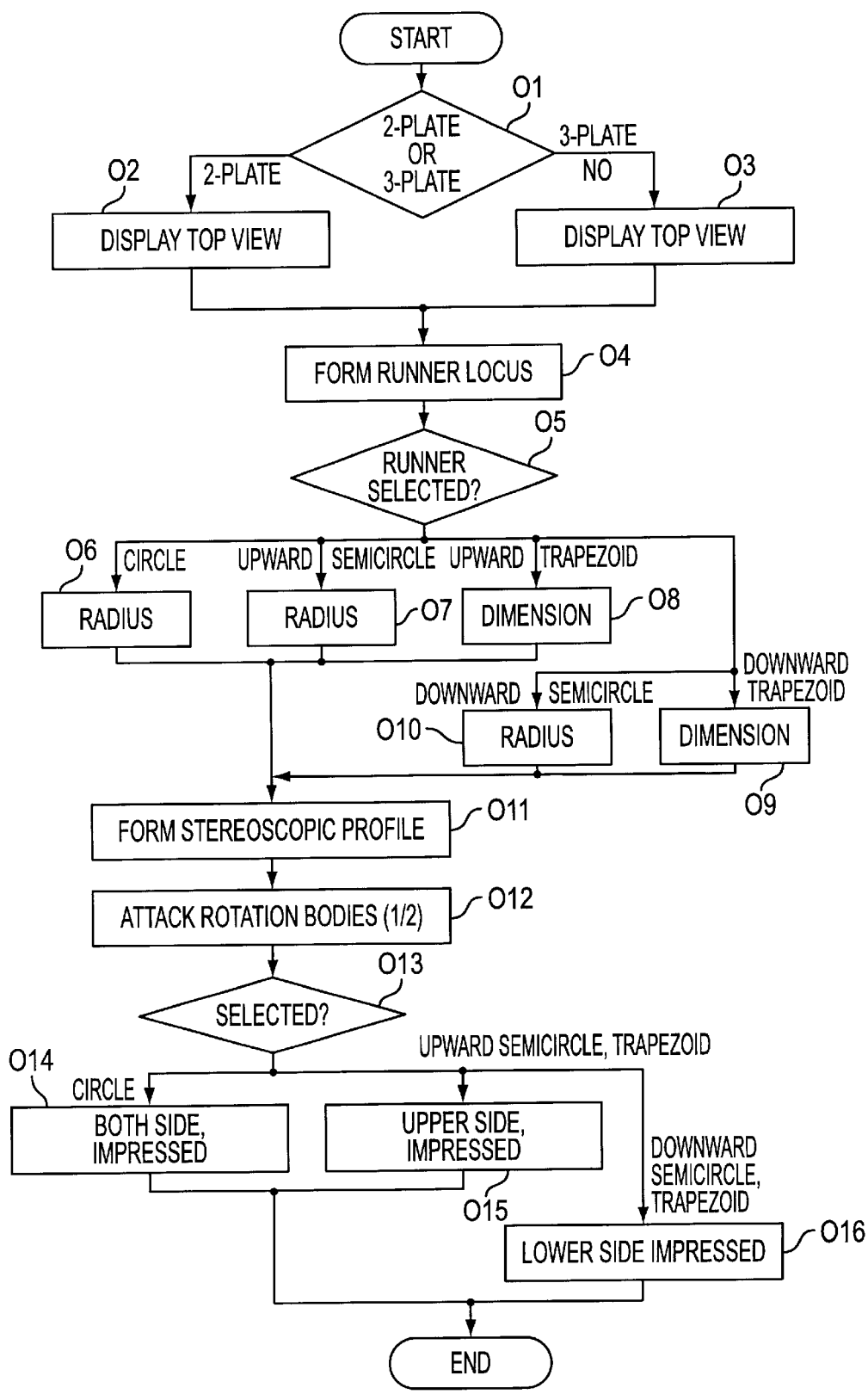
FIG. 44 is a flowchart illustrating runner design according to the fourteenth embodiment of the present invention.

FIG. 43 is a view illustrating an image on the display at the time when the runner may be designed according to the fourteenth embodiment of the present invention. FIG. 44 illustrates a flowchart for designing the runner according to the fourteenth embodiment of the present invention. In this process, a runner for use in introducing the resin into the mold in the lateral direction will be designed in the runner design section 63.

Referring to FIG. 43, the designer may display mold design menu screen on the display 19 to select "runner design". In FIG. 44, in step O1, the designer may select either mold design of two-plate structure or mold design of three-plate structure. If the designer has selected "mold design of two-plate structure" (YES), then in step O2 the top view of the contacting plane (parting plane) between the cavity and the core may be displayed on the display 19. Then the process advances to step O4.

Figure 45:
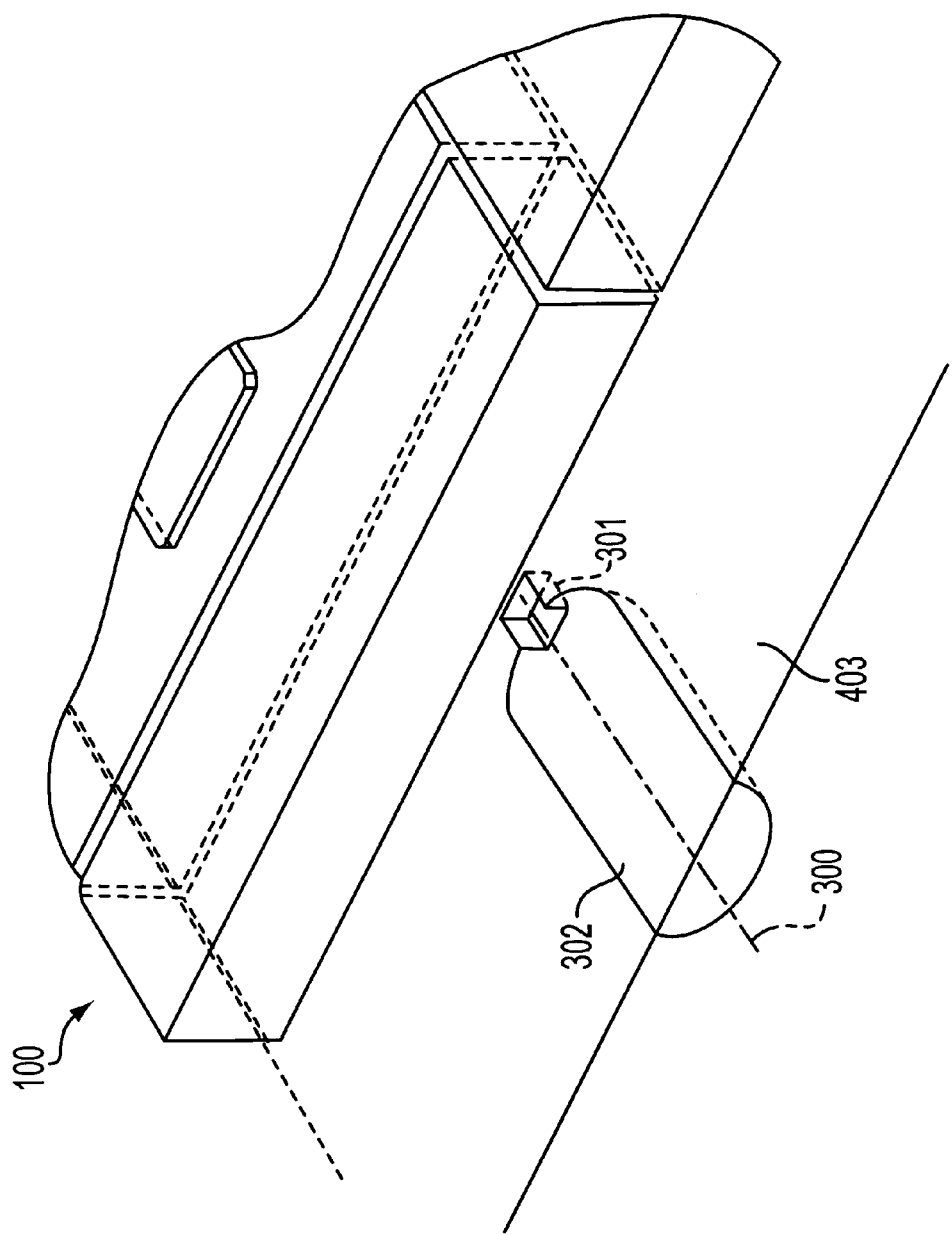
FIG. 45 is a perspective view showing the runner structure according to the fourteenth embodiment of the present invention.

On the contrary, if the designer has selected "mold design of three-plate structure" in step O2 (NO), then in step O3 the top view of the contacting plane (parting plane) between the cavity plate and the runner stripper plate may be displayed on the display 19. Then in step O4, a runner locus may be formed on the top view of the mold. AS shown in FIG. 45, the runner may be formed in the Y direction succeedingly to the gate 301. The runner locus may displayed by a straight line.

Thereafter, in step O5, the designer may determine a sectional shape of the runner. The runner locus may be determined when the designer designate locations of the cavity and the core on the menu screen. The runner locus may be designed by employing either a method for designating the starting point and the end point and then connecting them or a method for inputting the starting point and incremental value. The sectional shape of the runner may be designated by the designer on the menu screen.

Figure 46A:
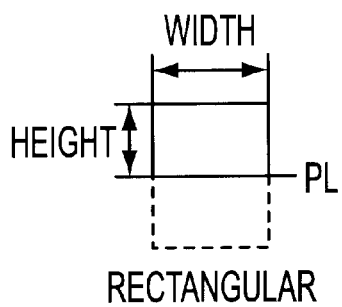
FIGS. 46A to 46D are sectional views showing the runner structure according to the fourteenth embodiment of the present invention.
Figure 46B:
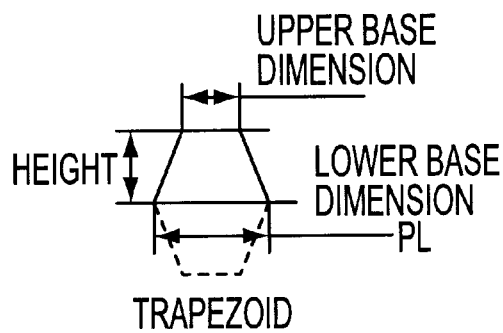
Figure 46C:
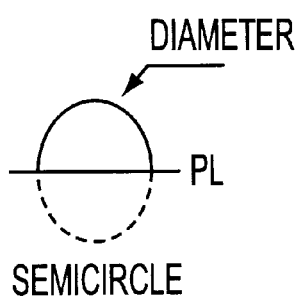
Figure 46D:
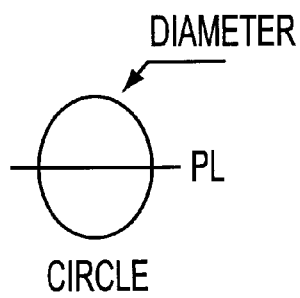

FIGS. 46A to 46D show the sectional shape and the dimension of the runner. FIG. 46A shows the runner having a rectangular sectional shape. For the rectangular runner, a width and a height may be specified on the basis of the parting line PL. FIG. 46B shows the runner having a trapezoidal sectional shape. For the trapezoidal runner, upper and lower base dimensions and a height may be specified on the basis of the parting line PL. FIG. 46C shows the runner having a semicircular sectional shape. For the semicircular runner, a diameter may be specified on the basis of the parting line PL. FIG. 46D shows the runner having a circular sectional shape. For the circular runner, a diameter may be specified on the basis of the parting line PL.

If the designer has selected the case the sectional shape of the runner should be formed as a circular one, then in step O6 a radius of the circle may be input. If the designer has selected the case the sectional shape of the runner should be formed as an upward semicircular one, then in step O7 a radius of the upward semicircle may be input. If the designer has selected the case the sectional shape of the runner should be formed as an upward trapezoidal one, then in step O8 the runner design section 63 may input dimensions of the trapezoid. If the designer has selected the case the sectional shape of the runner should be formed as a downward trapezoidal one, then in step O9 the runner design section 63 may input dimensions of the trapezoid. If the designer has selected the case the sectional shape of the runner should be formed as a downward semicircular one, then in step O10 the runner design section 63 may input a radius of the downward semicircle.

In step O11, the runner sectional shape may be swept along the runner locus to result in a stereoscopic profile of the runner.

In step O12, the runner design section 63 may attach rotation bodies (½) both having the same sectional shape to edges of the runner. The rotation body signifies a cutting tool for connecting the runner to the gate. ½ denotes a rate at which the cutting tool abuts a cut plane, i.e., a plane to be cut.

In step O13, impression may be performed in compliance with the sectional shape of the runner. In the case of the runner having the circular sectional shape, in step O14 both sides of the contacting plane between the cavity and the core may be impressed. The impression may be derived from logical difference in the swept runner profile. In the case of the runner having the upward semicircular sectional shape and the upward trapezoidal sectional shape, in step O15 the upper side of the contacting plane may be impressed. The impression may be derived from logical difference in the swept runner profile. In the case of the runner having the downward semicircular sectional shape and the downward trapezoidal sectional shape, in step O16 the lower side of the contacting plane between the cavity and the core may be impressed. The impression may be derived from logical difference in the swept runner profile. With foregoing processes, the runner for introducing the resin into the mold in the lateral direction has been able to be designed.

In the fashion described above, the mold design method according to the fourteenth embodiment, the designer may display the selected runner as the perspective view of the mold model on the display 19 by selecting either the two-plate runner structure or the three-plate runner structure, both being preliminarily prepared as patternized information. Then the designer may design the runner structure by selecting runner sectional shape, respective dimensions of runner sectional shape, locus, and process for the connecting portion, and inputting numeral values via the keyboard 17. Therefore, the designer may attain the runner structures without designing them at the beginning. As a result, the fourteenth embodiment may achieve such an advantage that a burden of the designer can be extremely reduced.

According to the fourteenth embodiment of the present invention, it would be understood that, since runner sectional shape of two-plate or three-plate type, respective dimensions of runner sectional shape, locus, etc. are prepared as patternized information, input items by the designer can be significantly reduced, and therefore the designer may design the runners in a short time. In addition, the designer having little knowledge about the injection molding may also design the runners.

(15) Fifteenth Embodiment

Figure 47:
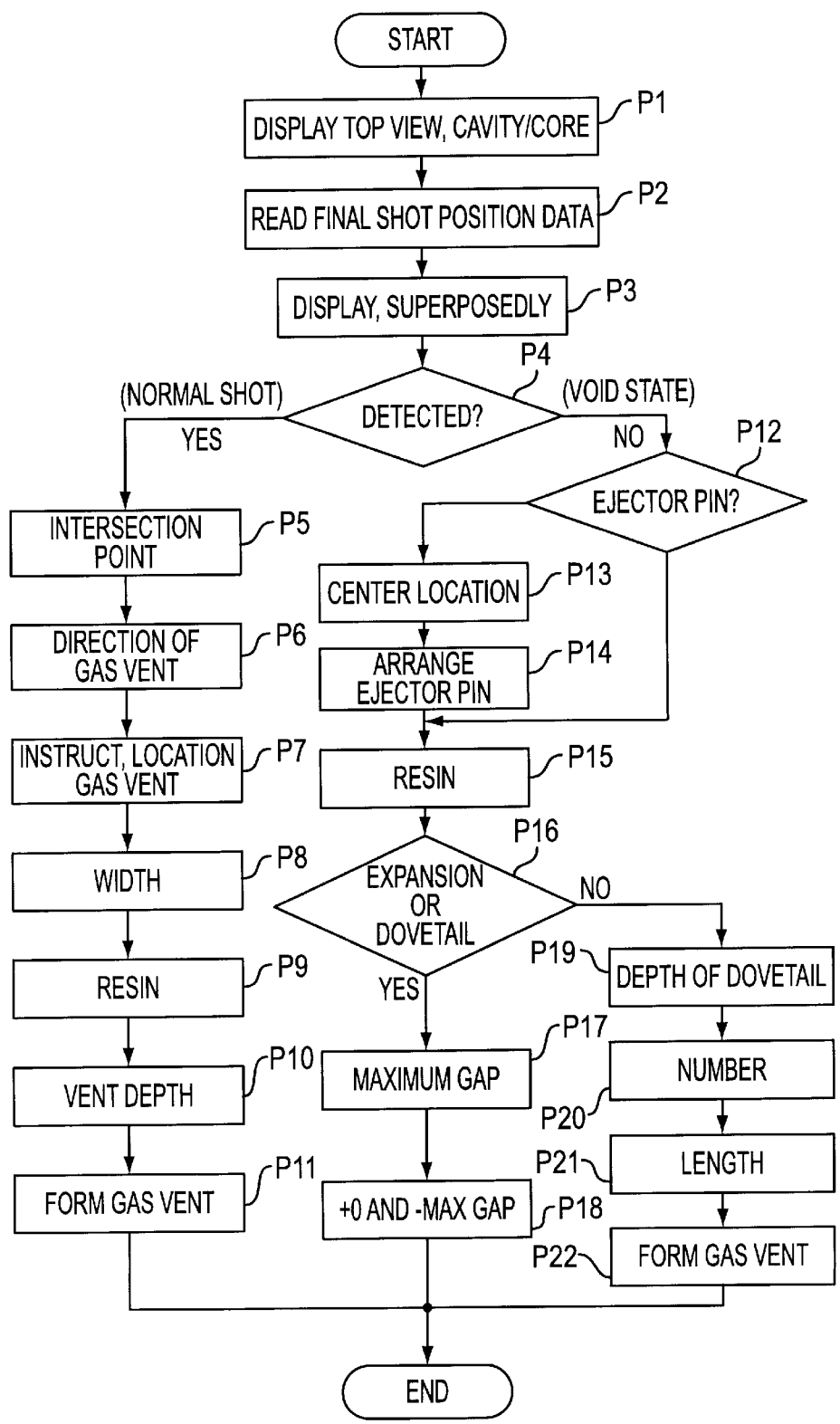
FIG. 47 is a flowchart illustrating gas vent design according to a fifteenth embodiment of the present invention.

FIG. 47 is flowchart illustrating design process of the gas vent according to the fifteenth embodiment of the present invention. In this process, the gas vent may be designed in the gas vent design section 65 to release the air from the cavity portion of the cavity/core when the resin is poured into the mold.

Figure 48:
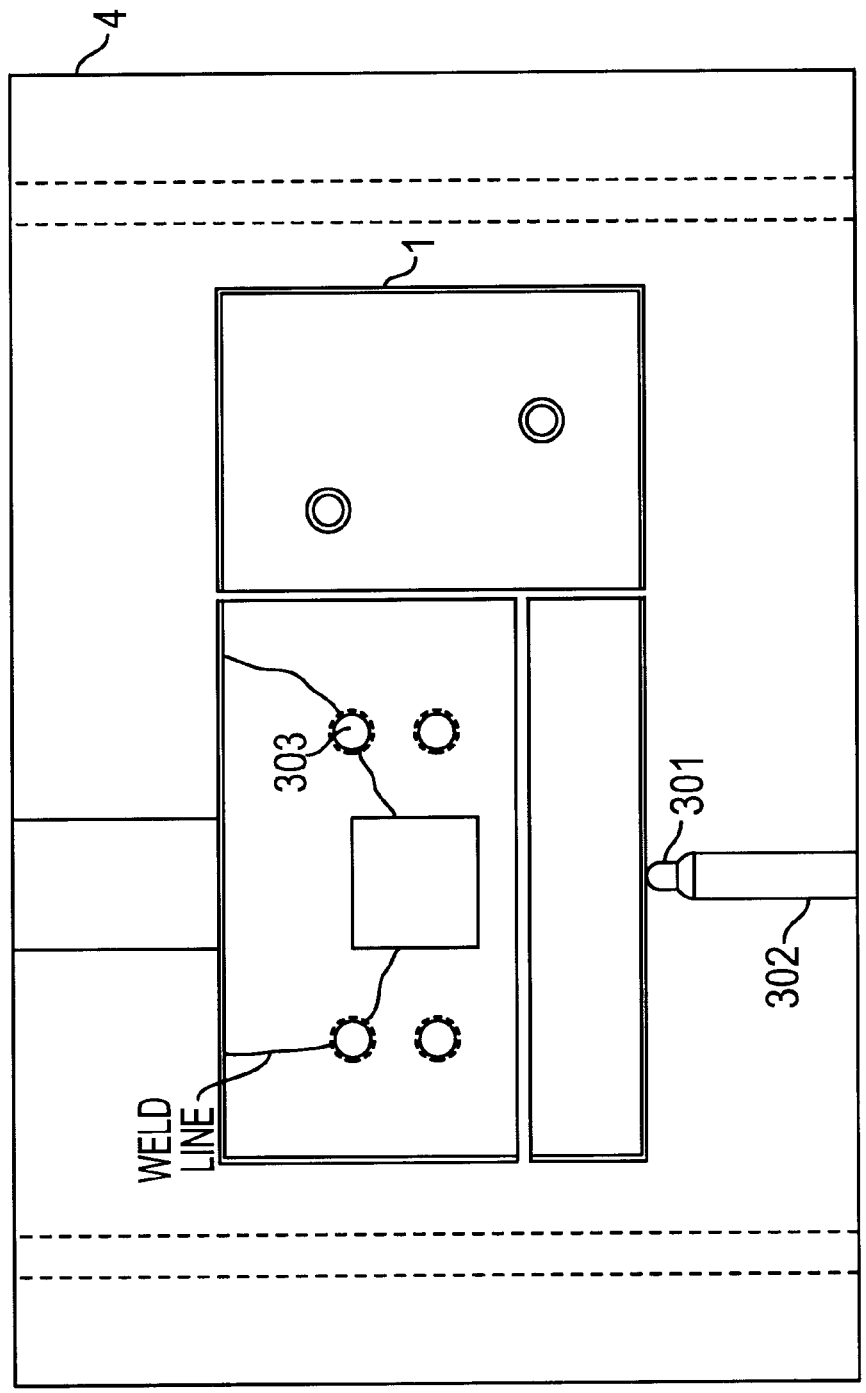
FIG. 48 is a plan view showing the core when designing the gas vent structure according to the fifteenth embodiment of the present invention.

In FIG. 47, in step P1, the top view of the parting plane 200 including the product shape, as shown in FIG. 48, is displayed on the display 19. In FIG. 48, a reference 303 denotes an ejector pin hole. The ejector pin (not shown) may be passed through the ejector pin hole 303 when the moldings 1 is drafted.

Next, in step P2, final shot position information as the result of resin superplasticized analysis may be read. The resin superplasticized analysis denotes a simulation as for the flowing directions (weld lines) taken by the resin when it is injected through the gate previously designed. According to this analysis, arrival points of the resin may be understood as the final shot position.

In step P3, the final shot position may be displayed on the display 19 so as to be superposed on the top view of the core including the product shape shown in FIG. 48. Then, in step P4, it may be detected whether or not the resin (weld line) intersects with the parting line. If it has been detected that the resin can be filled in the cavity core normally (YES), then in step P5 intersecting points between the parting line and the final shot position may be calculated.

In turn, in step P6, the designer may instruct the direction of the gas vent employing the intersecting point as the starting point. In step P7, the designer may instruct the location to which the gas vent is provided. The gas vent would be located on or beneath the parting line.

Figure 60:
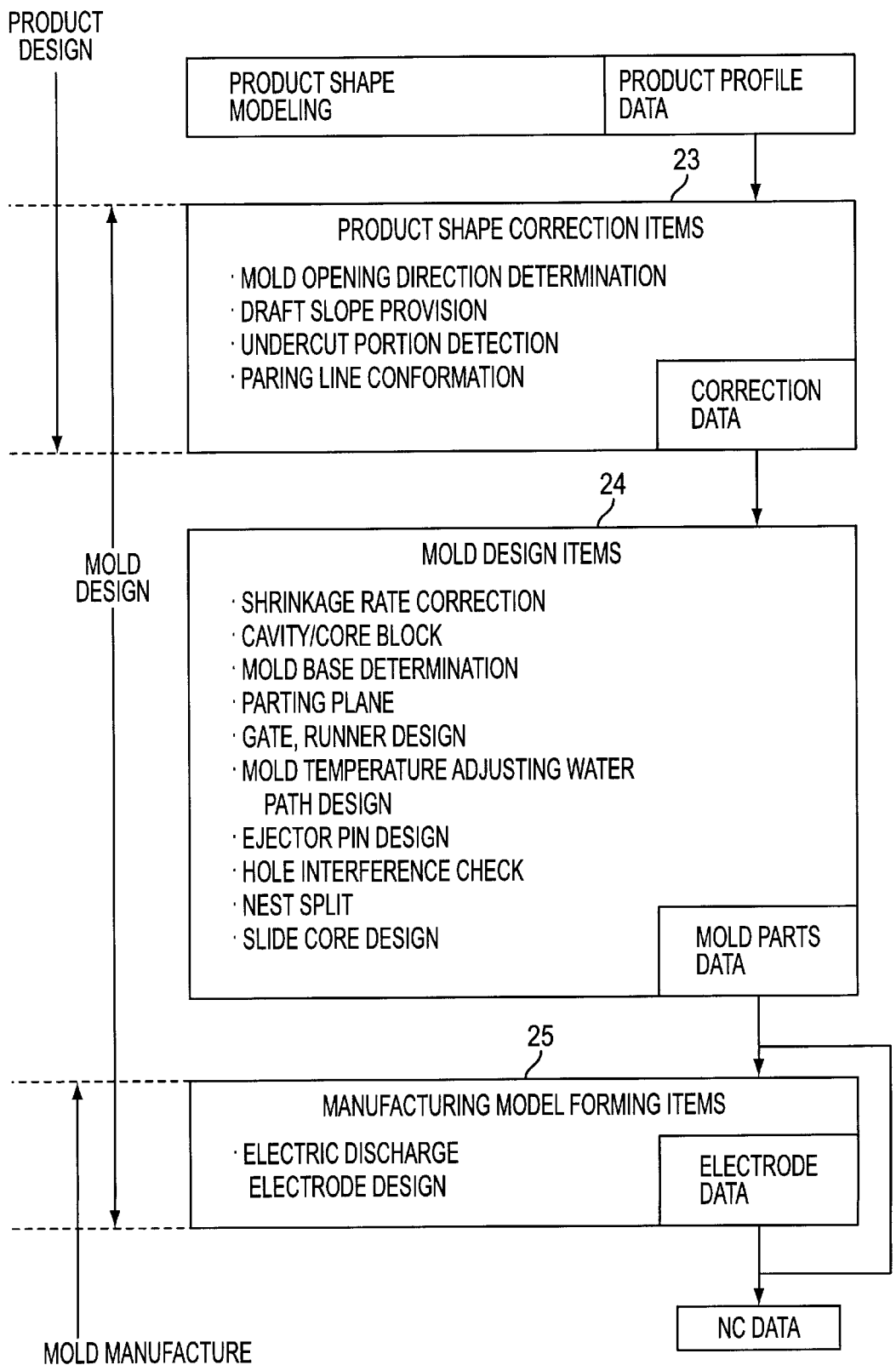
FIG. 60 is a view illustrating use segments of mold design items according to the twentieth embodiment of the present invention.

In step P8, a width of the gas vent may be input, and in step P9 the resin to be used may be input. Then, in step P10, the designer may decide a depth of the gas vent based on the resin material database. For instance, the designer may designate a depth and a width of the gas vent. In step P11, a gas vent groove may be formed by sweeping the sectional shape (rectangle). The gas vent 304 as shown in FIG. 60 is displayed on the top view of the mold base superposedly on the display 19. The gas vent 304 may be provided on the location opposing to the gate 301. In FIGS. 49A–I, the drawing in broken line circle may correspond to a sectional view of the gas vent 304 viewed from I—I' arrow line. In the drawing in broken line circle, a reference a shows a depth of the gas vent, and a reference b shows a width of the gas vent.

Conversely, if it has been detected in step P4 that the resin may not intersect with the parting line (NO), then the process goes to step P12. In case, as the result of the resin superplasticized analysis, it has been found that a void 305 will be caused at the location shown in FIG. 49A because of the air being caught in the resin, the resin may not intersect with the parting line.

In step P12, it may be decided whether or not there is an ejector pin hole 303 near the void 305. If it has been decided that the ejector pin hole 303 is present (YES), then the process proceeds to step P15. If it has been decided that there is no ejector pin hole 303 (NO), then the process goes to step P14 where the gas vent design section 65 may arrange the ejector pin hole 303 in the center of the void 305. Then in step P15, the resin to be used may be input.

Subsequently, in step P16, the designer may select whether or not a dimensional tolerance of the ejector pin hole 303 must be expanded. If it has been selected that the dimensional tolerance must be expanded (YES), then in step P17 where the designer may determine a maximum gap from the resin material database. The dimensional tolerance will be explained in the nineteenth embodiment. In step P18, the dimensional tolerance of the ejector pin hole 303 may be changed to a range between +0 and -maximum gap.

Figures 1, 49A:
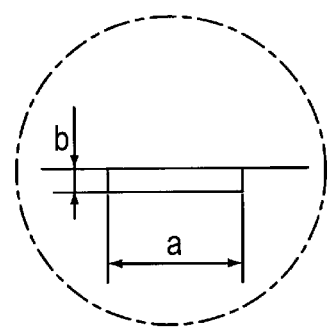
FIGS. 49A to 49C are views showing images on the display device obtained by superposing a plan view of the core and resin superplasticized analysis chart when designing the gas vent structure according to the fifteenth embodiment of the present invention.
Figure 49A:
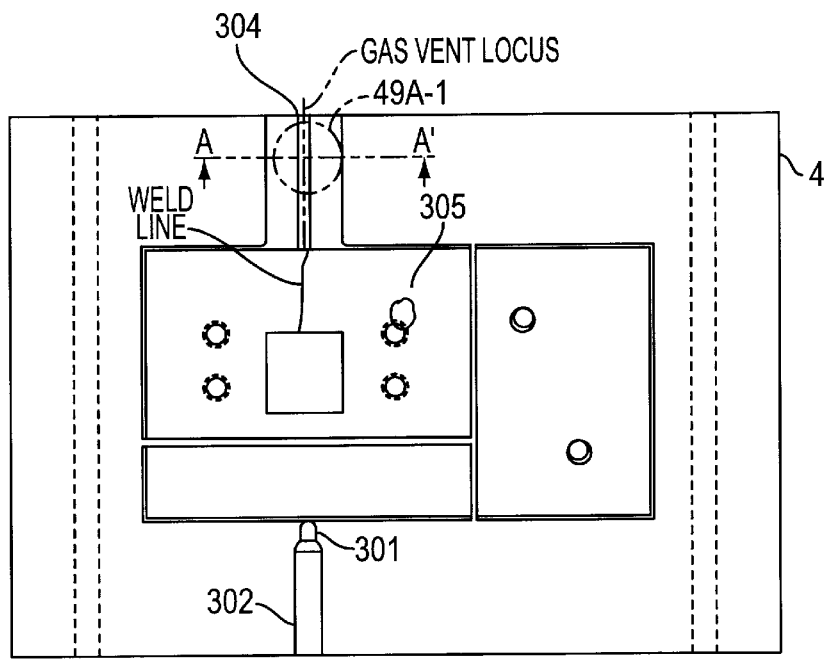
Figure 49B:
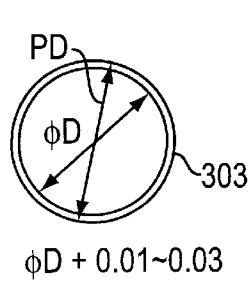

Here drawings of the ejector pin hole 303 before and after magnification, as shown in FIG. 49B, are depicted on the display 19. In FIG. 49B, $\phi D$ is a diameter of the ejector pin hole 303. If the gap should be expanded, $\phi D+0.01$ to $\phi D+0.03$ would be calculated.

Figure 49C:
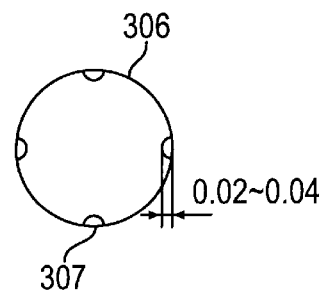

If the designer has selected in step P16 that, in place of expansion of the dimensional tolerance, an air vent dovetail as shown in FIG. 49C must be provided on the periphery of the ejector pin 306 (NO), then in step P19 a depth of the dovetail may be decided based on the resin material database. In step P20, the number of the dovetail may be determined. For purposes of example, in FIG. 49C, a depth of the dovetail has been set within 0.02 to 0.04 mm, and the number of the dovetail has been set to be four.

In step P21, a length of the dovetail may be input. After this, in step P22, the gas vent may be formed by sweeping the sectional shape (semicircle). With these processes, the gas vent 304 may be designed which serves to release the air from the space (cavity) portions of the cavity and the core when the resin is forced to be poured into the mold.

As has been discussed earlier, according to the mold design method according to the fifteenth embodiment, it would be understood that the gas vent 304 for releasing the gas has been arranged at the location where the resin reaches finally in step P3, based on the result of the resin superplasticized analysis being superposed on the perspective view of the mold. Therefore, the designer may arrange the gas vent 304 at the location suitable for the resin which being poured into the cavity portion of the mold block 100 without regard to experience and perception of the designer. Besides, it would be clear that, since the final shot position of the resin may be calculated by way of the superplasticized analysis CAE (Computer-Aided Engineering), the designer may design the gas vent structure without knowledge of the injection molding resin.

According to the fifteenth embodiment of the present invention, it should be noted that, if the method has been adopted wherein the gas is released by employing the ejector pin 306, correction operations such as location modification of the ejector pin 306, provision of the dovetail in the ejector pin 306, and dimension modification of the ejector pin 306 may be applicable.

In case, from the result of the resin superplasticized analysis, it has been seen that the resin cannot reach the gas vent 304 so that the gas stays in the cavity portion of the mold block 100 to produce the void 305, the gas vent design employing the ejector pin 306 may be adopted. Since a tolerable clearance (width, depth, etc.) may be displayed on the display 19, the designer may design the gas vent 304 by inputting necessary dimensions via the keyboard 17.

Therefore, it is of course that the designer may attain the runner structures without designing them at the beginning. As a result, the fourteenth embodiment may achieve such an advantage that a burden of the designer can be extremely reduced.

According to the fifteenth embodiment of the present invention, it would be evident that, if the designer designates shape and specification of the gas vent 304 prepared previously as patternized information via the keyboard 17, the profile of the designated gas vent 304 may be arranged in the mold model. Therefore, the designer may obtain the gas vent structures without designing the gas vent 304 at the beginning, and that a burden of the designer can be extremely reduced. In addition, it would be apparent that, since required parameters are patternized, simplification of operations can be achieved and, since input items input by the designer can be significantly reduced, the designer may design the gas vent 304 in a short time.

(16) Sixteenth Embodiment

Figure 50:
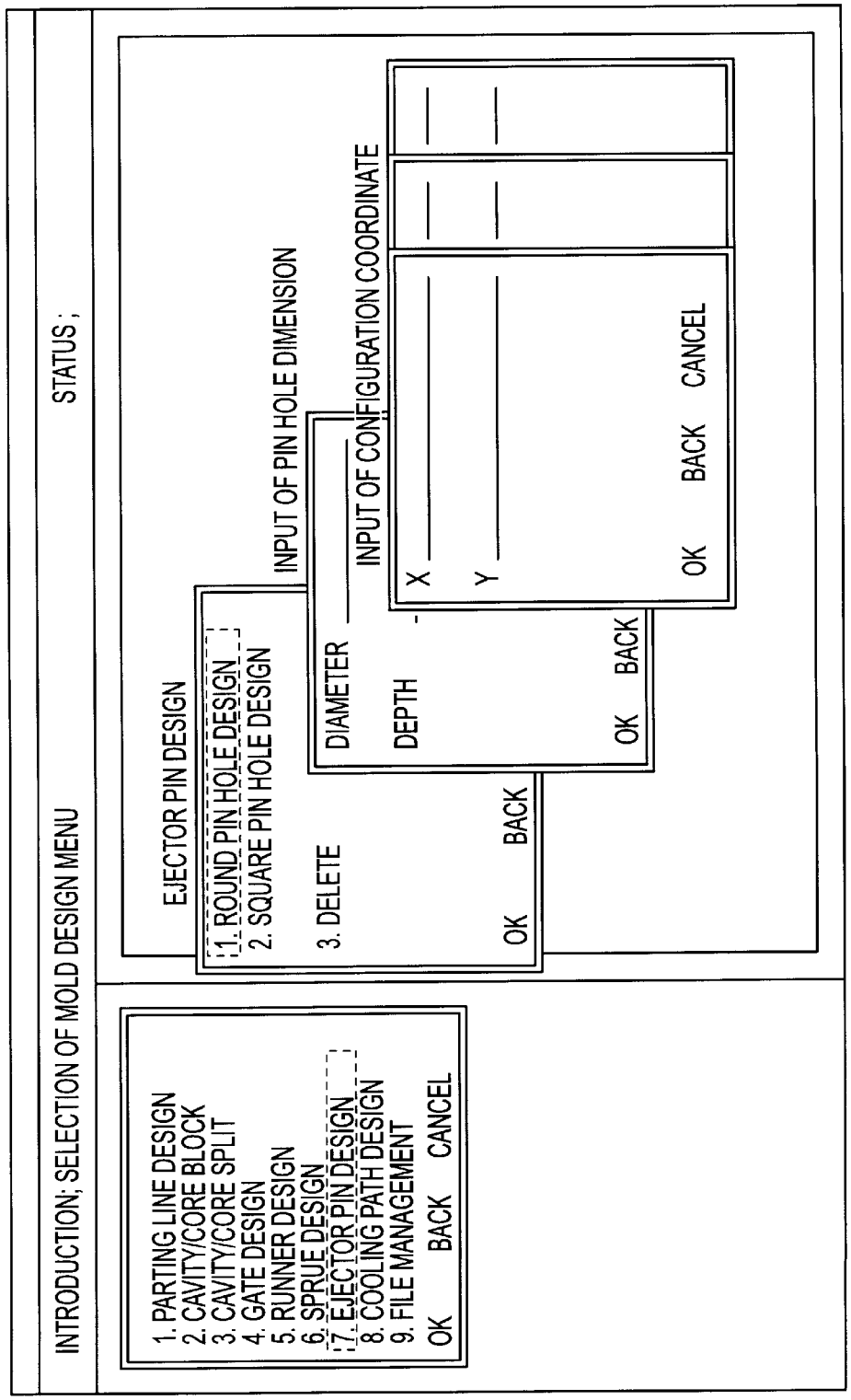
FIG. 50 is a view showing an image on the display device when designing the ejector pin according to a sixteenth embodiment of the present invention.
Figure 51:
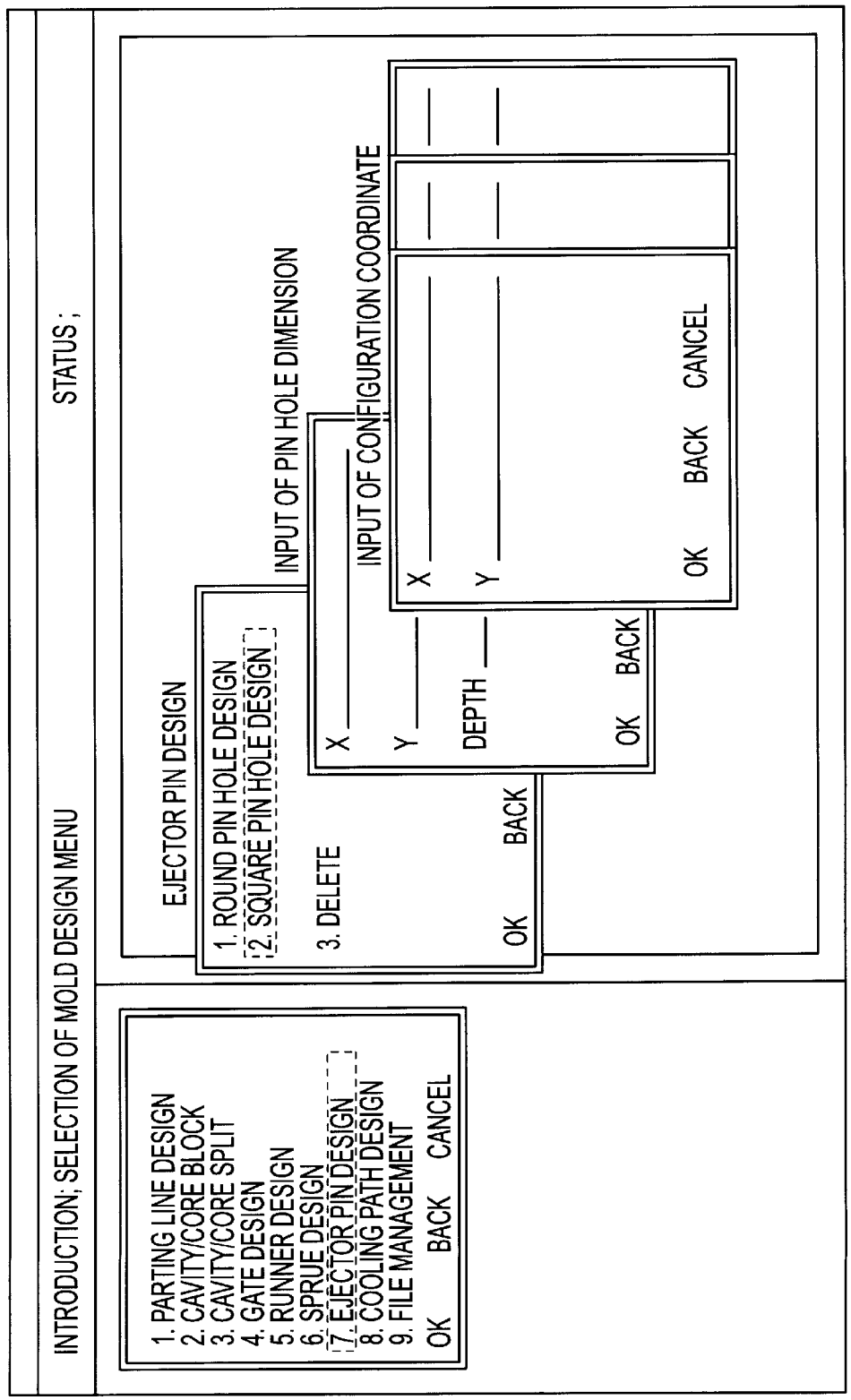
FIG. 51 is a view showing another image on the display device when designing the ejector pin according to a sixteenth embodiment of the present invention.
Figure 52:
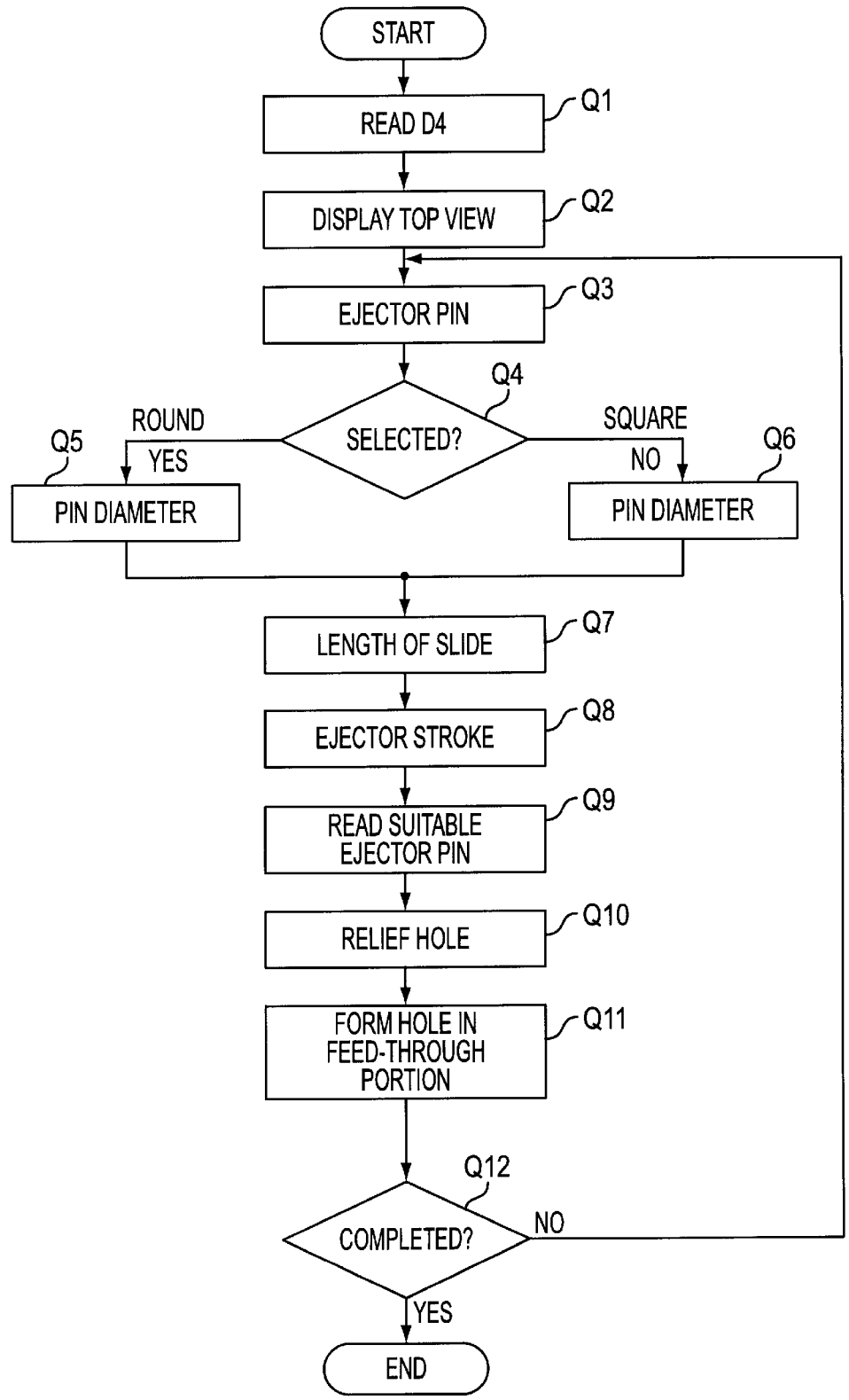
FIG. 52 is a flowchart illustrating ejector pin design according to the sixteenth embodiment of the present invention.

FIGS. 50 and 51 are views for illustrating images of the display when the ejector pin being designed according to the sixteenth embodiment of the present invention. FIG. 52 is a flowchart illustrating design process of the ejector pin according to the sixteenth embodiment of the present invention. In this process, the ejector pin may be designed in the ejector pin design section 66.

Referring to FIG. 50, first the designer may select "ejector pin design" from mold design menu screen displayed on the display 19. In step Q1, the cavity/core data D4 are read out, and in step Q2 the top view of the core may be displayed on the display 19. In step Q3, position of the ejector pin 306 may be displayed on the display 19.

Figure 41C:
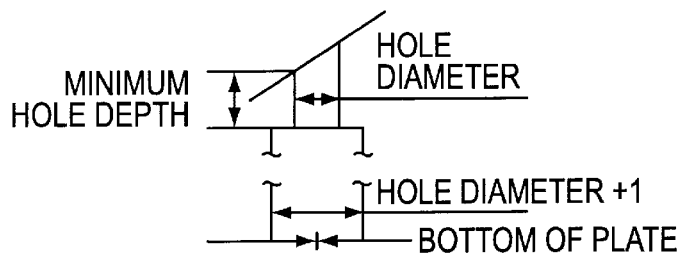

In the next, in step Q4, the designer may select a sectional profile of the ejector pin 306. If the ejector pin formed of a round pin has been selected (YES), "hole design for round pin" may be selected on the menu screen shown in FIG. 51. So a hole for round pin shown in FIG. 41C may be formed. The designer may arrange the hole for round pin on the basis of the bottom surface of the plate. In addition, the designer may designate minimum hole depth, hole diameter, hole diameter+1 (where 1 is relief, i.e., clearance) of the hole for round pin. In step Q5, a diameter of the pin may be input, and the process advances to step Q7.

Figure 41D:
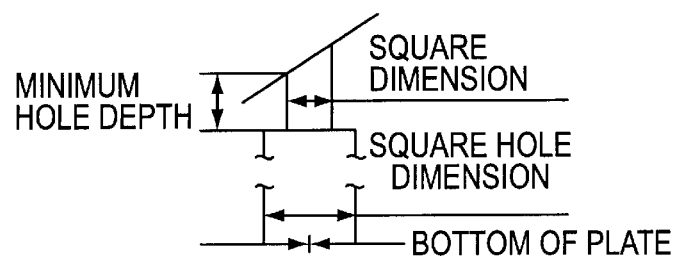

If the designer has selected a square pin in step Q4 (NO), "hole design for square pin" may be selected on the menu screen shown in FIG. 51. In step Q6, a pin diameter may be input. Here a hole for square pin shown in FIG. 41D may be displayed on the display 19. The designer may arrange the hole for square pin on the basis of the bottom surface of the plate. In addition, the designer may designate minimum hole depth, square hole dimensions (X, Y), square hole dimensions +1 (where 1 is nominal size) of the hole for square pin.

In step Q7, a length of a slider portion of the ejector pin 306 may be input, and then in step Q7 a stroke of the ejector pin 306 may be input. Next, in step Q9, appropriate ejector pin 306 will be read from the base file 12. The ejector pin 306 has been stored in the database as a mold standard parts. In step Q10, the pin design section 66 may input a clearance of the pin.

Figure 53:
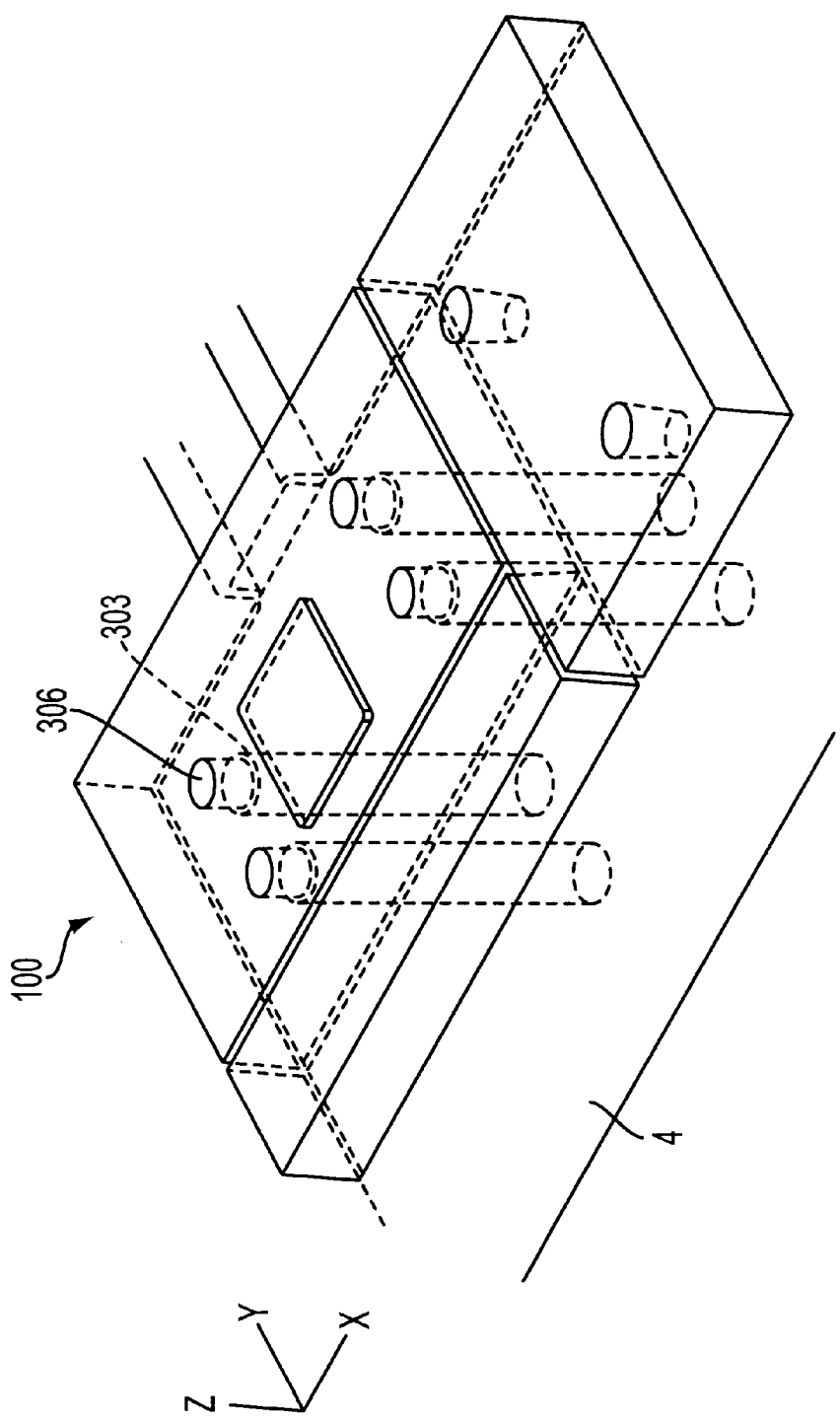
FIG. 53 is a perspective view showing the ejector pin in connection with the product shape according to the sixteenth embodiment of the present invention.

Subsequently, in step Q11, a hole may be formed in the feed-through parts. As shown in FIG. 53, the ejector pin 306 and the ejector pin hole 303 are displayed on the display 19 so as to overlap with the top view of the product shape.

The pin holes 303 must be opened in nest of the core 4, movable mold plate (core plate), movable support plate, and upper ejector plate.

In step Q12, it will be checked whether or not design of the ejector pin 306 has been finished. If design of the ejector pin 306 has not been finished (NO), the process returns to step Q3 to repeat steps Q3 to Q11 once more. If design of the ejector pin 306 has been finished in step Q12 (YES), the process may be completed. With this process, the ejector pin be able to be designed.

In this manner, according to the injection mold design method of the sixteenth embodiment, it would be obvious that, by selecting in step Q4 any of the structure such as sectional shape, dimension, length of slide portion, etc. of the ejector pin, all being stored as patternized information, the designer may display selected ejector pin on the perspective view of the mold model on the display 19. It would be apparent that, since the designer may design the ejector pin 306 by designating location, dimension, shape, etc. and inputting numerals via the keyboard 17, he or she may obtain the ejector pin structures without designing the ejector pin structure at the beginning, and that a burden of the designer can be extremely reduced. Since kinds of the ejector pin 306 such as round pin, square pin, straight pin, stepped pin serving as parameters have been prepared as patternized information preliminarily, operation can be simplified. In addition, since the input items can be reduced extremely because of patternized information, the ejector pin 306 can be designed in a short time.

(17) Seventeenth Embodiment

Figure 54:
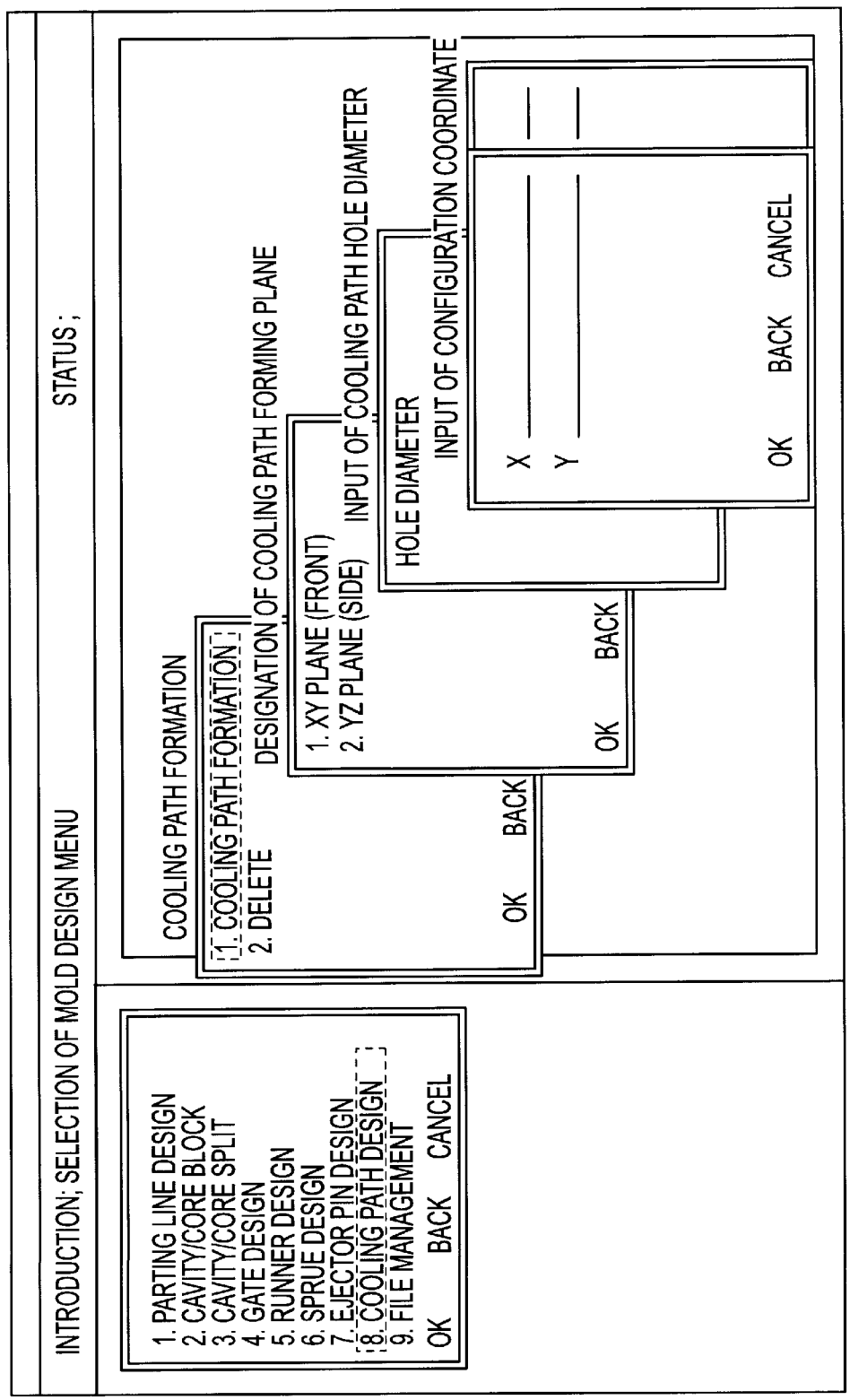
FIG. 54 is a view showing an image on the display device when designing a cooling path according to a seventeenth embodiment of the present invention.
Figure 55:
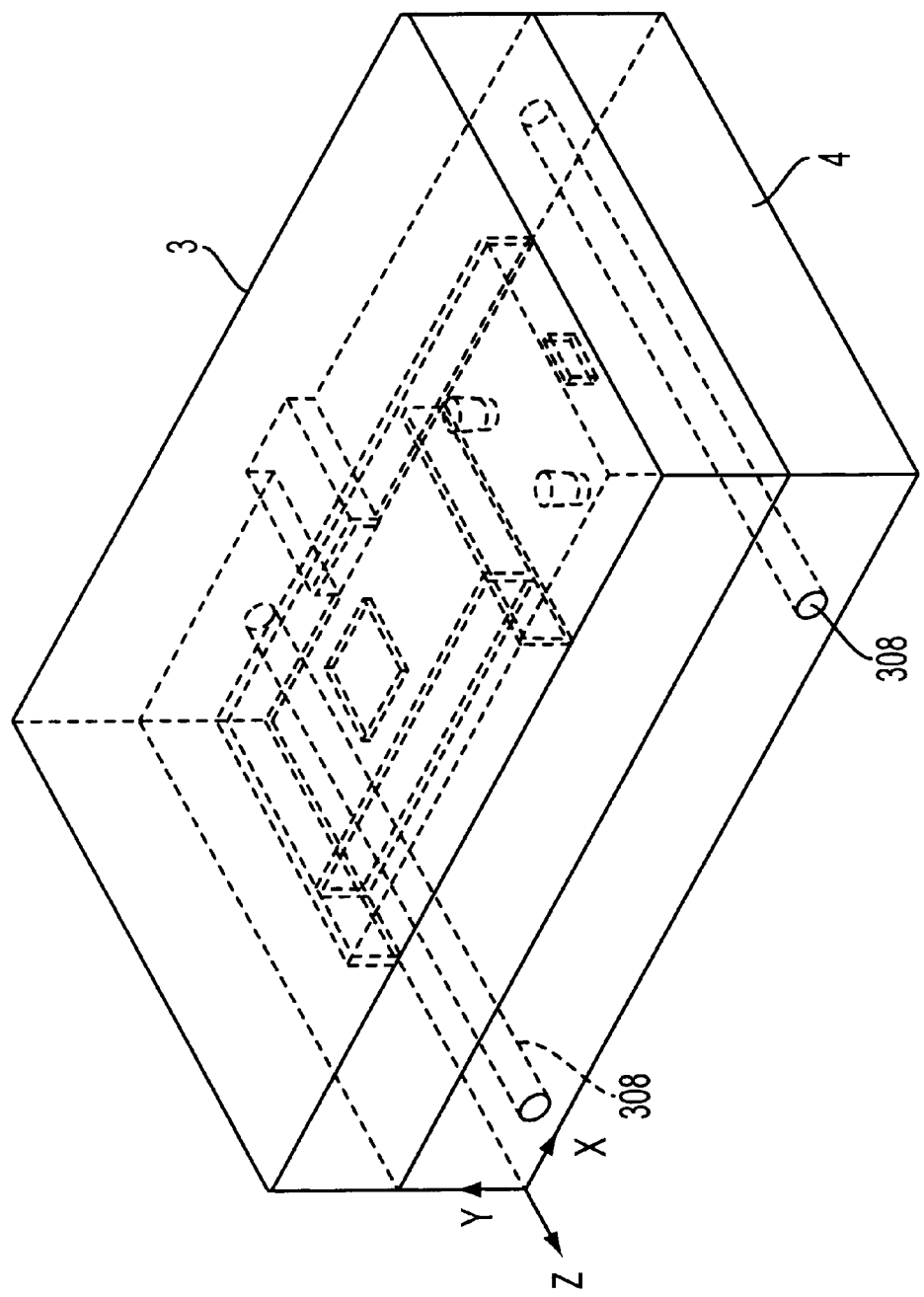
FIG. 55 is an isometric drawing showing the mold when designing the cooling path according to the seventeenth embodiment of the present invention.

FIG. 54 is a view showing an image when designing the cooling path according to the seventeenth embodiment of the present invention. FIG. 55 is the isometric drawing of the mold when designing the cooling path according to the seventeenth embodiment of the present invention. In this process, the cooling path for cooling the mold may be designed in the temperature adjusting structure designing section 67.

FIG. 54 shows a menu screen displayed on the display 19. The designer may select "8. cooling path design" from this menu screen. On the menu screen, selection item for formation/deletion of the cooling path, designation item for the cooling path forming plane, input item for the hole diameter of the cooling path, input item for configuration (layout) coordinate are displayed. On the display 19, the X·Z flat plane (front plane) and Y·Z flat plane (side plane) of the cooling path designated by the designer may be two-dimensionally displayed, hole diameter of the cooling path may be displayed as numerical values, configuration coordinate of the cooling path may be displayed as numerical values, and so forth. FIG. 55 shows the cooling path three-dimensionally in the mold block in which the mold is included. In the seventeenth embodiment, two cooling paths are provided in the core 4.

In FIG. 54, the designer may first display the mold design menu screen on the display 19, and then select "cooling path design".

Then, the isometric drawing of the mold consisting of the cavity 3 and the core 4 as shown in FIG. 55 may be displayed on the display 19. In FIG. 55, cooling pipes 308 may cool the mold upon forming the resin.

In the temperature adjusting structure designing section (abbreviated simply as "temperature adjusting section" hereinafter) 67, a flat plane on which the cooling pipes 308 are arranged may be determined according to instruction of the designer. The flat plane may be set as the X·Y flat plane during designing the cooling path. The designer may arrange the cooling pipes 308 on the designated position. At this time, the designer may designate hole diameter of the cooling pipes 308. In the seventeenth embodiment of the present invention, plural positions may be designated continuously. If a "cancel" button of the menu screen is pushed, then position designation has been completed.

In this fashion, according to the mold design method of the seventeenth embodiment, it would be obvious that, by selecting either structure of the cooling pipes 308 stored as patternized information preliminarily, the designer may display the selected cooling pipes 308 on the perspective view of the mold model on the display 19. It should be noted that, since the structure design of the cooling pipes 308 may be facilitated if the designer inputs numerical values such as hole diameter, position, PT screw nominal size via the keyboard 17, the designer may obtain the structure of the cooling pipes 308 without designing the cooling pipe structure at the beginning, and that a burden of the designer can be extremely reduced. Since required parameters have been prepared as patternized information preliminarily, design operation can be simplified. Furthermore, since the input items can be reduced extremely because of patternized information, the cooling pipe 308 can be designed in a short time.

(18) Eighteenth Embodiment

Figure 56A:
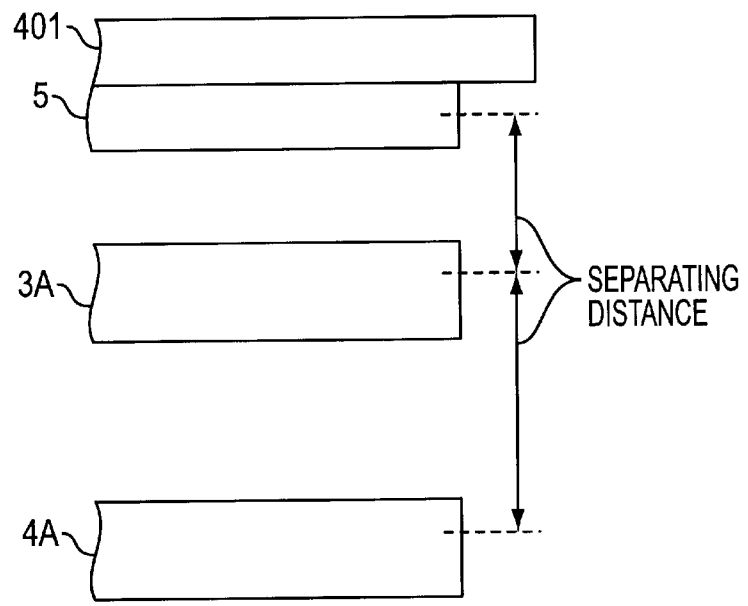
FIGS. 56A and 56B are segmental side views showing the mold when designing a link structure according to an eighteenth embodiment of the present invention.
Figure 56B:
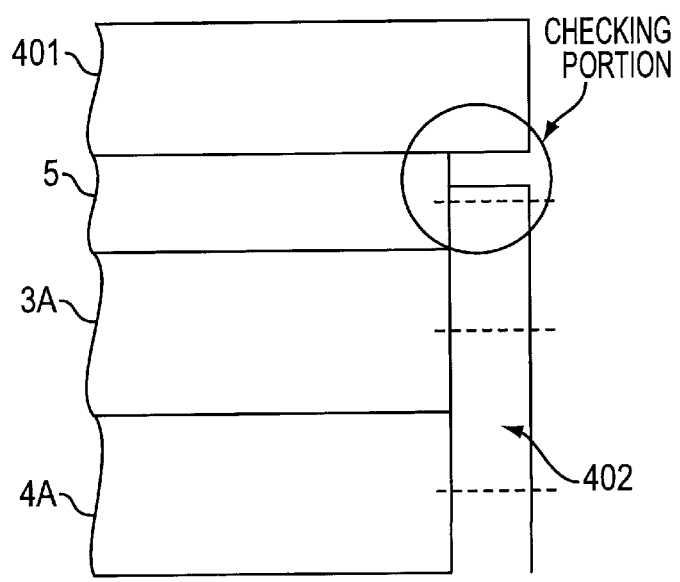

FIGS.56A and 56B shows a sectional view of the mold when designing a link structure of three-plate type according to the eighteenth embodiment of the present invention. In FIG. 56A, a reference 401 denotes a fixing side clamping plate constituting a main body of the injection mold machine; 5, runner stripper plate in which the runner is provided; 3A, cavity plate in which the cavity is provided; and 4A, core plate in which the core is provided. These plate structure may be patternized in advance.

First the designer may select the mold opening control structure from the menu screen displayed on the display 19. For the mold opening control structure, the link, puller bolt, etc. have been prepared as patternized information. As shown in FIG. 56A, the display 19 may display the fixing side clamping plate 401, the runner stripper plate 5, the cavity plate 3A, and the core plate 4A. Next, the designer may input necessary dimensions such as positions of the plates 5, 3A and 4A, a separating distance between the plate 5 and the plate 3A, a separating distance between the plate 3A and the plate 4A, etc. via the keyboard 17.

Next, in FIG. 56B, it may be checked whether or not interference resides between the link (coupling portion) and plates (i.e., whether they may contact with each other or not). A reference 402 denotes a link which may couple these three plates. As shown in FIG. 56B, the display 19 may display the view in which the fixing side clamping plate 401, the runner stripper plate 5, the cavity plate 3A, and the core plate 4A are stacked and three plates 5, 3A and 4A are coupled by the link.

The designer may check whether or not clearance is created between the fixing side clamping plate 401 and the link 402. This clearance must be checked to confirm whether or not the link 402 and the fixing side clamping plate 401 can be combined with each other without mutual engagement when three plates 5, 3A and 4A are clamped to the mold. If there has been no clearance between them, warning, interference, etc. would be displayed on the display 19. With watching the screen on the display 19, the designer may correct them.

As discussed earlier, according to the mold design method of the eighteenth embodiment of the present invention, it would be obvious that, when the designer select any one of structures of the link 402 being patternized preliminarily and stored in the storing means, the display 19 may display the selected link 402 on the perspective view of the mold model. Also, by inputting the separating distances between respective plates 5, 3A and 4A via the keyboard 17, the designer may check whether or not clearance has been created between the fixing side clamping plate 401 and the link 402.

Accordingly, it would be evident that, since the designer may effect structure design of the link structure 402 merely by inputting separating distances required for mold opening in the injection molding machine, he or she may obtain the link structures without designing the link structure at the beginning, and that a burden of the designer can be extremely reduced. The designer may design the link structures unless he or she knows mold opening operation as to three-plate type structure well. It would also be evident that, since the mold opening structure have been prepared as patternized information preliminarily, the input items can be reduced extremely, and that the three-plate type link can be designed in a short time.

(19) Nineteenth Embodiment

Figure 57:
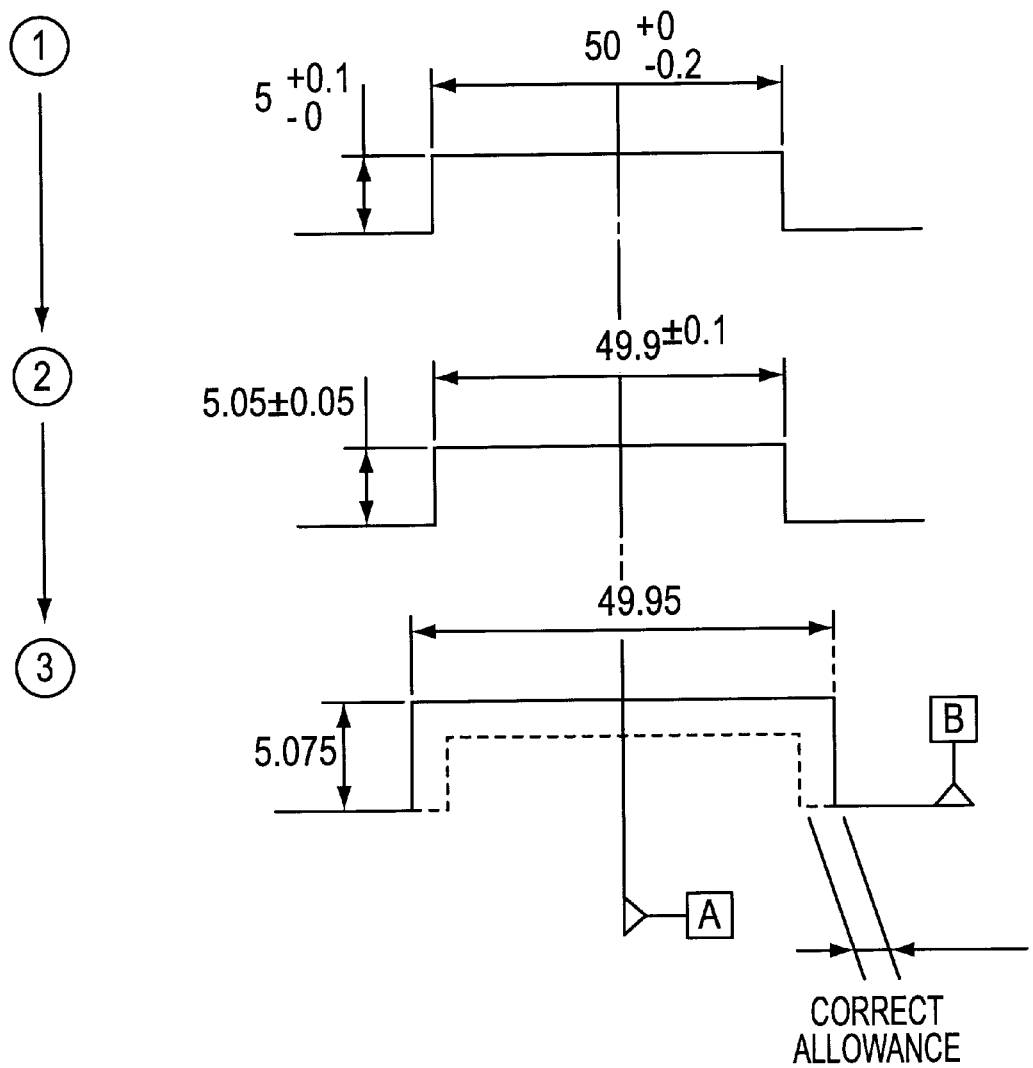
FIG. 57 is a view explaining dimensional tolerance according to a nineteenth embodiment of the present invention.

FIG. 57 is a view showing dimensions of parts having dimensional tolerance according to the nineteenth embodiment of the present invention. In the nineteenth embodiment of the present invention, if the dimensional tolerances have already been decided between parts of the mold model, as shown in FIG. 57, half tolerance of the dimension of given parts may automatically modified to central tolerance. By way of example, as shown in ① of FIG. 57, the display 19 may display a dimension 50 as a width of the parts, and also display an upper limit +0 and a lower limit −0.2 like "50 +2 −0.2" as half tolerance therefor. As for a height of the parts, it may display an upper limit +0.1 and a lower limit −0 like "5 +0.1 −0" as half tolerance for a height of 5. The product shape is displayed by central values.

In the nineteenth embodiment of the present invention, as shown in ② of FIG. 57, the designer may switch the display into central tolerance via the keyboard 17. In this event, as shown in FIG. 57, the display 19 may change the width 50, upper limit +0, and lower limit −0.2 of the parts into 49.9±0.1. With regard to the parts having the height 5, upper limit +0.1 and lower limit −0, the display may be changed into 5.05±0.05. Now a dimension $\epsilon$ may be displayed as $\alpha \pm \delta$. A central value $\epsilon$ is $\epsilon = \alpha + [(\beta + \gamma)/2]$, and an error $\delta$ is $\delta = [(\beta - \gamma)/2]$ and $\delta > 0$. The half tolerance is also referred to as modification direction tolerance.

Besides, in the nineteenth embodiment of the present invention, as shown in ③ of FIG. 57, the screen on the display may be changed to designer's objective dimension (working target dimension) by varying the central tolerance of the dimension of the parts into the half tolerance. The width of the parts of 49.9±0.1 may be modified to 49.95. The height of the parts of 5.05±0.05 may also be modified to 5.075. Thus, as shown in FIG. 57, correct allowance may be provided in the directions A and B. Where the working target dimension η may be displayed like $\eta = \epsilon + \delta \cdot \kappa \cdot \kappa$ is a parameter for the target dimension. In the nineteenth embodiment, $\kappa = +\frac{1}{2}$ may be applied.

If the dimensional tolerance has been fixed between the parts of the mold model, the designer may select either the central tolerance or the half tolerance for the dimensions of the given parts. Thus, based on the central tolerance or the half tolerance, the display 19 may display modified dimensional tolerance between the parts of the mold model.

As mentioned above, in the mold design method of the nineteenth embodiment of the present invention, if the mold dimensions and the parts dimensions have been given in terms of the half tolerance, the display 19 may display the central tolerance being modified from the half tolerance in accordance with instruction of the designer. Therefore, the designer can confirm target working dimensions of the intended mold or the intended parts on the screen.

Further, in the mold design method of the nineteenth embodiment of the present invention, even if the mold dimensions and the parts dimensions have been given by means of the central tolerance, the display 19 may display the half tolerance being modified from the central tolerance in accordance with instruction of the designer. Therefore, the designer can change target working dimensions of intended mold or parts on the screen. As a result, the dimensions may be modified in the direction to which correct allowance has been permitted and within limit tolerance.

According to the nineteenth embodiment of the present invention, in the event that the designer has selected either the central tolerance or the half tolerance for the dimensions of the given parts via the keyboard 17, the display 19 may display modified dimensional tolerance between the parts of the mold model based on the central tolerance or the half tolerance. Therefore, it would be apparent that the designer can edit target working dimensions of intended mold or parts on the screen. Thus, artificial error due to missing of the dimensional tolerance, etc. can be eliminated. The mold can be designed with considering the dimensional tolerance.

In the first to nineteenth embodiments of the present invention, although the methods for designing the mold by reading individual data have been explained, another method for designing the mold by reading data groups to which attributes (names) are assigned respectively will be explained in the twenty-seventh embodiment.

(20) Twentieth Embodiment

Figure 58:
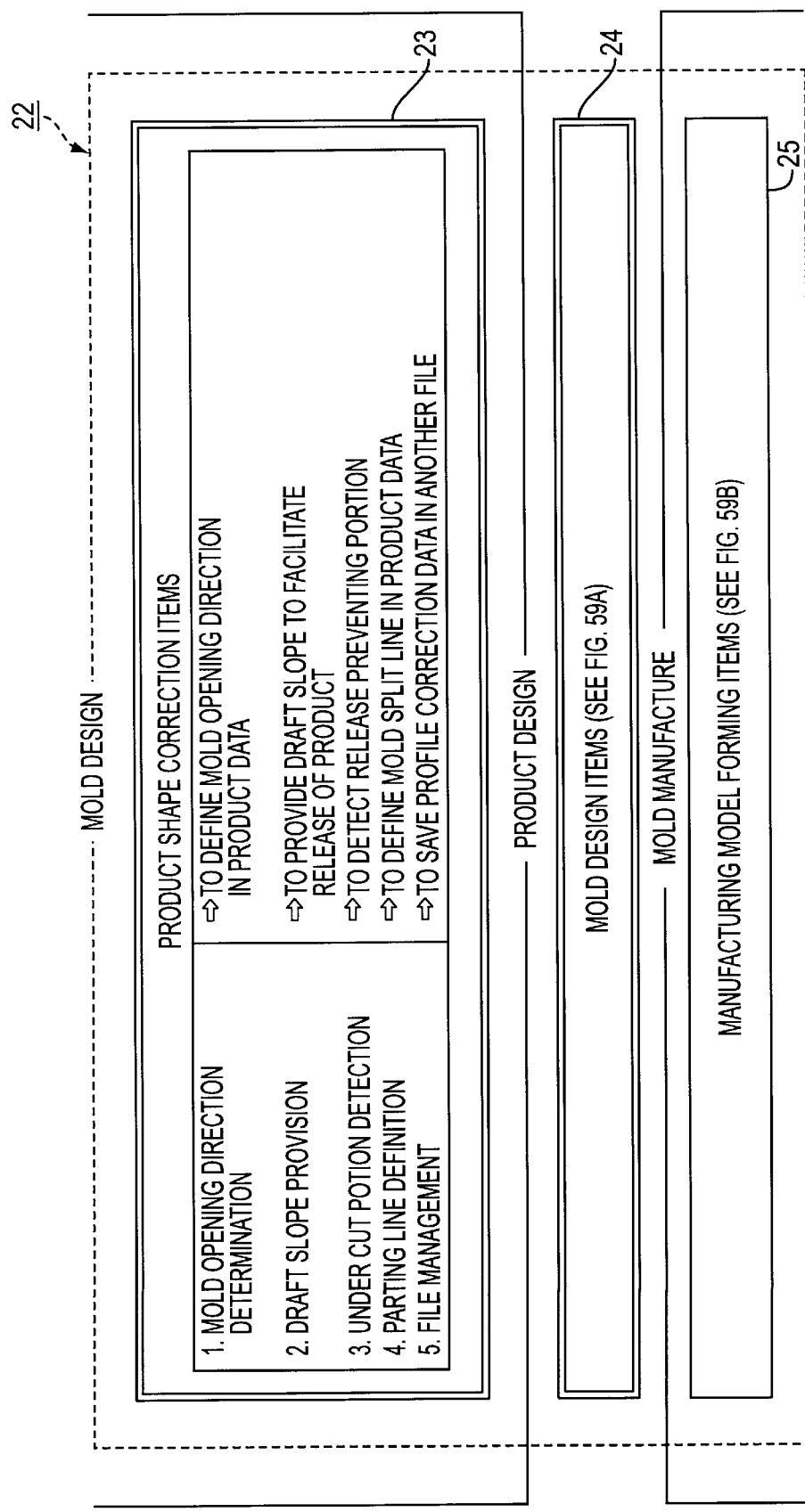
FIG. 58 is a view illustrating a menu system of the mold design system according to a twentieth embodiment of the present invention.

FIGS. 58 to 60 are views illustrating a design item system of the mold design system according to the twentieth embodiment of the present invention. In the twentieth embodiment, mold design items are registered preliminarily in the design system to effect the mold design readily and quickly.

In FIG. 58, a reference 22 denotes mold design items. The mold design items 22 are stored in the other memory 21 and are classified roughly into three groups. A reference 23 denotes product shape correction items. The correction items 23 are registered contents of preliminary between the mold designer and the mold designer to be conducted at the time when the construction of the mold is started. The contents of correction items are, for example, determination of mold opening direction, provision of draft slope to the product, detection of undercut, definition of the parting line, design of the gate, and file management.

The following will be the design items. The mold opening direction may be decided to "Z direction" in which the product is released from the core. The draft slope may be provided to facilitate release of the product from the core. Since the undercut prevents releasability of the product, the core must be formed as the nest structure. The parting line is formed to obtain the parting plane for splitting the mold block into the cavity and the core. The gate is provided to inject the resin into the cavity portion between the cavity and the core. Product shape correction data being derived by correcting the product shape in compliance with the product shape correction items 23 are stored in the work memory 13 and then managed.

Figures 59A, 59B:
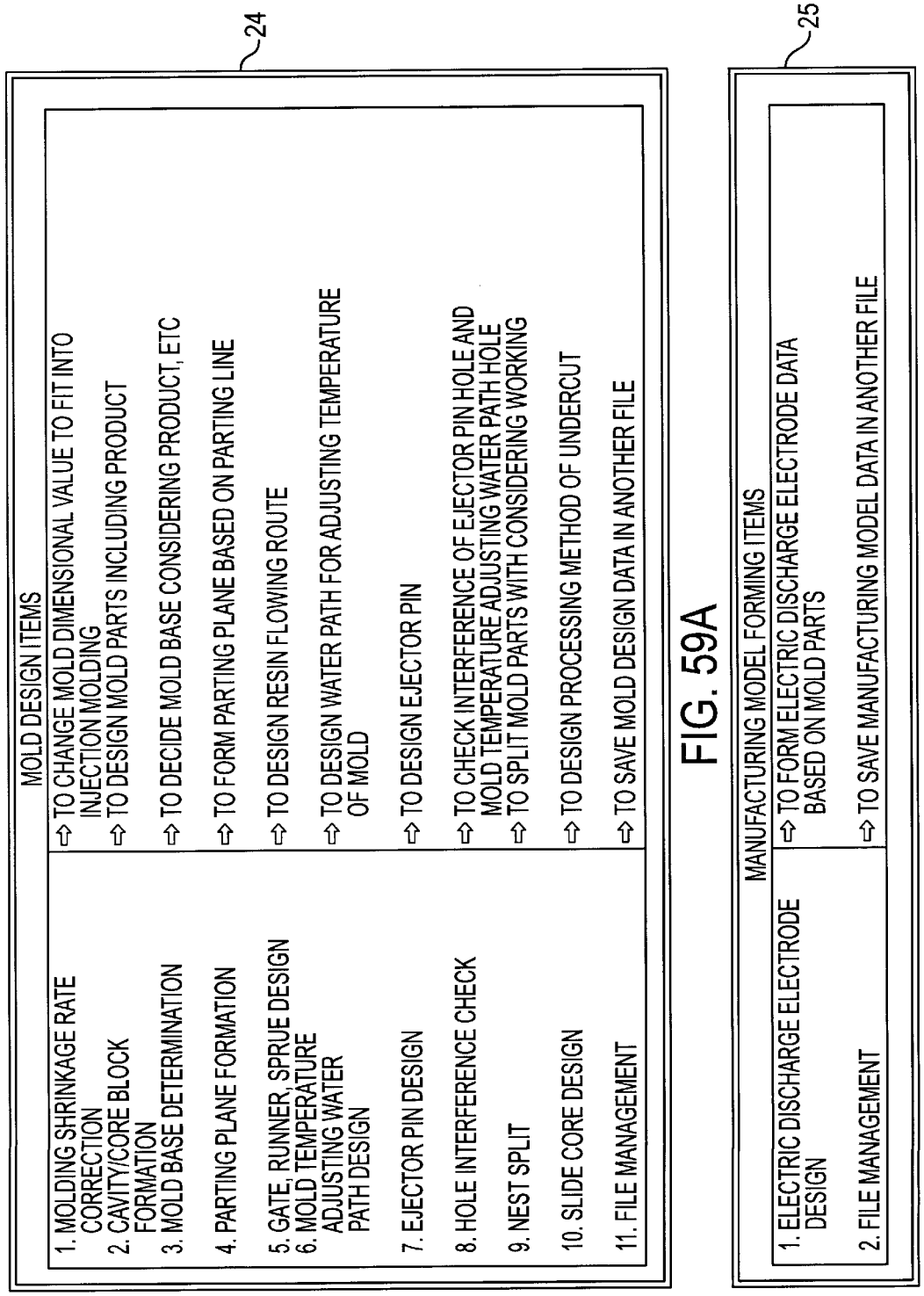
FIGS. 59A and 59B are views respectively illustrating another menu system of the mold design system according to the twentieth embodiment of the present invention.

In FIG. 59A, a reference 24 denotes mold design items. The mold design items 24 for the mold designer's exclusive use are, for example, correction of molding shrinkage rate, formation of cavity/core block, determination of mold base, formation of the parting plane, design of gate, runner, and sprue, design of mold temperature adjusting water path, design of ejector pin, check of hole interference, split of nest structure, design of slide core, and file management.

The design contents are as follows. In order to improve releasability of the product, the cavity and the core of the mold may be designed by modifying the dimensions according to shrinkage rate of the product. The cavity and the core may be designed by splitting the mold block by means of the parting plane. The mold base may be designed by selecting plates, to which the cavity and the core being fixed, and their fixing parts. The parting plane may be designed by selecting the parting line. The gate, runner, and sprue, these constituting resin flowing route, may be designed by selecting respective sectional shapes according to viscosity of the resin. The mold temperature adjusting water path (cooling water path) may be designed by considering other hole profiles.

The ejector pin may be designed by checking interference with the mold temperature adjusting water path. The undercut portion of the product may be formed by splitting the core into nests. The nest parts may be designed slidably in the X direction or Y direction.

In FIG. 59B, a reference 25 denotes manufacturing model forming items. The forming items are incorporated for use in the mold designer and the mold manufacturer. The contents of the forming items are electric discharge machining electrode design, file management, and the like. The electric discharge machining electrodes are manufacturing jigs for machining the inner surface of the cavity. In order to round the edge of the moldings, the inner edge of the cavity may be worked to form the circular cylinder surface by the manufacturing jigs. Working data (NC data) used to fabricate the electrodes may be stored in the work memory 13 and then managed. Note that these design items may be stored in the memory 21 shown in FIG. 2. On starting the design system, these design items may be displayed on the display 19 shown in FIG. 2.

FIG. 60 illustrates classification of the design items in the mold design system. In FIG. 60, the product designer may design the product shape to be molded by the injection mold. In compliance with the product shape correction items 23 of the mold design system, the product designer may effect determination of the mold opening direction, provision of the draft slope to the product, detection of the undercut portion, definition of the parting line, design of the gate, and file management. The product designer may offer the product shape correction data to the mold designer. Note that the product shape correction operation may be executed by the mold designer.

In turn, according to the mold design items 24, the mold designer may effect, for example, correction of molding shrinkage rate, formation of cavity/core block, determination of mold base, formation of the parting plane, design of gate, runner and sprue, design of mold temperature adjusting water path, design of ejector pin, check of hole interference, split of nest structure, design of slide core, and file management. The mold designer may offer the mold parts data to the mold manufacturer. Then, according to the manufacturing model forming items 25, the mold manufacturer may execute electric discharge machining electrode design, file management, etc. It should be noted that manufacturing model formation may be done by the mold designer.

As described above, according to the design item system of the mold design system according to the twentieth embodiment of the present invention, the design items of the mold have been roughly classified into three categories, i.e., product shape correction items, mold design items, and manufacturing model formation items, and then registered in the system.

Therefore, determination of the mold opening direction, provision of the draft slope, detection of the undercut portion, definition of the parting line, gate design, etc. may be effected in compliance with the product shape correction items, i.e., the contents of preliminary between the product designer and the mold designer conducted when starting construction of the mold.

Furthermore, correction of molding shrinkage rate, formation of cavity/core block, determination of mold base, formation of the parting plane, design of gate, runner and sprue, design of mold temperature adjusting water path, design of ejector pin, check of hole interference, split of nest structure, design of slide core, etc. may be effected in compliance with the mold design items being incorporated for use in the mold designer only.

Moreover, design of the electric discharge electrodes may be effected in compliance with the manufacturing model formation items being incorporated for use in the mold designer and the mold manufacturer. In that case, since software resources of the system can be commonly used by the product designer, the mold designer, and the mold manufacturer, design of the mold can be done easily and quickly. Preliminary and transfer of the product shape data can be effected smoothly when designing the mold, and processes required for the designers from the product design to the mold design can be reduced. A design method of the manufacturing jigs of the mold parts will be explained in the twenty-ninth embodiment.

(21) Twenty-first Embodiment

Figure 61:
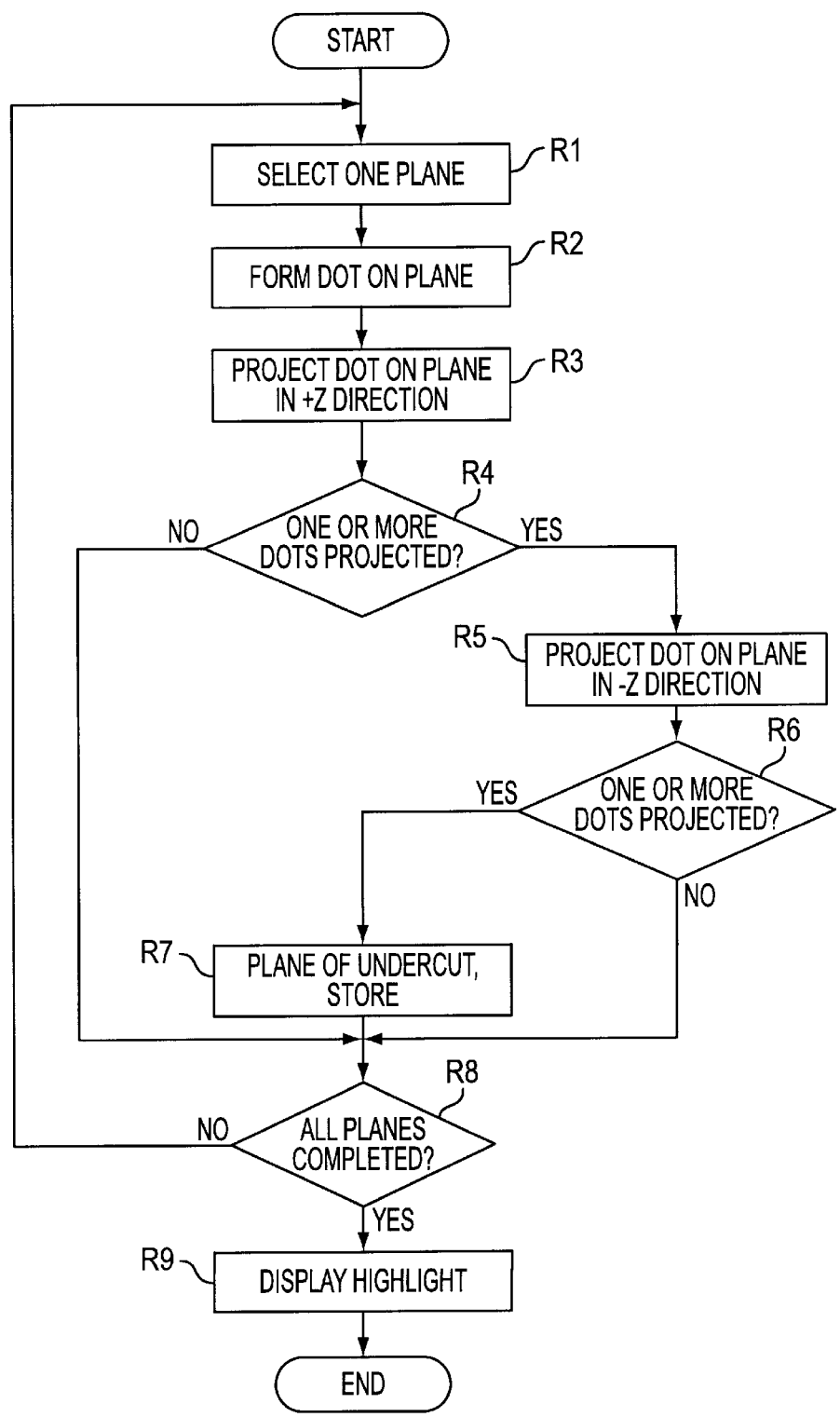
FIG. 61 is a flowchart illustrating detection of the undercut in the product shape according to the twenty-first embodiment of the present invention.
Figure 62A:
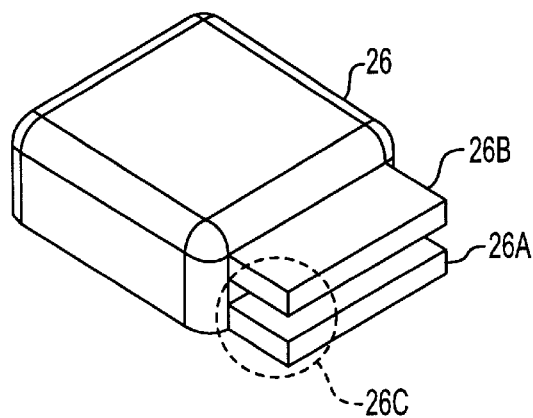
FIGS. 62A to 62C are views showing the product shape with the undercut according to the twenty-first embodiment of the present invention.

FIG. 61 is a flowchart illustrating detection process of the undercut portion of the product according to the twenty-first embodiment of the present invention. FIGS. 62A to 62C, 63A and 63B are views illustrating supplementary explanations. In the twenty-first embodiment, as shown in FIG. 62A, detection of the undercut portion of the product shape 26 having two eaves shapes will be explained. In FIG. 62A, a reference 26A denotes a first eaves shape which extends from one side of the product shape 26 laterally, and a reference 26B denotes a second eaves shape which is formed beneath the first eaves shape 26A. It may be detected whether or not the portion existing between two eaves shapes 26A and 26B functions as the undercut portion 26C.

Figure 62B:
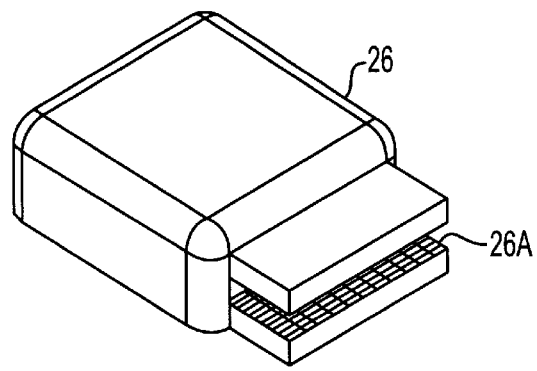

In FIG. 61, in step R1, the designer may first select one of planes constituting the product shape 26. For example, an upper plane of the eaves profile 26A as shown in FIG. 62B may be selected. In FIG. 62B, the display 19 may display a lattice-like image of the selected plane on the screen.

Figure 62C:
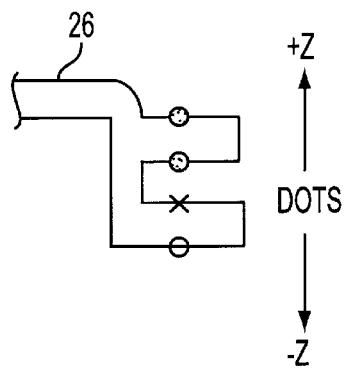

In step R2, the parting line forming section 41 may form dot lines on the upper surface of the eaves shape 26A. It is preferable that plural dot lines are prepared. For instance, the dot lines may be formed on the intersecting points of the lattice. In the sectional view of the product shape 26 in FIG. 62C, a X mark is the location of the dot lines and, for purposes of simplicity in the explanation, only one point is illustrated. Then, in step R3, the parting line forming section 41 may project the dot lines on the plane of the eaves profile 26A in the +Z direction. In FIG. 62C, a black round mark is the projected location in the +Z direction.

In step R4, the parting line forming section 41 may detect whether one or more dot lines can be projected onto other planes or not. In the example in FIG. 62C, dots are projected onto respective edges of upper and lower portions of the eaves profile 26B (two-point projection). If no dot line can be projected on other planes in step R4 (NO), then the process proceeds to step R8. On the contrary, if one or more dot lines can be projected onto other planes in step R4 (YES), then the process advances to step R5.

In step R5, the parting line forming section 41 may project the dot lines on the plane of the eaves profile 26A in the −Z direction. In the example in FIG. 62C, a white round mark is the projected location in the −Z direction. In step R6, the parting line forming section 41 may detect whether one or more dot lines can be projected onto other planes or not. In the example in FIG. 62C, dots are projected onto an edge of the lower portion of the eaves profile 26A (one-point projection).

If no dot line can be projected on other planes in step R6 (NO), then the process proceeds to step R8. Conversely, if one or more dot lines can be projected onto other planes in step R6 (YES), then the process advances to step R7.

In step R7, the plane may be stored as the plane constituting the undercut portion 26C in the work memory 13.

In step R8, the designer may decide whether or not detection of the undercut has been completed with respect to all planes. Unless detection of the undercut has been completed in step R8 (NO), the process returns to step R1 where one plane may be selected. Subsequently, steps P2 to P8 are repeated once again.

Figure 63A:
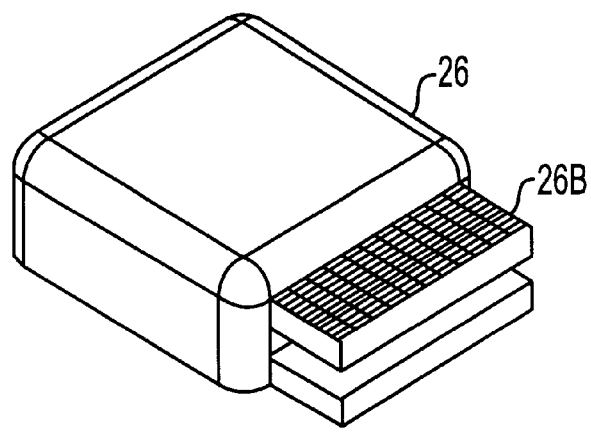
FIGS. 63A and 63B are views showing the product shape without the undercut according to the twenty-first embodiment of the present invention.

By way of example, the upper plane of the eaves profile 26B as shown in FIG. 63A has been selected in step R1. In FIG. 63A, the display 19 has displayed the lattice-like image of the selected plane on the screen.

Figure 63B:
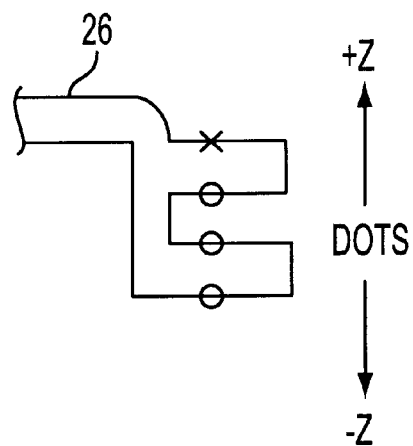

In step R2, the parting line forming section 41 may form dot lines on the upper surface of the eaves shape 26B. In FIG. 63B, a X mark is the location of the dot lines and, for purposes of clarification of the explanation, only one point is illustrated. In this example, there is shown the case wherein dots are projected onto e lower edge of the eaves profile 26B and upper and lower edges of the eaves profile 26A (three-point projection).

Then, in step R3, the parting line forming section 41 may project the dot lines on the plane of the eaves profile 26B in the +Z direction. In step R4, the parting line forming section 41 may detect whether one or more dot lines can be projected onto other planes or not. In the example in FIG. 63A, since there is no projection plane, dots on the plane of the eaves profile 26B cannot be projected in the +Z direction (zero-point projection). If no dot line can be projected on other planes in step R4 (NO), then the process proceeds to step R8.

If detection of the undercut has been completed with respect to all planes in step R8 (YES), then the process advances to step R9 where constituting plane of the undercut portion may highlighted on the screen of the display 19.

According to the method for detecting the undercut portion of the product shape according to the twenty-first embodiment of the present invention, it would be obvious that, by forming dot lines on the constituting plane of the product and detecting whether or not these dot lines can be projected onto other plane located in the ±Z direction, the undercut portion can be detected easily and in a short time in contrast to the seventh embodiment of the present invention.

(22) Twenty-second Embodiment

Figure 64:
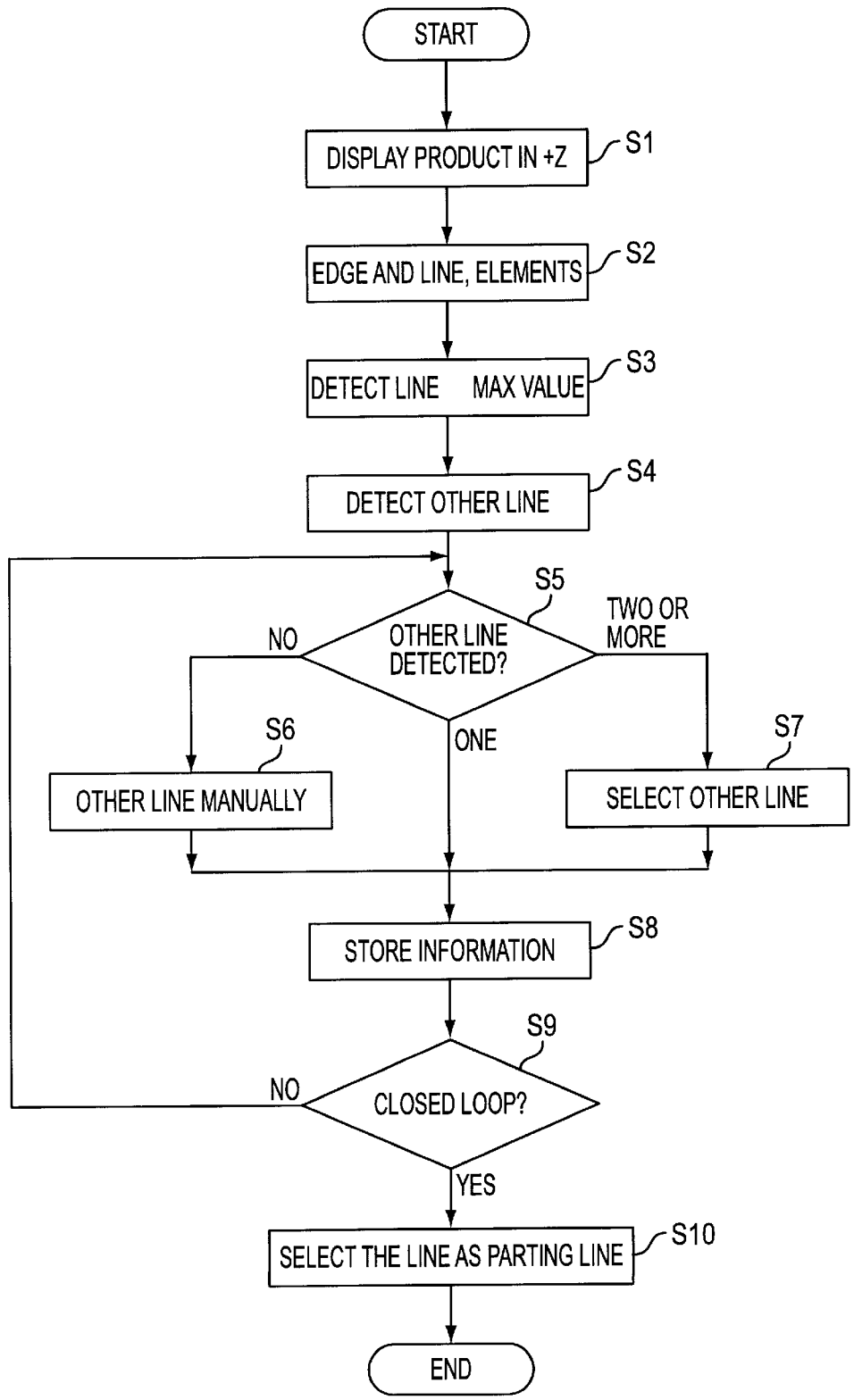
FIG. 64 is a flowchart illustrating extraction process of the parting line according to a twenty-second embodiment of the present invention.

FIG. 64 is a flowchart illustrating extraction process of the parting line according to the twenty-second embodiment of the present invention. FIGS.65A, 65B and 66A to 66D are views illustrating supplementary explanations. In the twenty-second embodiment, an extracting function of the parting line is simplfied rather than the first embodiment.

Figure 65A:
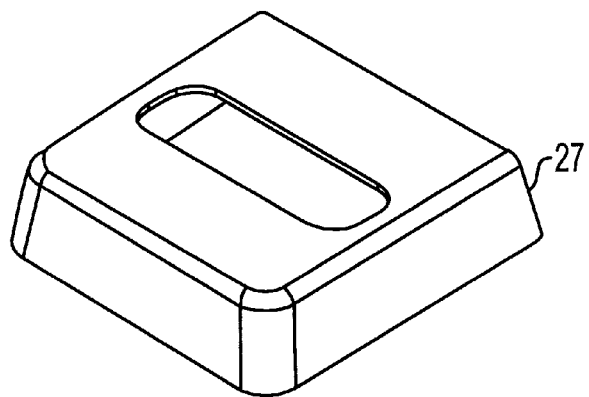
FIG. 65A is a perspective view showing the product shape according to the twenty-second embodiment of the present invention.
Figure 65B:
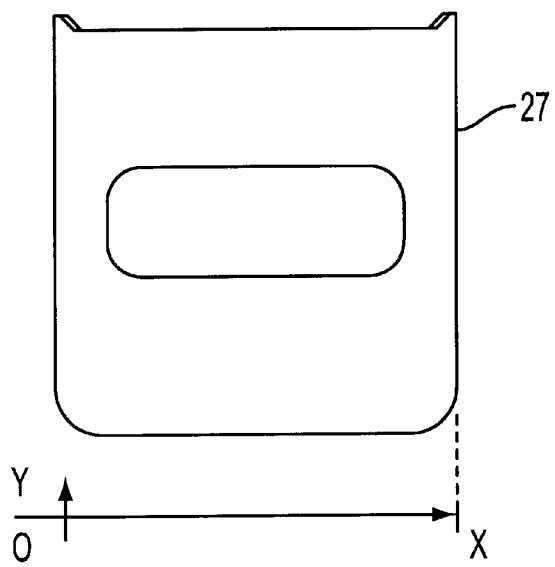
FIG. 65B is a view showing the product shape viewed from the mold opening direction according to the twenty-second embodiment of the present invention.

In FIG. 64, in step S1, the designer may first display a profile of the product shape 27 along the +Z direction on the screen of the display 19. FIG. 65A is a perspective view showing the product shape 27 of the plastics, and FIG. 65B is a view showing the product shape 27 viewed from the mold opening direction (+Z direction). Incidentally, since rear edges of the product shape 27 are obstructive to extraction of the parting line, profile data concerning the rear edges have been unloaded in the memory.

In step S2, the parting line forming section 41 may resolve visible edges of the product shape 27 and the profile lines (edges) into elements. In the example in FIG. 65B, an outermost peripheral profile line and edges of the product shape 27 are resolved into straight line, circular arc, etc. (referred to as "line element" hereinafter).

Figure 66A:
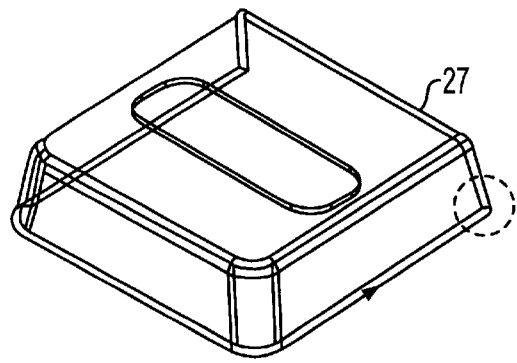
FIGS. 66A to 66D are views illustrating displayed examples on the display device when extracting the parting line according to the twenty-second embodiment of the present invention.

Next, in step S3, the parting line forming section 41 may detect a line element having maximum value in the horizontal direction (X direction) of the display screen according to instruction of the designer. This is because extraction candidates of the parting lines must be narrowed to some extent by retrieving the line elements roughly. Detected line elements may be stored in the work memory 13. In step S4, the parting line forming section 41 may detect other line elements being adjacent to the line elements having the maximum value in the X direction. At this time, the display 19 may display the perspective view of the product shape 27, as shown in FIG. 66A. Then, profile data relating to rear edges may be read out from the work memory 13, and the parting line is displayed superposedly on the perspective view of the product shape 27. Other line elements being adjacent to the line elements having the maximum value in the X direction may be stored in the work memory 13 as the candidates of the parting line.

Figure 66B:
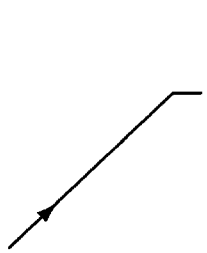
Figure 66C:
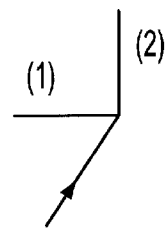
Figure 66D:
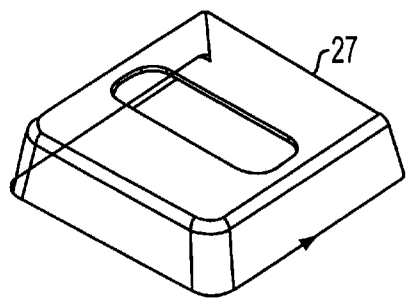

In step S5, depending upon the cases wherein there is no other line element adjacent to the line element and wherein two line elements or more are present as shown in FIG. 66C, the designer may provide instruction to the system via the keyboard 17. According to the contents of instruction, in case there has been no other line element adjacent to the line element, the process goes to step S6 where the line elements are formed manually. Alternatively, in case there have been two line elements (1), (2) being adjacent to the line element as shown in FIG. 66C, then the process advances to step S7 where the designer may select either line element (1) or line element (2) manually. As shown in FIG. 66B, in case there has been one other line element being adjacent to the line element, the process proceeds to step S8.

In step S8, the system may store other line element being adjacent to the line element in the work memory 13 as the candidates of the parting line. In step S9, it may be detected whether or not the line elements having the maximum value in the X direction have been detected as adjacent curves, i.e., the line elements have formed a closed loop.

Unless the line elements have formed the closed loop in step S9 (NO), the process returns to step S5. Until the line elements can form the closed loop, then steps S5 to S8 are repeated.

If the line elements have formed the closed loop in step S9, that is, the line elements having the maximum value in the X direction have been detected as adjacent curves (YES), the process goes to step S10 where the line elements may be extracted as the parting line. In FIG. 66C, the parting line of the product shape 27 is shown by the solid line.

According to the extraction method of the parting line of the twenty-second embodiment of the present invention, by retrieving the line elements having the maximum value in the X direction of the product shape viewed from the mold opening direction in step S3, extraction candidates of the parting line have been selected to some extent.

Therefore, it would be evident that the parting line can be extracted in a short time rather than the first embodiment and that in addition the parting line can be extracted in an extremely short time in comparison with the conventional case wherein the parting lines are extracted from the two-dimensional drawing.

(23) Twenty-third Embodiment

Figure 67A:
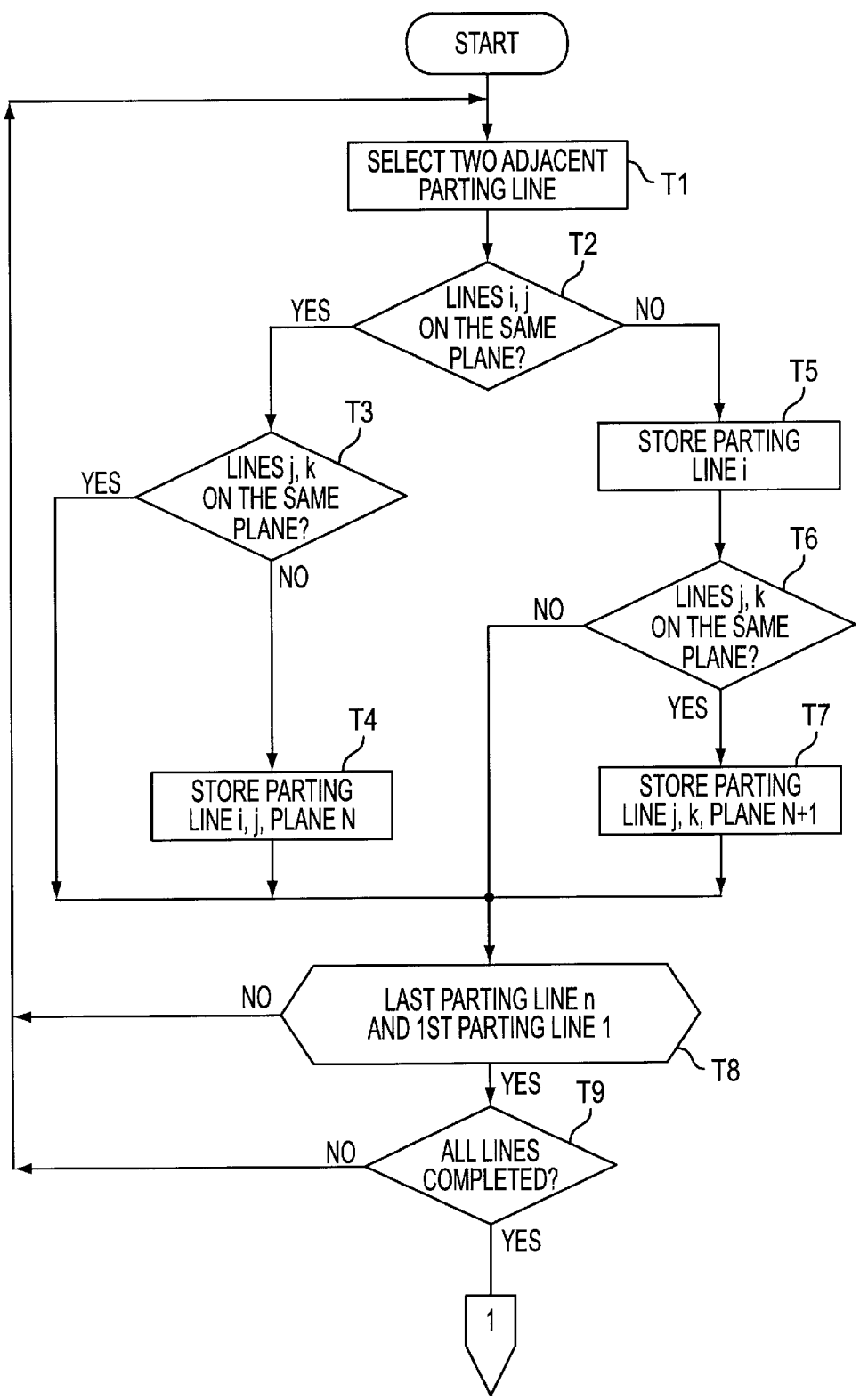
FIGS. 67A and 67B are flowcharts, when taken together, illustrating formation process of the parting plane according to a twenty-third embodiment of the present invention.
Figure 67B:
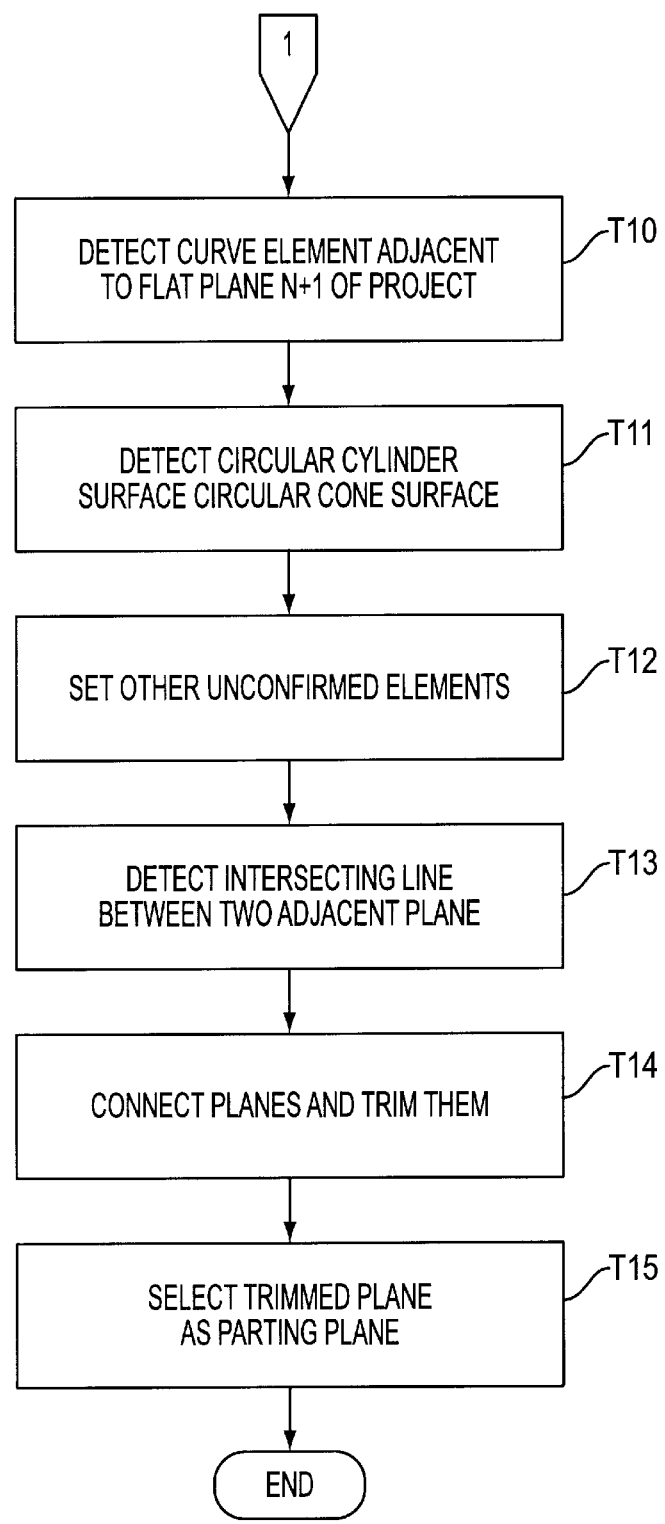

FIGS.67A and 67B are flowcharts illustrating formation process of the parting plane according to the twenty-third embodiment of the present invention. FIGS.68A to 68E are views for use in supplementary explanations. Unlike the ninth embodiment, in the the twenty-third embodiment, a falt surface, a circular cylinder surface, a circular cone surface, and a free-form surface may be extracted correspondingly to whether or not the parting line is on the same flat surface, and then the parting plane can be formed by connecting these surfaces mutually. Note that the mold split section 52 may also have this function.

In FIG. 67A, in step T1, the system may first two adjacent parting lines i, j from n (n=1, 2, 3, . . . i, j, k . . . n) parting lines according to instruction of the designer. In the present embodiment, it is regarded that, when both the parting line surrounding an outside of a certain region and the parting line surrounding an inside of the certain region can exist, the region may constitute the flat surface.

Figure 68A:
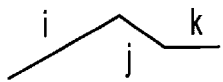
FIGS. 68A to 68E are views showing the parting line and plane elements when forming the parting plane according to the twenty-third embodiment of the present invention.
Figure 68B:
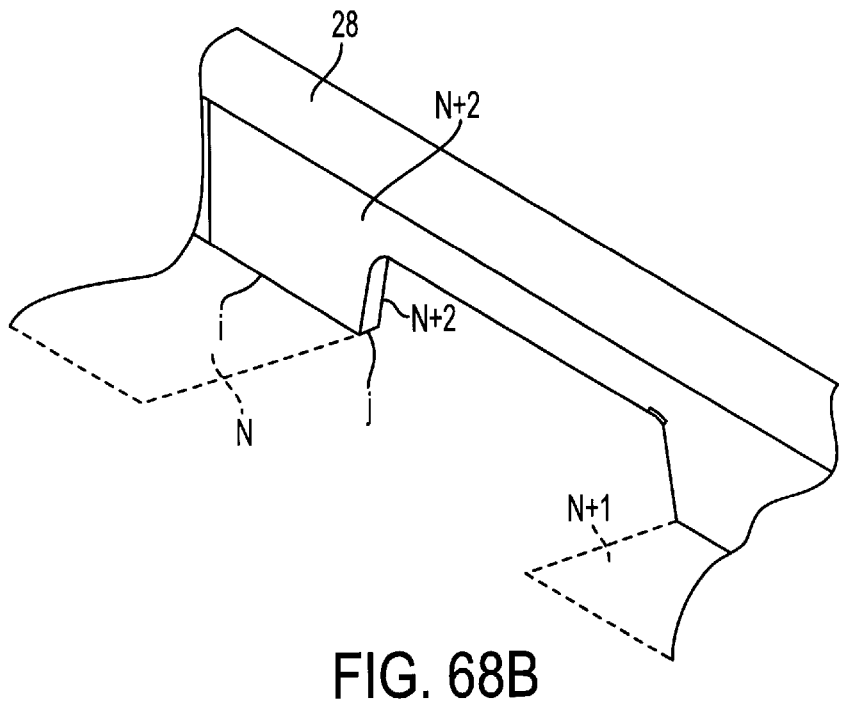

In step T2, it is detected whether or not two adjacent parting lines i, j are on the same flat surface. The detection condition is at this time whether or not two end points constituting a starting point and an end point of the two parting lines i, j and one connecting point are on the same flat surface. If two parting lines i, j are on the same flat surface, e.g., the flat surface N as shown in FIG. 68B (YES), then the process goes to step T3. In step T3, it may be detected whether or not the parting line k adjacent to the parting line j is on the same flat surface. If two parting lines j, k are on the same flat surface N (YES), then the process proceeds to step T8. Unless two parting lines j, k are on the same flat surface N (NO), then the process proceeds to step T4 where two parting lines j, k are stored as elements of the flat surface N.

Conversely, unless two parting lines i, j are on the same flat surface in step T2 (NO), then the process goes to step T5 where the parting line i is stored as an unconfirmed element. In the example in FIG. 68B, the parting line adjacent to the flat surface N of the product shape 28 is the unconfirmed element. Thereafter, this will be stored as the line element of the flat surface N+2.

In step T6, it may be detected whether or not the parting line k adjacent to the parting line j is on the same flat surface. If two parting lines j, k are on the same flat surface N in step T6 (YES), then the process proceeds to step T8. Unless two parting lines j, k are on the same flat surface N (NO), then the process proceeds to step T4 where two parting lines j, k are stored as elements of the flat surface N+1.

In step T8, it may be detected whether or not the last parting line n and the first parting line 1 are on the same flat surface. If the last parting line n and the first parting line 1 have not been on the same flat surface (NO), then the process returns to step T1. Two adjacent parting lines i, j may be selected, thereafter steps T2 to T8 are repeated. If the last parting line n and the first parting line 1 have been on the same flat surface in step T8 (NO), then the process advances to step T9. Where it may be decided whether or not all flat surfaces including the parting line have been detected. If entire flat surfaces have been detected (YES), then the process advances to step T10. Unless entire flat surfaces have been detected (NO), then the process returns to step T1. Two adjacent parting lines i, j may be selected, then steps T2 to T8 are repeated. As a result, all flat surfaces including the parting line have been detected.

In step T10, the designer may detect line elements adjacent to the flat surface N+1 of the product from unconfirmed elements while watching the product shape. This detection of the line elements would be done to confirm presence of the flat surface adjacent to the flat surface N+1. In case all flat surfaces have been detected in steps T2 to T8, the line element being adjacent to the flat surface N+1 is any of circular cylinder surface, circular cone surface and free-form surface.

Figure 68C:
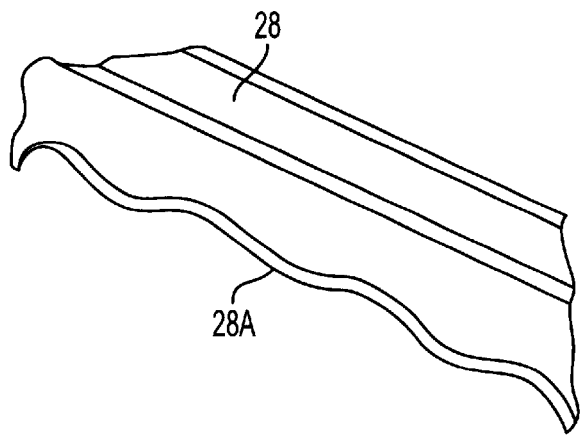
Figure 68D:
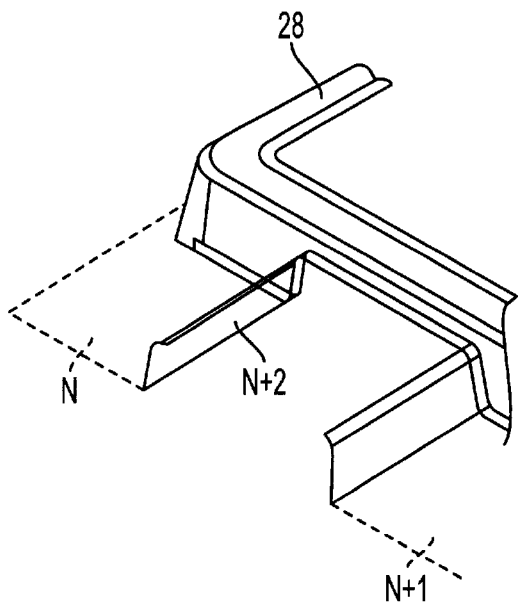

In step T11, the designer may first detect the circular cylinder surface and the circular cone surface from remaining unconfirmed elements. The circular cylinder surface and the circular cone surface can be found in the corner portions where inner surfaces of the product shape 28 intersect with each other. In step T12, other unconfirmed elements may as regarded as elements of sweep surfaces (free-form surfaces). In FIG. 68C, a reference 28A denotes a sweep surface of the product shape 28. This surface is a portion where the profile of the core must be finished to the sweep surface.

In step T13, a borderline on which two adjacent surfaces intersect with each other (referred to as "intersecting line" hereinafter) may be detected. In the example in FIG. 68D, the intersecting line of the product shape 28 can be found on the portion where the flat surface N and the flat surface N+1 intersect with each other. If the intersecting line can be detected, interference between the flat surfaces can be prevented.

Subsequently, in step T14, the surfaces may be connected and then trimmed. In the example in FIG. 68D, the flat surface N and the flat surface N+2 are connected. In addition, the flat surface N+2 and the circular cylinder surface are connected.

Figure 68E:
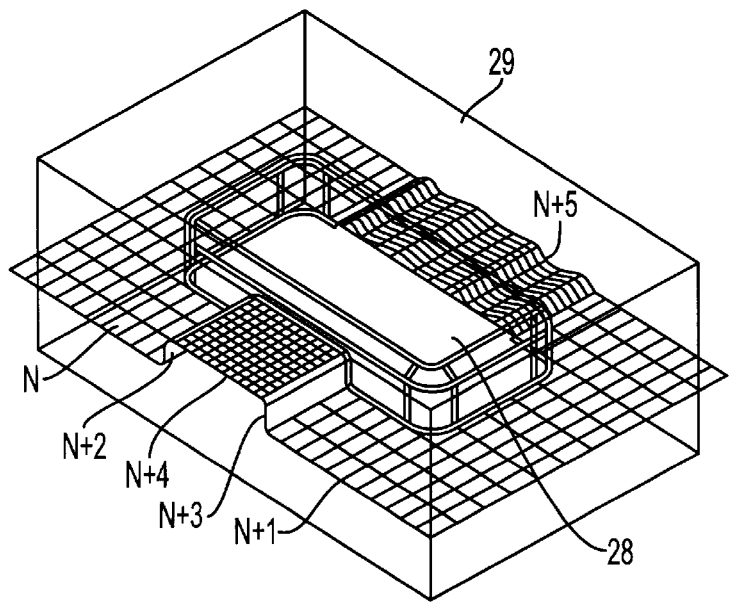

In step T15, trimmed surface has been determined as the parting plane of the product shape 28. FIG. 68E shows the parting plane of the product shape 28. In FIG. 68E, the parting plane of the product shape 28 can be formed by connecting flat surfaces N, N+1, N+4, flat surfaces N+2, N+3 modified by the circular cylinder surface, and the sweep surface N+5. If the parting plane has been determined, the mold block 29 may be split by this parting plane, like the ninth embodiment. Consequently, the cavity block and the core block may be designed.

As discussed above, according to forming method of the parting plane according to the twenty-third embodiment of the present invention, a falt surface, a circular cylinder surface, a circular cone surface, and a free-form surface may be extracted by detecting whether or not the parting line is on the same flat surface, and then the parting plane can be formed by connecting these surfaces mutually.

Therefore, the parting plane of the product shape 28 can be formed readily without projecting the main parting line onto the mold block after the main parting line being extended in the X, Y directions like the ninth embodiment.

(24) Twenty-fourth Embodiment

Figure 69:
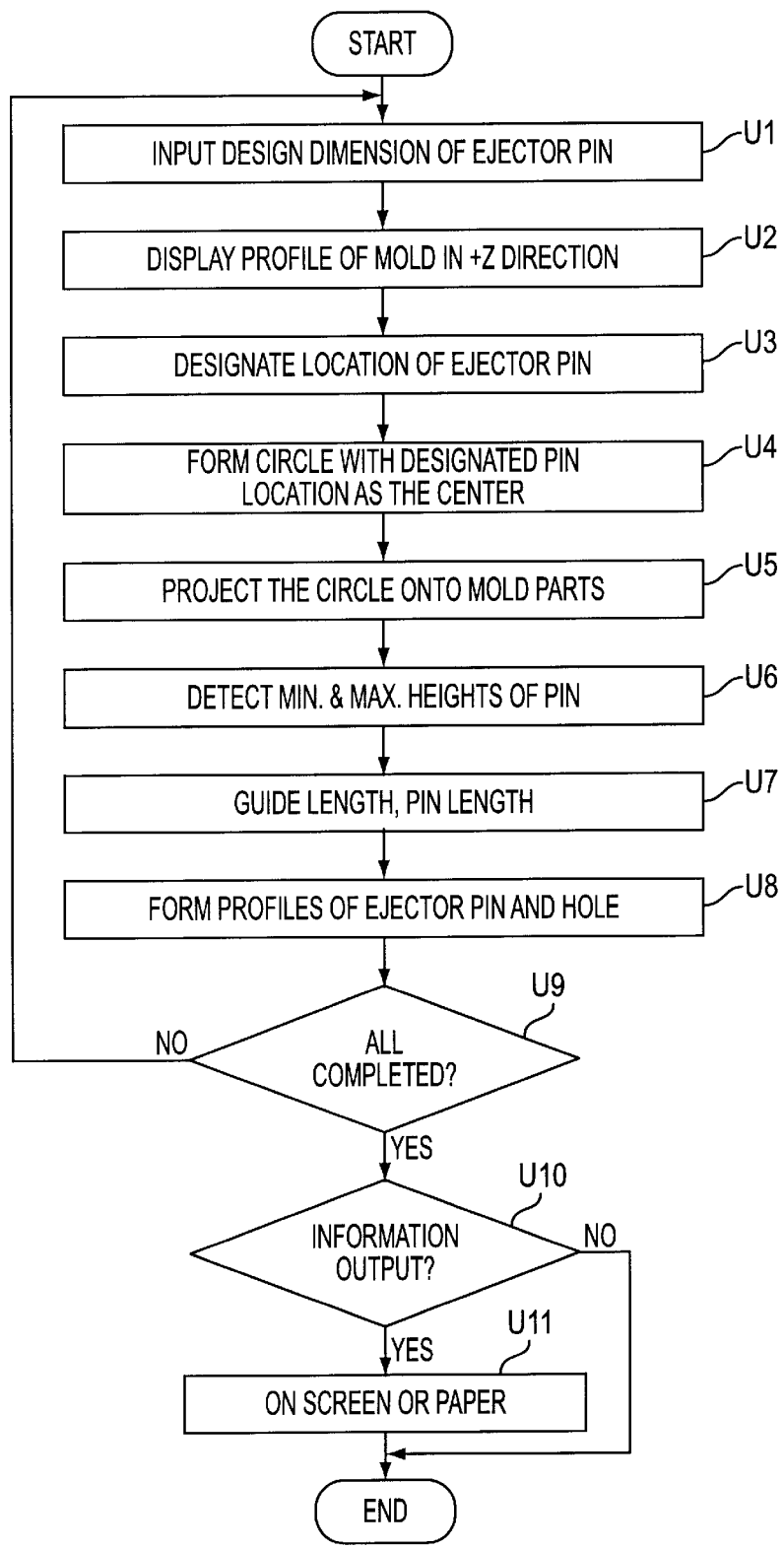
FIG. 69 is a flowchart illustrating design process of the ejector pin according to a twenty-fourth embodiment of the present invention.

FIG. 69 is a flowchart illustrating design process of the ejector pin according to the twenty-fourth embodiment of the present invention. FIGS.70A to 70D are views for use in supplementary explanations. Unlike the above sixteenth embodiment, in the twenty-fourth embodiment, the ejector pin design section may calculate a height of the ejector pin when the designer designates the location of the ejector pin.

Figure 70A:
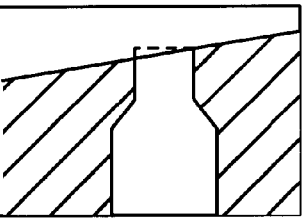

In FIG. 69, in step U1, the designer may first input design dimensions of the ejector pin. Such design dimensions of the ejector pin are input into the design system via the keyboard 17. At that time, a menu screen as shown in FIG. 70A appears on the display 19. Unlike the image view being explained in the sixteenth embodiment, the hole profile of the ejector pin and instruction boxes in which dimensional values are input are displayed in this one menu screen. The designer may input respective dimensional values into the instruction boxes. The dimensional values are ejector pin hole diameter, relief hole diameter, guide length, rib diameter, and so on. The rib serves as a disengage-preventing jig which is provided on the lower end of the ejector pin.

In step U2, the display 19 may display the profile of the core block viewed along the +Z direction in accordance with instruction of the designer. In step U3, the designer may designate the location of the ejector pin on the screen of the display 19. In the example in FIG. 70B, a black round mark on the core block 30 means the pin hole. The ejector pin design section 66 may then detect the pin location coordinates X, Y. The pin location coordinates X, Y are defined by distances from the center of the mold.

The display 19 may display the pin location coordinates X, Y in the instruction window. It is of course that the designer may correct these values via the keyboard 17.

Thereafter, in step U4, the ejector pin design section 66 may then form a circle with the pin designated location as the center. In step U5, the circle may be projected onto the mold parts. The mold parts are, for example, core block 30, core plate (not shown), support plate, upper ejector plate, and the like. There an assumption is needed that design of the mold base has been completed at this time.

In step U6, the ejector pin design section 66 may then detect a minimum height and a maximum height of the ejector pin. The height of the pin is different according to the surface profile of the product. For purposes of example, if the surface of the product is slant, the top end of the ejector pin must be worked to be slant, so that the ejector pin has the minimum height and the maximum height. In FIG. 70C, a black round mark is the maximum height of the ejector pin, while a black star (asterisk) mark is the minimum height of the ejector pin.

In step U7, the ejector pin design section 66 may set the minimum height of the ejector pin as the basis of guide length calculation. The guide length may provide a shift distance (ejection stroke) when the moldings is ejected. The maximum height of the ejector pin is a distance from the surface of the lower ejector plate to the top end of the ejector pin. The minimum height of the ejector pin is varied in compliance with slant of the product surface. The ejector pin design section 66 may read dimension values of thicknesses of, for instance, core block 30, core plate (not shown), support plate, upper ejector plate, etc. from the work memory 13, an then add these thicknesses. The maximum height of the ejector pin may be derived from the result of this addition.

In step U8, the ejector pin design section 66 may form profiles of the ejector pin and the hole based on ejector pin hole diameter, relief hole diameter, guide length, rib diameter, and so forth designated by the designer.

In step U9, the designer may decided whether or not all ejector pins have been designed. If all ejector pins have been designed (YES), then the process advances to step U10. Unless all ejector pins have been designed (NO), then the process returns to step U1 where dimensions required for design are input. Then, following steps U2 to U9 are executed once again.

In step U10, the designer may determine whether or not design information of the ejector pin must be output. If design information of the ejector pin must be output (YES), then the process goes to step U11 where design information is either displayed on the screen of the display 19 or output on the paper by the printer 20. By way of example, in FIG. 70D, the example has been given wherein the result of design of two ejector pins are output on the paper. The output contents are such as locations, hole diameters, relief hole diameters, guide lengths and ejector pin lengths. In step U11, design of the ejector pin may be ended after design information are output. Unless design information of the ejector pin must be output in step U10 (NO), design of the ejector pin may also be ended.

As has stated above, according to the design process of the ejector pin according to the twenty-fourth embodiment of the present invention, when the designer designates the location of the ejector pin on the screen of the display 19, the ejector pin design section 66 may detect locations X, Y of the ejector pin from the center of the mold, and calculate the height from the upper ejector plate. Thus, it would be understood that, although the mold has a complicate profile, the ejector pin may be designed in an interactive manner between the designer and the system.

(25) Twenty-fifth Embodiment

Figure 71:
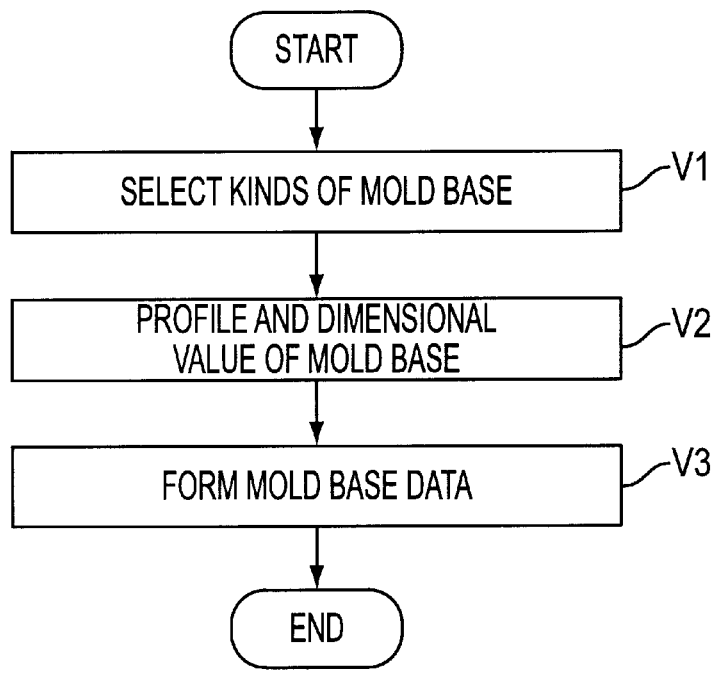
FIG. 71 is a flowchart illustrating design process of the mold base according to a twenty-fifth embodiment of the present invention.
Figure 72:
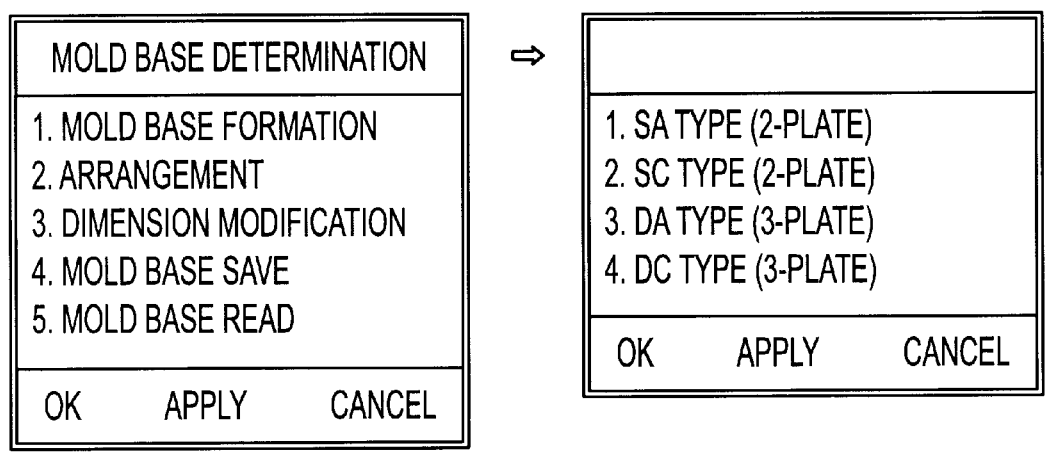
FIG. 72 is a view illustrating screen images on the display device when designing the mold base according to the twenty-fifth embodiment of the present invention.

FIG. 71 is a flowchart illustrating design process of mold base of the mold according to the twenty-fifth embodiment of the present invention. FIG. 72 is a view for use in supplementary explanations. In the twenty-fifth embodiment, entire profile of the mold base constituting the mold, and an instruction boxes in which dimensional values of respective constituent parts are input may be displayed in one screen.

In FIG. 71, in step V1, the designer may select kinds of the mold base of the mold. At this time, the display 19 may display a menu screen, as shown in FIG. 72. The display contents are mold base formation, arrangement determination, dimension correction, mold base save, mold base read, etc. If the designer selects "mold base formation", the display 19 may switch to the menu screen showing kinds of the mold base. The kinds of the mold base are SA type, SC type of two-plate structure, and DA type, DC type of three-plate structure. SA type and SC type are the mold consisting of two-mold plates of the cavity plate and the core plate. DA type and DC type are the mold consisting of three-mold plates of the cavity plate, the core plate and the runner stripper plate. The SA type and DA type have the support plate, but the SC type and DA type have not the support plate.

Figure 73:
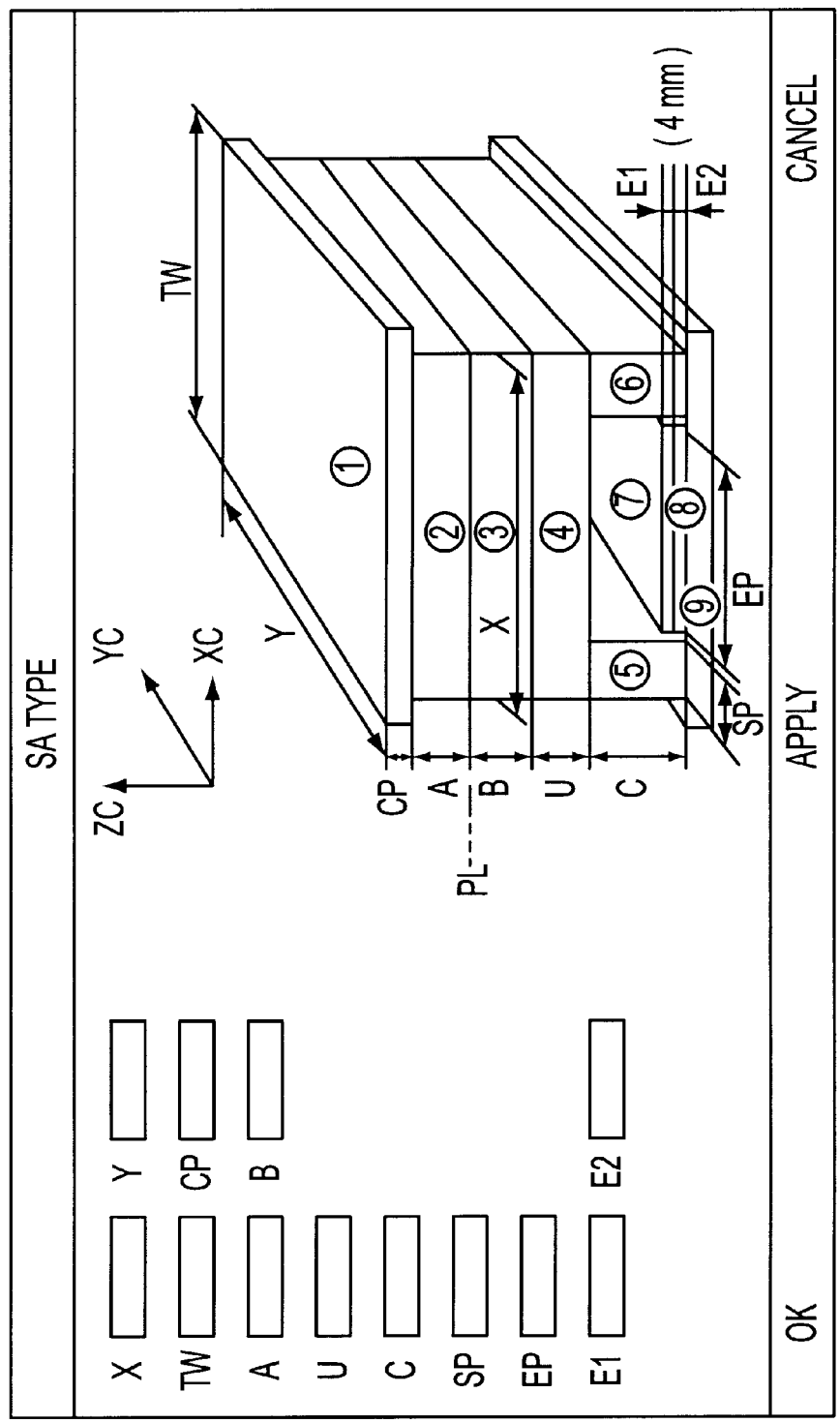
FIG. 73 is a view showing a menu screen for the injection molding machine when designing the mold base according to the twenty-fifth embodiment of the present invention.

In step V2, the display 19 may display the instruction window in which profile of the mold base and dimensional values are input. In the example in FIG. 73, entire profile of the SA type mold base and instruction boxes X, Y, TW, CP, A, B, U, C, SP, EP, E1, and E2, in which dimensional values of respective constituent parts being input, on one screen of the display 19. In the example in FIG. 73, a reference ①  denotes a fixing side clamping plate; ②, fixing side mold plate; ③, movable side mold plate; ④, support plate; ⑤ and ⑥, spacer blocks; ⑦, upper ejector plate; ⑧, lower ejector plate; and ⑨, movable side clamping plate.

X is a lateral length of the fixing side mold plate ②, the movable side mold plate ③, and the support plate ④. Y is a vertical length of the fixing side clamping plate ①. TW is a lateral length of the fixing side clamping plate ①. CP is a height of the fixing side clamping plate ①. A is a height of the fixing side mold plate ②. B is a height of the movable side mold plate ③. U is a height of the support plate ④. C is a height of the spacer blocks ⑤ and ⑥. SP is a lateral length of the spacer blocks ⑤ and ⑥.

EP is a lateral length of the upper ejector plate ⑦ and the lower ejector plate ⑧. E1 is a height of the upper ejector plate ⑦. E2 is a height of the lower ejector plate ⑧. A distance between E1 and E2 is 4 mm.

The designer may input dimentional values into these instruction boxes X, Y, TW, CP, A, B, U, C, SP, EP, E1, and E2 via the keyboard 17.

In step V3, the mold base forming section 61 may form mold base data in compliance with dimensional values input by the designer. The explanation of the method for forming the mold base data will be omitted since it has been described in the twelfth embodiment.

As mentioned earlier, according to the twenty-fifth embodiment of the present invention, entire profile of the mold base constituting the mold, and instruction boxes in which dimensional values of respective constituent parts are input may be displayed in one screen. Therefore, it would be understood that, with confirming an expected complete shape, the designer may design the injection mold by inputting dimentional values into these instruction boxes X, Y, TW, CP, A, B, U, C, SP, EP, E1, and E2, which thus facilitates the design of the mold.

(26) Twenty-sixth Embodiment

Figure 74:
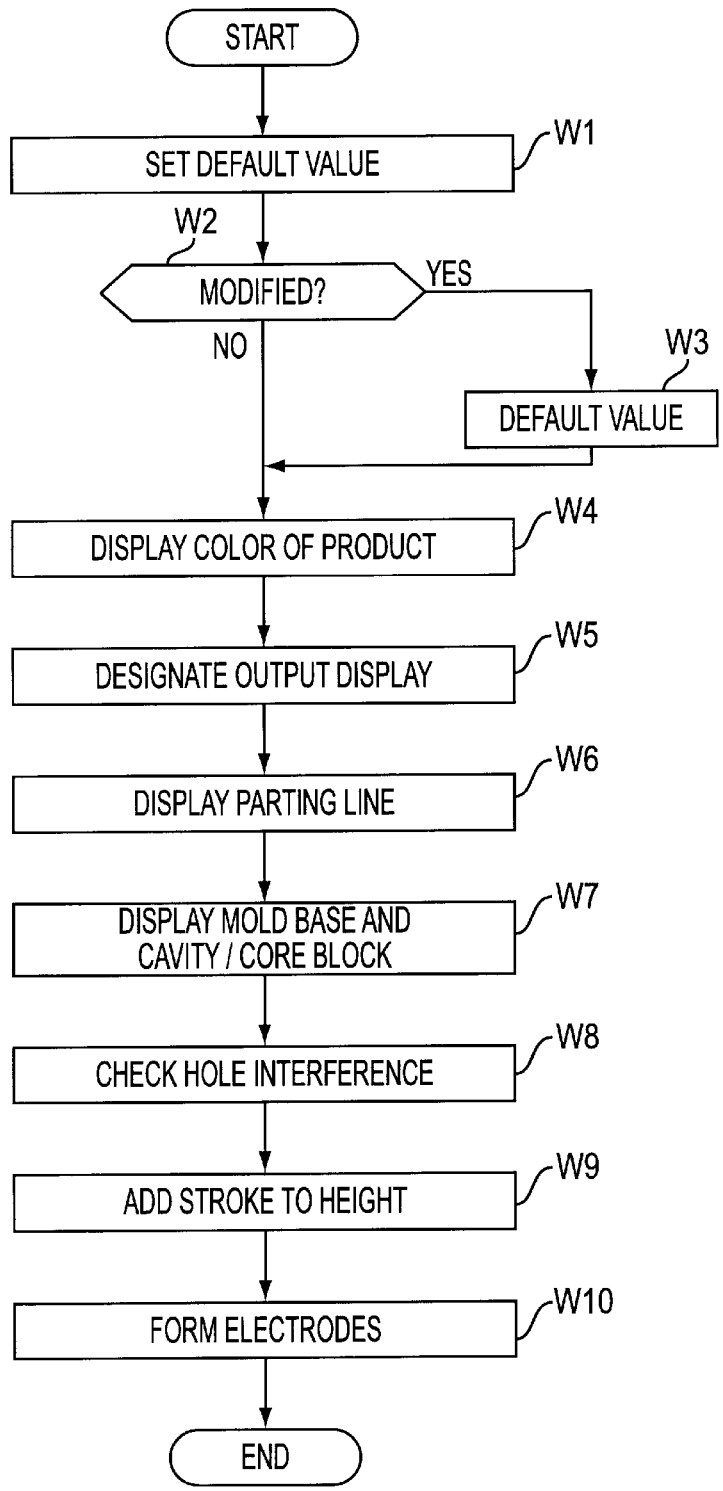
FIG. 74 is a flowchart illustrating usage of configuration file according to a twenty-sixth embodiment of the present invention.

FIG. 74 is a flowchart illustrating usage of the configuration file of the mold design system according to the twenty-sixth embodiment of the present invention. FIG. 75 is a view for use in supplementary explanations. In the twenty-sixth embodiment, usages of the tools for supporting the mold design system may be disclosed. In FIG. 74, in step W1, the designer may save the default value file in the system. This file in which the tools for supporting the mold design system are written would be written into the memory 21 shown in FIG. 2.

In FIG. 75, the contents of the tool are designation of display color of lines, characters and regions, output method of design information, reference value (design data) required for each design, and notation of respective parts data. In the twenty-sixth embodiment, the product shape data is displayed by "CYAN", the undercut portion is displayed by "PINK", the parting line is displayed by "YELLOW", the cavity/core is displayed by "MAGENTA", the mold base is displayed by "WHITE", and the ejector pin is displayed by "BLUE". The display 19 may display lines, characters and regions based on such classification of color.

In the twenty-sixth embodiment, the undercut portion may be output to the display 19 by "GRPHICS", and the ejector pin and the manufacturing jigs of the mold parts may be output to the printer 20 by "PAPER".

In addition, in the twenty-sixth embodiment, as for an approach allowable distance (hole interference check distance) between the ejector pin hole and other holes, 3 mm may be registered as an isolation standard value. As for an extrusion stroke α to the length of the ejector pin, 0.1 mm may be registered as an isolation standard value. As for an extrusion stroke to the manufacturing jigs of the mold parts, 10 mm may be registered as an isolation standard value. As for an offset amount of the base of the manufacturing jigs, 10 mm may be registered as an isolation standard value.

With respect to ejector pin design, parts data concerning the core block may be displayed by "CORE-BLOCK", parts data concerning the core plate may be displayed by "CORE-PLATE", parts data concerning the upper ejector pin may be displayed by "EPR", and parts data concerning the lower ejector pin may be displayed by "EP".

With respect to cooling water path design and nest design, parts data concerning the cavity plate may be displayed by "CAVITY-PLATE", parts data concerning the cavity block may be displayed by "CAVITY-BLOCK", parts data concerning the core plate may be displayed by "CORE-PLATE", and parts data concerning the core block may be displayed by "CORE-BLOCK".

Next, in step W2, the designer may decide whether or not the default value must be varied. If the default value must be varied (YES), then in step W3 the default value is varied. The designer may vary the default value by rewriting the contents of the configuration file. Thus, designation of display color of lines, characters and regions, output method of design information, reference value (design data) required for each design, and notation of respective parts data can be varied freely.

Unless the default value must be varied in step W2 (NO), then in step W4 the system is started. In response to starting of the system, the display 19 may display the product shape by "CYAN" in compliance with the configuration file.

In step W5, if the designer designates the information output method "GRPHICS" to detect the undercut portion, the display 19 may display the undercut portion in compliance with the configuration file.

In step W6, in order to form the parting, the display 19 may display the color of the parting by "YELLOW" in compliance with the configuration file.

In step W7, in order to form the mold base and the cavity/core, the display 19 may display the color of the mold base by "WHITE" and the color of the cavity/core by "MAGENTA" in compliance with the configuration file.

In step W8, when checking interference between holes, the ejector pin design section 66 may execute check process of interference between pin hole and other holes depending upon the standard value=3 mm read from the configuration file.

In step W9, when designing the ejector pin, the ejector pin design section 66 may add the extrusion stroke α=0.1 mm being read from the configuration file to a maximum height of the ejector pin.

Further, in step W10, when designing the electric discharge machining electrodes, the designer may design the electric discharge machining electrodes (manufacturing jigs of the mold parts) based on the extrusion stroke=10 mm being read from the configuration file. The designer may also design the base of the electrodes based on the offset amount being read from the configuration file.

Like the above, according to usage of the configuration file of the mold design system of the twenty-sixth embodiment of the present invention, it should be noted that, although a plenty of automatic processing are being employed, display color of lines, characters and regions, output method of design information, reference value (design data) required for each design, and notation of respective parts data can be varied arbitrary in step W3. Therefore, the mold design system which is fitted to each designer can be built up. Furthermore, the input items needed in designing process can be reduced by preparing the configuration file in advance.

(27) Twenty-seventh Embodiment

Figure 76:
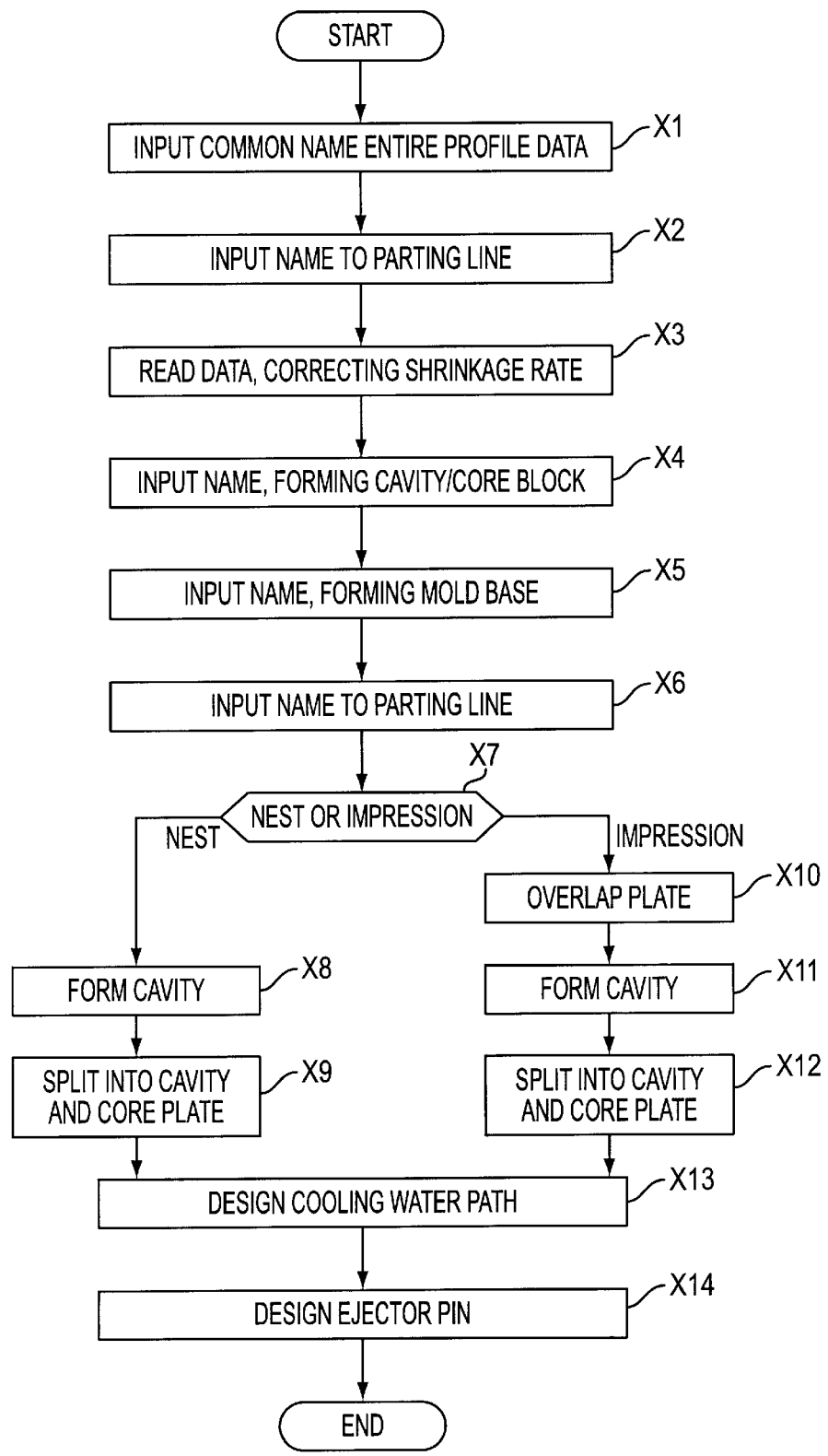
FIG. 76 is a flowchart illustrating mold design, with attributes being considered in the mold design system, according to a twenty-seventh embodiment of the present invention.
Figure 77:
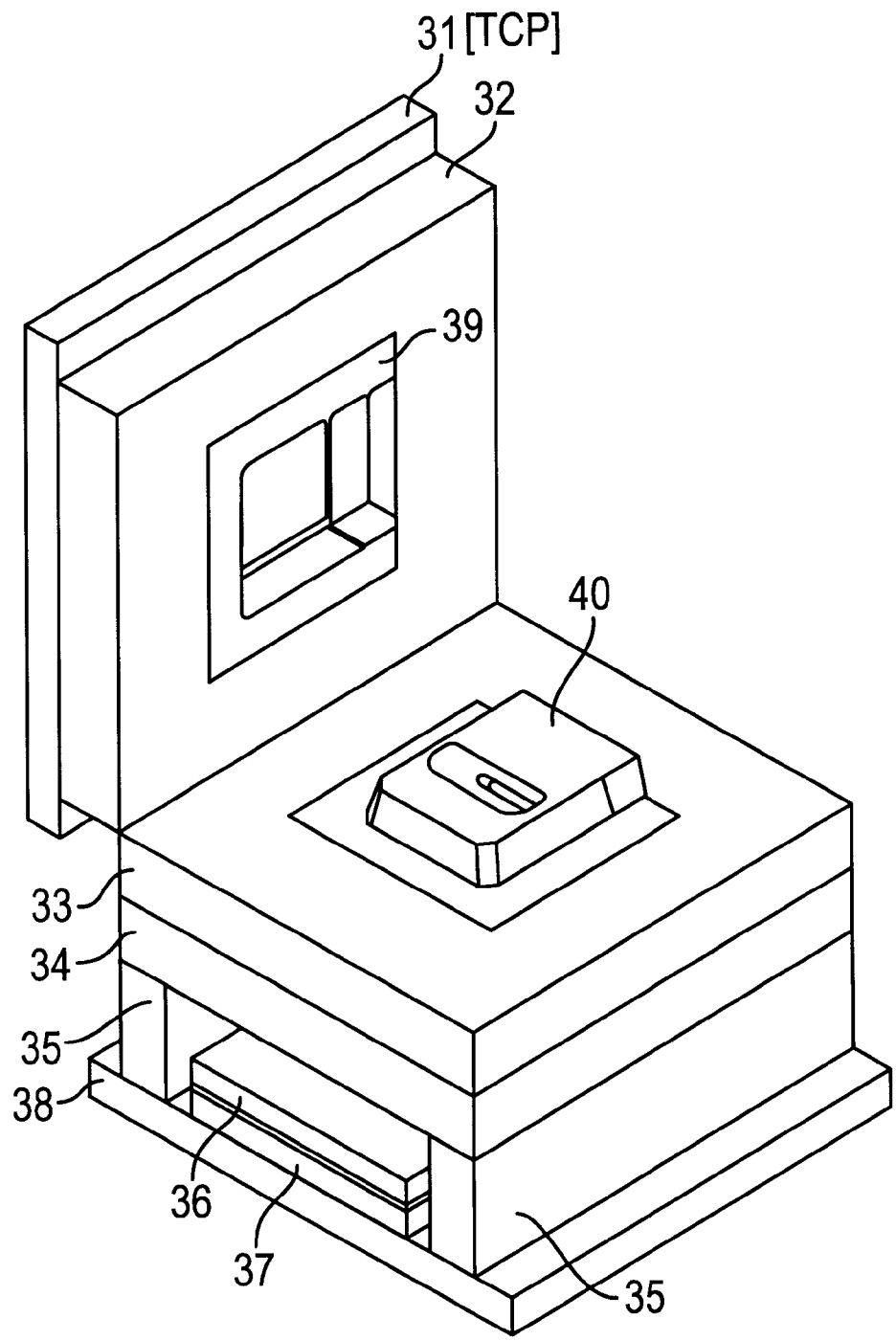
FIG. 77 is a perspective view showing an injection mold device when individual attributes are allotted to names of respective parts of the device, according to the twenty-seventh embodiment of the present invention.

FIG. 76 is a flowchart illustrating design process of the mold according to the twenty-seventh embodiment of the present invention. FIG. 77 is a view for use in supplementary explanations, i.e., a perspective view showing an injection mold device when individual attributes are allotted to names of respective parts of the device. In the twenty-seventh embodiment, in order to improve operability of the mold design system, first names (attributes) are assigned to data groups for designing the mold, and then nest type mold or direct impression type mold may be designed based on these attributes.

In FIG. 76, in step X1, the designer may first assign a name (attribute) of "PART" to product shape data at starting the design system. If there are a plurality of data groups, the designer may select and assign another name.

For instance, in step X2, when forming the parting line, the designer may assign a name of "PARTING-LINE" to a data group of the parting line.

In step X3, when correcting shrinkage rate, the designer may select a data group of "PART" and "PARTING-LINE". In that case, the product shape correction editor 14 may read out a data group of "PART" and "PARTING-LINE" from the memory 11 and the memory 13 and, as has explained in the third embodiment, then automatically correct the product shape.

In step X4, when designing the cavity and the core, the designer may assign a name of "CAVITY/CORE-BLOCK" to a data group of cavity/core. In the case that the nest type mold is designed, there exists a data group concerning the cavity/core block.

In turn, in step X5, when designing the mold base, the designer may assign names of "TCP", "CAVITY-PLATE", "COREPLATE", "SP", "SB", "EPR", "EP"and "BCP" to groups of the mold base data. In FIG. 77, a reference 31 denotes fixing side clamping plate which is displayed as "TCP" in the system; 32, fixing side mold plate being displayed as "CAVITY-PLATE"; 33, movable side mold plate being displayed as "CORE-PLATE"; 34, support plate being displayed as 35, spacer block being displayed as "SB"; 36, upper ejector plate being displayed as "EPR"; 37, lower ejector plate being displayed as "EP"; 38, movable side clamping plate being displayed as "BCP"; 39, fixing side block being displayed as "CAVITY-BLOCK"; 40, movable side block being displayed as "CORE-BLOCK".

In the event that the direct impression type mold is designed, there exists data groups as to the cavity plate and the core plate. The mold base design section 61 may read out data groups of "TCP", "CAVITY-PLATE", "CORE-PLATE", "SP", "SB", "EPR", "EP"and "BCP" from the memory 12 and, as has discussed in the twelfth and twenty-fifth embodiments, then form the mold base.

In step X6, when forming the parting plane, the cavity design editor 15 may form the parting plane on the basis of data group of the name "PARTING-LINE". The designer may assign a name of "PARTING-SURFACE"to a data group of the formed parting plane.

Subsequently, in step X7, the designer may detect whether or not there is the data group having the name of "CAVITY/CORE-BLOCK". If "CAVITY/CORE-BLOCK" has been detected (YES), then the process advances to step X8 since this corresponds to design of the nest type mold.

In step X8, the cavity design editor 15 may form a cavity portion of "PART" in "CAVITY/CORE-BLOCK". Here the cavity design editor 15 may read out the data groups concerning "CAVITY/CORE-BLOCK" and "PART" from the work memory 13 and, as has discussed in the ninth and twenty-third embodiments, then execute data processing.

In the next, in step X9, the cavity design editor 15 may split the mold block into two parts in "PARTING-SURFACE". The cavity design editor 15 may read out the data group of "CAVITY/CORE-BLOCK" from the work memory 13 and, as has described in the tenth embodiment, then split the mold block into the cavity and the core based on the parting plane. Two split portions are referred to as "CAVITY-BLOCK" and "CORE-BLOCK". The "CAVITY-BLOCK" may serve as the fixing side block and the "CORE-BLOCK" may serve as the movable side block.

On the other hand, there has been no data group as to "CAVITY/CORE-BLOCK" in step X7 (NO), then the process advances to step X10 since this corresponds to design of the direct impression type mold. In step X10, the designer may combine data groups of "CAVITY PLATE" and "CORE PLATE" with each other into a data group, and then assign a name of "CAVITY/CORE-PLATE" to the data group. To combine two data groups into one group means the fact that two plates are stacked.

In turn, in step X11, the cavity design editor 15 may form a cavity portion of "PART" in "CAVITY/CORE-PLATE".

Then in step X12, the cavity design editor 15 may split the mold block into two parts in "PARTING-SURFACE". Two split portions are referred to as "CAVITY-PLATE" and "CORE-PLATE". The "CAVITY-PLATE" may serve as the fixing side mold plate and the "CORE-PLATE" may serve as the movable side mold plate.

In addition, in step X13, when designing the cooling water path, the display 19 may read data groups relating to "CAVITY-BLOCK" or "CAVITY-PLATE" and "CORE-BLOCK" or "CORE-PLATE" from the work memory 13, and then display the fixing side block or the fixing side mold plate and the movable side mold block or the core side mold plate on the screen of the display 19.

In step X14, when designing the ejector pin, the display 19 may read data groups as for "CORE-BLOCK", "CORE-PLATE", "EPR" and "EP" from the work memory 13, and then display the core block, the core side mold plate, the support plate, and the ejector plate on the screen of the display 19.

If the location of the ejector pin has been decided by the designer here, the ejector pin design section 66 may form pin holes through four related parts, i.e., core block, core side mold plate, support plate, and upper ejector plate. In order to form the pin holes so as to penetrate four related parts collectively, consistent coordinate systems of data groups concerning "CORE-BLOCK", "CORE-PLATE", "EPR" and "EP" are needed. If the consistent coordinate systems have been achieved, profiles enabling the holes to be formed in these four related parts simultaneously may be designed on the same position as that of the designated ejector pin.

In this manner, according to the twenty-seventh embodiment of the present invention, it would be evident that, since names (attributes) have been assigned to data groups of the product and the mold parts, only data groups required for in the course of respective design stages may be selected. Therefore, since data groups being obstructive to the design operation has been unloaded into the memory, design operation can be simplified.

Moreover, according to the twenty-seventh embodiment of the present invention, it would be understood that, although four related parts into which the pin holes must be formed are needed, this operation may be effected together in the ejector pin design section 66 by assigning the attributes for unifying the coordinate system of the data groups concerning core bock, core side mold plate, support plate, and ejector plate.

(28) Twenty-eighth Embodiment

Figure 78:
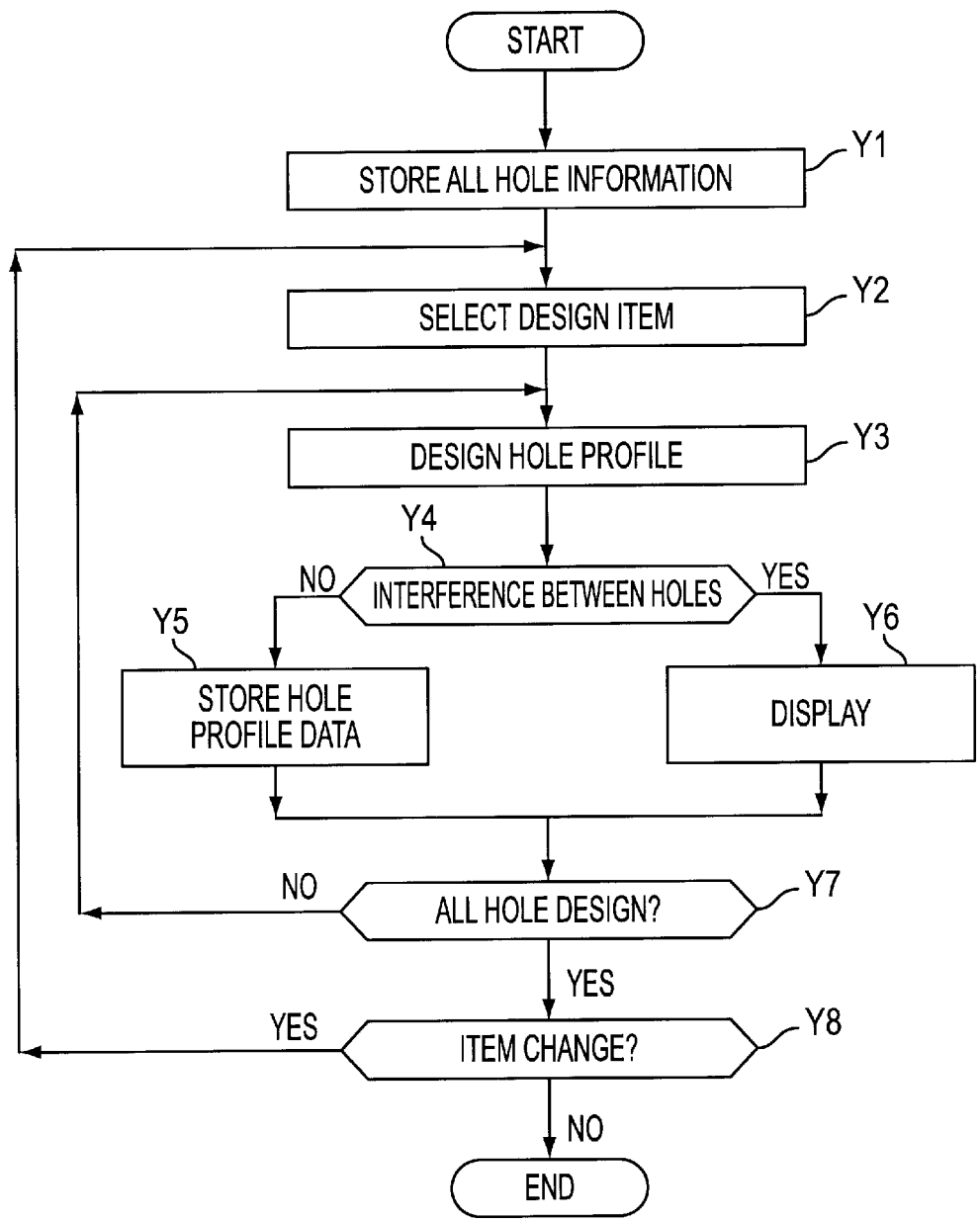
FIG. 78 is a flowchart illustrating design process of holes of the mold parts according to a twenty-eighth embodiment of the present invention.
Figure 79A:
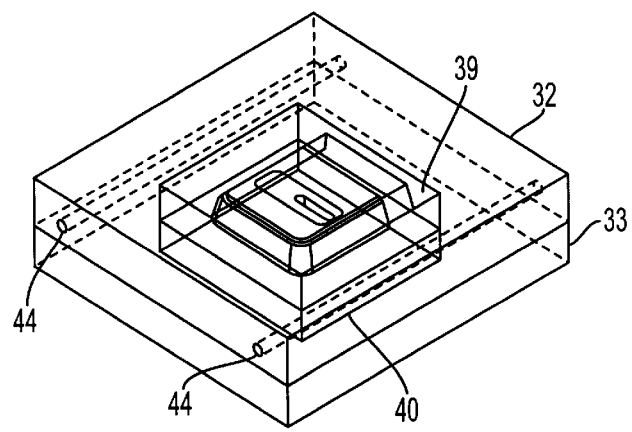
FIGS. 79A to 79C are perspective views showing interference between the cooling water path and the ejector pin holes according to the twenty-eighth embodiment of the present invention.
Figure 79B:
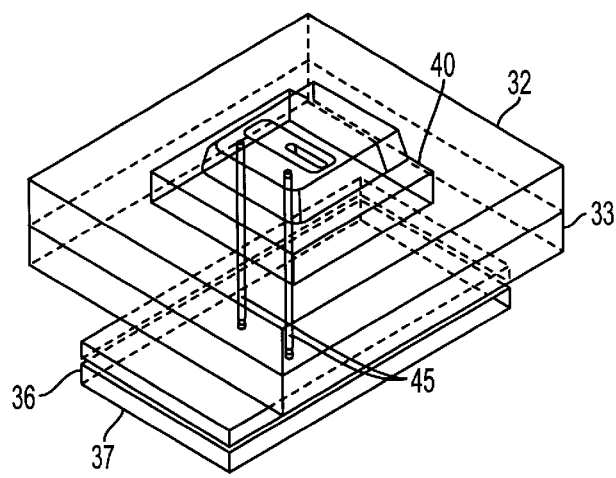
Figure 79C:
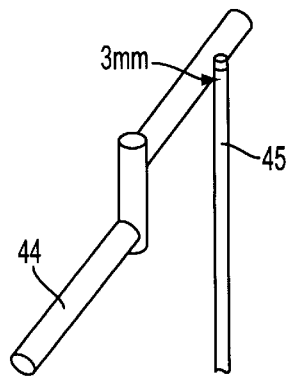

FIG. 78 is a flowchart illustrating design process of hole portions in the mold parts according to the twenty-eighth embodiment of the present invention. FIGS. 79A to 79C are views for use in supplementary explanations, i.e., perspective views showing interference between the cooling water path and the ejector pin holes. In the twenty-eighth embodiment, there is disclosed a method for designing the ejector pin holes and holes for the cooling water paths, etc. not to overlap with each other. In FIG. 78, in step Y1, the designer may first store information as to all holes of the mold parts in the design system. Tapped holes and guide holes for fixing the mold parts, cooling water paths for adjusting the temperature of the mold, ejector pin holes for ejecting the product from the mold, etc. are intended for the injection mold. These data may be stored in the design data memory 11.

In step Y2, the designer may select design items relating to hole formation of the mold. As has been explained in the twentieth embodiment, the design items are, for example, correction of molding shrinkage rate, formation of cavity/ core block, determination of mold base, formation of the parting plane, design of gate, runner and sprue, design of mold temperature adjusting water path, design of ejector pin, check of hole interference, split of nest structure, and design of slide core. For example, as shown in FIG. 79A, the designer may select design of the mold temperature adjusting water path to design the cooling water path 44 in the fixing side mold plate 32.

Next, in step Y3, the designer may design a certain hole profile in the selected design items. Then, as has explained in the seventeenth embodiment, the designer may design the cooling water path.

In step Y4, the ejector pin design section 66 may detect whether or not a hole to be designed (referred to as "design hole" hereinafter) interferes with other holes. For instance, the design hole is the cooling water path 44 whereas, as shown in FIG. 79B, an objective of other holes is an ejector pin hole 45 which penetrate movable side block 40, fixing side mold plate 32, and upper ejector plate 33 together. As shown in FIG. 79C, based on that the distance between the location of the cooling water path 44 and the location of the ejector pin hole 45 can be kept more than a standard value, it may be determined whether or not the cooling water path 44 does interfere with the ejector pin hole 45. An isolation standard value=3 mm, which having been discussed in the twenty-sixth embodiment, may be used as the foregoing standard value. This standard value may be stored in the configuration file.

Unless the interference between the cooling water path 44 and the ejector pin hole 45 has been caused in step Y4 (NO), then in step Y5 hole profile data of the cooling water path 44 are stored. On the contrary, if the interference between the cooling water path 44 and the ejector pin hole 45 has been caused in step Y4 (YES), then in step Y6 interference portion of the hole may be depicted on the display 19, as shown in FIG. 79C. Then this hole profile data may be removed.

In step Y7, the designer may determined whether or not design operation of entire holes have been completed. If the entire holes have been designed (YES), then the process goes to step Y8. Unless the entire holes have been designed (NO), then the process returns to step Y3 where the design operation of the hole profile may be continued. If all holes have been designed, then in step Y8 the designer may determine whether or not the design items must be changed. If the design items have been changed (YES), then the process proceeds to step Y2 where the design item may be selected. While, unless the design items have been changed (NO), then the hole design operation is terminated.

In this fashion, according to the hole design method of the mold of the twenty-eighth embodiment, it should be noted that, since interference between holes in design and other holes has been checked in step Y4, design errors such as overlapping of the cooling water path 44 and the ejector pin hole 45, for example, can be prevented.

(29) Twenty-ninth Embodiment

Figure 80:
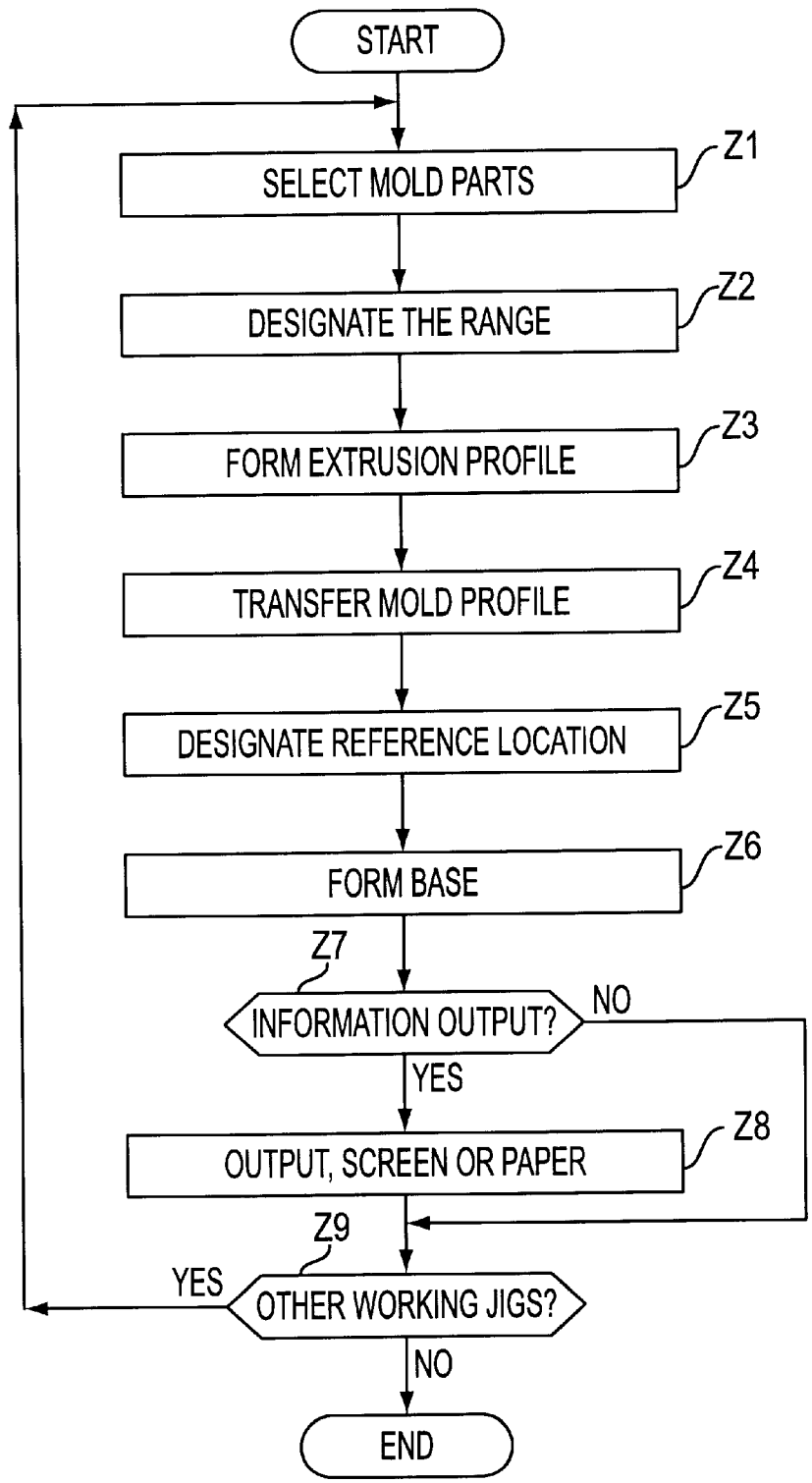
FIG. 80 is a flowchart illustrating design process of manufacturing jigs of the mold parts according to a twenty-ninth embodiment of the present invention.
Figure 81A:
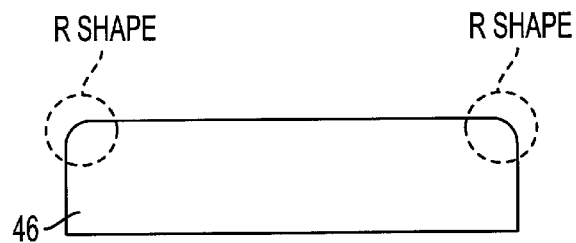
Figure 81B:
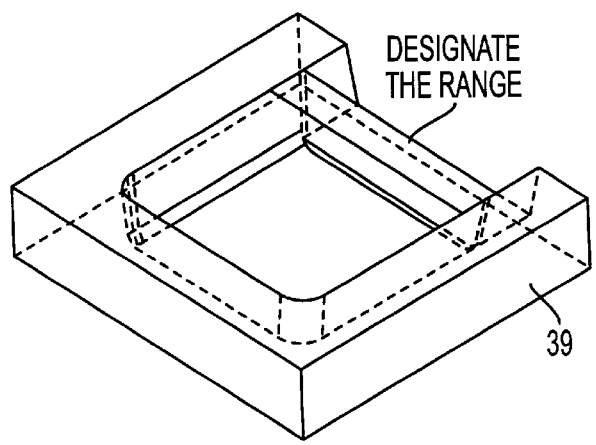
Figure 81C:
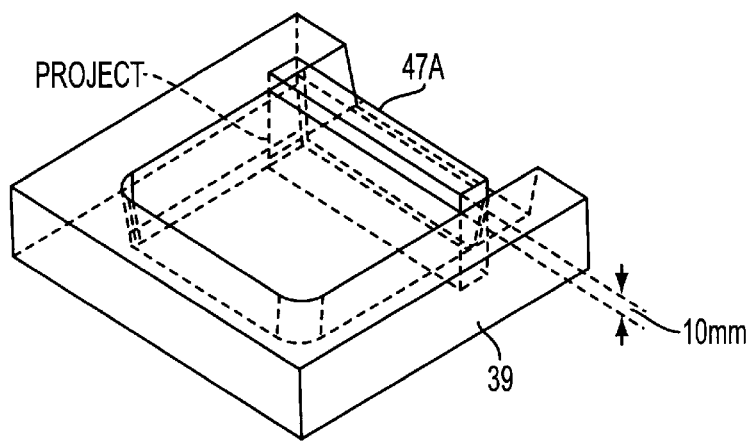

FIG. 80 is a flowchart illustrating design process of the manufacturing jigs of the mold parts according to the twenty-ninth embodiment of the present invention. FIGS.81A to 81F are views for use in supplementary explanations. In the twenty-ninth embodiment, the case may be particularly shown wherein electrodes (manufacturing jigs) for discharge-working the corners inside of the cavity block in an R-like shape should be designed. In FIG. 80, in step Z1, the designer may first select concerned mold parts. For instance, in case the corner portions of the product shape 46 would be finished to have an R shape, as shown in FIG. 81A, the inner corners of the cavity block must be worked in advance in an R-like shape. To this effect, the designer may select the cavity block 39, as shown in FIG. 81B. The display 19 may display the cavity block 39 designated by the designer. The profile data of other mold parts have been unloaded into the memory.

In step Z2, the designer may designate a range of the manufacturing jigs to the mold parts being displayed on the display 19. The range may be designated via the keyboard 17. In FIG. 81B, the range of the manufacturing jigs are the region for connecting both ends of the concave portion of the cavity block 39. The width of the manufacturing jigs may freely decided by the designer.

Subsequently, in step Z3, the designer may form an extrusion profile 47A having the range as the sectional shape. In FIG. 81, the extrusion profile 47A may comprise a portion extending from the back side of this sectional shape to the bottom of the cavity block 39 and a portion extruded from the front side of the sectional shape by a predetermined distance. Since this predetermined distance has been stored in the configuration file as an extrusion amount, it can be used by reading from the file. In the twenty-ninth embodiment, the predetermined distance=10 mm is set as a standard value.

Thereafter, in step Z4, the concave shape of the cavity block (mold profile) 39 may be transferred to the extrusion profile 47A. In other words, the sectional shape of the extrusion profile 47A is projected onto the concave portion of the cavity block 39 to transfer R shape, side shape, and bottom shape of the corners. Transfer process may execute by subtracting unnecessary profile portions from the solid profile formed by projection of the sectional shape in terms of Boolean operation. Thereby, as shown in FIG. 81D, an electric discharge machining electrodes 47 may be designed.

In step Z5, a reference location from the center of the injection mold is designated on the electrode 47. In the twenty-ninth embodiment, for instance, the reference location may be designated like (−200, 350). The designation of the reference location has to be designated to execute electric discharge machining the concave portion of the cavity plate exactly.

Next, in step Z6, a base 48 may be formed on the electrode 47. The base 48 may be formed by adding an offset amount, as shown in FIG. 81E, to dimension of the bottom surface of the electrode 47. The offset amount may be read from the configuration file. In the twenty-ninth embodiment, a reference value is 10 mm. A thickness of the base may be determined arbitrarily by the designer. Consequently, the electrodes (manufacturing jigs) 47 for electric-discharge machining the inner corners of the cavity block 39 to have an R-like shape have been designed. Profile data of the electrode 47 may be converted into numerical control data.

After this, in step Z7, the designer may determine whether or not information of the electrode 47 are output. If information of the electrode 47 have been output (YES), then in step Z8 the display 19 may output the profile of the electrode 47 on the screen according to instruction of the designer. The printer 20 may also output information of the concerned parts on the paper according to instruction of the designer. Output information corresponds to the mold parts being worked by the electrode 47. In the example shown in FIG. 81F, the case has been illustrated wherein the concerned parts name is "CAVITY-PLATE", the reference location of the electrode 47 from the center of the mold is (−200, 350), the profile of worked material is X=80, Y=90, and Z=40. Output information of the concerned parts may be offered to the mold manufacturer.

On the contrary, unless information of the manufacturing jigs have output in step Z7 (NO), then in step Z9 the designer may determine whether or not other manufacturing jigs should be designed. If other manufacturing jigs have been designed (YES), then the process returns to step Z1 where the mold parts may be selected. Subsequently, steps Z2 to Z8 may be repeated.

As has been stated earlier, according to the design method for the manufacturing jigs of the mold parts of the twenty-ninth embodiment of the present invention, it would be evident that, since the designer may designate the range of the manufacturing jigs for the cavity block 39 in step Z2 and the system may form the extrusion profile 47A having the range as the sectional shape in step Z3, the designer may design the electric discharge machining electrode 47 in a manner interacting with the system.

In addition, according to the twenty-ninth embodiment, it would be apparent that, since the reference location from the center of the injection mold may be designated on the electrode 47 in step Z5, electric discharge machining operation of the concave portion of the cavity plate can be performed exactly by placing the electrode 47 on the reference location.

What is claimed is:
1. An injection mold design method for correcting a profile of a product to be fabricated into a releasable profile from a mold comprising:
    removing temporarily part of lines or planes constituting a product shape or a mold profile from a screen; and
    replotting the lines or planes on the screen after a correction operation of the product shape or the mold profile being displayed on the screen is completed, so as to correct the product shape or the mold profile being displayed on the screen.
2. An injection mold design method as claimed in claim 1, further comprising:
    forming a flat plane perpendicular to a mold opening direction;
    projecting the product shape onto a flat plane so as to detect its outermost peripheral line;
    drawing a straight line from an outermost peripheral line in a mold opening direction so as to detect entire borderlines of the product shape being intersecting with the straight line; and
    selecting entire borderlines as candidates of a split borderline for splitting a mold block.
3. An injection mold design method as claimed in claim 2, further comprising storing a plural continuous borderlines as grouped information.
4. An injection mold design method as claimed in claim 3, further comprising:
    inspecting whether or not a group of grouped borderlines form respectively closed loops; and
    removing grouped borderlines not forming closed loops from the candidates of the split borderlines.
5. An injection mold design method as claimed in claim 1, further comprising:
    forming temporarily a flat plane onto which profile lines, edge lines of a product, or borderlines of plane elements are projected;
    projecting designated profile lines, edge lines, or borderlines of plane elements on the product shape when operator designates profile lines, edge lines, or borderlines of plane elements on the flat plane after correction of the product shape is completed; and
    selecting profile lines, edge lines, or borderlines of plane elements projected on the product shape as candidates of the split borderline for splitting a mold block.
6. An injection mold design method as claimed in claim 5, further comprising storing a plural continuous borderlines as grouped information.
7. An injection mold design method as claimed in claim 6, further comprising:
    inspecting whether or not a group of grouped borderlines form respectively closed loops; and
    removing grouped borderlines not forming closed loops from a candidates of split borderlines.
8. An injection mold design method as claimed in claim 1, further comprising:
    displaying outermost periphery of the product shape with different color from those of other lines on a flat plane when the product shape is being corrected.
9. An injection mold design method as claimed in claim 1, further comprising:
    inspecting candidates of borderlines of the product; and
    detecting opening portions of the product shape in response to that closed loop of other borderlines exist inside of closed loop of a certain borderline.
10. An injection mold design method as claimed in claim 1, further comprising:
    forming a flat plane in parallel to a mold opening direction and then projecting an edge of a rising portion of the product shape onto a flat plane when the product shape is corrected;
    projecting a reference point onto an edge of a rising portion of the product shape when operator designates a reference point on an arbitrary location on the edge projected;
    selecting locus of the reference point as a reference line by extending the reference point projected onto the edge in a direction perpendicular to the mold opening direction;
    rotating a surface of the rising portion in a designated rotation direction by a designated rotation angle with the reference line as a center; and
    correcting a profile of the rising portion.
11. An injection mold design method as claimed in claim 1, further comprising:
    forming a flat plane in parallel to a mold opening direction and then projecting an edge of a rising portion of the product shape onto a flat plane when the product shape is corrected;
    projecting a reference point onto the edge of the rising portion of the product shape when operator designates a reference point on an arbitrary location on the edge projected and designates rotation direction and rotation angle;
    selecting locus of the reference point as a reference line by extending the reference point projected onto the edge in a direction perpendicular to the mold opening direction; and
    correcting a profile using locus of oblique side of a circular cone as surface of the product after moving the circular cone along the reference line.
12. An injection mold design method as claimed in claim 1, further comprising:
    calculating normal vector on an arbitrary point on a sloped plane of the product and shrinkage vector caused when resin shrinks, to correct a profile of the product; and classifying planes into "plane to which sloped plane of the mold being indispensable" if a direction of a normal vector is opposite to that of a shrinkage vector, and "plane for which sloped plane of the mold being preferable" if a direction of the normal vector is identical to that of the shrinkage vector.

13. An injection mold design method as claimed in claim 1, further comprising:

displaying a result of resin superplasticized analysis of a mold superposedly on a perspective view of the mold viewed from a mold opening direction; and arranging a gas vent for exhausting gas in a location where the resin reaches finally based on the result of the resin superplasticized analysis.

14. An injection mold design method as claimed in claim 13, further comprising:

arranging ejector pins for ejecting the moldings from the mold in a location where the resin reaches finally based on the result of the resin superplasticized analysis; and providing breathing grooves on peripheries of the ejector pins.

15. An injection mold design method as claimed in claim 13, further comprising:

patternizing profiles and dimensions of plural gas vents preliminarily into a plurality of groups; and designating patternized profiles and dimensions of the gas vents by an operator in compliance with procedures displayed on a screen, so as to design shapes and locations of the gas vents.

16. An injection mold design method as claimed in claim 13, wherein the dimensions of the gas vents are determined according to viscosity of resin material which is poured into the mold.

17. An injection mold design method as claimed in claim 13, further comprising:

patternizing socket and spigot structure, flat plane locking structure and positioning locking structure as split plane structures of the mold in advance; and selecting a patternized structure by an operator in compliance with procedures displayed on a screen.

18. An injection mold design method as claimed in claim 13, further comprising:

patternizing fixing parts structure of the mold into plural groups in advance;

registering patternized fixing parts structures in a storing device; and selecting a patternized fixing parts structure by an operator in compliance with procedures displayed on a screen.

19. An injection mold design method as claimed in claim 13, further comprising:

patternizing runner structures for introducing resin into the mold into plural groups in advance;

registering patternized runner structures in a storing device; and selecting a patternized runner structure by an operator in compliance with procedures displayed on a screen.

20. An injection mold design method as claimed in claim 13, further comprising:

patternizing gate structures of the mold into plural groups in advance;

registering patternized gate structures in a storing device; and selecting a patternized gate structure by an operator in compliance with procedures displayed on a screen.

21. An injection mold design method as claimed in claim 13, further comprising:

patternizing ejector pin structures into plural groups in advance;

registering patternized ejector pin structures in a storing device; and selecting a patternized ejector pin structure by an operator in compliance with procedures displayed on a screen.

22. An injection mold design method as claimed in claim 13, further comprising:

patternizing cooling path structures of the mold into plural groups in advance;

registering patternized cooling path structures in a storing device; and selecting a patternized cooling path structure by an operator in compliance with procedures displayed on a screen.

23. An injection mold design method as claimed in claim 13, further comprising:

patternizing link structures of the mold into plural groups in advance;

registering patternized link structures in a storing device; and selecting a patternized link structure by an operator in compliance with procedures displayed on a screen.

24. An injection mold design method as claimed in claim 13, further comprising:

modifying half tolerance for a dimension specified to parts of the mold to central tolerance; and displaying the central tolerance on a screen.

25. An injection mold design method as claimed in claim 13, further comprising:

modifying central tolerance for a dimension specified to parts of the mold to tolerance in a modification direction; and displaying the tolerance in the modification direction on a screen.

26. An injection mold design method for correcting a profile of a product to be fabricated into a releasable profile from a mold comprising:

calculating a normal vector on a plane of a product shape and a reference vector in a mold opening direction; and detecting a normal vector having an opposite direction to that of the reference vector so as to detect undercut portion.

27. An injection mold design method as claimed in claim 26, further comprising:

displaying a result of resin superplasticized analysis of the mold superposedly on a perspective view of a mold viewed from the mold opening direction; and arranging a gas vent for exhausting gas in a location where resin reaches finally based on the result of the resin superplasticized analysis.

28. An injection mold design method as claimed in claim 27, further comprising:

arranging ejector pins for ejecting moldings from the mold in a location where the resin reaches finally based on the result of the resin superplasticized analysis; and providing breathing grooves on peripheries of the ejector pins.

29. An injection mold design method as claimed in claim 27, further comprising:

patternizing profiles and dimensions of plural gas vents preliminarily into a plurality of groups; and designating patternized profiles and dimensions of the gas vents by an operator in compliance with procedures displayed on a screen, so as to design shapes and locations of the gas vents.

30. An injection mold design method as claimed in claim 27, wherein the dimensions of the gas vents are determined according to viscosity of resin material which is poured into the mold.

31. An injection mold design method as claimed in claim 27, further comprising:

patternizing socket and spigot structure, flat plane locking structure and positioning locking structure as split plane structures of the mold in advance; and selecting a patternized structure by an operator in compliance with procedures displayed on a screen.

32. An injection mold design method as claimed in claim 27, further comprising:

patternizing fixing parts structure of the mold into plural groups in advance;

registering patternized fixing parts structures in a storing device; and selecting a patternized fixing parts structure by an operator in compliance with procedures displayed on a screen.

33. An injection mold design method as claimed in claim 27, further comprising:

patternizing runner structures for introducing resin into the mold into plural groups in advance;

registering patternized runner structures in a storing device; and selecting a patternized runner structure by an operator in compliance with procedures displayed on a screen.

34. An injection mold design method as claimed in claim 27, further comprising:

patternizing gate structures of the mold into plural groups in advance;

registering patternized gate structures in a storing device; and selecting a patternized gate structure by an operator in compliance with procedures displayed on a screen.

35. An injection mold design method as claimed in claim 27, further comprising:

patternizing ejector pin structures into plural groups in advance;

registering patternized ejector pin structures in a storing means; and selecting a patternized ejector pin structure by an operator in compliance with procedures displayed on a screen.

36. An injection mold design method as claimed in claim 27, further comprising:

patternizing cooling path structures of the mold into plural groups in advance;

registering patternized cooling path structures in a storing device; and selecting a patternized cooling path structure by an operator in compliance with procedures displayed on a screen.

37. An injection mold design method as claimed in claim 27, further comprising:

patternizing link structures of the mold into plural groups in advance;

registering patternized link structures in a storing device; and selecting a patternized link structure by an operator in compliance with procedures displayed on a screen.

38. An injection mold design method as claimed in claim 27, further comprising:

modifying half tolerance for a dimension specified to parts of the mold to central tolerance; and displaying the central tolerance on a screen.

39. An injection mold design method as claimed in claim 27, further comprising:

modifying central tolerance for a dimension specified to parts of the mold to tolerance in a modification direction; and displaying the tolerance in the modification direction on a screen.

40. An injection mold design method for correcting a profile of a product to be fabricated into a releasable profile from a mold comprising:

forming a split plane by extending a designated split borderline in parallel to a designated direction when a mold block is split into a core and cavity.

41. An injection mold design method as claimed in claim 40, further comprising:

forming a split plane by providing an arbitrary offset amount to the split borderline or by magnifying and extending the split borderline in a designated direction when the mold block is split into the core and the cavity.

42. An injection mold design method as claimed in claim 40, further comprising:

displaying the formed split plane on a portion on which the core and the cavity of the mold block are displayed three-dimensionally when the mold block is split into the core and the cavity.

43. An injection mold design method as claimed in claim 40, further comprising:

displaying a result of resin superplasticized analysis of a mold superposedly on a perspective view of the mold viewed from a mold opening direction; and arranging a gas vent for exhausting gas in a location where the resin reaches finally based on the result of the resin superplasticized analysis.

44. An injection mold design method as claimed in claim 43, further comprising:

arranging ejector pins for ejecting moldings from the mold in a location where resin reaches finally based on the result of the resin superplasticized analysis and providing breathing grooves on peripheries of the ejector pins.

45. An injection mold design method as claimed in claim 43, further comprising:

patternizing profiles and dimensions of plural gas vents preliminarily into a plurality of groups; and designating patternized profiles and dimensions of the gas vents by an operator in compliance with procedures displayed on a screen, so as to design shapes and locations of the gas vents.

46. An injection mold design method as claimed in claim 43, wherein dimensions of the gas vents are determined according to viscosity of resin material which is poured into the mold.

47. An injection mold design method as claimed in claim 43, further comprising:

patternizing socket and spigot structure, flat plane locking structure and positioning locking structure as split plane structures of the mold in advance; and selecting a patternized structure by an operator in compliance with procedures displayed on a screen.

48. An injection mold design method as claimed in claim 43, further comprising:
   patternizing fixing parts structure of the mold into plural groups in advance;
   registering patternized fixing parts structures in a storing device; and
   selecting a patternized fixing parts structure by an operator in compliance with procedures displayed on a screen.

49. An injection mold design method as claimed in claim 43, further comprising:
   patternizing runner structures for introducing resin into the mold into plural groups in advance;
   registering patternized runner structures in a storing device; and
   selecting a patternized runner structure by an operator in compliance with procedures displayed on a screen.

50. An injection mold design method as claimed in claim 43, further comprising:
   patternizing gate structures of the mold into plural groups in advance;
   registering patternized gate structures in a storing device; and
   selecting a patternized gate structure by an operator in compliance with procedures displayed on a screen.

51. An injection mold design method as claimed in claim 43, further comprising:
   patternizing ejector pin structures into plural groups in advance;
   registering patternized ejector pin structures in a storing device; and
   selecting a patternized ejector pin structure by an operator in compliance with procedures displayed on a screen.

52. An injection mold design method as claimed in claim 43, further comprising:
   patternizing cooling path structures of the mold into plural groups in advance;
   registering patternized cooling path structures in a storing device; and
   selecting a patternized cooling path structure by an operator in compliance with procedures displayed on a screen.

53. An injection mold design method as claimed in claim 43, further comprising:
   patternizing link structures of the mold into plural groups in advance;
   registering patternized link structures in a storing device; and
   selecting a patternized link structure by an operator in compliance with procedures displayed on a screen.

54. An injection mold design method as claimed in claim 43, further comprising:
   modifying half tolerance for a dimension specified to parts of the mold to central tolerance; and
   displaying the central tolerance on the screen.

55. An injection mold design method as claimed in claim 43, further comprising:
   modifying central tolerance for a dimension specified to parts of the mold to tolerance in a modification direction; and
   displaying the tolerance in the modification direction on the screen.

56. An injection mold design method for correcting a profile of a product to be fabricated into a releasable profile from a mold comprising:
   detecting a bottom of a cavity in a core side; and
   extending a peripheral portion of the bottom along a mold opening direction so as to select candidates of a split line for splitting the core of a mold block into a nest structure.

57. An injection mold design method as claimed in claim 56, further comprising:
   assigning numbers to candidates of the split borderline of the nest parts in sequence from a near side of an arbitrary point; and
   splitting the core by candidates of even numbered or odd numbered split borderline.

58. An injection mold design method as claimed in claim 56, further comprising:
   displaying a result of resin superplasticized analysis of the mold superposedly on a perspective view of a mold viewed from the mold opening direction; and
   arranging a gas vent for exhausting gas in a location where the resin reaches finally based on the result of the resin superplasticized analysis.

59. An injection mold design method as claimed in claim 58, further comprising:
   arranging ejector pins for ejecting moldings from the mold in a location where the resin reaches finally based on the result of the resin superplasticized analysis; and
   providing breathing grooves on peripheries of the ejector pins.

60. An injection mold design method as claimed in claim 58, further comprising:
   patternizing profiles and dimensions of plural gas vents preliminarily into a plurality of groups; and
   designating patternized profiles and dimensions of the gas vents by an operator in compliance with procedures displayed on a screen, so as to design shapes and locations of the gas vents.

61. An injection mold design method as claimed in claim 58, wherein the dimensions of the gas vents are determined according to viscosity of resin material which is poured into the mold.

62. An injection mold design method as claimed in claim 58, further comprising:
   patternizing socket and spigot structure, flat plane locking structure and positioning locking structure as split plane structures of the mold in advance; and
   selecting a patternized structure by an operator in compliance with procedures displayed on a screen.

63. An injection mold design method as claimed in claim 58, further comprising:
   patternizing fixing parts structure of the mold into plural groups in advance;
   registering patternized fixing parts structures in a storing device; and
   selecting a patternized fixing parts structure by an operator in compliance with procedures displayed on a screen.

64. An injection mold design method as claimed in claim 58, further comprising:
   patternizing runner structures for introducing resin into the mold into plural groups in advance;
   registering patternized runner structures in a storing device; and
   selecting a patternized runner structure by an operator in compliance with procedures displayed on a screen.

65. An injection mold design method as claimed in claim 58, further comprising:

patternizing cooling path structures of the mold into plural groups in advance;

registering patternized cooling path structures in a storing device; and selecting a patternized cooling path structure by an operator in compliance with procedures displayed on a screen.

66. An injection mold design method as claimed in claim 58, further comprising:

pattemizing link structures of the mold into plural groups in advance;

registering patternized link structures in a storing device; and selecting a patternized link structure by an operator in compliance with procedures displayed on a screen.

67. An injection mold design method as claimed in claim 58, further comprising:

modifying half tolerance for a dimension specified to parts of the mold to central tolerance; and displaying the central tolerance on the screen.

68. An injection mold design method as claimed in claim 58, further comprising:

modifying central tolerance for a dimension specified to parts of the mold to tolerance in a modification direction; and displaying the tolerance in the modification direction on the screen.

69. An injection mold design method of extracting a main parting line from a product shape to split a mold block into a core and a cavity, said method comprising:

extracting candidates of the main parting line;

detecting planes to which a slope must be applied from the product shape;

assigning priority to sloped planes being detected;

applying draft slopes to the product shape;

forming the main parting line based on the candidates of the main parting line; and checking whether the main parting line has been formed as a closed loop.

70. An injection mold design method as claimed in claim 69, wherein extracting candidates of the main parting line comprises:

correcting a profile of a product to be fabricated into a releasable profile from the mold;

arranging a corrected product shape in the mold block being displayed on a screen to provide a cavity corresponding to the product shape into the mold block; and splitting the mold block to thereby design the core and the cavity of the injection mold, wherein, when the product shape or the mold profile being displayed on the screen is corrected, part of one of lines and planes constituting one of the product shape and the mold profile is removed temporarily from the screen, and then one of the lines and planes are replotted on the screen after a correction operation of the product shape or the mold profile being displayed on the screen has been completed.

71. An injection mold design method as claimed in claim 70, wherein extracting candidates of the main parting line comprises:

forming a flat plane perpendicular to a mold opening direction;

projecting the product shape onto the flat plane so as to detect product shape's outermost peripheral line;

drawing a straight line from the outermost peripheral line in a mold opening direction so as to detect all borderlines of the product shape that intersect with this straight line; and selecting all borderlines as candidates of a split borderline for splitting the mold block.

72. An injection mold design method as claimed in claim 71, wherein extracting candidates of the main parting line further comprises storing a plurality of continuous borderlines as grouped information.

73. An injection mold design method as claimed in claim 72, wherein extracting candidates of the main parting line further comprises:

inspecting whether a group of borderlines are formed as closed loops respectively; and removing grouped borderlines which do not form closed loops from the candidates of the split borderline.

74. An injection mold design method as claimed in claim 70, wherein extracting candidates of the main parting line further comprises:

temporarily forming a flat plane onto which profile lines, edge lines, or borderlines of plane elements of the product are projected;

projecting at least one of designed profile lines, edge lines, and borderlines of the plane elements onto the product shape when an operator designates the profile lines, the edge lines, or the borderlines of the plane elements on the flat plane after correction of the product shape has been completed; and selecting the profile lines, the edge lines, or the borderlines of the plane elements projected onto the product shape as the candidates of the split borderline for splitting the mold block.

75. An injection mold design method as claimed in claim 74, wherein extracting candidates of the main parting line further comprises storing a plurality of continuous borderlines grouped information.

76. An injection mold design method as claimed in claim 75, wherein checking whether the main parting line has been formed as a closed loop comprises:

inspecting whether a group borderlines are formed as closed loops respectively, and removing grouped borderlines which do not form closed loops from the candidates of the split borderline.

77. An injection mold design method as claimed in claim 69, wherein forming the main parting line based on candidates of the main parting line comprises displaying an outermost periphery of the product shape with different colors from those of other lines on the flat plane when the product shape is to be corrected.

78. An injection mold design method as claimed in claim 69, wherein, when the mold is constructed by using a nest or nests by splitting the cavity and the core, extracting candidates of the main parting line comprises:

inspecting candidates of borderlines of the product shape; and detecting opening portions of the product shape in response to whether or not closed loops of other borderlines exist inside the closed loop of a certain borderline.

79. An injection mold design method as claimed in claim 69, wherein applying draft slopes to the product shape comprises:

forming a flat plane in parallel with a mold opening direction;

then projecting edge lines of rising portions of the product shape onto the flat plane when the product shape is to be corrected;

projecting a reference point onto the edge line of the rising portion of the product shape when an operator designates the reference point at an arbitrary location on the edge line being projected;

extending the reference point projected onto the edge line in a direction perpendicular to a mold opening direction to select a locus of the reference point as a reference line; and correcting the model profile using a locus of an oblique surface of a circular cone as a surface of a product by moving the circular cone along the reference line.

80. An injection mold design method as claimed in claim 69, wherein applying draft slopes to the product shape comprises:

forming a flat plan a in parallel with a mold opening direction and then projecting an edge line of the rising portion of the product shape onto the flat plane when the product shape is to be corrected;

projecting a reference point onto the edge line of the rising portion of the product shape when an operator designates the reference point at an arbitrary location on the edge line projected and also designates a rotation direction and a rotation angle;

extending the reference point projected onto the edge line in a direction perpendicular to a mold opening direction to select a locus of the reference point as a reference line; and correcting the profile of the rising portion by rotating a surface of the rising portion in the designated rotation direction with the reference line as a center by the designated rotation angle.

81. An injection mold design method as claimed in claim 70, wherein assigning priority to detected sloped planes:

calculating a normal vector at an arbitrary point on a sloped plane of a product and a shrinkage vector caused upon resin shrinkage when the product shape is to be corrected; and classifying planes into planes to which a sloped plane of the mold is indispensable if a direction of the normal vector is opposite to that of the shrinkage vector and planes for which the sloped plane of the mold is preferable if the direction of the normal vector is identical to that of the shrinkage vector.

82. An injection mold design method comprising:

forming parting lines to constitute an injection mold with use of a nest by splitting a mold block into a core and a cavity based on a product shape;

assigning priority to the parting lines;

forming parting planes of the nest;

splitting a part of one of the core and the cavity into at least one nest according to an instruction of an operator;

arranging a mold base to support the injection mold;

designing a gate, a runner, a gas vent, ejection pins, and a cooling path, respectively; and designing a link structure to link a runner stripper plate, a cavity plate, and a core plate.

83. An injection mold design method as claimed in claim 82, wherein designing the gas vent comprises:

displaying a result of resin superplasticized analysis of the mold in super position on a perspective view of the mold viewed from a mold opening direction; and disposing the gas vent for exhausting a gas in a location where the finally reaches, based on the result of the resin superplasticized analysis.

84. An injection mold design method as claimed in claim 82, wherein designing the gas vent comprises:

arranging ejector pins for ejecting a molding from the mold into a location where resin finally reaches, based on the result of the resin superplasticized analysis; and providing breathing grooves on peripheries of a plurality of ejector pins.

85. An injection mold design method as claimed in claim 82, wherein designing the gas vent comprises:

preliminarily patterning profiles and dimensions of plural gas vents into a plurality of groups; and designating patterned profiles and dimensions of the gas vents by an operator in compliance with procedures displayed on a screen, so as to design shapes and locations of the gas vents.

86. An injection mold design method as claimed in claim 82, wherein designing the gas vent comprises determining dimensions of the gas vents according to viscosity of resin material which is poured into the mold.

87. An injection mold design method as claimed in claim 82, wherein splitting a part of the core or the cavity into at least one nest comprises:

patterning socket and spigot structures, a flat plane locking structure, and positioning the locking structure as a split plane structure of the mold; and selecting a patterned structure by an operator in compliance with procedures displayed on a screen.

88. An injection mold design method as claimed in claim 82, wherein splitting a part of one of the core and the cavity into at least one nest comprises:

registering plural groups of patterned fixing part structures of the mold in advance; and selecting a patterned fixing parts structure by an operator in compliance with procedures displayed on a screen.

89. An injection mold design method as claimed in claim 82, wherein designing the runner comprises:

registering plural groups of patterned runner structures for introducing resin into the mold; and selecting a patterned runner structure by an operator in compliance with procedures displayed on a screen.

90. An injection mold design method as claimed in claim 82, wherein designing the gate comprises:

registering plural groups of patterned gate structures of the mold; and selecting a patterned gate structure by an operator in compliance with procedures displayed on a screen.

91. An injection mold design method as claimed in claim 82, wherein designing the ejector pins comprises:

registering plural groups of patterned ejector pin structures; and selecting a patterned ejector pin structure by an operator in compliance with procedures displayed on a screen.

92. An injection mold design method as claimed in claim 82, wherein designing the cooling path comprises:

registering plural groups of patterned cooling path structures of the mold; and selecting a patterned cooling path structure by an operator in compliance with procedures displayed on a screen.

93. An injection mold design method as claimed in claim 82, wherein designing the link structure comprises:

registering plural groups of patterned link structures of the mold; and selecting a patterned link structure by an operator in compliance with procedures displayed on a screen.

94. An injection mold design method as claimed in claim 82, wherein splitting a part of the core or the cavity into at least one nest comprises modifying half tolerance for a dimension specified to parts of the mold into a central tolerance to then display the central tolerance on a screen.

95. An injection mold design method as claimed in claim 24, wherein the central tolerance for a dimension specified to parts of the mold is modified into a tolerance in a modification direction, and then the tolerance in the modification direction is displayed on the screen.

96. An injection mold design method as claimed in claim 69, wherein detecting planes to which the slope must be applied from the product shape comprises calculating a normal vector on the plane of the product shape and a reference vector so as to detect an undercut portion.

97. An injection mold design method as claimed in claim 82, wherein forming parting lines comprises:

detecting a bottom of the cavity in a core side; and extending a peripheral portion of the bottom along a mold opening direction so as to select candidates of the split line for splitting the core of the mold block into the nest.

98. An injection mold design method as claimed in claim 82, wherein assigning priority to the parting lines comprises:

assigning numbers to candidates of a split assigning borderline of the nest parts in sequence from a near side of an arbitrary point; and splitting the core by the candidates of one of an even numbered and an odd numbered split borderline.

* * * * *

UNITED STATES PATENT AND TRADEMARK OFFICE
CERTIFICATE OF CORRECTION

PATENT NO.   : 6,192,327 B1
DATED        : February 20, 2001
INVENTOR(S)  : Shusaku Nishiyama, et al.

It is certified that error appears in the above-identified patent and that said Letters Patent is hereby corrected as shown below:

<u>Title page,</u>
Item [56], References Cited
    FOREIGN PATENT DOCUMENTS
    change "WO 9213301" to -- WO 9213301A --.

<u>Column 65,</u>
Line 37, change "patternizing" to -- patternizing --.

<u>Column 67,</u>
Line 53, change "patternizing" to -- patternizing --.

<u>Column 69,</u>
Line 7, change "patternized" to -- patternized --.;
Line 48, change "patternized" to -- patternized --..

<u>Column 70,</u>
Line 31, change "patternizing" to -- patternizing --;
Line 33, change "patternized" to -- patternized --;
Line 62, change "patternized" to -- patternized --.

<u>Column 71,</u>
Line 10, change "patternizing" to -- patternizing --.

Signed and Sealed this

Sixteenth Day of October, 2001

Attest:

NICHOLAS P. GODICI
*Attesting Officer*    *Acting Director of the United States Patent and Trademark Office*